US010564826B2

(12) United States Patent
Victor

(10) Patent No.: US 10,564,826 B2
(45) Date of Patent: Feb. 18, 2020

(54) DEVICE, METHOD, AND GRAPHICAL USER INTERFACE FOR MANIPULATING USER INTERFACE OBJECTS

(71) Applicant: Apple Inc., Cupertino, CA (US)

(72) Inventor: B. Michael Victor, Castro Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/403,184

(22) Filed: May 3, 2019

(65) Prior Publication Data

US 2020/0004409 A1 Jan. 2, 2020

Related U.S. Application Data

(63) Continuation of application No. 15/088,450, filed on Apr. 1, 2016, now Pat. No. 10,282,070, which is a (Continued)

(51) Int. Cl.

*G06F 3/041* (2006.01)
*G06F 3/0484* (2013.01)
(Continued)

(52) U.S. Cl.

CPC .......... *G06F 3/04842* (2013.01); *G06F 3/041* (2013.01); *G06F 3/0482* (2013.01); *G06F 3/0485* (2013.01); *G06F 3/0486* (2013.01); *G06F 3/0488* (2013.01); *G06F 3/04817* (2013.01); *G06F 3/04845* (2013.01); *G06F 3/04883* (2013.01); *G06F 3/04886* (2013.01);
(Continued)

(58) Field of Classification Search

None
See application file for complete search history.

(56) References Cited

U.S. PATENT DOCUMENTS 4,885,786 A 12/1989 Anderson et al.
5,283,561 A 2/1994 Lumelsky et al.
(Continued)

FOREIGN PATENT DOCUMENTS

CN 1404233 A 3/2003
CN 1717918 A 1/2006
(Continued)

OTHER PUBLICATIONS

US 2002/0018582 A1, 02/2002, Hagiwara et al. (withdrawn)
(Continued)

*Primary Examiner* — Peter Vincent Agustin
(74) *Attorney, Agent, or Firm* — Dentons US LLP

(57) ABSTRACT

A computing device with a touch screen display simultaneously displays on the touch screen display a plurality of user interface objects and at least one destination object. The computing device detects a first input by a user on a destination object displayed on the touch screen display. While continuing to detect the first input by the user on the destination object, the computing device detects a second input by the user on a first user interface object displayed on the touch screen display. In response to detecting the second input by the user on the first user interface object, the computing device performs an action on the first user interface object. The action is associated with the destination object.

24 Claims, 145 Drawing Sheets

Related U.S. Application Data continuation of application No. 13/909,002, filed on Jun. 3, 2013, now Pat. No. 9,310,907, which is a continuation of application No. 12/567,570, filed on Sep. 25, 2009, now Pat. No. 8,456,431.

(51) Int. Cl.

| | |
|---|---|
| ***G06F 3/0488*** | (2013.01) |
| ***G06F 3/0485*** | (2013.01) |
| ***G06F 3/0486*** | (2013.01) |
| ***G06F 3/0481*** | (2013.01) |
| ***G06F 3/0482*** | (2013.01) |

(52) U.S. Cl.

CPC .............. *G06F 2203/04806* (2013.01); *G06F 2203/04808* (2013.01)

(56) References Cited

U.S. PATENT DOCUMENTS

| | | | |
|---|---|---|---|
| 5,327,161 | A | 7/1994 | Logan et al. |
| 5,359,703 | A | 10/1994 | Robertson et al. |
| 5,371,845 | A | 12/1994 | Newell et al. |
| 5,424,756 | A | 6/1995 | Ho et al. |
| 5,463,725 | A | 10/1995 | Henckel et al. |
| 5,483,261 | A | 1/1996 | Yasutake |
| 5,490,241 | A | 2/1996 | Mallgren et al. |
| 5,499,334 | A | 3/1996 | Staab |
| 5,511,148 | A | 4/1996 | Wellner |
| 5,533,183 | A | 7/1996 | Henderson, Jr. et al. |
| 5,581,670 | A | 12/1996 | Bier et al. |
| 5,583,542 | A | 12/1996 | Capps et al. |
| 5,602,981 | A | 2/1997 | Hargrove |
| 5,675,753 | A | 10/1997 | Hansen et al. |
| 5,677,708 | A | 10/1997 | Matthew et al. |
| 5,712,995 | A | 1/1998 | Cohn |
| 5,729,673 | A | 3/1998 | Cooper et al. |
| 5,732,227 | A | 3/1998 | Kuzunuki et al. |
| 5,767,835 | A | 6/1998 | Obbink et al. |
| 5,808,601 | A | 9/1998 | Leah et al. |
| 5,825,349 | A | 10/1998 | Meier et al. |
| 5,825,352 | A | 10/1998 | Bisset et al. |
| 5,841,435 | A | 11/1998 | Dauerer et al. |
| 5,845,122 | A | 12/1998 | Nielsen et al. |
| 5,864,868 | A | 1/1999 | Contois |
| 5,872,559 | A | 2/1999 | Shieh |
| 5,880,743 | A | 3/1999 | Moran et al. |
| 5,886,697 | A | 3/1999 | Naughton et al. |
| 5,910,800 | A | 6/1999 | Shields et al. |
| 5,969,283 | A | 10/1999 | Looney et al. |
| 6,025,844 | A | 2/2000 | Parsons |
| 6,028,271 | A | 2/2000 | Gillespie et al. |
| 6,055,543 | A | 4/2000 | Christensen et al. |
| 6,065,021 | A | 5/2000 | George |
| 6,073,036 | A | 6/2000 | Heikkinen et al. |
| 6,075,531 | A | 6/2000 | DeStefano |
| 6,088,649 | A | 7/2000 | Kadaba et al. |
| 6,118,450 | A | 9/2000 | Proehl et al. |
| 6,141,007 | A | 10/2000 | Lebling et al. |
| 6,160,551 | A | 12/2000 | Naughton et al. |
| 6,167,469 | A | 12/2000 | Safai et al. |
| 6,175,364 | B1 | 1/2001 | Wong et al. |
| 6,208,329 | B1 | 3/2001 | Ballare |
| 6,215,490 | B1 | 4/2001 | Kaply |
| 6,232,957 | B1 | 5/2001 | Hinckley |
| 6,237,010 | B1 | 5/2001 | Hui et al. |
| 6,245,982 | B1 | 6/2001 | Suzuki et al. |
| 6,248,946 | B1 | 6/2001 | Dwek |
| 6,253,218 | B1 | 6/2001 | Aoki et al. |
| 6,266,057 | B1 | 7/2001 | Kuzunuki et al. |
| 6,278,443 | B1 | 8/2001 | Amro et al. |
| 6,301,586 | B1 | 10/2001 | Yang et al. |
| 6,317,784 | B1 | 11/2001 | Mackintosh et al. |
| 6,323,846 | B1 | 11/2001 | Westerman et al. |
| 6,334,025 | B1 | 12/2001 | Yamagami |
| 6,346,935 | B1 | 2/2002 | Nakajima et al. |
| 6,346,951 | B1 | 2/2002 | Mastronardi |
| 6,356,971 | B1 | 3/2002 | Katz et al. |
| 6,374,177 | B1 | 4/2002 | Lee et al. |
| 6,380,947 | B1 | 4/2002 | Stead |
| 6,392,673 | B1 | 5/2002 | Andrew et al. |
| 6,462,760 | B1 | 10/2002 | Cox, Jr. et al. |
| 6,480,813 | B1 | 11/2002 | Bloomquist et al. |
| 6,545,669 | B1 | 4/2003 | Kinawi et al. |
| 6,564,213 | B1 | 5/2003 | Ortega et al. |
| 6,565,608 | B1 | 5/2003 | Fein et al. |
| 6,570,557 | B1 | 5/2003 | Westerman et al. |
| 6,646,655 | B1 | 11/2003 | Brandt et al. |
| 6,657,615 | B2 | 12/2003 | Harada |
| 6,677,932 | B1 | 1/2004 | Westerman |
| 6,686,935 | B1 | 2/2004 | Richard |
| 6,690,365 | B2 | 2/2004 | Hinckley et al. |
| 6,713,312 | B2 | 3/2004 | Blalock et al. |
| 6,731,312 | B2 | 5/2004 | Robbin |
| 6,784,925 | B1 | 8/2004 | Tomat et al. |
| 6,807,361 | B1 | 10/2004 | Girgensohn et al. |
| 6,856,259 | B1 | 2/2005 | Sharp |
| 6,888,536 | B2 | 5/2005 | Westerman et al. |
| 6,903,751 | B2 | 6/2005 | Saund et al. |
| 6,920,619 | B1 | 7/2005 | Milekic |
| 6,928,619 | B2 | 8/2005 | Clow et al. |
| 7,030,861 | B1 | 4/2006 | Westerman et al. |
| 7,093,192 | B2 | 8/2006 | Mullen et al. |
| 7,110,005 | B2 | 9/2006 | Arvin et al. |
| 7,134,093 | B2 | 11/2006 | Etgen et al. |
| 7,158,158 | B1 | 1/2007 | Fleming et al. |
| 7,164,410 | B2 | 1/2007 | Kupka |
| 7,190,379 | B2 | 3/2007 | Nissen |
| 7,216,293 | B2 | 5/2007 | Kataoka et al. |
| 7,218,226 | B2 | 5/2007 | Wehrenberg |
| 7,287,241 | B2 | 10/2007 | Balsiger |
| 7,380,212 | B2 | 5/2008 | Cody et al. |
| 7,444,390 | B2 | 10/2008 | Tadayon et al. |
| 7,453,444 | B2 | 11/2008 | Geaghan |
| 7,454,717 | B2 | 11/2008 | Hinckley et al. |
| 7,456,823 | B2 | 11/2008 | Poupyrev et al. |
| 7,469,381 | B2 | 12/2008 | Ording |
| 7,469,833 | B1 | 12/2008 | Kelley et al. |
| 7,477,233 | B2 | 1/2009 | Duncan et al. |
| 7,489,324 | B2 | 2/2009 | Royal et al. |
| 7,555,710 | B2 | 6/2009 | Kobashi et al. |
| 7,557,797 | B2 | 7/2009 | Ludwig |
| 7,559,034 | B1 | 7/2009 | Paperny et al. |
| 7,614,008 | B2 | 11/2009 | Ording |
| 7,619,618 | B2 | 11/2009 | Westerman et al. |
| 7,627,828 | B1 | 12/2009 | Collison et al. |
| 7,633,076 | B2 | 12/2009 | Huppi et al. |
| 7,634,725 | B2 | 12/2009 | Nishikawa |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,688,306 | B2 | 3/2010 | Wehrenberg et al. |
| 7,694,231 | B2 | 4/2010 | Kocienda et al. |
| 7,705,830 | B2 | 4/2010 | Westerman et al. |
| 7,728,823 | B2 | 6/2010 | Lyon et al. |
| 7,743,348 | B2 | 6/2010 | Robbins et al. |
| 7,791,755 | B2 | 9/2010 | Mori |
| 7,812,826 | B2 | 10/2010 | Ording et al. |
| 7,823,080 | B2 | 10/2010 | Miyajima et al. |
| 7,856,605 | B2 | 12/2010 | Ording et al. |
| 7,904,810 | B2 | 3/2011 | Chen et al. |
| 7,934,156 | B2 | 4/2011 | Forstall et al. |
| 7,936,341 | B2 | 5/2011 | Weiss |
| 7,956,847 | B2 | 6/2011 | Christie |
| 7,996,788 | B2 * | 8/2011 | Carmichael ........... G06F 3/0482 715/834 |
| 8,023,158 | B2 | 9/2011 | Maki et al. |
| 8,024,658 | B1 | 9/2011 | Fagans et al. |
| 8,024,667 | B2 | 9/2011 | Shaw et al. |
| 8,095,884 | B2 | 1/2012 | Karunakaran et al. |
| 8,106,856 | B2 | 1/2012 | Matas et al. |
| 8,152,640 | B2 | 4/2012 | Shirakawa et al. |
| 8,161,400 | B2 | 4/2012 | Kwon |
| 8,171,401 | B2 | 5/2012 | Sun |

(56) References Cited

U.S. PATENT DOCUMENTS 8,171,431 B2 5/2012 Grossman et al.
8,176,435 B1 5/2012 Jitkoff et al.
8,176,438 B2 5/2012 Zaman et al.
8,209,630 B2 6/2012 Thimbleby et al.
8,259,132 B2 * 9/2012 Buchheit .............. G06F 3/0482 345/619
8,276,085 B2 9/2012 Sherwani
8,291,349 B1 10/2012 Park et al.
8,291,350 B1 10/2012 Park et al.
8,305,355 B2 11/2012 Matas et al.
8,312,387 B2 11/2012 Williams et al.
8,339,420 B2 12/2012 Hiraoka
8,448,083 B1 5/2013 Migos et al.
8,451,268 B1 5/2013 Reisman et al.
8,456,431 B2 6/2013 Victor
8,458,617 B2 6/2013 Victor
8,464,173 B2 6/2013 Victor
8,525,799 B1 9/2013 Grivna et al.
8,539,385 B2 9/2013 Capela et al.
8,539,386 B2 9/2013 Capela et al.
8,612,884 B2 12/2013 Capela et al.
8,677,268 B2 3/2014 Capela et al.
8,766,928 B2 7/2014 Weeldreyer et al.
8,780,069 B2 7/2014 Victor
8,799,826 B2 8/2014 Missig et al.
8,832,585 B2 9/2014 Missig et al.
8,863,016 B2 10/2014 Victor
8,957,865 B2 2/2015 Cieplinski et al.
8,966,399 B2 2/2015 Chiang et al.
8,972,879 B2 3/2015 Migos et al.
9,081,494 B2 7/2015 Migos
9,098,182 B2 8/2015 Migos et al.
9,310,907 B2 4/2016 Victor
9,459,792 B2 10/2016 Matas et al.
2002/0015024 A1 2/2002 Westerman et al.
2002/0018075 A1 2/2002 Maulik et al.
2002/0021758 A1 2/2002 Chui
2002/0054233 A1 5/2002 Juen
2002/0057292 A1 5/2002 Holtz
2002/0057461 A1 5/2002 Dow et al.
2002/0062321 A1 5/2002 Shibata
2002/0109668 A1 8/2002 Rosenberg et al.
2002/0109708 A1 8/2002 Peurach et al.
2002/0161772 A1 10/2002 Bergelson et al.
2003/0014382 A1 1/2003 Iwamoto et al.
2003/0048291 A1 3/2003 Dieberger
2003/0081135 A1 5/2003 Boll
2003/0122787 A1 7/2003 Zimmerman et al.
2003/0128192 A1 7/2003 Van Os
2003/0128241 A1 7/2003 Watanabe et al.
2003/0142137 A1 7/2003 Brown et al.
2003/0169288 A1 9/2003 Misawa
2003/0179240 A1 9/2003 Gest
2003/0189597 A1 10/2003 Anderson et al.
2003/0197687 A1 10/2003 Shetter
2003/0210268 A1 11/2003 Kataoka et al.
2003/0234768 A1 12/2003 Rekimoto et al.
2004/0046886 A1 3/2004 Ambiru et al.
2004/0066407 A1 4/2004 Regan et al.
2004/0088656 A1 5/2004 Washio
2004/0119758 A1 6/2004 Grossman et al.
2004/0141009 A1 7/2004 Hinckley et al.
2004/0150668 A1 8/2004 Myers et al.
2004/0174398 A1 9/2004 Luke et al.
2004/0174399 A1 9/2004 Wu et al.
2004/0183830 A1 9/2004 Cody et al.
2004/0205504 A1 10/2004 Phillips
2004/0207722 A1 10/2004 Koyama et al.
2004/0225968 A1 11/2004 Look et al.
2004/0239621 A1 12/2004 Numano
2004/0239691 A1 12/2004 Sprang et al.
2005/0041035 A1 2/2005 Nagatomo et al.
2005/0052427 A1 3/2005 Wu et al.
2005/0062130 A1 3/2005 Ciancio et al.
2005/0068290 A1 3/2005 Jaeger
2005/0071767 A1 3/2005 Kirkland
2005/0071774 A1 3/2005 Lipsky et al.
2005/0073601 A1 4/2005 Battles et al.
2005/0076307 A1 4/2005 Robbin
2005/0088418 A1 4/2005 Nguyen
2005/0088423 A1 4/2005 Keely et al.
2005/0091008 A1 4/2005 Green et al.
2005/0102635 A1 5/2005 Jiang et al.
2005/0104848 A1 5/2005 Yamaguchi et al.
2005/0108620 A1 5/2005 Allyn et al.
2005/0108656 A1 5/2005 Wu et al.
2005/0160377 A1 7/2005 Sciammarella et al.
2005/0177796 A1 8/2005 Takahashi
2005/0183026 A1 8/2005 Amano et al.
2005/0188329 A1 8/2005 Cutler et al.
2005/0195221 A1 9/2005 Berger et al.
2005/0231512 A1 10/2005 Niles et al.
2005/0289476 A1 12/2005 Tokkonen
2006/0001650 A1 1/2006 Robbins et al.
2006/0001652 A1 1/2006 Chiu et al.
2006/0004685 A1 1/2006 Pyhalammi et al.
2006/0017692 A1 1/2006 Wehrenberg et al.
2006/0022955 A1 2/2006 Kennedy
2006/0025218 A1 2/2006 Hotta
2006/0026521 A1 2/2006 Hotelling et al.
2006/0026535 A1 2/2006 Hotelling et al.
2006/0026536 A1 2/2006 Hotelling et al.
2006/0033721 A1 2/2006 Woolley et al.
2006/0033724 A1 2/2006 Chaudhri et al.
2006/0055662 A1 3/2006 Rimas-Ribikauskas et al.
2006/0055684 A1 3/2006 Rimas-Ribikauskas et al.
2006/0072028 A1 4/2006 Hong
2006/0077266 A1 4/2006 Nurmi
2006/0080386 A1 4/2006 Roykkee et al.
2006/0085757 A1 4/2006 Andre et al.
2006/0085767 A1 4/2006 Hinckley et al.
2006/0088228 A1 4/2006 Marriott et al.
2006/0112335 A1 5/2006 Hofmeister et al.
2006/0125803 A1 6/2006 Westerman et al.
2006/0129945 A1 6/2006 Dettinger et al.
2006/0136246 A1 6/2006 Tu
2006/0136833 A1 6/2006 Dettinger et al.
2006/0136839 A1 6/2006 Makela
2006/0161870 A1 7/2006 Hotelling et al.
2006/0164535 A1 7/2006 Oyama
2006/0170669 A1 8/2006 Walker et al.
2006/0174568 A1 8/2006 Kinoshita et al.
2006/0184966 A1 8/2006 Hunleth et al.
2006/0190833 A1 8/2006 Sangiovanni et al.
2006/0197750 A1 9/2006 Kerr et al.
2006/0197753 A1 9/2006 Hotelling
2006/0238517 A1 10/2006 King et al.
2006/0238521 A1 10/2006 Westerman et al.
2006/0248469 A1 11/2006 Czerwinski et al.
2006/0279532 A1 12/2006 Olszewski et al.
2007/0016868 A1 1/2007 Nurmi
2007/0031115 A1 2/2007 Oshikiri et al.
2007/0050726 A1 3/2007 Wakai et al.
2007/0055940 A1 3/2007 Moore et al.
2007/0061748 A1 3/2007 Hirose
2007/0064004 A1 3/2007 Bonner et al.
2007/0067711 A1 3/2007 Woodall et al.
2007/0079236 A1 4/2007 Schrier et al.
2007/0081740 A1 4/2007 Ciudad et al.
2007/0113198 A1 5/2007 Robertson et al.
2007/0126732 A1 6/2007 Robertson et al.
2007/0136778 A1 6/2007 Birger et al.
2007/0150810 A1 6/2007 Katz et al.
2007/0150839 A1 6/2007 Danninger
2007/0152980 A1 7/2007 Kocienda et al.
2007/0152984 A1 7/2007 Ording et al.
2007/0160345 A1 7/2007 Sakai et al.
2007/0177803 A1 8/2007 Elias et al.
2007/0179938 A1 8/2007 Ikeda et al.
2007/0186178 A1 8/2007 Schiller
2007/0188518 A1 8/2007 Vale et al.
2007/0192741 A1 8/2007 Yoritate et al.
2007/0192744 A1 8/2007 Reponen
2007/0192749 A1 8/2007 Baudisch

(56) References Cited

U.S. PATENT DOCUMENTS

| | | | |
|---|---|---|---|
| 2007/0198942 A1 | 8/2007 | Morris | |
| 2007/0204225 A1 | 8/2007 | Berkowitz et al. | |
| 2007/0209004 A1 | 9/2007 | Layard | |
| 2007/0220444 A1 | 9/2007 | Sunday et al. | |
| 2007/0229471 A1 | 10/2007 | Kim et al. | |
| 2007/0229678 A1 | 10/2007 | Barrus et al. | |
| 2007/0236475 A1 | 10/2007 | Wherry | |
| 2007/0245236 A1 | 10/2007 | Lee | |
| 2007/0245257 A1 | 10/2007 | Chan et al. | |
| 2007/0247435 A1 | 10/2007 | Benko et al. | |
| 2007/0253025 A1 | 11/2007 | Terayoko | |
| 2007/0257890 A1 | 11/2007 | Hotelling et al. | |
| 2007/0263025 A1 | 11/2007 | Ohashi et al. | |
| 2008/0019591 A1 | 1/2008 | Lwayama et al. | |
| 2008/0022197 A1 | 1/2008 | Bergeron et al. | |
| 2008/0030456 A1 | 2/2008 | Asadi | |
| 2008/0034317 A1 | 2/2008 | Fard et al. | |
| 2008/0036743 A1 | 2/2008 | Westerman et al. | |
| 2008/0040668 A1 | 2/2008 | Ala-rantala | |
| 2008/0042978 A1 | 2/2008 | Perez-Noguera | |
| 2008/0052945 A1 | 3/2008 | Matas et al. | |
| 2008/0057941 A1 | 3/2008 | Scott et al. | |
| 2008/0059888 A1 | 3/2008 | Dunko | |
| 2008/0066010 A1* | 3/2008 | Brodersen | G06F 3/0482 715/810 |
| 2008/0066015 A1 | 3/2008 | Blankenhorn | |
| 2008/0066016 A1 | 3/2008 | Dowdy et al. | |
| 2008/0072173 A1 | 3/2008 | Brunner et al. | |
| 2008/0094368 A1 | 4/2008 | Ording et al. | |
| 2008/0094370 A1 | 4/2008 | Ording et al. | |
| 2008/0098331 A1 | 4/2008 | Novick et al. | |
| 2008/0100642 A1 | 5/2008 | Betancourt et al. | |
| 2008/0109751 A1 | 5/2008 | Fitzmaurice et al. | |
| 2008/0111766 A1 | 5/2008 | Uchino et al. | |
| 2008/0133697 A1 | 6/2008 | Stewart et al. | |
| 2008/0136786 A1 | 6/2008 | Lanfermann | |
| 2008/0140868 A1 | 6/2008 | Kalayjian et al. | |
| 2008/0147664 A1 | 6/2008 | Fujiwara et al. | |
| 2008/0148181 A1 | 6/2008 | Reyes et al. | |
| 2008/0150715 A1 | 6/2008 | Tang et al. | |
| 2008/0155478 A1* | 6/2008 | Stross | G06F 3/0481 715/849 |
| 2008/0165141 A1 | 7/2008 | Christie | |
| 2008/0165142 A1 | 7/2008 | Kocienda et al. | |
| 2008/0167834 A1 | 7/2008 | Herz et al. | |
| 2008/0168403 A1 | 7/2008 | Westerman et al. | |
| 2008/0168404 A1 | 7/2008 | Ording | |
| 2008/0174570 A1 | 7/2008 | Jobs et al. | |
| 2008/0180404 A1 | 7/2008 | Han et al. | |
| 2008/0180405 A1 | 7/2008 | Han et al. | |
| 2008/0180406 A1 | 7/2008 | Han et al. | |
| 2008/0186285 A1 | 8/2008 | Shimizu | |
| 2008/0211766 A1 | 9/2008 | Westerman et al. | |
| 2008/0216022 A1 | 9/2008 | Lorch et al. | |
| 2008/0229223 A1 | 9/2008 | Kake | |
| 2008/0244410 A1 | 10/2008 | Schormann | |
| 2008/0259040 A1 | 10/2008 | Ording et al. | |
| 2008/0267468 A1 | 10/2008 | Geiger et al. | |
| 2008/0270886 A1 | 10/2008 | Gossweiler et al. | |
| 2008/0278455 A1 | 11/2008 | Atkins et al. | |
| 2008/0284799 A1 | 11/2008 | Hollemans et al. | |
| 2008/0297482 A1 | 12/2008 | Weiss | |
| 2008/0303786 A1 | 12/2008 | Nakamura et al. | |
| 2008/0309632 A1 | 12/2008 | Westerman et al. | |
| 2008/0320391 A1 | 12/2008 | Lemay et al. | |
| 2008/0320419 A1 | 12/2008 | Matas et al. | |
| 2009/0013350 A1 | 1/2009 | Ohlfs et al. | |
| 2009/0021576 A1 | 1/2009 | Linder et al. | |
| 2009/0051660 A1 | 2/2009 | Feland et al. | |
| 2009/0051946 A1 | 2/2009 | Hibi | |
| 2009/0052751 A1 | 2/2009 | Chaney et al. | |
| 2009/0055748 A1 | 2/2009 | Dieberger et al. | |
| 2009/0079700 A1 | 3/2009 | Abernathy | |
| 2009/0083655 A1 | 3/2009 | Beharie et al. | |
| 2009/0100383 A1 | 4/2009 | Sunday et al. | |
| 2009/0113330 A1 | 4/2009 | Garrison et al. | |
| 2009/0122018 A1 | 5/2009 | Vymenets et al. | |
| 2009/0128516 A1 | 5/2009 | Rimon et al. | |
| 2009/0140997 A1 | 6/2009 | Jeong et al. | |
| 2009/0150775 A1 | 6/2009 | Miyazaki et al. | |
| 2009/0158326 A1 | 6/2009 | Hunt et al. | |
| 2009/0164936 A1 | 6/2009 | Kawaguchi | |
| 2009/0172606 A1 | 7/2009 | Dunn et al. | |
| 2009/0174679 A1 | 7/2009 | Westerman | |
| 2009/0178008 A1 | 7/2009 | Herz et al. | |
| 2009/0183930 A1 | 7/2009 | Yang et al. | |
| 2009/0184939 A1 | 7/2009 | Wohlstadter et al. | |
| 2009/0193351 A1 | 7/2009 | Lee et al. | |
| 2009/0228792 A1 | 9/2009 | Van Os et al. | |
| 2009/0231275 A1 | 9/2009 | Odgers | |
| 2009/0237363 A1 | 9/2009 | Levy et al. | |
| 2009/0239587 A1 | 9/2009 | Negron et al. | |
| 2009/0256809 A1 | 10/2009 | Minor | |
| 2009/0256857 A1 | 10/2009 | Davidson et al. | |
| 2009/0259964 A1 | 10/2009 | Davidson et al. | |
| 2009/0259967 A1 | 10/2009 | Davidson et al. | |
| 2009/0282332 A1 | 11/2009 | Porat | |
| 2009/0282359 A1 | 11/2009 | Saul et al. | |
| 2009/0303231 A1 | 12/2009 | Robinet et al. | |
| 2009/0307589 A1 | 12/2009 | Inose et al. | |
| 2009/0309881 A1 | 12/2009 | Zhao et al. | |
| 2009/0327975 A1 | 12/2009 | Stedman | |
| 2010/0002002 A1 | 1/2010 | Lipsky et al. | |
| 2010/0004030 A1 | 1/2010 | Nam | |
| 2010/0007623 A1 | 1/2010 | Kaneko et al. | |
| 2010/0017734 A1 | 1/2010 | Cummins et al. | |
| 2010/0026647 A1 | 2/2010 | Abe et al. | |
| 2010/0031202 A1 | 2/2010 | Morris et al. | |
| 2010/0031203 A1 | 2/2010 | Morris et al. | |
| 2010/0050076 A1 | 2/2010 | Roth | |
| 2010/0053111 A1 | 3/2010 | Karlsson | |
| 2010/0058238 A1 | 3/2010 | Ben Moshe | |
| 2010/0073318 A1 | 3/2010 | Hu et al. | |
| 2010/0088624 A1 | 4/2010 | Bligh et al. | |
| 2010/0088641 A1 | 4/2010 | Choi | |
| 2010/0090971 A1 | 4/2010 | Choi et al. | |
| 2010/0095205 A1 | 4/2010 | Kinoshita | |
| 2010/0095206 A1 | 4/2010 | Kim | |
| 2010/0107101 A1 | 4/2010 | Shaw et al. | |
| 2010/0134425 A1 | 6/2010 | Storrusten | |
| 2010/0146436 A1 | 6/2010 | Jakobson et al. | |
| 2010/0149211 A1 | 6/2010 | Tossing et al. | |
| 2010/0153833 A1 | 6/2010 | Siegel et al. | |
| 2010/0156813 A1 | 6/2010 | Duarte et al. | |
| 2010/0162105 A1 | 6/2010 | Beebe et al. | |
| 2010/0169819 A1 | 7/2010 | Bestle et al. | |
| 2010/0185949 A1 | 7/2010 | Jaeger | |
| 2010/0191701 A1 | 7/2010 | Beyda et al. | |
| 2010/0194703 A1 | 8/2010 | Fedor et al. | |
| 2010/0211920 A1 | 8/2010 | Westerman et al. | |
| 2010/0214571 A1 | 8/2010 | Luo | |
| 2010/0218100 A1 | 8/2010 | Simon et al. | |
| 2010/0228746 A1 | 9/2010 | Harada | |
| 2010/0231533 A1 | 9/2010 | Chaudhri | |
| 2010/0235794 A1 | 9/2010 | Ording | |
| 2010/0241955 A1 | 9/2010 | Price et al. | |
| 2010/0262634 A1 | 10/2010 | Wang | |
| 2010/0283743 A1 | 11/2010 | Coddington | |
| 2010/0283750 A1 | 11/2010 | Kang et al. | |
| 2010/0283754 A1 | 11/2010 | Nakao | |
| 2010/0289760 A1 | 11/2010 | Jonoshita et al. | |
| 2010/0299598 A1 | 11/2010 | Shin et al. | |
| 2010/0302176 A1 | 12/2010 | Nikula et al. | |
| 2010/0309140 A1 | 12/2010 | Widgor | |
| 2010/0313125 A1 | 12/2010 | Fleizach et al. | |
| 2010/0313126 A1 | 12/2010 | Jung et al. | |
| 2010/0318904 A1 | 12/2010 | Hillis et al. | |
| 2010/0325529 A1 | 12/2010 | Sun | |
| 2010/0333044 A1 | 12/2010 | Kethireddy | |
| 2011/0004830 A1 | 1/2011 | Von Kaenel et al. | |
| 2011/0010672 A1 | 1/2011 | Hope | |
| 2011/0012848 A1 | 1/2011 | Li et al. | |
| 2011/0012856 A1 | 1/2011 | Maxwell et al. | |
| 2011/0018821 A1 | 1/2011 | Kii | |

(56) References Cited

U.S. PATENT DOCUMENTS

| | | | |
|---|---|---|---|
| 2011/0029927 | A1 | 2/2011 | Lietzke et al. |
| 2011/0029934 | A1 | 2/2011 | Locker et al. |
| 2011/0055742 | A1 | 3/2011 | Tomono |
| 2011/0069016 | A1 | 3/2011 | Victor |
| 2011/0069017 | A1 | 3/2011 | Victor |
| 2011/0069018 | A1 | 3/2011 | Atkins et al. |
| 2011/0074710 | A1 | 3/2011 | Weeldreyer et al. |
| 2011/0093812 | A1 | 4/2011 | Fong |
| 2011/0093821 | A1 | 4/2011 | Wigdor et al. |
| 2011/0099299 | A1 | 4/2011 | Vasudevan et al. |
| 2011/0109581 | A1 | 5/2011 | Ozawa et al. |
| 2011/0128367 | A1 | 6/2011 | Yoshioka et al. |
| 2011/0145759 | A1 | 6/2011 | Leffert et al. |
| 2011/0163944 | A1 | 7/2011 | Bilbrey et al. |
| 2011/0163968 | A1 | 7/2011 | Hogan |
| 2011/0179097 | A1 | 7/2011 | Ala-rantala |
| 2011/0179368 | A1 | 7/2011 | King et al. |
| 2011/0179373 | A1 | 7/2011 | Moore et al. |
| 2011/0185316 | A1 | 7/2011 | Reid et al. |
| 2011/0185321 | A1 | 7/2011 | Capela et al. |
| 2011/0209058 | A1 | 8/2011 | Hinckley et al. |
| 2011/0209100 | A1 | 8/2011 | Hinckley et al. |
| 2011/0209102 | A1 | 8/2011 | Hinckley et al. |
| 2011/0209104 | A1 | 8/2011 | Hinckley et al. |
| 2011/0231796 | A1 | 9/2011 | Vigil |
| 2011/0246918 | A1 | 10/2011 | Henderson |
| 2011/0252370 | A1 | 10/2011 | Chaudhri |
| 2011/0252380 | A1 | 10/2011 | Chaudhri |
| 2011/0252381 | A1 | 10/2011 | Chaudhri |
| 2011/0258537 | A1 | 10/2011 | Rives et al. |
| 2011/0302519 | A1 | 12/2011 | Fleizach et al. |
| 2011/0314422 | A1 | 12/2011 | Cameron et al. |
| 2012/0023453 | A1 | 1/2012 | Wagner |
| 2012/0023459 | A1 | 1/2012 | Westerman |
| 2012/0026100 | A1 | 2/2012 | Migos et al. |
| 2012/0030568 | A1 | 2/2012 | Migos et al. |
| 2012/0030569 | A1 | 2/2012 | Migos et al. |
| 2012/0036460 | A1 | 2/2012 | Cieplinski et al. |
| 2012/0042272 | A1 | 2/2012 | Hong et al. |
| 2012/0044150 | A1 | 2/2012 | Karpin et al. |
| 2012/0117506 | A1 | 5/2012 | Koch et al. |
| 2012/0166975 | A1 | 6/2012 | Oh et al. |
| 2012/0188275 | A1 | 7/2012 | Shimazu et al. |
| 2013/0061175 | A1 | 3/2013 | Matas et al. |
| 2013/0174062 | A1 | 7/2013 | Stoustrup |
| 2013/0215064 | A1 | 8/2013 | Cholewin et al. |
| 2013/0263055 | A1 | 10/2013 | Victor |
| 2014/0002387 | A1 | 1/2014 | Hashiba |
| 2014/0075373 | A1 | 3/2014 | Jitkoff et al. |
| 2014/0075374 | A1 | 3/2014 | Jitkoff et al. |
| 2014/0333551 | A1 | 11/2014 | Kim et al. |
| 2014/0351707 | A1 | 11/2014 | Missig et al. |
| 2015/0007099 | A1 | 1/2015 | Bernaudin et al. |
| 2015/0015502 | A1 | 1/2015 | Al-Nasser |
| 2015/0111558 | A1 | 4/2015 | Yang |
| 2015/0130719 | A1 | 5/2015 | Wehrenberg et al. |
| 2015/0309692 | A1 | 10/2015 | Migos |
| 2016/0216868 | A1 | 7/2016 | Victor |
| 2017/0019587 | A1 | 1/2017 | Matas et al. |

FOREIGN PATENT DOCUMENTS

| | | | |
|---|---|---|---|
| CN | 1756273 | A | 4/2006 |
| CN | 101063925 | A | 10/2007 |
| CN | 101446884 | A | 6/2009 |
| CN | 101458586 | A | 6/2009 |
| CN | 101599002 | A | 12/2009 |
| CN | 101617288 | A | 12/2009 |
| EP | 0871177 | A2 | 10/1998 |
| EP | 1124175 | A2 | 8/2001 |
| EP | 1148412 | A2 | 10/2001 |
| EP | 1289210 | A2 | 3/2003 |
| EP | 1577746 | A2 | 9/2005 |
| EP | 1615114 | A2 | 1/2006 |
| EP | 1840717 | A1 | 10/2007 |
| EP | 2060970 | A1 | 5/2009 |
| EP | 2068237 | A2 | 6/2009 |
| EP | 2136290 | A2 | 12/2009 |
| EP | 2284675 | A2 | 2/2011 |
| FR | 2830093 | A3 | 3/2003 |
| GB | 2420260 | A | 5/2006 |
| JP | 3-217976 | A | 9/1991 |
| JP | 6-309138 | A | 11/1994 |
| JP | 7-175587 | A | 7/1995 |
| JP | 8-106469 | A | 4/1996 |
| JP | 11-164175 | A | 6/1999 |
| JP | 11-168694 | A | 6/1999 |
| JP | 2000-138883 | A | 5/2000 |
| JP | 2000-148591 | A | 5/2000 |
| JP | 2000-163031 | A | 6/2000 |
| JP | 2000-221879 | A | 8/2000 |
| JP | 2000-244673 | A | 9/2000 |
| JP | 2000-350134 | A | 12/2000 |
| JP | 2001-136303 | A | 5/2001 |
| JP | 2001-228971 | A | 8/2001 |
| JP | 2001-265481 | A | 9/2001 |
| JP | 2001-309019 | A | 11/2001 |
| JP | 2002-152559 | A | 5/2002 |
| JP | 2003-163820 | A | 6/2003 |
| JP | 2003-338975 | A | 11/2003 |
| JP | 2003-345491 | A | 12/2003 |
| JP | 2004-32346 | A | 1/2004 |
| JP | 2004-145291 | A | 5/2004 |
| JP | 2004-153832 | A | 5/2004 |
| JP | 2004-234661 | A | 8/2004 |
| JP | 2004-288208 | A | 10/2004 |
| JP | 2004-336536 | A | 11/2004 |
| JP | 2004-336711 | A | 11/2004 |
| JP | 2005-38101 | A | 2/2005 |
| JP | 2005-92386 | A | 4/2005 |
| JP | 2005-100084 | A | 4/2005 |
| JP | 2005-515530 | A | 5/2005 |
| JP | 2005-150836 | A | 6/2005 |
| JP | 2005-175991 | A | 6/2005 |
| JP | 2005-182320 | A | 7/2005 |
| JP | 2005-202483 | A | 7/2005 |
| JP | 2005-202651 | A | 7/2005 |
| JP | 2005-303728 | A | 10/2005 |
| JP | 2005-321516 | A | 11/2005 |
| JP | 2005-339420 | A | 12/2005 |
| JP | 2006-67344 | A | 3/2006 |
| JP | 2006-139340 | A | 6/2006 |
| JP | 2006-140865 | A | 6/2006 |
| JP | 2006-195592 | A | 7/2006 |
| JP | 2006203809 | A | 8/2006 |
| JP | 2006-236249 | A | 9/2006 |
| JP | 2007-515775 | A | 6/2007 |
| JP | 2007-525775 | A | 9/2007 |
| JP | 2008-106469 | A | 5/2008 |
| JP | 2008-518330 | A | 5/2008 |
| JP | 2009-217815 | A | 9/2009 |
| JP | 2013-140171 | A | 7/2013 |
| JP | 2013-541061 | A | 11/2013 |
| JP | 5771242 | B2 | 8/2015 |
| KR | 10-2005-0051638 | A | 6/2005 |
| KR | 10-2005-0101162 | A | 10/2005 |
| KR | 10-2006-0032793 | A | 4/2006 |
| KR | 10-2009-0070491 | A | 7/2009 |
| WO | 2000/16186 | A2 | 3/2000 |
| WO | 2001/29702 | A2 | 4/2001 |
| WO | 2002/080176 | A2 | 10/2002 |
| WO | 2003/023593 | A1 | 3/2003 |
| WO | 2003/081458 | A1 | 10/2003 |
| WO | 2005/093550 | A2 | 10/2005 |
| WO | 2005/103863 | A2 | 11/2005 |
| WO | 2005/106800 | A2 | 11/2005 |
| WO | 2006/020305 | A2 | 2/2006 |
| WO | 2007/098243 | A2 | 8/2007 |
| WO | 2008/030779 | A2 | 3/2008 |
| WO | 2008/044024 | A2 | 4/2008 |
| WO | 2008/085737 | A1 | 7/2008 |
| WO | 2008/138046 | A1 | 11/2008 |

(56) References Cited

FOREIGN PATENT DOCUMENTS

| | | |
|---|---|---|
| WO | 2009/084141 A1 | 7/2009 |
| WO | 2009/084809 A1 | 7/2009 |
| WO | 2012/015933 A1 | 2/2012 |

OTHER PUBLICATIONS

Advisory Action received for U.S. Appl. No. 12/848,087, dated Jun. 17, 2015, 3 pages.
*Apple Inc.* vs. *Samsung Electronics Co. Ltd. et al*, Judgment in Interlocutory proceeding, Case No. 396957/KG ZA 11-730, civil law sector, Aug. 24, 2011, pp. 1-65.
*Apple Inc.* vs. *Samsung Electronics Co. Ltd, et al*, Samsung's Motion to Supplement Invalidity Contentions, Case No. 11-cv-01846-LHK, filed Jan. 27, 2012 together with Exhibit 6, 47 pages.
*Apple Inc.* vs. *Samsung Electronics Co. Ltd, et al*, Samsung's Patent Local Rule 3-3 and 3-4 Disclosures, Case No. 11-cv-01846-LHK, dated Oct. 7, 2011, together with Exhibits G-1 through G-7 and Exhibit H, 287 pages.
Brief Communication Relating to Oral Proceedings received for European Patent Application No. 11741385.6, dated Oct. 23, 2017, 17 pages.
Decision on Appeal received for U.S. Appl. No. 12/848,087, dated Aug. 29, 2018, 9 pages.
Decision to Grant received for European Patent Application No. 09756118.7, dated Jul. 13, 2017, 2 pages.
Decision to Grant received for European Patent Application No. 11702357.2, dated Jul. 14, 2016, 2 pages.
Decision to Refusal received for European Patent Application No. 11741385.6, dated Dec. 14, 2017, 23 pages.
Ex-Parte Quayle Action received for U.S. Appl. No. 12/567,570, dated Oct. 3, 2012, 6 pages.
Extended European Search Report received for European Patent Application No. 16177552.3, dated Sep. 30, 2016, 7 pages.
Extended European Search Report received for European Patent Application No. 17180535.1, dated Oct. 30, 2017, 9 pages.
Final Office Action received for U.S. Appl. No. 14/455,303, dated Mar. 13, 2017, 33 pages.
Final Office Action received for U.S. Appl. No. 14/455,303, dated May 11, 2018, 30 pages.
HTC Europe Co. Ltd and Apple Inc. invalidity Claim dated Jul. 29, 2011, together with amended Particulars of Claim and amended Grounds of Invalidity, Jul. 29, 2011, 22 pages.
HTC Europe Co. Ltd and Apple Inc. Invalidity Claim No. HC 12 C 01465, together with annexes, dated Apr. 5, 2012, 12 pages.
Intention to Grant received for European Patent Application No. 09756118.7, dated Mar. 2, 2017, 8 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Non-Final Office Action received for U.S. Appl. No. 14/455,303, dated Jul. 29, 2016, 27 pages.
Non-Final Office Action received for U.S. Appl. No. 14/455,303, dated Oct. 18, 2017, 30 pages.
Non-Final Office Action received for U.S. Appl. No. 15/088,450, dated Jul. 23, 2018, 12 pages.
Notice of Acceptance received for Australian Patent Application No. 2015202218, dated Dec. 20, 2016, 3 pages.
Notice of Allowance received for Australian Patent Application No. 2015202218, dated Apr. 11, 2017, 4 pages.
Notice of Allowance received for Chinese Patent Application No. 201180016102.7, dated Sep. 5, 2016, 4 pages.
Notice of Allowance received for U.S. Appl. No. 12/567,570, dated Dec. 19, 2012, 7 pages.
Notice of Allowance received for U.S. Appl. No. 12/567,570, dated Mar. 27, 2013, 8 pages.
Notice of Allowance received for U.S. Appl. No. 12/848,087, dated Nov. 20, 2018, 9 pages.
Notice of Allowance received for U.S. Appl. No. 14/793,574, dated Dec. 13, 2016, 20 pages.
Notice of Allowance received for U.S. Appl. No. 15/088,450, dated Dec. 13, 2018, 7 pages.
Notice of Allowance received for U.S. Appl. No. 14/455,303, dated Nov. 21, 2018, 6 pages.
Office Action received for European Patent Application No. 11702358.0, dated Jun. 28, 2016, 5 pages.
Office Action received for European Patent Application No. 11702358.0, dated Mar. 9, 2018, 4 pages.
Office Action received for European Patent Application No. 11741385.6, dated Sep. 27, 2016, 8 pages.
Office Action received for European Patent Application No. 16177552.3, dated Aug. 23, 2018, 7 pages.
Office Action received for European Patent Application No. 17180535.1, dated Oct. 8, 2018, 6 pages.
Pleading notes Mr B.J. Berghuis van Woortman, in matter of Apple Inc. vs Samsung Electronics, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
"*Samsung Electronics GmbH* vs *Apple Inc*, List scrolling and document translation, scaling and rotation on a touch-screen display", Opposition, Jan. 30, 2012, 27 pages.
*Samsung Electronics* vs *Apple Inc*, Statement of Defense Also Counterclaim, Case No. KG ZA 2011-730, Jul. 20, 2011, 44 pages.
*Samsung Electronics* vs *Apple Inc*, Statement of Defense Also Counterclaim, Case No. KG ZA 2011-731, Jul. 20, 2011, 48 pages.
"Spaces (software)", Wikipedia, the free encyclopedia, available at <http://en.wikipedia.org/wiki/Spaces (software)>, Jul. 15, 2009, 3 pages.
Summons to Attend Oral Proceedings received for European Patent Application No. 09756118.7, dated Sep. 23, 2016, 8 pages.
Summons to attend Oral proceedings received for European Patent Application No. 11741385.6, dated Apr. 26, 2017, 10 pages.
Summons to Attend Oral proceedings received for European Patent Application No. 11741385.6, dated Oct. 19, 2017, 2 pages.
"Virtual Desktop", Wikipedia, the free encyclopedia, available at <http://en.wikipedia.org/wiki/Virtual_desktop>, Jul. 20, 2009, 5 pages.
"Visio 2003 Professional-Basics", Available online at: URL:http://d.scribd.com/docs/2dolxjrcshr9fcemu941.pdf, retrieved on Mar. 15, 2009, pp. 77-80.
Office Action received for European Patent Application No. 09756118.7, dated Feb. 13, 2013, 5 pages.
Office Action received for European Patent Application No. 09756118.7, dated Mar. 7, 2014, 7 pages.
Office Action Received for European Patent Application No. 09756118.7, dated Oct. 8, 2015, 6 pages.
Notice of Allowance received for Korean Patent Application No. 10-2012-7022209, dated Apr. 28, 2014, 5 pages.
Office Action received for Korean Patent Application No. 10-2012-7022209, dated Oct. 21, 2013, 4 pages.
Notice of Allowance received for Korean Patent Application No. 10-2012-7022448, dated Apr. 27, 2015, 2 pages.
Office Action Received for Korean Patent Application No. 10-2012-7022448, dated Jun. 13, 2014, 3 pages.
Notice of Allowance received for Korean Patent Application No. 10-2013-7003785, dated Aug. 14, 2014, 2 pages.
Office Action received for Korean Patent Application No. 10-2013-7003785, dated Jan. 28, 2014, 4 pages.
Intention to Grant received for European Patent Application No. 11702357.2, dated Feb. 26, 2016, 6 pages.
Office Action received for European Patent Application No. 11702357.2, dated Jan. 14, 2014, 5 pages.
Office Action received for European Patent Application No. 11741385.6, dated Jan. 22, 2014, 3 pages.
Office Action received for European Patent Application No. 11741385.6, dated Sep. 16, 2014, 7 pages.
Final Office Action received for U.S. Appl. No. 12/567,171, dated Jan. 3, 2013, 12 pages.
Non-Final Office Action received for U.S. Appl. No. 12/567,171, dated Jul. 6, 2012, 13 pages.

(56) References Cited

OTHER PUBLICATIONS

Notice of Allowance received for U.S. Appl. No. 12/567,171, dated Apr. 1, 2014, 8 pages.
Notice of Allowance received for U.S. Appl. No. 12/567,171, dated Oct. 4, 2013, 9 pages.
Final Office Action received for U.S. Appl. No. 12/567,206 dated Apr. 4, 2013, 21 pages.
Non-Final Office Action received for U.S. Appl. No. 12/567,206 dated Aug. 30, 2012, 13 pages.
Notice of Allowance received for U.S. Appl. No. 12/567,206 dated May 8, 2014, 8 pages.
Notice of Allowance received for U.S. Appl. No. 12/567,206, dated Aug. 21, 2014, 6 pages.
Notice of Allowance received for U.S. Appl. No. 12/567,206, dated Aug. 8, 2013, 8 pages.
Final Office Action received for U.S. Appl. No. 12/567,405, dated Dec. 17, 2012, 19 pages.
Non-Final Office Action received for U.S. Appl. No. 12/567,405, dated Jan. 16, 2014, 19 pages.
Non-Final Office Action received for U.S. Appl. No. 12/567,405, dated May 17, 2012, 14 pages.
Notice of Allowance received for U.S. Appl. No. 12/567,405, dated Jun. 11, 2014, 9 pages.
Non-Final Office Action received for U.S. Appl. No. 12/567,460, dated Aug. 4, 2011, 13 pages.
Notice of Allowance received for U.S. Appl. No. 12/567,460, dated Apr. 10, 2013, 9 pages.
Notice of Allowance received for U.S. Appl. No. 12/567,460, dated Aug. 10, 2012, 8 pages.
Notice of Allowance received for U.S. Appl. No. 12/567,460, dated Dec. 24, 2012, 8 pages.
Notice of Allowance received for U.S. Appl. No. 12/567,460, dated Jan. 18, 2012, 8 pages.
Final Office Action received for U.S. Appl. No. 12/567,553, dated Mar. 12, 2012, 15 pages.
Non-Final Office Action received for U.S. Appl. No. 12/567,553, dated Sep. 16, 2011, 11 pages.
Notice of Allowance received for U.S. Appl. No. 12/567,553, dated Apr. 2, 2013, 9 pages.
Notice of Allowance received for U.S. Appl. No. 12/567,553, dated Aug. 10, 2012, 8 pages.
Notice of Allowance received for U.S. Appl. No. 12/567,553, dated Dec. 24, 2012, 8 pages.
Notice of Allowance received for U.S. Appl. No. 12/567,553, dated Jun. 12, 2012, 8 pages.
Final Office Action received for U.S. Appl. No. 12/768,623, dated Jan. 22, 2013, 34 pages.
Final Office Action received for U.S. Appl. No. 12/768,623, dated Oct. 23, 2013, 31 pages.
Non-Final Office Action received for U.S. Appl. No. 12/768,623, dated Jun. 7, 2012, 12 pages.
Non-Final Office Action received for U.S. Appl. No. 12/768,623, dated May 30, 2013, 34 pages.
Notice of Allowance received for U.S. Appl. No. 12/768,623, dated Feb. 20, 2014, 8 pages.
Final Office Action received for U.S. Appl. No. 12/790,504, dated Apr. 1, 2013, 21 pages.
Non-Final Office Action received for U.S. Appl. No. 12/790,504, dated Oct. 3, 2012, 22 pages.
Notice of Allowance received for U.S. Appl. No. 12/790,504, dated Aug. 13, 2013, 14 pages.
Non-Final Office Action received for U.S. Appl. No. 12/790,508, dated Nov. 7, 2012, 32 pages.
Notice of Allowance received for U.S. Appl. No. 12/790,508, dated Jul. 10, 2013, 7 pages.
Notice of Allowance received for U.S. Appl. No. 12/790,508, dated Nov. 8, 2013, 11 pages.
Non-Final Office Action received for U.S. Appl. No. 12/790,516, dated Aug. 27, 2012, 9 pages.
Non-Final Office Action received for U.S. Appl. No. 12/790,516, dated Feb. 2, 2012, 10 pages.
Notice of Allowance received for U.S. Appl. No. 12/790,516, dated May 15, 2013, 7 pages.
Non-Final Office Action received for U.S. Appl. No. 12/790,524, dated Sep. 24, 2012, 22 pages.
Notice of Allowance received for U.S. Appl. No. 12/790,524, dated Feb. 5, 2013, 8 pages.
Notice of Allowance received for U.S. Appl. No. 12/790,524, dated May 13, 2013, 6 pages.
Final Office Action received for U.S. Appl. No. 12/848,063, dated Oct. 11, 2013, 15 pages.
Non-Final Office Action received for U.S. Appl. No. 12/848,063, dated Aug. 9, 2012, 14 pages.
Non-Final Office Action received for U.S. Appl. No. 12/848,063, dated Mar. 29, 2013, 13 pages.
Notice of Allowance received for U.S. Appl. No. 12/848,063, dated Dec. 4, 2014, 8 pages.
Notice of Allowance received for U.S. Appl. No. 12/848,063, dated Mar. 27, 2015, 8 pages.
Final Office Action received for U.S. Appl. No. 12/848,067 dated Jan. 10, 2013, 35 pages.
Non-Final Office Action received for U.S. Appl. No. 12/848,067, dated Apr. 16, 2014, 40 pages.
Non-Final Office Action received for U.S. Appl. No. 12/848,067, dated Jun. 6, 2012, 16 pages.
Notice of Allowance received for U.S. Appl. No. 12/848,067, dated Dec. 12, 2014, 2 pages.
Notice of Allowance received for U.S. Appl. No. 12/848,067, dated Oct. 22, 2014, 23 pages.
Final Office Action received for U.S. Appl. No. 12/848,074, dated Apr. 3, 2013, 15 pages.
Non-Final Office Action received for U.S. Appl. No. 12/848,074, dated Jun. 29, 2012, 12 pages.
Notice of Allowance received for U.S. Appl. No. 12/848,074, dated Apr. 28, 2015, 5 pages.
Notice of Allowance received for U.S. Appl. No. 12/848,074, dated Jun. 3, 2015, 5 pages.
Notice of Allowance received for U.S. Appl. No. 12/848,074, dated Mar. 13, 2015, 8 pages.
Notice of Allowance received for U.S. Appl. No. 12/848,074, dated May 13, 2014, 10 pages.
Final Office Action received for U.S. Appl. No. 12/848,087, dated Jan. 28, 2015, 30 pages.
Final Office Action received for U.S. Appl. No. 12/848,087, dated Aug. 22, 2013, 22 pages.
Non-Final Office Action received for U.S. Appl. No. 12/848,087, dated Jul. 14, 2014, 18 pages.
Non-Final Office Action received for U.S. Appl. No. 12/848,087, dated Mar. 7, 2013, 19 pages.
Non-Final Office Action received for U.S. Appl. No. 13/909,001, dated Sep. 26, 2013, 7 pages.
Notice of Allowance received for U.S. Appl. No. 13/909,001, dated Mar. 3, 2014, 7 pages.
Non-Final Office Action received for U.S. Appl. No. 13/909,002, dated Jun. 23, 2015, 6 pages.
Notice of Allowance received for U.S. Appl. No. 13/909,002, dated Dec. 4, 2015, 7 pages.
Notice of Acceptance received for Australian Patent Application No. 2011209729, dated Jan. 15, 2015, 2 pages.
Office Action received for Australian Patent Application No. 2011209729, dated Jun. 24, 2013, 4 pages.
Notice of Acceptance received for Australian Patent Application No. 2011282703, dated May 8, 2015, 2 pages.
Office Action received for Australian Patent Application No. 2011282703, dated Oct. 21, 2013, 3 pages.
Office Action received for Chinese Patent Application No. 201180016102.7, dated Aug. 25, 2015, 23 pages.
Office Action received for Chinese Patent Application No. 201180016102.7, dated Oct. 16, 2014, 10 pages.
Office Action received for Chinese Patent Application No. 201180016102.7, dated Mar. 9, 2016, 8 pages.

(56) References Cited

OTHER PUBLICATIONS

Notice of Allowance received for Chinese Patent Application No. 201180037474.8, dated Mar. 3, 2016, 3 pages.
Office Action received for Chinese Patent Application No. 201180037474.8, dated Aug. 24, 2015, 8 pages.
Office Action received for Chinese Patent Application No. 201180037474.8, dated Dec. 22, 2014, 6 pages.
Decision on Appeal received for Japanese Patent Application No. 2013521943, dated Mar. 25, 2016, 3 pages.
Office Action Received for Japanese Patent Application No. 2013521943, dated Nov. 2, 2015, 4 pages.
Office Action received for Japanese Patent Application No. 2013-521943, dated Feb. 27, 2015, 2 pages.
Office Action received for Japanese Patent Application No. 2013-521943, dated Jan. 6, 2014, 2 pages.
Office Action received for Japanese Patent Application No. 2013-521943, dated Sep. 1, 2014, 2 pages.
Office Action received for Australian Patent Application No. 2015202218, dated Feb. 12, 2016, 5 pages.
ALAI6666, "Jeff Han's 8 ft. Multi-Touch Display Wall", Available online at <http://www.youtube.com/watch?v=JfFwgPuEdSk>, retrieved on May 16, 2007, 2 pages.
Alessandro, Valli, "Minority Report interface prototype", Available online at <http://www.youtube.com/watch?v=3bn-zZX9kdc>, retrieved on Jul. 12, 2006, 3 pages.
Angell, "Is Bimanual the Future Paradigm for Human Computer Interaction?", University of Plymouth, 2006, 2006, 36 pages.
Anthes, Gary, "Give your computer the finger: Touch-screen tech comes of age", Feb. 1, 2008, 3 Pages.
Apple.com, "Pages. Keyboard Shortcuts", available at <http://www.apple.com/support/pages./shortcuts/>, retrieved on Jan. 18, 2010, 6 pages.
Apted et al, "Tabletop Sharing of Digital Photographs for the Elderly", CHI 2006: Proceedings, Apr. 2006, Montreal, Quebec, Canada, Apr. 2006, 10 pages.
Autodesklabs, "Autodesk Design on Jeff Han's Perceptive Pixel Multi-Touch", Available online at <http://www.youtube.com/watch?v=O7ENumwMohs>, retrieved on Jul. 27, 2007, 2 pages.
Baudisch, Patrick, "The Cage: Efficient Construction in 3D using a Cubic Adaptive Grid", Proceedings of the 9th annual ACM symposium on User interface software and technology UIST '96, Nov. 6, 1996, 2 pages.
Beaudouin-Lafon et al, "CPN/Tools: A Post-WIMP Interface for Editing and Simulating Coloured Petri Nets", Proceedings of 22nd International Conference on Application and Theory of Petri Nets 2001, 2001, pp. 1-10.
Beaudouin-Lafon, M, "Novel Interaction Techniques for Overlapping Windows", Available at <http://portal.acm.org/citation.cfm?id=502371>, 2001, pp. 153-154.
Bederson, B, "PhotoMesa: A Zoomable Image Browser Using Quantum Treemaps and Bubblemaps", UIST 2001, Oriando, Florida, Nov. 2001, Nov. 2001, 10 pages.
Benko et al, "Precise Selection Techniques for Multi-Touch Screens", CHI 2006, Apr. 22-27, 2006, 10 pages.
BESTSHEEP1, "TDesktop Multiuser", Available online on <http://www.youtube.com/watch?v=PjsO-lbli34>, retrieved on Sep. 6, 2007, 2 pages.
Botjunkie, "Microsoft Surface 169 CES 2008", Available online at <http://www.youtube.com/watch?v=Zxk_WywMTzc>, retrieved on Jan. 8, 2008, 2 pages.
Brandl et al, "Combining and Measuring the Benefits of Bimanual Pen and Direct-Touch Interaction on Horizontal Interfaces", AVI'08, May 2008, Naples, Italy, May 2008, pp. 1-8.
Brandl, P, "Combining and Measuring the Benefits of Bimanual Pen and Direct-Touch Interaction on Horizontal Interfaces", Media Interaction Lab, Slide presentation, May 2008, 26 pages.
Brown, Rich, "Touch mice: Smartphone-style input on your PC?", Online available at: <https://www.cnet.com/news/touch-mice-smartphone-style-input-on-your-pc/>, Feb. 15, 2012, 4 pages.
Bumptop, "3D Desktop", Available online at <http://www.youtube.com/watch?v=I_IxBwvf3Vk>, retrieved on Sep. 18, 2006, Sep. 18, 2006, 2 pages.
Butz et al, "Hybrid Widgets on an Interactive Tabletop", Ubicomp '07, Innsbruck, Austria, Sep. 2007, 7 pages.
Buxton, Bill, "A Multi-Touch Three Dimensional Touch-Tablet", Available online at <http://www.youtube.com/watch?v=Arrus9CxUiA>, retrieved on Nov. 18, 2009, 3 pages.
Buxton, W et al, "A Study in Two-Handed Input", Proceedings of CHI '86, Boston, MA, Apr. 1986, pp. 321-326.
Buxton, W, Chapter 11: Two-Handed Input in Human-Computer Interaction, Aug. 22, 2008, pp. 11.1-11.18.
Buxton, W, "Chapter 5: Case Study 1: Touch Tablets", Haptic Input, Jan. 4, 2009, 20 pages.
Buxton, W et al, "Issues and Techniques in Touch-Sensitive Tablet Input", Computer Graphics, vol. 19(3), <http://www.dgp.toronto.edu/OTP/papers/bill.buxton/touch.html>, Proceedings of SIGGRAPH'85, Jul. 22, 1985, pp. 215-224.
Buxton, W et al, "Multi-Touch Systems that I Have Known and Loved", <http://www.billbuxton.com/multitouchOverview.html>, Jan. 12, 2007, pp. 1-21.
Buxton, Bill, "Multi-Touch Systems that I Have Known and Loved", available at <http://www.billbuxton.com/multitouchOverview.html>, Jan. 12, 2007, 14 pages.
Chanfrado, "Multi Touch (new touchscreen technology)", Available online at <http://www.youtube.com/watch?v=1ftJhDBZqss>, retrieved on Mar. 17, 2006, 2 pages.
Chen et al, "Relative role of merging and two-handed operation on command selection speed", Int. J. Human-Computer Studies 66 (2008), Jun. 2008, pp. 729-740.
Cho et al, "Interaction for Tabletop Computing Environment: An Analysis and Implementation", Science and Technology (2005), ACM, 2005, pp. 11-18.
Cocoadex, "Photo Touch: Multi-touch Photo Organization for your Mac", Available online at <http://www.youtube.com/watch?v=D7x7jV3P1-0>, retrieved on Mar. 30, 2008, 3 pages.
Continuumshow, "IdentityMine's Multitude of Multi-touch Apps", Youtube, available online at <http://www.youtube.com/watch?v=HcpdNb9LHns>, Nov. 6, 2008, 2 pages.
Couturier, et al, "Pointing Fingers: Using Multiple Direct Interactions with Visual Objects to Perform Music", Proceedings of the 2003 Conference on New Interfaces for Musical Expression May 2003, Montreal, Canada, May 2003, pp. 184-187.
Cutedraw, "Moving, Rotating, Resizing and Flipping Shapes", CuteDraw 2.0 Help System, available at <http://www.cutedraw.com/Moving,%20Rotating,%20Resizing%20Flipping%20Shapes.php>, 2007, 5 pages.
Darthstoo, "Wii Multi-touch Photo Gallery", Available online at <http://www.youtube.com/watch?v=0CYVxQ2OM9s>, retrieved on Apr. 10, 2008, 3 pages.
Derene, G, "Microsoft Surface: Behind-the-Scenes First Look", PopularMechanics.com, Jul. 1, 2007, <http://www.popularmechanics.com/technology/gadgets/news/4217348?page=3>, Jul. 1, 2007, 4 pages.
Dwigdor, "Lucid Touch: a See-Through Multi-Touch Mobile Device", Available online at <http://www.youtube.com/watch?v=qbMQ7urAvuc>, retrieved on Aug. 21, 2007, 2 pages.
Engadget, "LG Philips 52-inch multi-touch display", Available online at <http://www.youtube.com/watch?v=9qO-diu4jg4>, retrieved on Jan. 8, 2008, 2 pages.
F0XMULD3R, "Multi-touch interface (from Adobe TED)", Available online at <http://www.youtube.com/watch?v=UcKqyn-gUbY>, retrieved on Aug. 3, 2006, 2 pages.
Faas, Ryan, "Spaces: A Look at Apple's Take on Virtual Desktops in Leopard", Computerworld, available at <http://www.computerworld.com/s/article/9005267/Spaces_A_look_at_Apple_s_take_on_virtual_desktops_in_Leopard?taxonomyName>, Nov. 21, 2006, 3 pages.
Fingerworks Forums, "Is the Multitouch Lemur?", Available at <http://64233.167.104/search?q=cache:sjVdtyFBvRMJ:forums.finger>, Dec. 24, 2004, 2 pages.
Fingerworks, Inc, "Installation and Operation Guide for iGesture Products w/Keys", available at <www.fingerworks.com>, 2002, 10 pages.

(56) References Cited

OTHER PUBLICATIONS

Fingerworks, Inc, "Installation and Operation Guide for the TouchStream and TouchStream LP", available at <http://www.fingerworks.com>, 2002, pp. 1-25.
Fingerworks, Inc, "Quick Reference Guide for iGesture Products", available at <http://www.fingerworks.com>, 1999-2002, 2 pages.
Fingerworks, Inc, "Quick Reference Guide for TouchStream ST/LP", available at <http://www.fingerworks.com>, 2001-2003, 4 pages.
Fingerworks, Inc, "TouchStream LP Silver", available at <http://www.fingerworks.com>, Apr. 27, 2005, 18 pages.
Google Docs, "Drawings: Moving, resizing and rotating objects", Downloaded from <https://support.google.com/docs/answer/141914?hl=-en> on Jan. 18, 2010, Jan. 18, 2010, 1 page.
Guimbretiere, Francois, "Paper Augmented Digital Documents", ACM, vol. 5, No. 2, 2003, pp. 51-60.
Guimbretière, et al, "Benefits of Merging Command Selection and Direct Manipulation", ACM Transactions on Computer-Human Interaction, vol. 12, No. 3, Sep. 2005, Sep. 2005, pp. 460-476.
Guimbretière, F, "Curriculum Vitae (People, Paper and Computers)", University of Maryland Institute for Advanced Computer Studies, 2008, 5 pages.
Hcikonstanz, "Multi-touch Interaction: Browser Control", Available online at <http://www.youtube.com/watch?v=jTOK5Zbfm4U>, retrieved on Sep. 12, 2008, 2 pages.
Hinckley, K, "Haptic Issues for Virtual Manipulation", University of Virginia, Dissertation Presented Dec. 1996, http://research.microsoft.com/en-us/um/people/kenh/all-published-papers/hinckley-thesis-haptic-issues-for-virtual-manipulation.pdf, Dec. 1996, 216 pages.
Hinckley et al, "Interaction and Modeling Techniques for Desktop Two-Handed Input", UIST '98, San Francisco, CA, Nov. 1998, 10 pages.
Hodges et al, "ThinSight: Versatile Multi-touch Sensing for Thin Form-factor Displays", UIST '07, Newport, Rhode Island, USA, Oct. 7-10, 2007, 10 pages.
Hudson, Scott E, "Adaptive Semantic Snaping—A Technique for Semantic Feedback at the Lexical Level", Proceedings of the SIGCHI Conference on Human Factors in Computing Systems, Apr. 1990, pp. 65-70.
I3PGROUP, "13 MultiTouch Interactive Table", Youtube, available online at <http://www.youtube.com/watch?v=M2oijV-bRrw>, Nov. 16, 2007, 2 pages.
IBM, "Resizing Shapes by Dragging Sizing Handles", IBM WebSphere Help System, available at <http://publib.boulder.ibm.com/infocenter/wsadhelp/v5r1m2/index.jsp?topic=/com.rational.xtools.umivisualizer.doc/topics/tresizedrag.html>, 1999, 1 page.
Inkspace, "Inkscape tutorial: Basic", Inkscape.org, <http://web.archive.org/web20051225021958/http://inkscape.org/doc/basic/tutorial-basic.html>, Apr. 20, 2005, pp. 1-7.
Intuilab, "Multitouch Time and Geo Tagging Photosharing with IntuiFace", Available online at <http://www.youtube.com/watch?v=ftsx21liFvo>, retrieved on Jan. 31, 2008, 3 pages.
Jin et al, "GIA: Design of a Gesture-Based Interaction Photo Album", Pers Ubiquit Comput, Jul. 1, 2004, pp. 227-233.
Kane et al, "Slide Rule: Making Mobile Touch Screens Accessible to Blind People Using Multi-Touch Interaction Techniques", Assets, Oct. 15, 2008, pp. 73-80.
Karsenty et al, "Inferring Graphical Constraints with Rockit", Digital-Paris Research Laboratory, Mar. 1992, 30 pages.
Korman, Jonathan, "Intuition, pleasure, and gestures", Available online at:-<https://www.cooper.com/journal/2007/10/intuition_pleasure_and_gesture>, Oct. 5, 2007, 4 pages.
Krishnaarava, "Cubit—Open Source Multitouch Display", Available online at <http://www.youtube.com/watch?v=btFlrrDiUxk>, retrieved on May 2, 2008, May 2, 2008, 3 pages.
Kristensson et al, "InfoTouch: An Explorative Multi-Touch Visualization Interface for Tagged Photo Collections", Proceedings NordiCHI 2008, Oct. 20-22, 2008, pp. 491-494.
Kurata et al, "Tangible Tabletop Interface for an Expert to Collaborate with Remote Field Workers", CollabTech2005, Slides, Jul. 16, 2005, 27 pages.
Kurata et al, "Tangible Tabletop Interface for an Expert to Collaborate with Remote Field Workers", CollabTech2005, Jul. 16, 2005, pp. 58-63.
Kurtenbach et al, The Design of A GUI Paradigm Based on Tablets, Two-Hands, and Transparency, Mar. 27, 1997, 8 pages.
Lee et al, "A Multi-Touch Three Dimensional Touch-Sensitive Tablet", CHI '85 Proceedings of the SIGCHI Conference on Human Factors in Computing Systems, Apr. 1985, pp. 21-25.
Malik et al, "Visual Touchpad: A Two-Handed Gestural Input Device", ICMI'04 Proceedings of the 6th International Conference on Multimodal Intercases, ACM, Oct. 13-15, 2004, pp. 289-296.
Markandtanya, Imagining Multi-touch in Outlook, May 2008, 3 pages.
Markusson, D, "Interface Development of a Multi-Touch Photo Browser", Umea University, Master's Thesis presented, Apr. 18, 2008, 76 pages.
Matsushita et al, "Dual Touch: A Two-Handed Interface for Pen-Based PDAs", UIST '00, San Diego, California, Nov. 2000, 2 pages.
Matsushita et al, "HoloWall: Designing a Finger, Hand, Body and Object Sensitive Wall", UIST '97 Proceedings of the 10th annual ACM symposium on User interface software and technology, Oct. 1997, 2 pages.
Media Interaction Lab, "Bimanual Pen & Touch", http://mi-lab.org/projects/bimanual-pen-touch/, Nov. 2008, 5 pages.
Microsoft.com, "Quickly Copy Formatting with the Format Painter", available at <http://office.microsoft.com/enus/help/HA012176101033.aspx>, 2003, 1 page.
Microsoft.com, "Resize an Object", Microsoft Office Online, available at <http://office.microsoft.com/en-us/publisher/HP051139751033.aspx>, 2010, 2 pages.
Moscovich et al, "Indirect Mappings of Multi-touch Input Using One and Two Hands", CHI 2008, Florence, Italy, Apr. 2008, 9 pages.
Moscovich et al, "Multi-Finger Cursor Techniques", GI '06 Proceedings of Graphics Interface 2006, Quebec City, Quebec, Canada, Jun. 9, 2006, 7 pages.
Moscovich, T, "Multi-touch Interaction", CHI 2006, Montréal, Québec, Canada, Apr. 2006, pp. 1-4.
Moscovich, T, "Principles and Applications of Multi-touch Interaction", Brown University, Dissertation Presented, May 2007, 114 pages.
Mueller et al, "Visio 2007 for Dummies", John Wiley & Sons, Dec. 18, 2006, pp. 178-181.
Murphy, Peter, "Review: SBSH Calendar Touch", available at <http://justanothermobilemonday.com/Wordpress/2008/12/08/review-sbsh-calendar-touch/>, Dec. 8, 2008, 7 pages.
Nepsihus, "PhotoApp (Multi-Touch)", Available online at <http://www.youtube.com/watch?v=RJTVULGnZQ0>, retrieved on Dec. 30, 2007, 3 pages.
NextWindow, "NextWindow's Multi-Touch Overview", v1.2, 2007, pp. 1-7.
International Preliminary Report on Patentability received for PCT Patent Application No. PCT/US2009/057899, dated Apr. 5, 2012, 14 pages.
International Search Report and Written Opinion received for PCT Patent Application No. PCT/US2009/057899, dated Jun. 14, 2010, 19 pages.
Invitation to Pay Additional Fees received for PCT Patent Application No. PCT/US2009/057899, dated Apr. 29, 2010, 8 pages.
International Preliminary Report on Patentability received for PCT Patent Application No. PCT/US2011/022519, dated Aug. 9, 2012, 8 pages.
International Search Report and Written Opinion received for PCT Patent Application No. PCT/US2011/022519, dated Jul. 1, 2011, 8 pages.
International Preliminary Report on Patentability received for PCT Patent Application No. PCT/US2011/022525, dated Aug. 9, 2012, 8 pages.

(56) References Cited

OTHER PUBLICATIONS

International Search Report and Written Opinion received for PCT Patent Application No. PCT/US2011/022525, dated Apr. 27, 2011, 10 pages.
International Preliminary Report on Patentability received for PCT Patent Application No. PCT/US2011/022532, dated Aug. 9, 2012, 11 pages.
International Search Report and Written Opinion received for PCT Patent Application No. PCT/US2011/022532, dated May 24, 2011, 16 pages.
International Preliminary Report on Patentability received for PCT Patent Application No. PCT/US2011/045552, dated Feb. 5, 2013, 7 pages.
International Search Report and Written Opinion received for PCT Patent Application No. PCT/US2011/045552, dated Dec. 13, 2011, 10 pages.
Raskin, A, "Enso 2.0 Design Thoughts", Aza's Thoughts, http://www.azarask.in/blog/post/enso-20-design-thoughts/, Dec. 6, 2008, 16 pages.
Raskin, A, "Visual Feedback: Why Modes Kill", Humanized, Dec. 2006, 18 pages.
Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Sahlin, et al, "Flash® CS4 All-in-One for Dummies®", John Wiley & Sons, Dec. 3, 2008, 4 pages.
Sears, A, et al, "High Precision Touchscreens: Design Strategies and Comparisons With a Mouse", Human-Computer Interaction Laboratory, University of MD, Jan. 23, 1989, pp. 1-23.
Shen, et al, "Informing the Design of Direct-Touch Tabletops", IEEE Sep./Oct. 2006, Sep./Oct. 2006, pp. 36-46.
Shen, C, "Interactive tabletops: User Interface, Metaphors and Gestures", SIGGRAPH2007, Aug. 2007, 14 pages.
Spadaccini, "Multitouch Exhibit Design 1: Interaction and Feedback", Available online at : <http://ideum.com/2009/02/25/multitouch-exhibit-design-1-interaction-and-feedback/>, Feb. 25, 2009, 4 pages.
TABLETOPRESEARCH201, "Gesture Registration, Relaxation, and Reuse for Multi-Point", Youtube, available online at <http://www.youtube.com/watch?v=dT4dXuah2yM>, May 19, 2008, 2 pages.
Thomas, Gläser, "Photoshop MT—Desktop Digital Imaging on FTIR multitouch", Available online at <http://www.youtube.com/watch?v=JmHNr9EH1iU>, retrieved on Feb. 7, 2007, 2 pages.
Thurrott, Paul, "Windows 8 Tip: Use Trackpad Multitouch Gestures", Available online at :- <http://winsupersite.com/windows-8/windows-8-tip-use-trackpad-multi-touch-gestures>, Nov. 10, 2012, 5 pages.
Tse et al, "Enabling Interaction with Single User Applications Through Speech and Gestures on a Multi-User Tabletop", Mitsubishi Electric Research Laboratories, 2005, pp. 336-343.
Ullmer et al, "The metaDESK: Models and Prototypes for Tangible User Interfaces", UIST '97, Banff, Alberta, Canada, Oct. 14, 1997, pp. 1-10.
UNWIRELIFE1, "HP TouchSmart tx2—Multi-Touch Part 2", Youtube, available online at <http://www.youtube.com/watch?v=Yon3vRwc94A>, Dec. 19, 2008, 2 pages.
Vanderlin, Todd, "Smart Surface Beta", Available online at <http://www.youtube.com/watch?v=68wFqxdXENw>, retrieved on Mar. 29, 2008, 3 pages.
Westerman, Wayne, "Hand Tracking, Finger Identification and Chordic Manipulation on a Multi-Touch Surface", Doctoral Dissertation, 1999, 363 Pages.
Westerman et al, "Multi-Touch: A New Tactile 2-D Gesture Interface for Human-Computer Interaction", Proceedings of the Human Factors and Ergonomics Societ 45th Annual Meeting, 2001, pp. 632-636.
Wilson, A, "Robust Computer Vision-Based Detection of Pinching for One and Two-Handed Gesture Input", UIST '06, Montreux, Switzerland, Oct. 2006, 4 pages.
Wu et al, "Multi-Finger and Whole Hand Gestural Interaction Techniques for Multi-User Tabletop Displays", UiST '03, Vancouver, BC, Canada, © ACM 2003, Nov. 5-7, 2003, pp. 193-202.
Yee, K, "Two-Handed Interaction on a Tablet Display", SIGCHI 2004, Vienna, Austria, Apr. 2004, 4 pages.
ZAC96, "Microsoft Surface Demo", Available online at <http://www.youtube.com/watch?v=rKgU6ubBgJA>, retrieved on Aug. 17, 2007, 2 pages.
Advisory Action received for U.S. Appl. No. 10/497,076, dated Aug. 2, 2011, 3 pages.
Advisory Action received for U.S. Appl. No. 10/497,076, dated Oct. 28, 2008, 3 pages.
Corrected Notice of Allowance received for U.S. Appl. No. 12/566,994, dated Jan. 22, 2015, 2 pages.
Corrected Notice of Allowance received for U.S. Appl. No. 13/666,943, dated Aug. 11, 2016, 2 pages.
Corrected Notice of Allowance received for U.S. Appl. No. 15/281,524, dated Jun. 3, 2019, 2 pages.
Decision to Grant received for European Patent Application No. 11178259.5, dated Apr. 4, 2019, 3 pages.
European Search Report received for the European Patent Application No. 10172417.7, dated Jan. 7, 2011, 4 pages.
Extended European Search Report received for European Patent Application No. 18197554.1, dated Jun. 3, 2019, 11 pages.
Final Office Action received for U.S. Appl. No. 10/497,076 dated Feb. 10, 2012, 25 pages.
Final Office Action received for U.S. Appl. No. 10/497,076, dated Apr. 26, 2013, 30 pages.
Final Office Action received for U.S. Appl. No. 10/497,076, dated Feb. 2, 2011, 22 pages.
Final Office Action received for U.S. Appl. No. 10/497,076, dated Jun. 12, 2008, 31 pages.
Final Office Action received for U.S. Appl. No. 10/497,076, dated Oct. 6, 2009, 29 pages.
Final Office Action received for U.S. Appl. No. 15/281,524, dated Dec. 27, 2018, 6 pages.
Intention to Grant received for European Patent Application No. 11178259.5, dated Nov. 8, 2018, 16 pages.
International Preliminary Examination Report on Patentability received for PCT Patent Application No. PCT/US2002/000484, dated Aug. 4, 2003, 7 pages.
International Search Report and Written Opinion received for PCT Patent Application No. PCT/US2002/000484, dated Jul. 11, 2002, 1 page.
Minutes of Oral Proceedings received for European Patent Application No. 11178259.5, dated Nov. 2, 2018, 9 pages.
Non-Final Office Action received for U.S. Appl. No. 09/757,000, dated Jan. 30, 2003, 11 pages.
Non-Final Office Action received for U.S. Appl. No. 09/757,000, dated Jun. 19, 2003, 11 pages.
Non-Final Office Action received for U.S. Appl. No. 10/497,076, dated Jan. 8, 2009, 29 pages.
Non-Final Office Action received for U.S. Appl. No. 10/497,076, dated May 13, 2010, 24 pages.
Non-Final Office Action received for U.S. Appl. No. 10/497,076, dated Oct. 3, 2012, 24 pages.
Non-Final Office Action received for U.S. Appl. No. 10/497,076, dated Oct. 13, 2011, 24 pages.
Non-Final Office Action received for U.S. Appl. No. 10/497,076, dated Sep. 13, 2007, 19 pages.
Non-Final Office Action received for U.S. Appl. No. 15/281,524, dated Jun. 19, 2018, 23 pages.
Notice of Acceptance received for Australian Patent Application No. 2015201028, dated Mar. 21, 2017, 3 pages.
Notice of Acceptance received for Australian Patent Application No. 2017201548, dated Sep. 3, 2018, 3 pages.
Notice of Allowance received for Canadian Patent Application No. 2,935,875, dated May 3, 2017, 1 page.
Notice of Allowance received for Japanese Patent Application No. 2014-259225, dated Feb. 27, 2017, 3 pages. (Official Copy Only) {See Communication under 37 CFR § 1.98(a) (3)}.

(56) References Cited

OTHER PUBLICATIONS

Notice of Allowance received for Japanese Patent Application No. 2015-129152, dated May 8, 2017, 3 pages. (Official Copy only). {See Communication under 37 CFR § 1.98(a) (3)}.
Notice of Allowance received for Japanese Patent Application No. 2017-057997, dated Apr. 23, 2018, 4 pages (1 page of English Translation and 3 pages of Official copy).
Notice of Allowance received for Japanese Patent Application No. 2017-132229, dated Jun. 25, 2018, 4 pages (1 page of English Translation and 3 pages of Official copy).
Notice of Allowance received for U.S. Appl. No. 09/757,000, dated Dec. 15, 2003, 4 pages.
Notice of Allowance received for U.S. Appl. No. 13/666,943, dated Jun. 2, 2016, 9 pages.
Notice of Allowance received for U.S. Appl. No. 15/281,524, dated Apr. 11, 2019, 7 pages.
Office Action received for Australian Patent Application No. 2017201548, dated Feb. 26, 2018, 2 pages.
Office Action received for Australian Patent Application No. 2018214074, dated May 9, 2019, 2 pages.
Office Action received for Canadian Patent Application No. 2,984,527 dated Sep. 11, 2018, 5 pages.
Office Action received for European Patent Application No. 02713375.0, dated Feb. 27, 2009, 5 pages.
Office Action received for European Patent Application No. 11178259.5, dated Nov. 10, 2015, 4 pages.
Office Action received for European Patent Application No. 02713375.0, dated Feb. 24, 2010, 4 pages.
Office Action received for Japanese Patent Application No. 2014-259225, dated May 27, 2016, 4 pages (2 pages of English Translation and 2 pages of Official Copy).
Office Action received for Japanese Patent Application No. 2015-129152, dated Sep. 23, 2016, 3 pages (1 page of English Translation and 2 pages of Official Copy).
Office Action received for Japanese Patent Application No. 2017-057997, dated Jan. 9, 2018, 6 pages (3 pages of English translation and 3 pages of official copy).
Office Action received for Japanese Patent Application No. 2017-132229, dated Mar. 16, 2018, 7 pages (3 pages of English Translation and 4 pages of Official Copy).
Office Action received for Japanese Patent Application No. 2018-138559, dated May 13, 2019, 10 pages (5 pages of English Translation and 5 pages of Official Copy).
Office Action received for European Patent Application No. 02713375.0, dated Feb. 24, 2014, 5 pages.
Partial European Search Report received for European Patent Application No. 18197554.1, dated Jan. 22, 2019, 8 pages.
Summons to Attend Oral Proceedings received for European Patent Application No. 11178259.5, dated Feb. 19, 2018, 12 pages.
Supplementary European Search Report received for European Patent Application No. 02713375.0, dated Oct. 2, 2009, 3 pages.
Supplementary Search Report received for European Patent Application No. 02713375.0, dated Aug. 5, 2005, 3 pages.
Decision to Grant received for the European Patent Application No. 07814633.9, dated Sep. 2, 2010, 3 pages.
Intention to Grant received for the European Patent Application No. 07814633.9, dated Mar. 19, 2010, 4 pages.
Office Action received for European Patent Application No. 07814633.9, dated Aug. 10, 2009, 3 pages.
Decision to Grant received for the European Patent Application No. 10172417.7, dated Nov. 14, 2013, 3 pages.
Intention to Grant received for European Patent Application No. 10172417.7, dated Jul. 9, 2013, 10 pages.
Office Action received for European Patent Application No. 10172417.7, dated Oct. 31, 2011, 6 pages.
Summons to Attend Oral Proceeding received for European Patent Application No. 10172417.7, Jan. 28, 2013, 6 pages.
Non-Final Office Action received for U.S. Appl. No. 11/848,210, dated Jun. 30, 2011, 8 pages.
Notice of Allowance received for U.S. Appl. No. 11/848,210, dated Dec. 20, 2011, 5 pages.
Decision to Grant received for the European Patent Application No. 11178257.9, dated Jun. 20, 2013, 3 pages.
Extended European Search Report received for European Patent Application No. 11178257.9, dated Oct. 31, 2011, 5 pages.
Intention to Grant received for European Patent Application No. 11178257.9, dated Jan. 30, 2013, 9 pages.
European Search Report received for the European Application No. 11178259.5, dated Oct. 31, 2011, 8 pages.
Office Action received for European Patent Application No. 11178259.5, dated Jan. 4, 2013, 8 pages.
Summons to Attend Oral Proceedings received for European Patent Application No. 11178259.5, mailed on Feb. 11, 2015, 9 pages.
Non-Final Office Action received for U.S. Appl. No. 12/566,994, dated Dec. 13, 2013, 10 pages.
Non-Final Office Action received for U.S. Appl. No. 12/566,994, dated Jan. 9, 2013, 15 pages.
Non-Final Office Action received for U.S. Appl. No. 12/566,994, dated Jun. 13, 2014, 12 pages.
Notice of Allowance received for U.S. Appl. No. 12/566,994, dated May 22, 2013, 9 pages.
Notice of Allowance received for U.S. Appl. No. 12/566,994, dated Oct. 6, 2014, 8 pages.
Non-Final Office Action received for U.S. Appl. No. 12/849,767, dated Jul. 9, 2012, 16 pages.
Notice of Allowance received for U.S. Appl. No. 12/849,767, dated Jan. 8, 2013, 9 pages.
Notice of Allowance received for U.S. Appl. No. 12/849,767, dated Apr. 25, 2014, 5 pages.
Non-Final Office Action received for U.S. Appl. No. 13/361,912, dated Mar. 22, 2012, 8 pages.
Notice of Allowance received for U.S. Appl. No. 13/361,912, dated Jul. 2, 2012, Jul. 2, 2012, 7 pages.
Non-Final Office Action received for U.S. Appl. No. 13/666,943, dated Oct. 26, 2015, 12 pages.
Notice of Allowance received for U.S. Appl. No. 13/666,943, dated Jun. 17, 2015, 7 pages.
Notice of Allowance received for the Canadian Patent Application No. 2,853,273, dated Jan. 12, 2016, 1 page.
Office Action received for Canadian Patent Application No. 2,853,273, dated Feb. 23, 2015, 5 pages.
Board Opinion received for Chinese Reexamination Patent Application No. 200780001142.8, dated Oct. 21, 2014, 19 pages (7 pages of English Translation and 12 pages of Official copy).
Decision to Grant received for Japanese Patent Application No. 2009-526943, dated Dec. 2, 2011, 3 pages (Official Copy only). {See Communication under 37 CFR § 1.98(a) (3)}.
Notice of Acceptance received for Australian Patent Application No. 2011265412, dated Nov. 12, 2014, 2 pages.
Notice of Allowance received for Japanese Patent Application No. 2013-140171, dated May 29, 2015, 4 pages (Official Copy only). {See Communication under 37 CFR § 1.98(a) (3)}.
Office Action received for Japanese Patent Application No. 2013-140171, dated Jul. 22, 2014, 4 pages (2 pages of English Translation and 2 pages of Official copy).
Office Action Received for Japanese Patent Application No. 2014-259225, dated Nov. 20, 2015, 2 pages (Official copy only). {See Communication under 37 CFR § 1.98(a) (3)}.
Office Action received for Australian Patent Application No. 2015201028, dated Mar. 15, 2016, 2 pages.
Office action received for Indian Patent Application No. 2797/CHENP/2008 , dated Jan. 29, 2014, 3 pages.
Hinckley et al., "Sensing Techniques for Mobile Interaction", Symposium on User Interface Software and Technology, CHI Letters, vol. 2, No. 2, Nov. 2000, pp. 91-100.
Jobs, Steve, "iPhone Introduction in 2007 (Complete)", available at <https://www.youtube.com/watch?v=9hUIxyE2Ns8>, Jan. 10, 2013, 3 pages.
Karlson et al., "AppLens and LaunchTile: Two Designs for One-Handed Thumb Use on Small Devices", CHI 2005, Papers: Small Devices 1, Apr. 2-7, 2005, pp. 201-210.

(56) References Cited

OTHER PUBLICATIONS

Kyocera WX300K, "Way to Use a Camera", JP, Nov. 18, 2005, pp. 206-212. (Official Copy Only) {See Communication under 37 CFR § 1.98(a) (3)}.
Microsoft Windows, "Microsoft Windows" (Copyright 2009), 2 pages.
International Preliminary Report on Patentability received for PCT Patent Application No. PCT/US2007/077441, dated Mar. 10, 2009, 9 pages.
International Search Report and Written Opinion, received for PCT Patent Application No. PCT/US2007/077441, dated May 8, 2008, 13 pages.
Invitation to Pay Additional Fees received for PCT Patent Application No. PCT/US2007/077441, dated Jan. 28, 2008, 5 pages.
Willcom, "Operation Manual for WS003SH", JP, Dec. 2005, pp. 4-1 to 4-7. (Official Copy Only). {See Communication under 37 CFR § 1.98(a) (3)}.
Notice of Acceptance received for Australian Patent Application No. 2018214074, dated Aug. 6, 2019, 3 pages.
Office Action received for Canadian Patent Application No. 2,984,527, dated Jul. 25, 2019, 4 pages.
Office Action received for European Patent Application No. 17180535.1, dated Oct. 14, 2019, 8 pages.

* cited by examiner

Figure 5D
112
EVENTS
Birthday
Day at the zoo
School garden
Family reunion
Southern Europe
Vacation in Kona
Snow storm
Lake Tahoe
Prarie
Halloween
Playtime
LABELS
Selected
Wesley
Adorable children
(New Label)
DESTINATIONS
Slideshow
Slideflow
Printer
Email
Print Service
Hide
Trash
2/1/08 Birthday (27)
B1-r
B1
B4
B7
B2
B5
B8
B3
B6
B9
1/15/08 Day at the zoo (36)
D7-r
D1
D4
D7
D2
D5
D8
D3
D6
D9
5004
5054
5030
5048
5060
5058

Figure 9D:
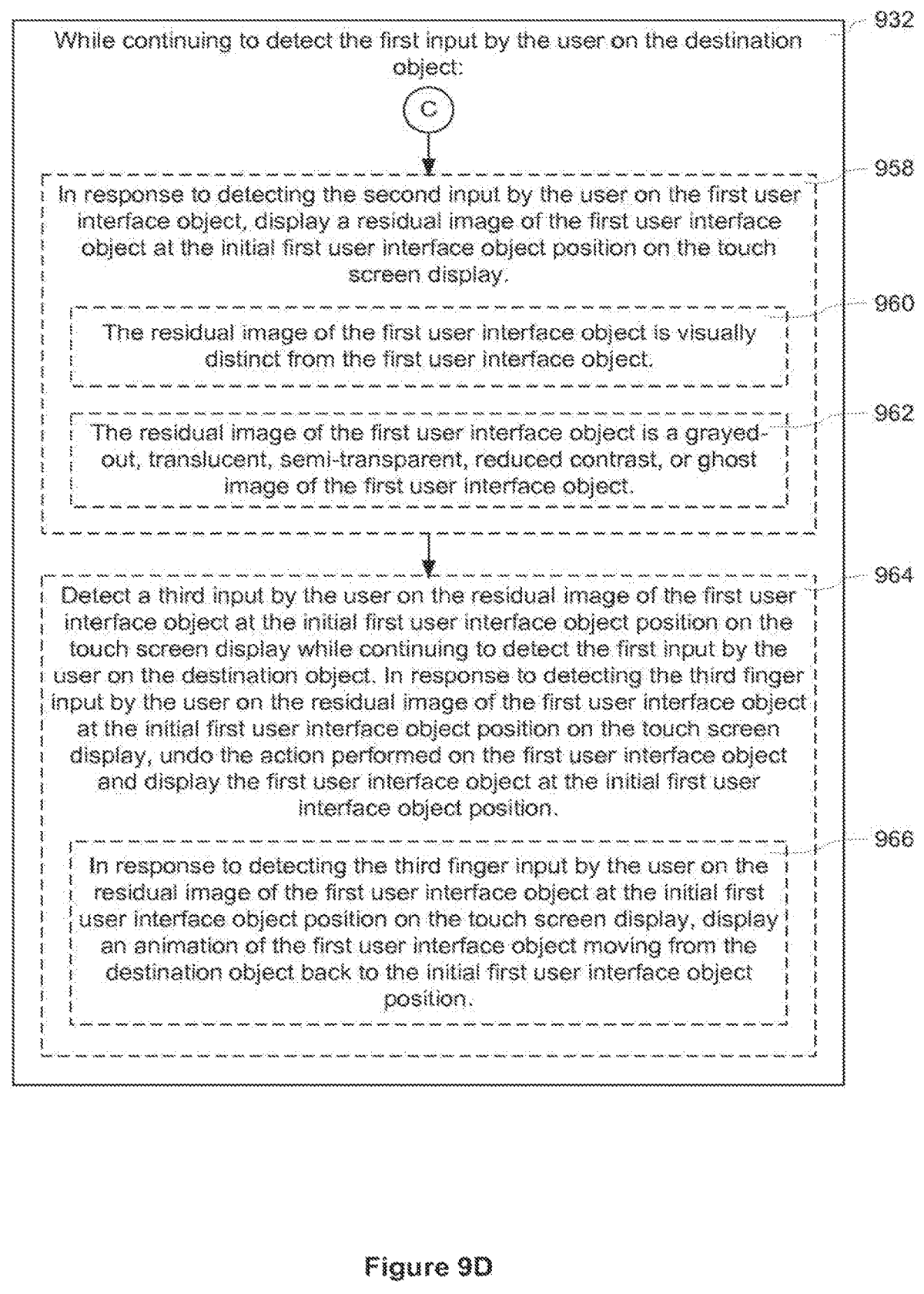

932

While continuing to detect the first input by the user on the destination object:

C

958

In response to detecting the second input by the user on the first user interface object, display a residual image of the first user interface object at the initial first user interface object position on the touch screen display.

960

The residual image of the first user interface object is visually distinct from the first user interface object.

962

The residual image of the first user interface object is a grayed-out, translucent, semi-transparent, reduced contrast, or ghost image of the first user interface object.

964

Detect a third input by the user on the residual image of the first user interface object at the initial first user interface object position on the touch screen display while continuing to detect the first input by the user on the destination object. In response to detecting the third finger input by the user on the residual image of the first user interface object at the initial first user interface object position on the touch screen display, undo the action performed on the first user interface object and display the first user interface object at the initial first user interface object position.

966

In response to detecting the third finger input by the user on the residual image of the first user interface object at the initial first user interface object position on the touch screen display, display an animation of the first user interface object moving from the destination object back to the initial first user interface object position.

Figure 12B:
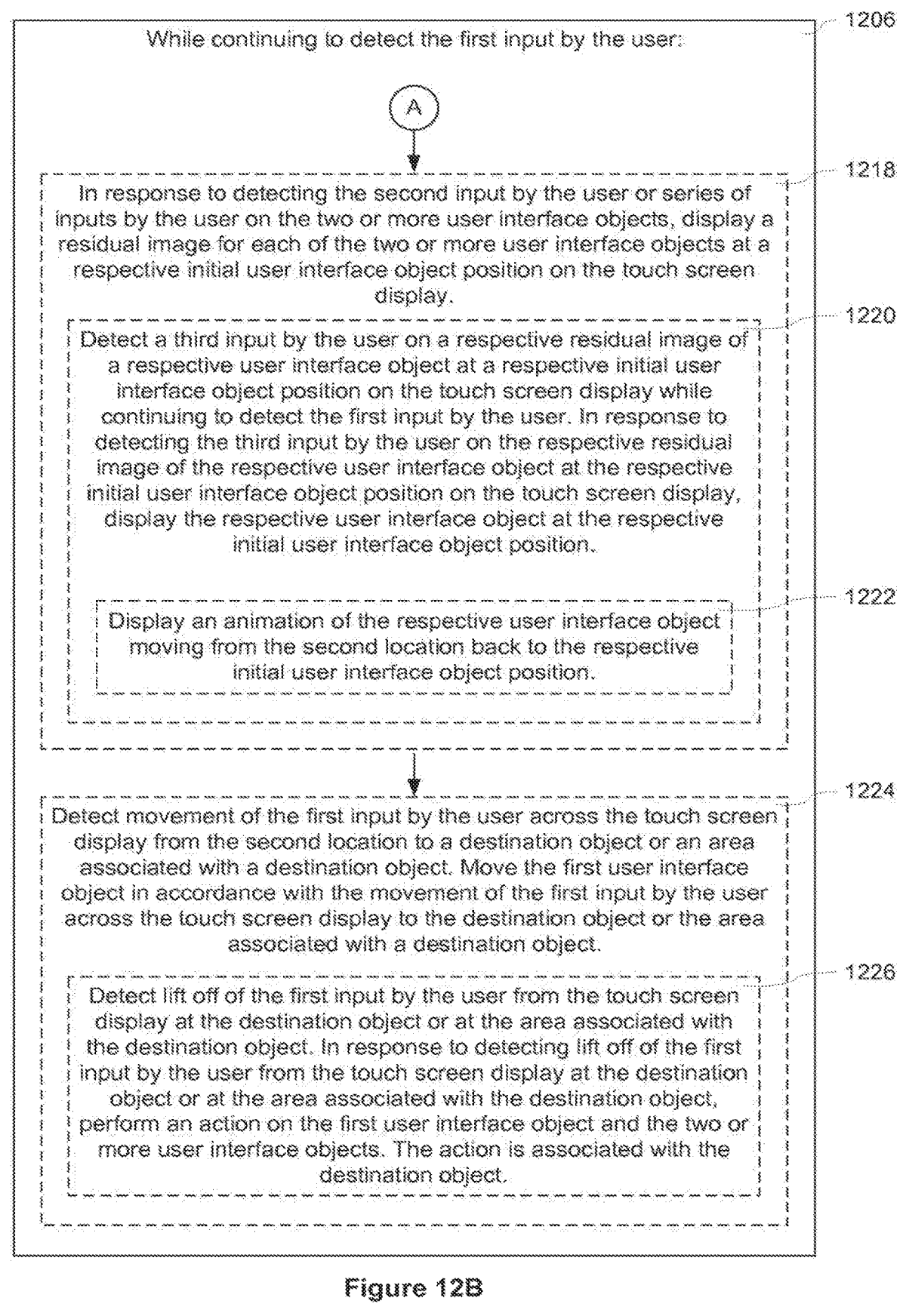

While continuing to detect the first input by the user:

(A)

1218

In response to detecting the second input by the user or series of inputs by the user on the two or more user interface objects, display a residual image for each of the two or more user interface objects at a respective initial user interface object position on the touch screen display.

1220

Detect a third input by the user on a respective residual image of a respective user interface object at a respective initial user interface object position on the touch screen display while continuing to detect the first input by the user. In response to detecting the third input by the user on the respective residual image of the respective user interface object at the respective initial user interface object position on the touch screen display, display the respective user interface object at the respective initial user interface object position.

1222

Display an animation of the respective user interface object moving from the second location back to the respective initial user interface object position.

1224

Detect movement of the first input by the user across the touch screen display from the second location to a destination object or an area associated with a destination object. Move the first user interface object in accordance with the movement of the first input by the user across the touch screen display to the destination object or the area associated with a destination object.

1226

Detect lift off of the first input by the user from the touch screen display at the destination object or at the area associated with the destination object. In response to detecting lift off of the first input by the user from the touch screen display at the destination object or at the area associated with the destination object, perform an action on the first user interface object and the two or more user interface objects. The action is associated with the destination object.

Figure 13A:
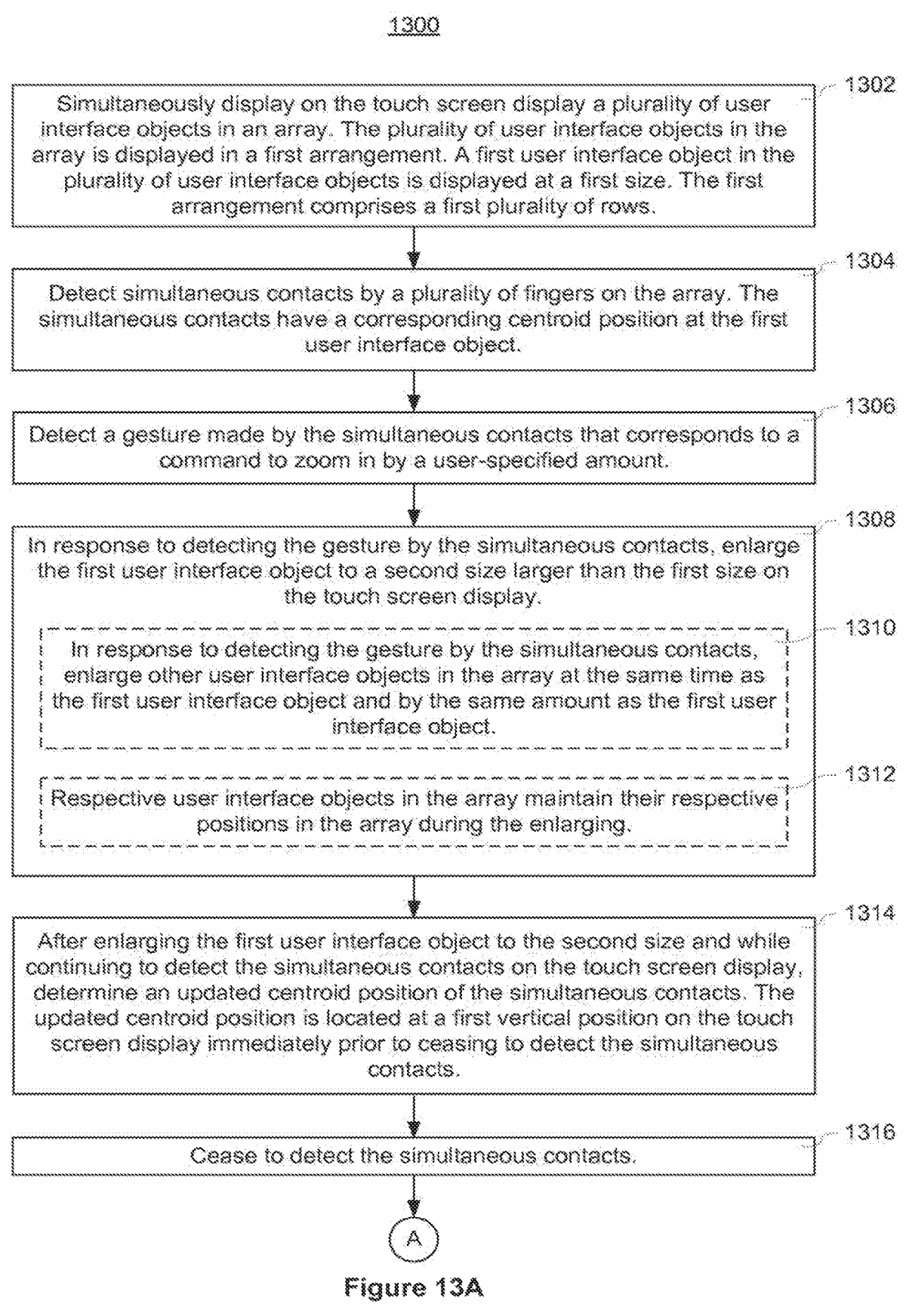

1302 Simultaneously display on the touch screen display a plurality of user interface objects in an array. The plurality of user interface objects in the array is displayed in a first arrangement. A first user interface object in the plurality of user interface objects is displayed at a first size. The first arrangement comprises a first plurality of rows.

1304 Detect simultaneous contacts by a plurality of fingers on the array. The simultaneous contacts have a corresponding centroid position at the first user interface object.

1306 Detect a gesture made by the simultaneous contacts that corresponds to a command to zoom in by a user-specified amount.

1308 In response to detecting the gesture by the simultaneous contacts, enlarge the first user interface object to a second size larger than the first size on the touch screen display.

1310 In response to detecting the gesture by the simultaneous contacts, enlarge other user interface objects in the array at the same time as the first user interface object and by the same amount as the first user interface object.

1312 Respective user interface objects in the array maintain their respective positions in the array during the enlarging.

1314 After enlarging the first user interface object to the second size and while continuing to detect the simultaneous contacts on the touch screen display, determine an updated centroid position of the simultaneous contacts. The updated centroid position is located at a first vertical position on the touch screen display immediately prior to ceasing to detect the simultaneous contacts.

1316 Cease to detect the simultaneous contacts.

Figure 13B:
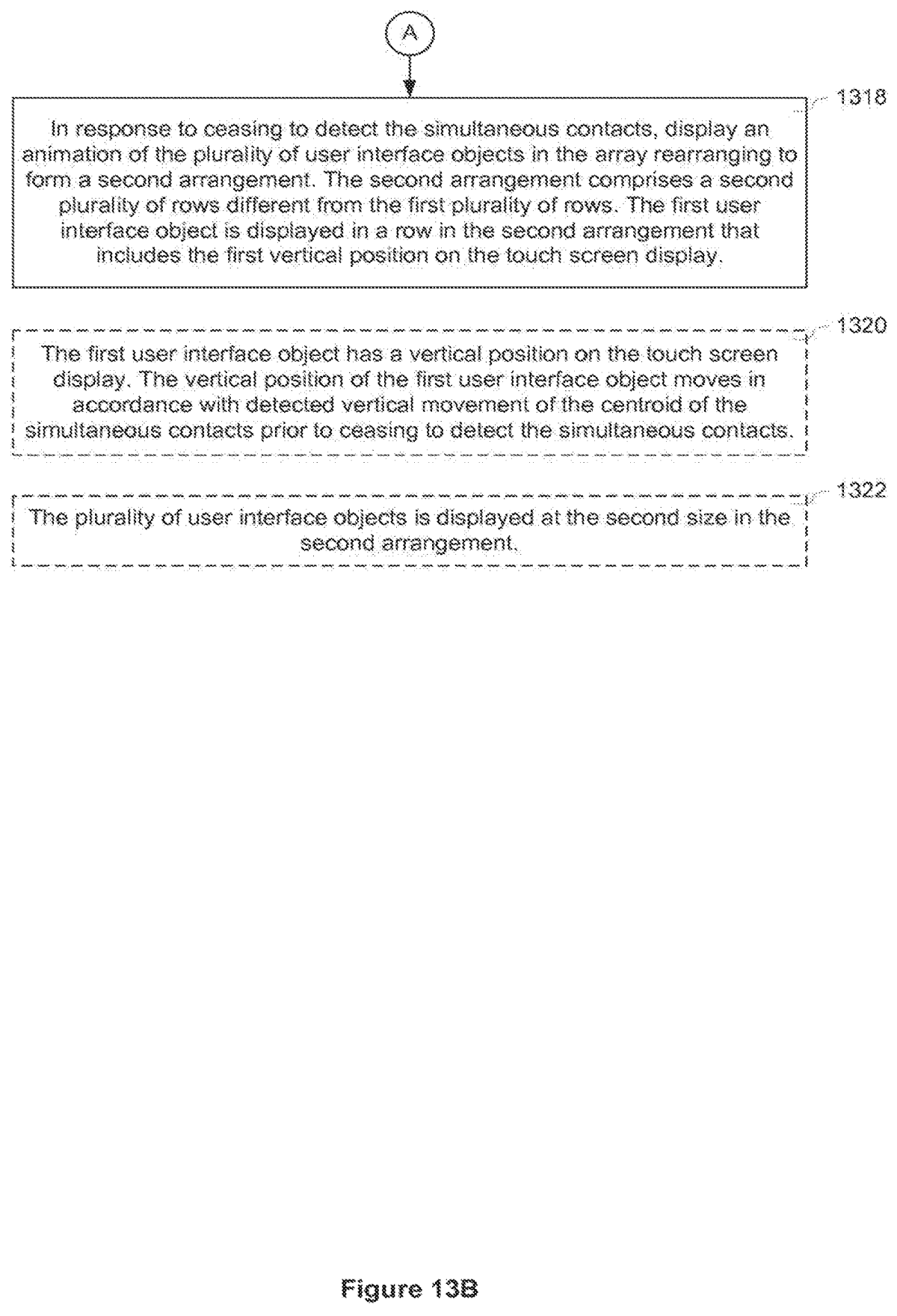

In response to ceasing to detect the simultaneous contacts, display an animation of the plurality of user interface objects in the array rearranging to form a second arrangement. The second arrangement comprises a second plurality of rows different from the first plurality of rows. The first user interface object is displayed in a row in the second arrangement that includes the first vertical position on the touch screen display.

1320

The first user interface object has a vertical position on the touch screen display. The vertical position of the first user interface object moves in accordance with detected vertical movement of the centroid of the simultaneous contacts prior to ceasing to detect the simultaneous contacts.

1322

The plurality of user interface objects is displayed at the second size in the second arrangement.

Figure 14E:
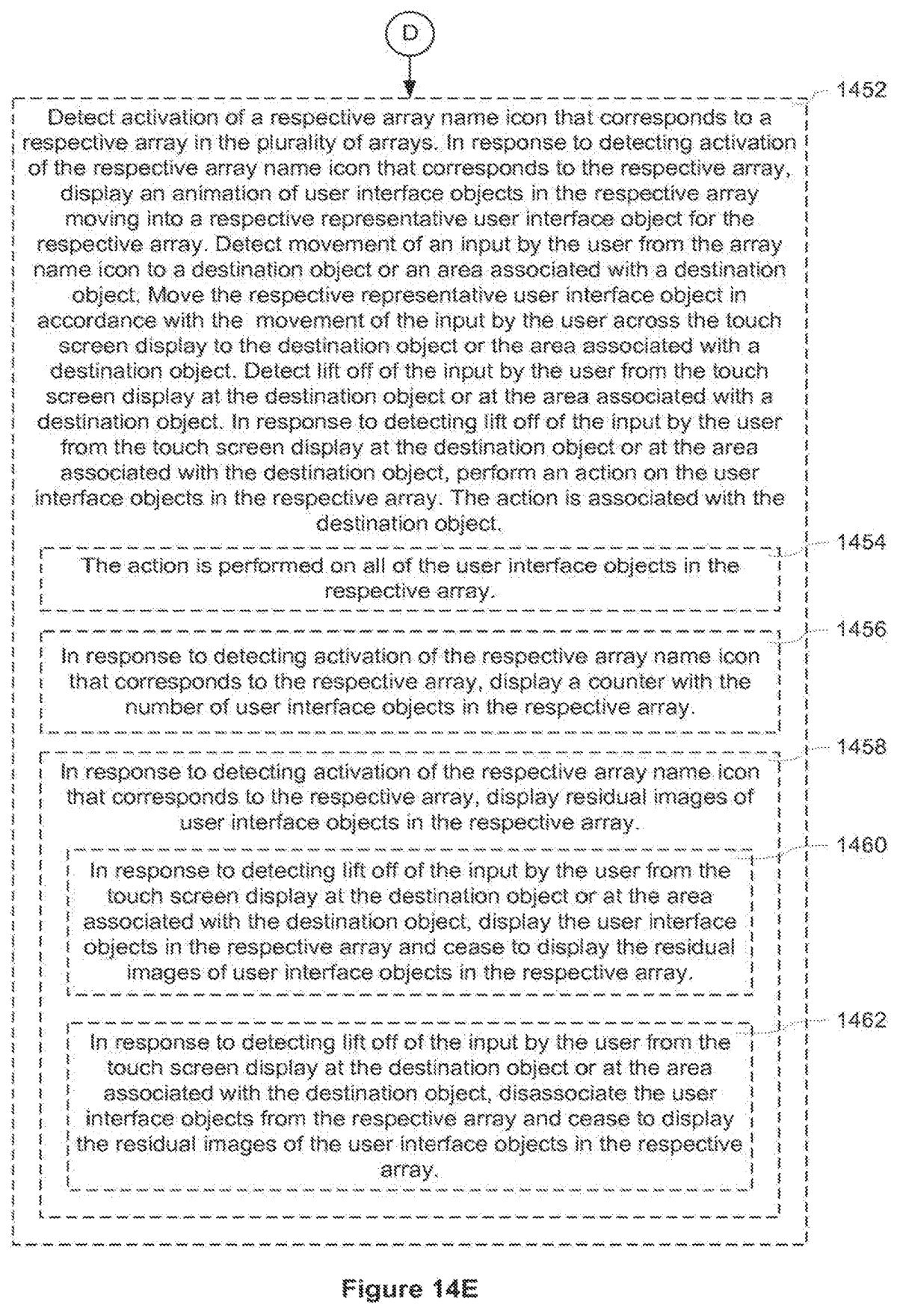

Detect activation of a respective array name icon that corresponds to a respective array in the plurality of arrays. In response to detecting activation of the respective array name icon that corresponds to the respective array, display an animation of user interface objects in the respective array moving into a respective representative user interface object for the respective array. Detect movement of an input by the user from the array name icon to a destination object or an area associated with a destination object. Move the respective representative user interface object in accordance with the movement of the input by the user across the touch screen display to the destination object or the area associated with a destination object. Detect lift off of the input by the user from the touch screen display at the destination object or at the area associated with a destination object. In response to detecting lift off of the input by the user from the touch screen display at the destination object or at the area associated with the destination object, perform an action on the user interface objects in the respective array. The action is associated with the destination object.

1454

The action is performed on all of the user interface objects in the respective array.

1456

In response to detecting activation of the respective array name icon that corresponds to the respective array, display a counter with the number of user interface objects in the respective array.

1458

In response to detecting activation of the respective array name icon that corresponds to the respective array, display residual images of user interface objects in the respective array.

1460

In response to detecting lift off of the input by the user from the touch screen display at the destination object or at the area associated with the destination object, display the user interface objects in the respective array and cease to display the residual images of user interface objects in the respective array.

1462

In response to detecting lift off of the input by the user from the touch screen display at the destination object or at the area associated with the destination object, disassociate the user interface objects from the respective array and cease to display the residual images of the user interface objects in the respective array.

Figure 14F:
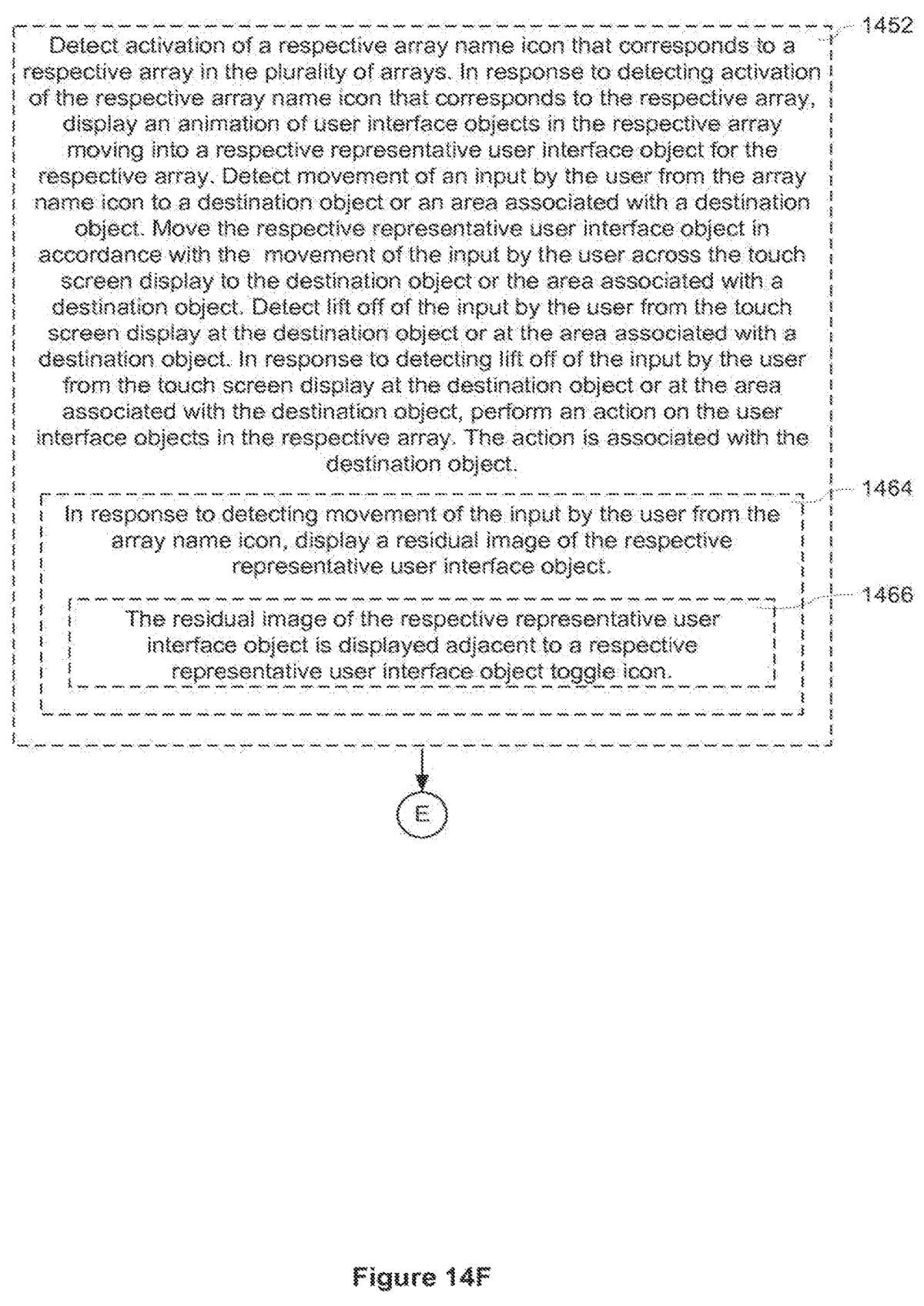

Detect activation of a respective array name icon that corresponds to a respective array in the plurality of arrays. In response to detecting activation of the respective array name icon that corresponds to the respective array, display an animation of user interface objects in the respective array moving into a respective representative user interface object for the respective array. Detect movement of an input by the user from the array name icon to a destination object or an area associated with a destination object. Move the respective representative user interface object in accordance with the movement of the input by the user across the touch screen display to the destination object or the area associated with a destination object. Detect lift off of the input by the user from the touch screen display at the destination object or at the area associated with a destination object. In response to detecting lift off of the input by the user from the touch screen display at the destination object or at the area associated with the destination object, perform an action on the user interface objects in the respective array. The action is associated with the destination object.

1464

In response to detecting movement of the input by the user from the array name icon, display a residual image of the respective representative user interface object.

1466

The residual image of the respective representative user interface object is displayed adjacent to a respective representative user interface object toggle icon.

Figure 14G:
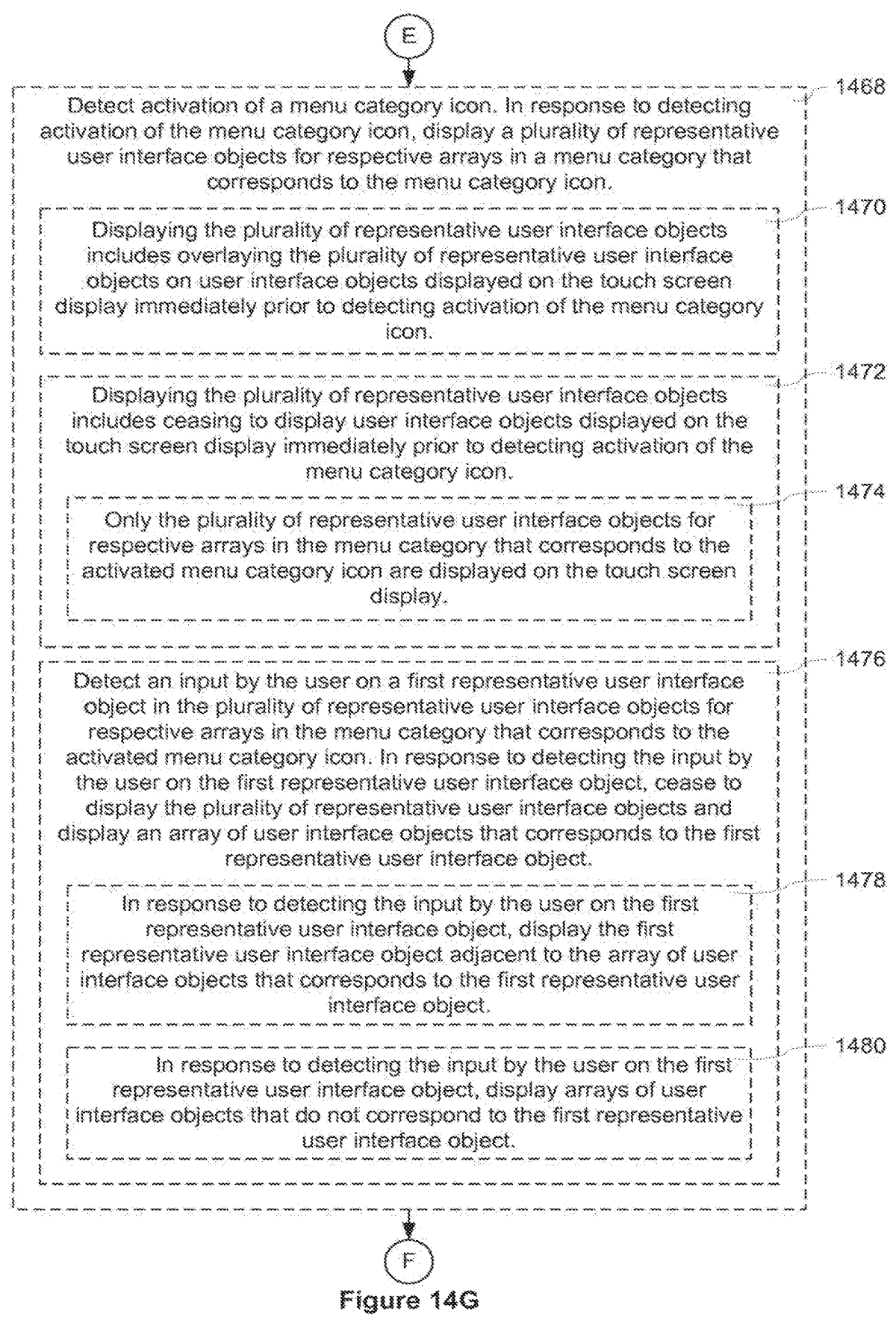

1468
Detect activation of a menu category icon. In response to detecting activation of the menu category icon, display a plurality of representative user interface objects for respective arrays in a menu category that corresponds to the menu category icon.

1470
Displaying the plurality of representative user interface objects includes overlaying the plurality of representative user interface objects on user interface objects displayed on the touch screen display immediately prior to detecting activation of the menu category icon.

1472
Displaying the plurality of representative user interface objects includes ceasing to display user interface objects displayed on the touch screen display immediately prior to detecting activation of the menu category icon.

1474
Only the plurality of representative user interface objects for respective arrays in the menu category that corresponds to the activated menu category icon are displayed on the touch screen display.

1476
Detect an input by the user on a first representative user interface object in the plurality of representative user interface objects for respective arrays in the menu category that corresponds to the activated menu category icon. In response to detecting the input by the user on the first representative user interface object, cease to display the plurality of representative user interface objects and display an array of user interface objects that corresponds to the first representative user interface object.

1478
In response to detecting the input by the user on the first representative user interface object, display the first representative user interface object adjacent to the array of user interface objects that corresponds to the first representative user interface object.

1480
In response to detecting the input by the user on the first representative user interface object, display arrays of user interface objects that do not correspond to the first representative user interface object.

Figure 14H:
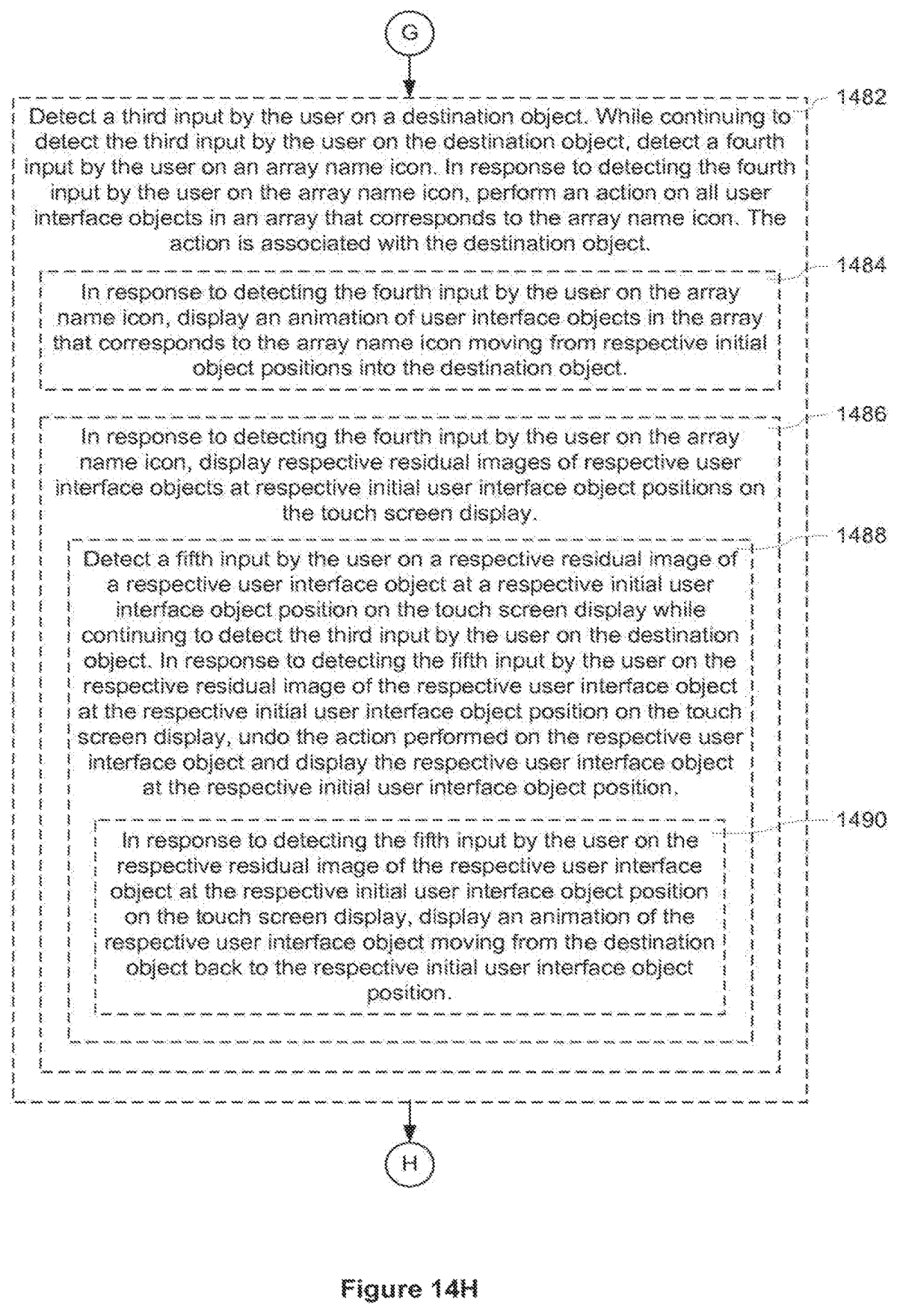

1482 Detect a third input by the user on a destination object. While continuing to detect the third input by the user on the destination object, detect a fourth input by the user on an array name icon. In response to detecting the fourth input by the user on the array name icon, perform an action on all user interface objects in an array that corresponds to the array name icon. The action is associated with the destination object.

1484 In response to detecting the fourth input by the user on the array name icon, display an animation of user interface objects in the array that corresponds to the array name icon moving from respective initial object positions into the destination object.

1486 In response to detecting the fourth input by the user on the array name icon, display respective residual images of respective user interface objects at respective initial user interface object positions on the touch screen display.

1488 Detect a fifth input by the user on a respective residual image of a respective user interface object at a respective initial user interface object position on the touch screen display while continuing to detect the third input by the user on the destination object. In response to detecting the fifth input by the user on the respective residual image of the respective user interface object at the respective initial user interface object position on the touch screen display, undo the action performed on the respective user interface object and display the respective user interface object at the respective initial user interface object position.

1490 In response to detecting the fifth input by the user on the respective residual image of the respective user interface object at the respective initial user interface object position on the touch screen display, display an animation of the respective user interface object moving from the destination object back to the respective initial user interface object position.

Figure 14I:
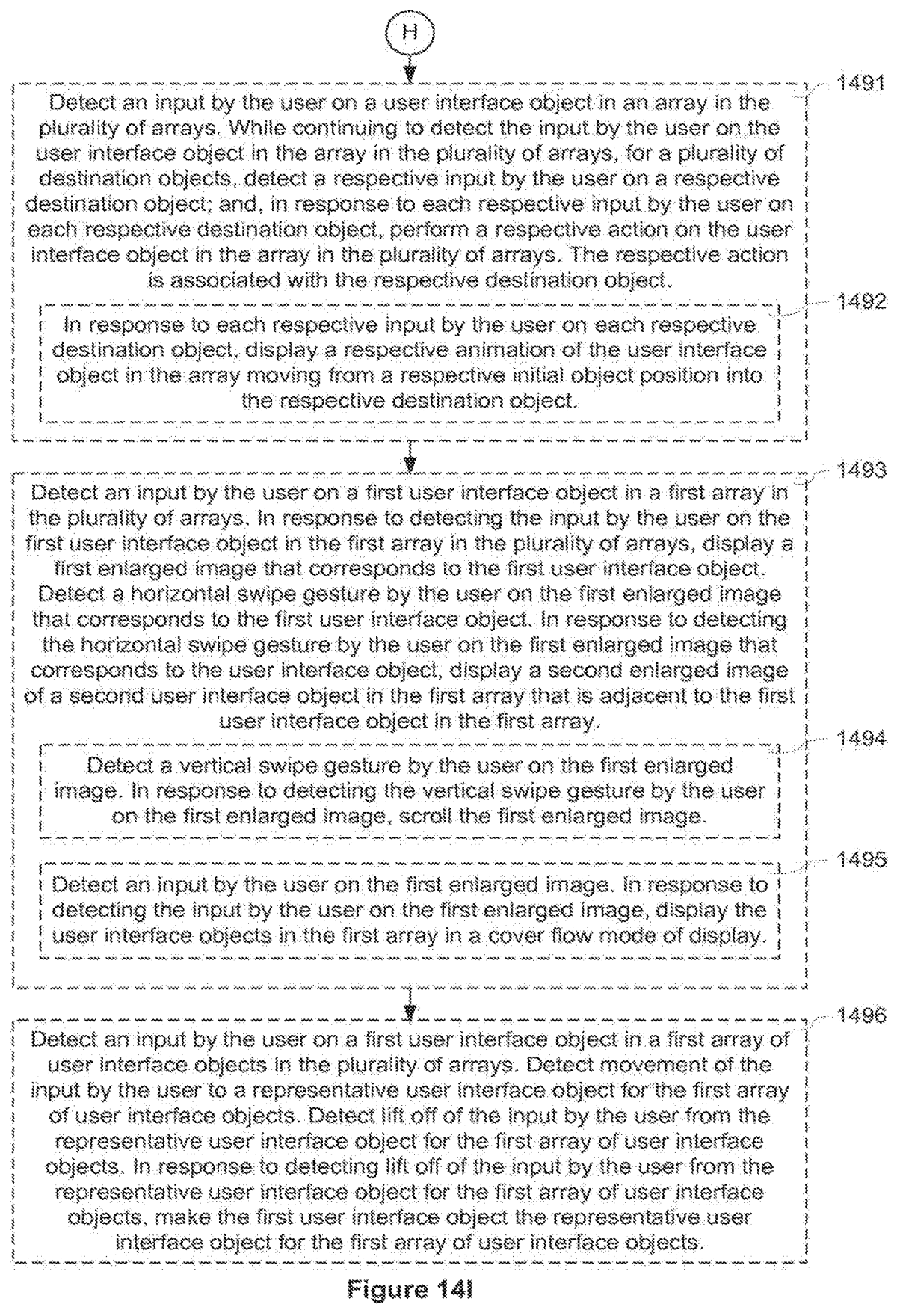

1491
Detect an input by the user on a user interface object in an array in the plurality of arrays. While continuing to detect the input by the user on the user interface object in the array in the plurality of arrays, for a plurality of destination objects, detect a respective input by the user on a respective destination object; and, in response to each respective input by the user on each respective destination object, perform a respective action on the user interface object in the array in the plurality of arrays. The respective action is associated with the respective destination object.

1492
In response to each respective input by the user on each respective destination object, display a respective animation of the user interface object in the array moving from a respective initial object position into the respective destination object.

1493
Detect an input by the user on a first user interface object in a first array in the plurality of arrays. In response to detecting the input by the user on the first user interface object in the first array in the plurality of arrays, display a first enlarged image that corresponds to the first user interface object. Detect a horizontal swipe gesture by the user on the first enlarged image that corresponds to the first user interface object. In response to detecting the horizontal swipe gesture by the user on the first enlarged image that corresponds to the user interface object, display a second enlarged image of a second user interface object in the first array that is adjacent to the first user interface object in the first array.

1494
Detect a vertical swipe gesture by the user on the first enlarged image. In response to detecting the vertical swipe gesture by the user on the first enlarged image, scroll the first enlarged image.

1495
Detect an input by the user on the first enlarged image. In response to detecting the input by the user on the first enlarged image, display the user interface objects in the first array in a cover flow mode of display.

1496
Detect an input by the user on a first user interface object in a first array of user interface objects in the plurality of arrays. Detect movement of the input by the user to a representative user interface object for the first array of user interface objects. Detect lift off of the input by the user from the representative user interface object for the first array of user interface objects. In response to detecting lift off of the input by the user from the representative user interface object for the first array of user interface objects, make the first user interface object the representative user interface object for the first array of user interface objects.

Figure 16B:
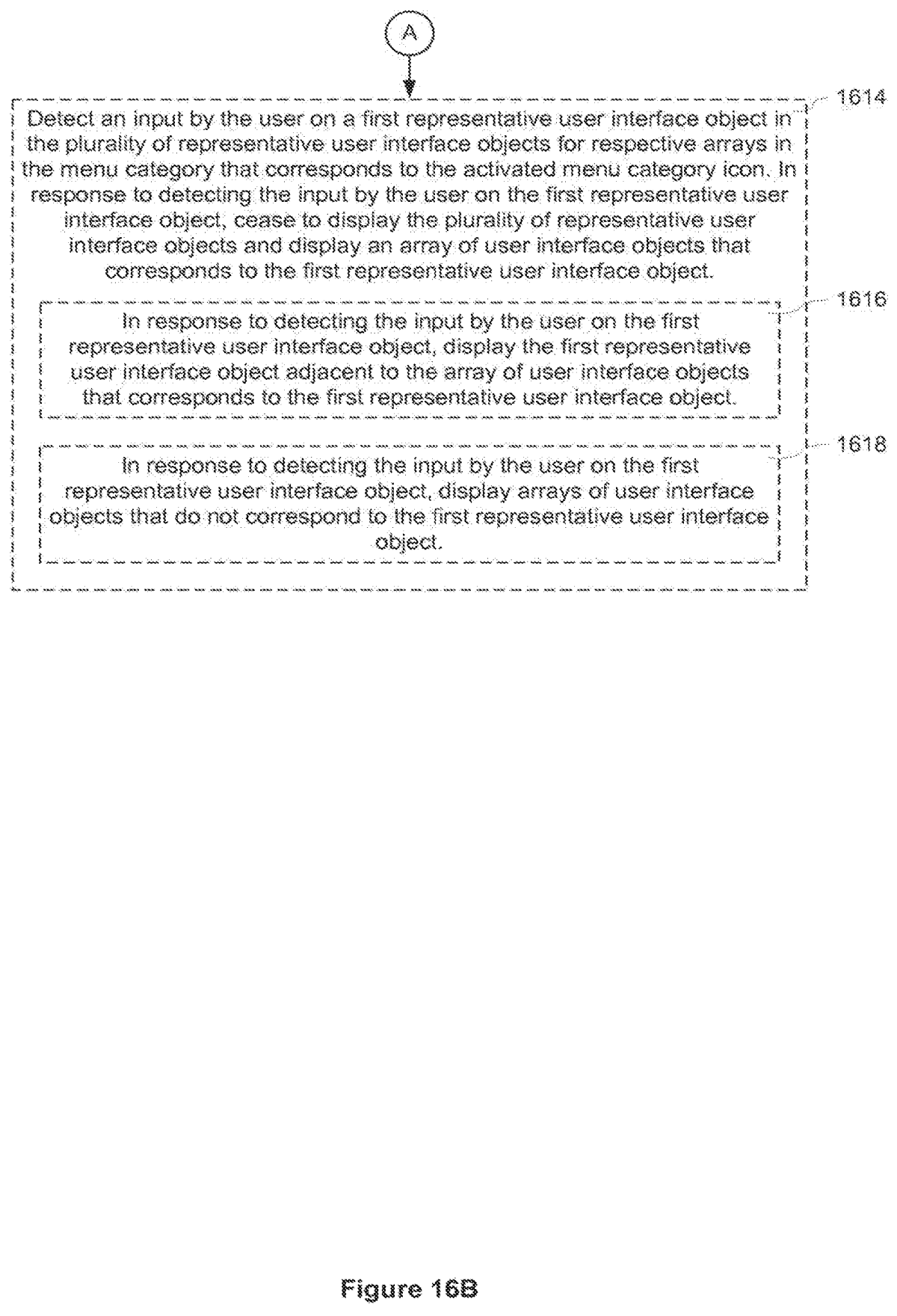

Detect an input by the user on a first representative user interface object in the plurality of representative user interface objects for respective arrays in the menu category that corresponds to the activated menu category icon. In response to detecting the input by the user on the first representative user interface object, cease to display the plurality of representative user interface objects and display an array of user interface objects that corresponds to the first representative user interface object.

1616

In response to detecting the input by the user on the first representative user interface object, display the first representative user interface object adjacent to the array of user interface objects that corresponds to the first representative user interface object.

1618

In response to detecting the input by the user on the first representative user interface object, display arrays of user interface objects that do not correspond to the first representative user interface object.

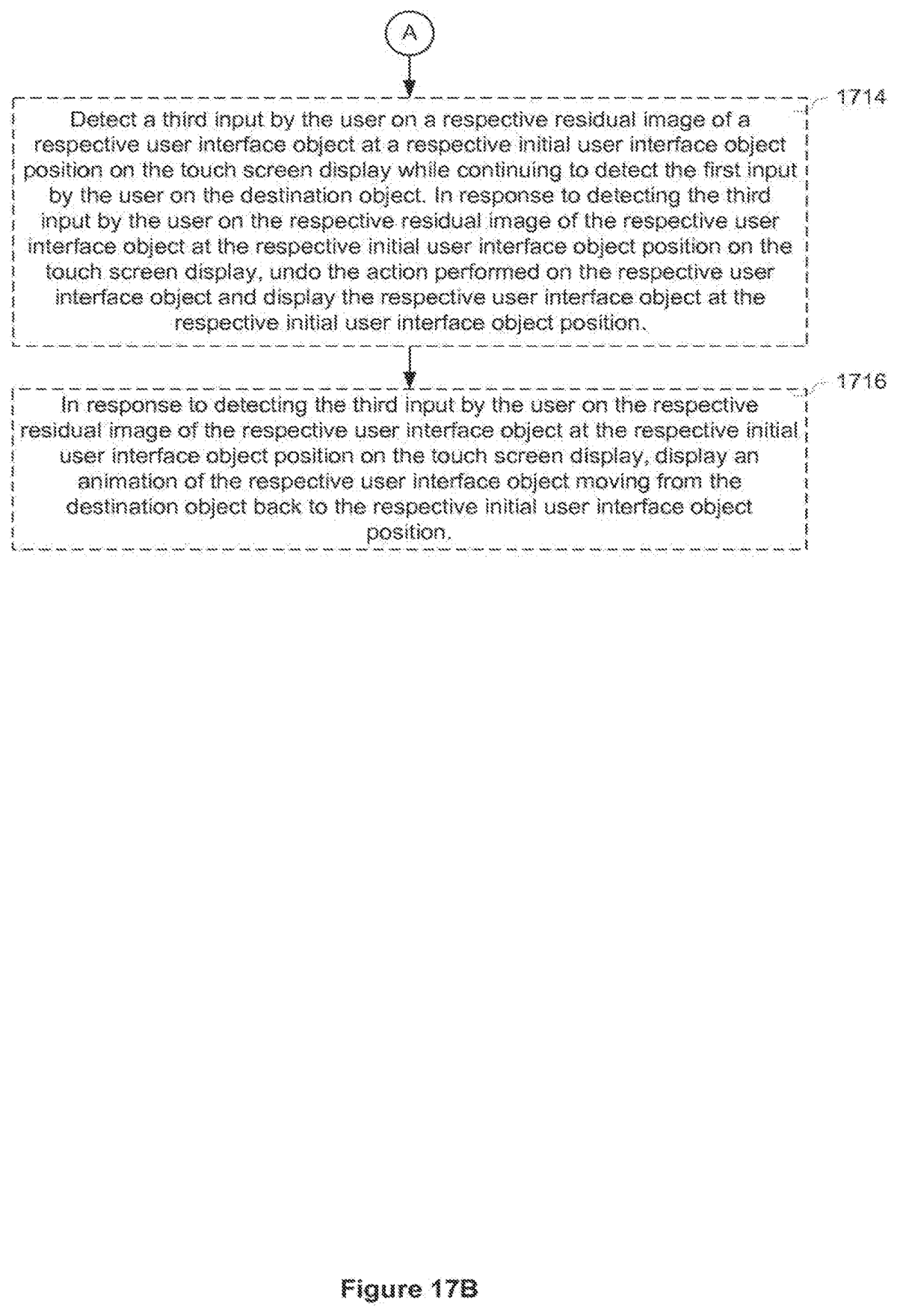

Detect a third input by the user on a respective residual image of a respective user interface object at a respective initial user interface object position on the touch screen display while continuing to detect the first input by the user on the destination object. In response to detecting the third input by the user on the respective residual image of the respective user interface object at the respective initial user interface object position on the touch screen display, undo the action performed on the respective user interface object and display the respective user interface object at the respective initial user interface object position.

1716

In response to detecting the third input by the user on the respective residual image of the respective user interface object at the respective initial user interface object position on the touch screen display, display an animation of the respective user interface object moving from the destination object back to the respective initial user interface object position.

Figure 17B

DEVICE, METHOD, AND GRAPHICAL USER INTERFACE FOR MANIPULATING USER INTERFACE OBJECTS

RELATED APPLICATIONS

This application is a continuation of U.S. patent application Ser. No. 15/088,450, "Device, Method, and Graphical User Interface for Manipulating User Interface Objects," filed Apr. 1, 2016, now U.S. Pat. No. 10,282,070, which is a continuation of U.S. patent application Ser. No. 13/909,002, "Device, Method, and Graphical User Interface for Manipulating User Interface Objects," filed Jun. 3, 2013, now U.S. Pat. No. 9,310,907, which is a continuation of U.S. patent application Ser. No. 12/567,570, "Device, Method, and Graphical User Interface for Manipulating User Interface Objects," filed Sep. 25, 2009, now U.S. Pat. No. 8,456,431, which claims priority to International Application No. PCT/US09/57899, "Device, Method, and Graphical User Interface for Manipulating User Interface Objects," filed Sep. 22, 2009, which are incorporated by reference herein in their entirety.

This application is related to the following applications: (1) U.S. patent application Ser. No. 12/567,405, "Device, Method, and Graphical User Interface for Manipulating User Interface Objects," filed Sep. 25, 2009; (2) U.S. patent application Ser. No. 12/567,460, "Device, Method, and Graphical User Interface for Manipulating User Interface Objects," filed Sep. 25, 2009; and (3) U.S. patent application Ser. No. 12/567,553, "Device, Method, and Graphical User Interface for Manipulating User Interface Objects," filed Sep. 25, 2009, which are incorporated by reference herein in their entirety.

TECHNICAL FIELD

The disclosed embodiments relate generally to electronic devices with touch-sensitive surfaces, and more particularly, to electronic devices with touch-sensitive surfaces that use two or more simultaneous user inputs to manipulate user interface objects.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects, as well as associating metadata with one or more user interface objects. Exemplary user interface objects include digital images, video, text, icons, and other graphics. A user may need to perform such manipulations on user interface objects in a file management program (e.g., Finder from Apple Computer, Inc. of Cupertino, Calif.), an image management application (e.g., Aperture or iPhoto from Apple Computer, Inc. of Cupertino, Calif.), a digital content (e.g., videos and music) management application (e.g., iTunes from Apple Computer. Inc. of Cupertino, Calif.), a drawing application, a presentation application (e.g., Keynote from Apple Computer, Inc. of Cupertino, Calif.), a word processing application (e.g., Pages from Apple Computer, Inc. of Cupertino, Calif.), a website creation application (e.g., iWeb from Apple Computer, Inc. of Cupertino, Calif.), a disk authoring application (e.g., iDVD from Apple Computer, Inc. of Cupertino, Calif.), or a spreadsheet application (e.g., Numbers from Apple Computer, Inc. of Cupertino, Calif.).

But existing methods for performing these manipulations are cumbersome and inefficient. For example, using a sequence of mouse-based inputs to select one or more user interface objects and perform one or more actions on the selected user interface objects is tedious and creates a significant cognitive burden on a user. Existing methods that use simultaneous inputs to perform these manipulations are also cumbersome and inefficient. In addition, existing methods take longer than necessary, thereby wasting energy. This latter consideration is particularly important in battery-operated devices.

Accordingly, there is a need for computing devices with faster, more efficient methods and interfaces for manipulating user interface objects using two or more simultaneous user inputs, such as two simultaneous inputs on a track pad or touch screen, or simultaneous inputs from a touch-sensitive surface and a mouse. Such methods and interfaces may complement or replace conventional methods for manipulating user interface objects. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a computing device with a touch screen display. The method includes: simultaneously displaying on the touch screen display: a plurality of user interface objects, and at least one destination object; and detecting a first input by a user on a destination object. The method further includes, while continuing to detect the first input by the user on the destination object: detecting a second input by the user on a first user interface object displayed at an initial first user interface object position on the touch screen display; and, in response to detecting the second input by the user on the first user interface object, performing an action on the first user interface object. The action is associated with the destination object.

In accordance with some embodiments, a computing device includes a touch screen display, one or more processors, memory, and one or more programs. The one or more programs are stored in the memory and configured to be executed by the one or more processors. The one or more programs include instructions for: simultaneously displaying on the touch screen display: a plurality of user interface objects, and at least one destination object. The programs also include instructions for detecting a first input by a user on a destination object. The programs further include instructions for, while continuing to detect the first input by the user on the destination object, detecting a second input by the user on a first user interface object displayed at an initial first user interface object position on the touch screen display; and, in response to detecting the second input by the user on the first user interface object, performing an action on the first user interface object. The action is associated with the destination object.

In accordance with some embodiments, a computer readable storage medium has stored therein instructions which when executed by a computing device with a touch screen display, cause the device to: simultaneously display on the touch screen display: a plurality of user interface objects, and at least one destination object. The instructions also cause the device to detect a first input by a user on a destination object. While continuing to detect the first input by the user on the destination object, the instructions also cause the device to detect a second input by the user on a first user interface object displayed at an initial first user interface object position on the touch screen display; and, in response to detecting the second input by the user on the first user interface object, perform an action on the first user interface object. The action is associated with the destination object.

In accordance with some embodiments, a graphical user interface on a computing device with a touch screen display, a memory, and one or more processors to execute one or more programs stored in the memory includes a plurality of user interface objects, and at least one destination object. A first input by a user on a destination object is detected. While continuing to detect the first input by the user on the destination object: a second input by the user on a first user interface object, displayed at an initial first user interface object position on the touch screen display, is detected; and, in response to detecting the second input by the user on the first user interface object, an action is performed on the first user interface object. The action is associated with the destination object.

In accordance with some embodiments, a computing device includes: a touch screen display; means for simultaneously displaying on the touch screen display: a plurality of user interface objects, and at least one destination object. The device also includes means for detecting a first input by a user on a destination object. The device further includes, while continuing to detect the first input by the user on the destination object, means for detecting a second input by the user on a first user interface object displayed at an initial first user interface object position on the touch screen display; and, means, responsive to detecting the second input by the user on the first user interface object, for performing an action on the first user interface object. The action is associated with the destination object.

In accordance with some embodiments, an information processing apparatus for use in a computing device with a touch screen display includes: means for simultaneously displaying on the touch screen display: a plurality of user interface objects, and at least one destination object. The apparatus also includes means for detecting a first input by a user on a destination object. The apparatus further includes, while continuing to detect the first input by the user on the destination object, means for detecting a second input by the user on a first user interface object displayed at an initial first user interface object position on the touch screen display; and, means, responsive to detecting the second input by the user on the first user interface object, for performing an action on the first user interface object. The action is associated with the destination object.

In accordance with some embodiments, a method is performed at a computing device with a touch screen display. The method includes: simultaneously displaying on the touch screen display a plurality of user interface objects, and at least one destination object; and detecting a first input by a user on a destination object. The method further includes, while continuing to detect the first input by the user on the destination object: detecting a second input by the user or a series of inputs by the user on two or more user interface objects in the plurality of user interface objects, wherein the two or more user interface objects are displayed at respective initial user interface object positions on the touch screen display; and, in response to detecting the second input by the user or series of inputs by the user on the two or more user interface objects, performing an action on each of the two or more user interface objects. The action is associated with the destination object.

In accordance with some embodiments, a computing device includes a touch screen display, one or more processors, memory, and one or more programs. The one or more programs are stored in the memory and configured to be executed by the one or more processors. The one or more programs include instructions for: simultaneously displaying on the touch screen display: a plurality of user interface objects, and at least one destination object. The programs also include instructions for detecting a first input by a user on a destination object. The programs further include instructions for, while continuing to detect the first input by the user on the destination object: detecting a second input by the user or a series of inputs by the user on two or more user interface objects in the plurality of user interface objects, wherein the two or more user interface objects are displayed at respective initial user interface object positions on the touch screen display; and, in response to detecting the second input by the user or series of inputs by the user on the two or more user interface objects, performing an action on each of the two or more user interface objects. The action is associated with the destination object.

In accordance with some embodiments, a computer readable storage medium has stored therein instructions which when executed by a computing device with a touch screen display, cause the device to: simultaneously display on the touch screen display: a plurality of user interface objects, and at least one destination object. The instructions also cause the device to detect a first input by a user on a destination object. The instructions further cause the device to, while continuing to detect the first input by the user on the destination object: detect a second input by the user or a series of inputs by the user on two or more user interface objects in the plurality of user interface objects, wherein the two or more user interface objects are displayed at respective initial user interface object positions on the touch screen display; and, in response to detecting the second input by the user or series of inputs by the user on the two or more user interface objects, perform an action on each of the two or more user interface objects. The action is associated with the destination object.

In accordance with some embodiments, a graphical user interface on a computing device with a touch screen display, a memory, and one or more processors to execute one or more programs stored in the memory includes a plurality of user interface objects and at least one destination object. A first input by a user on a destination object is detected. While continuing to detect the first input by the user on the destination object: a second input by the user is detected or a series of inputs by the user on two or more user interface objects in the plurality of user interface objects are detected, wherein the two or more user interface objects are displayed at respective initial user interface object positions on the touch screen display: and, in response to detecting the second input by the user or series of inputs by the user on the two or more user interface objects, an action is performed on each of the two or more user interface objects. The action is associated with the destination object.

In accordance with some embodiments, a computing device includes: a touch screen display; means for simultaneously displaying on the touch screen display: a plurality of user interface objects, and at least one destination object. The device further includes means for detecting a first input by a user on a destination object. The device also includes, while continuing to detect the first input by the user on the destination object: means for detecting a second input by the user or a series of inputs by the user on two or more user interface objects in the plurality of user interface objects, wherein the two or more user interface objects are displayed at respective initial user interface object positions on the touch screen display; and means, responsive to detecting the second input by the user or series of inputs by the user on the two or more user interface objects, for performing an action on each of the two or more user interface objects. The action is associated with the destination object.

In accordance with some embodiments, an information processing apparatus for use in a computing device with a touch screen display includes: means for simultaneously displaying on the touch screen display: a plurality of user interface objects, and at least one destination object. The apparatus further includes means for detecting a first input by a user on a destination object. The apparatus also includes, while continuing to detect the first input by the user on the destination object: means for detecting a second input by the user or a series of inputs by the user on two or more user interface objects in the plurality of user interface objects, wherein the two or more user interface objects are displayed at respective initial user interface object positions on the touch screen display; and means, responsive to detecting the second input by the user or series of inputs by the user on the two or more user interface objects, for performing an action on each of the two or more user interface objects. The action is associated with the destination object.

In accordance with some embodiments, a method is performed at a computing device with a touch screen display. The method includes: simultaneously displaying on the touch screen display a plurality of user interface objects and at least one destination object. The method also includes detecting a first input by a user on a first user interface object at a first location on the touch screen display. The method further includes, while continuing to detect the first input by the user: detecting movement of the first input by the user across the touch screen display to a second location on the touch screen display; moving the first user interface object in accordance with the movement of the first input by the user across the touch screen display to the second location on the touch screen display; detecting a second input by the user on a second user interface object displayed at an initial second user interface object position on the touch screen display; and, in response to detecting the second input by the user on the second user interface object, displaying an animation of the second user interface object moving from the initial second user interface object position to the second location.

In accordance with some embodiments, a computing device includes a touch screen display, one or more processors, memory, and one or more programs. The one or more programs are stored in the memory and configured to be executed by the one or more processors. The one or more programs include instructions for: simultaneously displaying on the touch screen display: a plurality of user interface objects, and at least one destination object. The programs also include instructions for detecting a first input by a user on a first user interface object at a first location on the touch screen display. The programs further include instructions for, while continuing to detect the first input by the user: detecting movement of the first input by the user across the touch screen display to a second location on the touch screen display; moving the first user interface object in accordance with the movement of the first input by the user across the touch screen display to the second location on the touch screen display; detecting a second input by the user on a second user interface object displayed at an initial second user interface object position on the touch screen display; and, in response to detecting the second input by the user on the second user interface object, displaying an animation of the second user interface object moving from the initial second user interface object position to the second location.

In accordance with some embodiments, a computer readable storage medium has stored therein instructions which when executed by a computing device with a touch screen display, cause the device to: simultaneously display on the touch screen display: a plurality of user interface objects, and at least one destination object. The instructions also cause the device to detect a first input by a user on a first user interface object at a first location on the touch screen display. The instructions further cause the device to, while continuing to detect the first input by the user: detect movement of the first input by the user across the touch screen display to a second location on the touch screen display; move the first user interface object in accordance with the movement of the first input by the user across the touch screen display to the second location on the touch screen display; detect a second input by the user on a second user interface object displayed at an initial second user interface object position on the touch screen display; and, in response to detecting the second input by the user on the second user interface object, display an animation of the second user interface object moving from the initial second user interface object position to the second location.

In accordance with some embodiments, a graphical user interface on a computing device with a touch screen display, a memory, and one or more processors to execute one or more programs stored in the memory includes a plurality of user interface objects and at least one destination object. A first input by a user on a first user interface object is detected at a first location on the touch screen display. While continuing to detect the first input by the user: movement of the first input by the user across the touch screen display to a second location on the touch screen display is detected; the first user interface object is moved in accordance with the movement of the first input by the user across the touch screen display to the second location on the touch screen display; a second input by the user on a second user interface object, displayed at an initial second user interface object position on the touch screen display, is detected; and, in response to detecting the second input by the user on the second user interface object, an animation of the second user interface object moving from the initial second user interface object position to the second location is displayed.

In accordance with some embodiments, a computing device includes: a touch screen display; and means for simultaneously displaying on the touch screen display: a plurality of user interface objects, and at least one destination object. The device also includes means for detecting a first input by a user on a first user interface object at a first location on the touch screen display. The device further includes, while continuing to detect the first input by the user: means for detecting movement of the first input by the user across the touch screen display to a second location on the touch screen display: means for moving the first user interface object in accordance with the movement of the first input by the user across the touch screen display to the second location on the touch screen display: means for detecting a second input by the user on a second user interface object displayed at an initial second user interface object position on the touch screen display; and, means, responsive to detecting the second input by the user on the second user interface object, for displaying an animation of the second user interface object moving from the initial second user interface object position to the second location.

In accordance with some embodiments, an information processing apparatus for use in a computing device with a touch screen display includes: means for simultaneously displaying on the touch screen display a plurality of user interface objects and at least one destination object; and means for detecting a first input by a user on a first user interface object at a first location on the touch screen display. The apparatus further includes, while continuing to detect the first input by the user: means for detecting movement of the first input by the user across the touch screen display to a second location on the touch screen display; means for moving the first user interface object in accordance with the movement of the first input by the user across the touch screen display to the second location on the touch screen display; means for detecting a second input by the user on a second user interface object displayed at an initial second user interface object position on the touch screen display; and, means, responsive to detecting the second input by the user on the second user interface object, for displaying an animation of the second user interface object moving from the initial second user interface object position to the second location.

In accordance with some embodiments, a method is performed at a computing device with a touch screen display. The method includes: simultaneously displaying on the touch screen display a plurality of user interface objects and at least one destination object. The method also includes detecting a first input by a user on a first user interface object at a first location on the touch screen display. The method further includes, while continuing to detect the first input by the user: detecting movement of the first input by the user across the touch screen display to a second location on the touch screen display; moving the first user interface object in accordance with the movement of the first input by the user across the touch screen display to the second location on the touch screen display; detecting a second input by the user or series of inputs by the user on two or more user interface objects in the plurality of user interface objects, wherein the two or more user interface objects are displayed at respective initial user interface object positions on the touch screen display; and, in response to detecting the second input by the user or series of inputs by the user on two or more user interface objects in the plurality of user interface objects, displaying animations of each respective user interface object in the two or more user interface objects moving from a respective initial user interface object position to the second location.

In accordance with some embodiments, a computing device includes a touch screen display, one or more processors, memory, and one or more programs. The one or more programs are stored in the memory and configured to be executed by the one or more processors. The one or more programs include instructions for simultaneously displaying on the touch screen display a plurality of user interface objects and at least one destination object. The programs also include instructions for detecting a first input by a user on a first user interface object at a first location on the touch screen display. The programs further include instructions for, while continuing to detect the first input by the user: detecting movement of the first input by the user across the touch screen display to a second location on the touch screen display; moving the first user interface object in accordance with the movement of the first input by the user across the touch screen display to the second location on the touch screen display; detecting a second input by the user or series of inputs by the user on two or more user interface objects in the plurality of user interface objects, wherein the two or more user interface objects are displayed at respective initial user interface object positions on the touch screen display; and, in response to detecting the second input by the user or series of inputs by the user on two or more user interface objects in the plurality of user interface objects, displaying animations of each respective user interface object in the two or more user interface objects moving from a respective initial user interface object position to the second location.

In accordance with some embodiments, a computer readable storage medium has stored therein instructions which when executed by a computing device with a touch screen display, cause the device to simultaneously display on the touch screen display a plurality of user interface objects and at least one destination object. The instructions also cause the device to detect a first input by a user on a first user interface object at a first location on the touch screen display. The instructions further cause the device to, while continuing to detect the first input by the user: detect movement of the first input by the user across the touch screen display to a second location on the touch screen display; move the first user interface object in accordance with the movement of the first input by the user across the touch screen display to the second location on the touch screen display: detect a second input by the user or series of inputs by the user on two or more user interface objects in the plurality of user interface objects, wherein the two or more user interface objects are displayed at respective initial user interface object positions on the touch screen display; and, in response to detecting the second input by the user or series of inputs by the user on two or more user interface objects in the plurality of user interface objects, display animations of each respective user interface object in the two or more user interface objects moving from a respective initial user interface object position to the second location.

In accordance with some embodiments, a graphical user interface on a computing device with a touch screen display, a memory, and one or more processors to execute one or more programs stored in the memory includes a plurality of user interface objects and at least one destination object. A first input by a user is detected on a first user interface object at a first location on the touch screen display. While continuing to detect the first input by the user: movement of the first input by the user across the touch screen display to a second location on the touch screen display is detected; the first user interface object is moved in accordance with the movement of the first input by the user across the touch screen display to the second location on the touch screen display; a second input by the user or series of inputs by the user on two or more user interface objects in the plurality of user interface objects is detected, wherein the two or more user interface objects are displayed at respective initial user interface object positions on the touch screen display; and, in response to detecting the second input by the user or series of inputs by the user on two or more user interface objects in the plurality of user interface objects, animations of each respective user interface object in the two or more user interface objects moving from a respective initial user interface object position to the second location are displayed.

In accordance with some embodiments, a computing device includes: a touch screen display; and means for simultaneously displaying on the touch screen display a plurality of user interface objects and at least one destination object. The device also includes means for detecting a first input by a user on a first user interface object at a first location on the touch screen display. The device further includes, while continuing to detect the first input by the user: means for detecting movement of the first input by the user across the touch screen display to a second location on the touch screen display; means for moving the first user interface object in accordance with the movement of the first input by the user across the touch screen display to the second location on the touch screen display; means for detecting a second input by the user or series of inputs by the user on two or more user interface objects in the plurality of user interface objects, wherein the two or more user interface objects are displayed at respective initial user interface object positions on the touch screen display; and means, responsive to detecting the second input by the user or series of inputs by the user on two or more user interface objects in the plurality of user interface objects, for displaying animations of each respective user interface object in the two or more user interface objects moving from a respective initial user interface object position to the second location.

In accordance with some embodiments, an information processing apparatus for use in a computing device with a touch screen display includes: means for simultaneously displaying on the touch screen display a plurality of user interface objects and at least one destination object. The apparatus also includes means for detecting a first input by a user on a first user interface object at a first location on the touch screen display. The apparatus further includes, while continuing to detect the first input by the user: means for detecting movement of the first input by the user across the touch screen display to a second location on the touch screen display; means for moving the first user interface object in accordance with the movement of the first input by the user across the touch screen display to the second location on the touch screen display; means for detecting a second input by the user or series of inputs by the user on two or more user interface objects in the plurality of user interface objects, wherein the two or more user interface objects are displayed at respective initial user interface object positions on the touch screen display; and means, responsive to detecting the second input by the user or series of inputs by the user on two or more user interface objects in the plurality of user interface objects, for displaying animations of each respective user interface object in the two or more user interface objects moving from a respective initial user interface object position to the second location.

In accordance with some embodiments, a method is performed at a computing device with a touch screen display. The method includes simultaneously displaying on the touch screen display a plurality of user interface objects in an array. The plurality of user interface objects in the array is displayed in a first arrangement. A first user interface object in the plurality of user interface objects is displayed at a first size. The first arrangement comprises a first plurality of rows. The method further includes detecting simultaneous contacts by a plurality of fingers on the array. The simultaneous contacts have a corresponding centroid position at the first user interface object. The method also includes detecting a gesture made by the simultaneous contacts that corresponds to a command to zoom in by a user-specified amount; and, in response to detecting the gesture by the simultaneous contacts, enlarging the first user interface object to a second size larger than the first size on the touch screen display. The method further includes, after enlarging the first user interface object to the second size and while continuing to detect the simultaneous contacts on the touch screen display, determining an updated centroid position of the simultaneous contacts. The updated centroid position is located at a first vertical position on the touch screen display immediately prior to ceasing to detect the simultaneous contacts. The method also includes ceasing to detect the simultaneous contacts; and, in response to ceasing to detect the simultaneous contacts, displaying an animation of the plurality of user interface objects in the array rearranging to form a second arrangement. The second arrangement comprises a second plurality of rows different from the first plurality of rows. The first user interface object is displayed in a row in the second arrangement that includes the first vertical position on the touch screen display.

In accordance with some embodiments, a computing device includes a touch screen display, one or more processors, memory, and one or more programs. The one or more programs are stored in the memory and configured to be executed by the one or more processors. The one or more programs include instructions for simultaneously displaying on the touch screen display a plurality of user interface objects in an array. The plurality of user interface objects in the array is displayed in a first arrangement. A first user interface object in the plurality of user interface objects is displayed at a first size. The first arrangement comprises a first plurality of rows. The programs also include instructions for detecting simultaneous contacts by a plurality of fingers on the array. The simultaneous contacts have a corresponding centroid position at the first user interface object. The programs further include instructions for: detecting a gesture made by the simultaneous contacts that corresponds to a command to zoom in by a user-specified amount; in response to detecting the gesture by the simultaneous contacts, enlarging the first user interface object to a second size larger than the first size on the touch screen display; and, after enlarging the first user interface object to the second size and while continuing to detect the simultaneous contacts on the touch screen display, determining an updated centroid position of the simultaneous contacts. The updated centroid position is located at a first vertical position on the touch screen display immediately prior to ceasing to detect the simultaneous contacts. The program also includes instructions for: ceasing to detect the simultaneous contacts; and, in response to ceasing to detect the simultaneous contacts, displaying an animation of the plurality of user interface objects in the array rearranging to form a second arrangement. The second arrangement comprises a second plurality of rows different from the first plurality of rows, and the first user interface object is displayed in a row in the second arrangement that includes the first vertical position on the touch screen display.

In accordance with some embodiments, a computer readable storage medium has stored therein instructions which when executed by a computing device with a touch screen display, cause the device to simultaneously display on the touch screen display a plurality of user interface objects in an array. The plurality of user interface objects in the array is displayed in a first arrangement. A first user interface object in the plurality of user interface objects is displayed at a first size. The first arrangement comprises a first plurality of rows. The instructions also cause the device to detect simultaneous contacts by a plurality of fingers on the array. The simultaneous contacts have a corresponding centroid position at the first user interface object. The instructions further cause the device to: detect a gesture made by the simultaneous contacts that corresponds to a command to zoom in by a user-specified amount; in response to detecting the gesture by the simultaneous contacts, enlarge the first user interface object to a second size larger than the first size on the touch screen display; and, after enlarging the first user interface object to the second size and while continuing to detect the simultaneous contacts on the touch screen display, determine an updated centroid position of the simultaneous contacts. The updated centroid position is located at a first vertical position on the touch screen display immediately prior to ceasing to detect the simultaneous contacts. The instructions also cause the device to: cease to detect the simultaneous contacts; and, in response to ceasing to detect the simultaneous contacts, display an animation of the plurality of user interface objects in the array rearranging to form a second arrangement. The second arrangement comprises a second plurality of rows different from the first plurality of rows. The first user interface object is displayed in a row in the second arrangement that includes the first vertical position on the touch screen display.

In accordance with some embodiments, a graphical user interface on a computing device with a touch screen display, a memory, and one or more processors to execute one or more programs stored in the memory includes a plurality of user interface objects in an array. The plurality of user interface objects in the array is displayed in a first arrangement. A first user interface object in the plurality of user interface objects is displayed at a first size. The first arrangement comprises a first plurality of rows. Simultaneous contacts by a plurality of fingers are detected on the array. The simultaneous contacts have a corresponding centroid position at the first user interface object. A gesture made by the simultaneous contacts that corresponds to a command to zoom in by a user-specified amount is detected. In response to detecting the gesture by the simultaneous contacts, the first user interface object is enlarged to a second size larger than the first size on the touch screen display. After enlarging the first user interface object to the second size and while continuing to detect the simultaneous contacts on the touch screen display, an updated centroid position of the simultaneous contacts is determined. The updated centroid position is located at a first vertical position on the touch screen display immediately prior to ceasing to detect the simultaneous contacts. The simultaneous contacts cease to be detected. In response to ceasing to detect the simultaneous contacts, an animation of the plurality of user interface objects in the array rearranging to form a second arrangement is displayed. The second arrangement comprises a second plurality of rows different from the first plurality of rows. The first user interface object is displayed in a row in the second arrangement that includes the first vertical position on the touch screen display.

In accordance with some embodiments, a computing device includes: a touch screen display; and means for simultaneously displaying on the touch screen display a plurality of user interface objects in an array. The plurality of user interface objects in the array is displayed in a first arrangement. A first user interface object in the plurality of user interface objects is displayed at a first size. The first arrangement comprises a first plurality of rows. The device also includes means for detecting simultaneous contacts by a plurality of fingers on the array. The simultaneous contacts have a corresponding centroid position at the first user interface object. The device further includes: means for detecting a gesture made by the simultaneous contacts that corresponds to a command to zoom in by a user-specified amount; means, responsive to detecting the gesture by the simultaneous contacts, for enlarging the first user interface object to a second size larger than the first size on the touch screen display; and means for, after enlarging the first user interface object to the second size and while continuing to detect the simultaneous contacts on the touch screen display, determining an updated centroid position of the simultaneous contacts. The updated centroid position is located at a first vertical position on the touch screen display immediately prior to ceasing to detect the simultaneous contacts. The device also includes: means for ceasing to detect the simultaneous contacts; and, means, responsive to ceasing to detect the simultaneous contacts, for displaying an animation of the plurality of user interface objects in the array rearranging to form a second arrangement. The second arrangement comprises a second plurality of rows different from the first plurality of rows. The first user interface object is displayed in a row in the second arrangement that includes the first vertical position on the touch screen display.

In accordance with some embodiments, an information processing apparatus for use in a computing device with a touch screen display includes means for simultaneously displaying on the touch screen display a plurality of user interface objects in an array. The plurality of user interface objects in the array is displayed in a first arrangement. A first user interface object in the plurality of user interface objects is displayed at a first size. The first arrangement comprises a first plurality of rows. The apparatus also includes means for detecting simultaneous contacts by a plurality of fingers on the array. The simultaneous contacts have a corresponding centroid position at the first user interface object. The apparatus further includes: means for detecting a gesture made by the simultaneous contacts that corresponds to a command to zoom in by a user-specified amount; means, responsive to detecting the gesture by the simultaneous contacts, for enlarging the first user interface object to a second size larger than the first size on the touch screen display; and means for, after enlarging the first user interface object to the second size and while continuing to detect the simultaneous contacts on the touch screen display, determining an updated centroid position of the simultaneous contacts. The updated centroid position is located at a first vertical position on the touch screen display immediately prior to ceasing to detect the simultaneous contacts. The apparatus also includes: means for means for ceasing to detect the simultaneous contacts; and, means, responsive to ceasing to detect the simultaneous contacts, for displaying an animation of the plurality of user interface objects in the array rearranging to form a second arrangement. The second arrangement comprises a second plurality of rows different from the first plurality of rows. The first user interface object is displayed in a row in the second arrangement that includes the first vertical position on the touch screen display.

In accordance with some embodiments, a method is performed at a computing device with a touch screen display. The method includes simultaneously displaying on the touch screen display at least one destination object and at least a subset of a plurality of arrays of user interface objects. The method further includes detecting a first input by a user on the touch screen display; and, in response to detecting the first input by the user on the touch screen display, vertically scrolling the plurality of arrays on the touch screen display. The method further includes detecting a second input by the user on a single array in the plurality of arrays on the touch screen display; and, in response to detecting the second input by the user on the single array, horizontally scrolling user interface objects in the single array.

In accordance with some embodiments, a computing device includes a touch screen display, one or more processors, memory, and one or more programs. The one or more programs are stored in the memory and configured to be executed by the one or more processors. The one or more programs include instructions for simultaneously displaying on the touch screen display at least one destination object and at least a subset of a plurality of arrays of user interface objects. The programs also include instructions for: detecting a first input by a user on the touch screen display; and, in response to detecting the first input by the user on the touch screen display, vertically scrolling the plurality of arrays on the touch screen display. The programs further include instructions for: detecting a second input by the user on a single array in the plurality of arrays on the touch screen display; and, in response to detecting the second input by the user on the single array, horizontally scrolling user interface objects in the single array.

In accordance with some embodiments, a computer readable storage medium has stored therein instructions which when executed by a computing device with a touch screen display, cause the device to simultaneously display on the touch screen display at least one destination object and at least a subset of a plurality of arrays of user interface objects. The instructions also cause the device to: detect a first input by a user on the touch screen display; and in response to detecting the first input by the user on the touch screen display, vertically scroll the plurality of arrays on the touch screen display. The instructions further cause the device to: detect a second input by the user on a single array in the plurality of arrays on the touch screen display; and, in response to detecting the second input by the user on the single array, horizontally scroll user interface objects in the single array.

In accordance with some embodiments, a graphical user interface on a computing device with a touch screen display, a memory, and one or more processors to execute one or more programs stored in the memory includes at least one destination object and at least a subset of a plurality of arrays of user interface objects. A first input by a user on the touch screen display is detected. In response to detecting the first input by the user on the touch screen display, the plurality of arrays on the touch screen display is vertically scrolled. A second input by the user on a single array in the plurality of arrays on the touch screen display is detected. In response to detecting the second input by the user on the single array, user interface objects in the single array are horizontally scrolled.

In accordance with some embodiments, a computing device includes: a touch screen display; and means for simultaneously displaying on the touch screen display at least one destination object and at least a subset of a plurality of arrays of user interface objects. The device also includes: means for detecting a first input by a user on the touch screen display; and, means, responsive to detecting the first input by the user on the touch screen display, for vertically scrolling the plurality of arrays on the touch screen display. The device further includes: means for detecting a second input by the user on a single array in the plurality of arrays on the touch screen display; and, means, responsive to detecting the second input by the user on the single array, for horizontally scrolling user interface objects in the single array.

In accordance with some embodiments, an information processing apparatus for use in a computing device with a touch screen display includes means for simultaneously displaying on the touch screen display at least one destination object and at least a subset of a plurality of arrays of user interface objects. The apparatus also includes: means for detecting a first input by a user on the touch screen display; and, means, responsive to detecting the first input by the user on the touch screen display, for vertically scrolling the plurality of arrays on the touch screen display. The apparatus further includes: means for detecting a second input by the user on a single array in the plurality of arrays on the touch screen display; and, means, responsive to detecting the second input by the user on the single array, for horizontally scrolling user interface objects in the single array.

In accordance with some embodiments, a method is performed at a computing device with a touch screen display. The method includes: simultaneously displaying on the touch screen display at least one destination object and at least a subset of a plurality of arrays of user interface objects. The method further includes: detecting activation of a respective array name icon that corresponds to a respective array in the plurality of arrays, and, in response to detecting activation of the respective array name icon that corresponds to the respective array, displaying an animation of user interface objects in the respective array moving into a respective representative user interface object for the respective array. The method also includes: detecting movement of an input by the user from the array name icon to a destination object or an area associated with a destination object; and, moving the respective representative user interface object in accordance with the movement of the input by the user across the touch screen display to the destination object or the area associated with a destination object. The method further includes: detecting lift off of the input by the user from the touch screen display at the destination object or at the area associated with a destination object; and, in response to detecting lift off of the input by the user from the touch screen display at the destination object or at the area associated with the destination object, performing an action on the user interface objects in the respective array. The action is associated with the destination object.

In accordance with some embodiments, a computing device includes a touch screen display, one or more processors, memory, and one or more programs. The one or more programs are stored in the memory and configured to be executed by the one or more processors. The one or more programs include instructions for simultaneously displaying on the touch screen display at least one destination object and at least a subset of a plurality of arrays of user interface objects. The programs also include instructions for: detecting activation of a respective array name icon that corresponds to a respective array in the plurality of arrays; and, in response to detecting activation of the respective array name icon that corresponds to the respective array, displaying an animation of user interface objects in the respective array moving into a respective representative user interface object for the respective array. The programs further include instructions for: detecting movement of an input by the user from the array name icon to a destination object or an area associated with a destination object: and moving the respective representative user interface object in accordance with the movement of the input by the user across the touch screen display to the destination object or the area associated with a destination object. The programs also include instructions for: detecting lift off of the input by the user from the touch screen display at the destination object or at the area associated with a destination object; and, in response to detecting lift off of the input by the user from the touch screen display at the destination object or at the area associated with the destination object, performing an action on the user interface objects in the respective array. The action is associated with the destination object.

In accordance with some embodiments, a computer readable storage medium has stored therein instructions which when executed by a computing device with a touch screen display, cause the device to simultaneously display on the touch screen display at least one destination object and at least a subset of a plurality of arrays of user interface objects. The instructions also cause the device to: detect activation of a respective array name icon that corresponds to a respective array in the plurality of arrays; and, in response to detecting activation of the respective array name icon that corresponds to the respective array, display an animation of user interface objects in the respective array moving into a respective representative user interface object for the respective array. The instructions also cause the device to: detect movement of an input by the user from the array name icon to a destination object or an area associated with a destination object; and, move the respective representative user interface object in accordance with the movement of the input by the user across the touch screen display to the destination object or the area associated with a destination object. The instructions further cause the device to: detect lift off of the input by the user from the touch screen display at the destination object or at the area associated with a destination object and, in response to detecting lift off of the input by the user from the touch screen display at the destination object or at the area associated with the destination object, perform an action on the user interface objects in the respective array. The action is associated with the destination object.

In accordance with some embodiments, a graphical user interface on a computing device with a touch screen display, a memory, and one or more processors to execute one or more programs stored in the memory includes at least one destination object and at least a subset of a plurality of arrays of user interface objects. Activation of a respective array name icon that corresponds to a respective array in the plurality of arrays is detected. In response to detecting activation of the respective array name icon that corresponds to the respective array, an animation of user interface objects in the respective array moving into a respective representative user interface object for the respective array is displayed. Movement of an input by the user from the array name icon to a destination object or an area associated with a destination object is detected. The respective representative user interface object is moved in accordance with the movement of the input by the user across the touch screen display to the destination object or the area associated with a destination object. Lift off of the input by the user from the touch screen display at the destination object or at the area associated with a destination object is detected. In response to detecting lift off of the input by the user from the touch screen display at the destination object or at the area associated with the destination object, an action on the user interface objects in the respective array is performed. The action is associated with the destination object.

In accordance with some embodiments, a computing device includes: a touch screen display; and means for simultaneously displaying on the touch screen display at least one destination object and at least a subset of a plurality of arrays of user interface objects. The device also includes: means for detecting activation of a respective array name icon that corresponds to a respective array in the plurality of arrays; and means, responsive to detecting activation of the respective array name icon that corresponds to the respective array, for displaying an animation of user interface objects in the respective array moving into a respective representative user interface object for the respective array. The device further includes: means for detecting movement of an input by the user from the array name icon to a destination object or an area associated with a destination object; and means for moving the respective representative user interface object in accordance with the movement of the input by the user across the touch screen display to the destination object or the area associated with a destination object. The device also includes: means for detecting lift off of the input by the user from the touch screen display at the destination object or at the area associated with a destination object; and, means, responsive to detecting lift off of the input by the user from the touch screen display at the destination object or at the area associated with the destination object, for performing an action on the user interface objects in the respective array. The action is associated with the destination object.

In accordance with some embodiments, an information processing apparatus for use in a computing device with a touch screen display includes means for simultaneously displaying on the touch screen display at least one destination object and at least a subset of a plurality of arrays of user interface objects. The apparatus also includes: means for detecting activation of a respective array name icon that corresponds to a respective array in the plurality of arrays; and means, responsive to detecting activation of the respective array name icon that corresponds to the respective array, for displaying an animation of user interface objects in the respective array moving into a respective representative user interface object for the respective array. The apparatus further includes: means for detecting movement of an input by the user from the array name icon to a destination object or an area associated with a destination object; and means for moving the respective representative user interface object in accordance with the movement of the input by the user across the touch screen display to the destination object or the area associated with a destination object. The apparatus also includes: means for detecting lift off of the input by the user from the touch screen display at the destination object or at the area associated with a destination object; and, means, responsive to detecting lift off of the input by the user from the touch screen display at the destination object or at the area associated with the destination object, for performing an action on the user interface objects in the respective array. The action is associated with the destination object.

In accordance with some embodiments, a method is performed at a computing device with a touch screen display. The method includes: simultaneously displaying on the touch screen display at least one destination object and at least a subset of a plurality of arrays of user interface objects; detecting activation of a menu category icon; and, in response to detecting activation of the menu category icon, displaying a plurality of representative user interface objects for respective arrays in a menu category that corresponds to the menu category icon.

In accordance with some embodiments, a computing device includes a touch screen display, one or more processors, memory, and one or more programs. The one or more programs are stored in the memory and configured to be executed by the one or more processors. The one or more programs include instructions for: simultaneously displaying on the touch screen display at least one destination object and at least a subset of a plurality of arrays of user interface objects; detecting activation of a menu category icon; and, in response to detecting activation of the menu category icon, displaying a plurality of representative user interface objects for respective arrays in a menu category that corresponds to the menu category icon.

In accordance with some embodiments, a computer readable storage medium has stored therein instructions which when executed by a computing device with a touch screen display, cause the device to: simultaneously display on the touch screen display at least one destination object and at least a subset of a plurality of arrays of user interface objects; detect activation of a menu category icon; and, in response to detecting activation of the menu category icon, display a plurality of representative user interface objects for respective arrays in a menu category that corresponds to the menu category icon.

In accordance with some embodiments, a graphical user interface on a computing device with a touch screen display, a memory, and one or more processors to execute one or more programs stored in the memory includes at least one destination object and at least a subset of a plurality of arrays of user interface objects. Activation of a menu category icon is detected. In response to detecting activation of the menu category icon, a plurality of representative user interface objects for respective arrays are displayed in a menu category that corresponds to the menu category icon.

In accordance with some embodiments, a computing device includes: a touch screen display; means for simultaneously displaying on the touch screen display at least one destination object and at least a subset of a plurality of arrays of user interface objects; means for detecting activation of a menu category icon; and, means, responsive to detecting activation of the menu category icon, for displaying a plurality of representative user interface objects for respective arrays in a menu category that corresponds to the menu category icon.

In accordance with some embodiments, an information processing apparatus for use in a computing device with a touch screen display includes: means for simultaneously displaying on the touch screen display at least one destination object and at least a subset of a plurality of arrays of user interface objects; means for detecting activation of a menu category icon: and, means, responsive to detecting activation of the menu category icon, for displaying a plurality of representative user interface objects for respective arrays in a menu category that corresponds to the menu category icon.

In accordance with some embodiments, a method is performed at a computing device with a touch screen display. The method includes: simultaneously displaying on the touch screen display at least one destination object and at least a subset of a plurality of arrays of user interface objects; detecting a first input by a user on a destination object; while continuing to detect the first input by the user on the destination object, detecting a second input by the user on an array name icon; and, in response to detecting the second input by the user on the array name icon, performing an action on all user interface objects in an array that corresponds to the array name icon. The action is associated with the destination object.

In accordance with some embodiments, a computing device includes a touch screen display, one or more processors, memory, and one or more programs. The one or more programs are stored in the memory and configured to be executed by the one or more processors. The one or more programs include instructions for: simultaneously displaying on the touch screen display at least one destination object and at least a subset of a plurality of arrays of user interface objects; detecting a first input by a user on a destination object; while continuing to detect the first input by the user on the destination object, detecting a second input by the user on an array name icon; and, in response to detecting the second input by the user on the array name icon, performing an action on all user interface objects in an array that corresponds to the array name icon. The action is associated with the destination object.

In accordance with some embodiments, a computer readable storage medium has stored therein instructions which when executed by a computing device with a touch screen display, cause the device to: simultaneously display on the touch screen display at least one destination object and at least a subset of a plurality of arrays of user interface objects; detect a first input by a user on a destination object; while continuing to detect the first input by the user on the destination object, detect a second input by the user on an array name icon; and, in response to detecting the second input by the user on the array name icon, perform an action on all user interface objects in an array that corresponds to the array name icon. The action is associated with the destination object.

In accordance with some embodiments, a graphical user interface on a computing device with a touch screen display, a memory, and one or more processors to execute one or more programs stored in the memory includes at least one destination object and at least a subset of a plurality of arrays of user interface objects. A first input by a user on a destination object is detected. While continuing to detect the first input by the user on the destination object, a second input by the user on an array name icon is detected. In response to detecting the second input by the user on the array name icon, an action is performed on all user interface objects in an array that corresponds to the array name icon. The action is associated with the destination object.

In accordance with some embodiments, a computing device includes: a touch screen display; means for simultaneously displaying on the touch screen display at least one destination object and at least a subset of a plurality of arrays of user interface objects; means for detecting a first input by a user on a destination object; while continuing to detect the first input by the user on the destination object, means for detecting a second input by the user on an array name icon; and, means, responsive to detecting the second input by the user on the array name icon, for performing an action on all user interface objects in an array that corresponds to the array name icon. The action is associated with the destination object.

In accordance with some embodiments, an information processing apparatus for use in a computing device with a touch screen display includes: means for simultaneously displaying on the touch screen display at least one destination object and at least a subset of a plurality of arrays of user interface objects; means for detecting a first input by a user on a destination object; while continuing to detect the first input by the user on the destination object, means for detecting a second input by the user on an array name icon; and, means, responsive to detecting the second input by the user on the array name icon, for performing an action on all user interface objects in an array that corresponds to the array name icon. The action is associated with the destination object.

Thus, computing devices with touch screen displays are provided with faster, more efficient methods and interfaces for manipulating user interface objects using two or more simultaneous user inputs, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 9A-9D are flow diagrams illustrating a method of moving one or more user interface objects to a destination object and performing an action associated with the destination object on the one or more user interface objects in accordance with some embodiments.

FIGS. 12A-12B are flow diagrams illustrating a method of forming a group of user interface objects, moving the group to a destination object or an area associated with a destination object, and performing an action associated with the destination object on the group of user interface objects in accordance with some embodiments.

FIGS. 13A-13I are flow diagrams illustrating a method of zooming and rearranging user interface objects in an array with a multifinger gesture in accordance with some embodiments.

FIGS. 14A-14I are flow diagrams illustrating a method of manipulating user interface objects in a plurality of arrays of user interface objects in accordance with some embodiments.

FIGS. 16A-16B are flow diagrams illustrating a method of using representative user interface objects for respective arrays in a menu category to select an array in accordance with some embodiments.

FIGS. 17A-17B are flow diagrams illustrating a method of performing an action on user interface objects in an array in accordance with some embodiments.

DESCRIPTION OF EMBODIMENTS

Figure 1A:
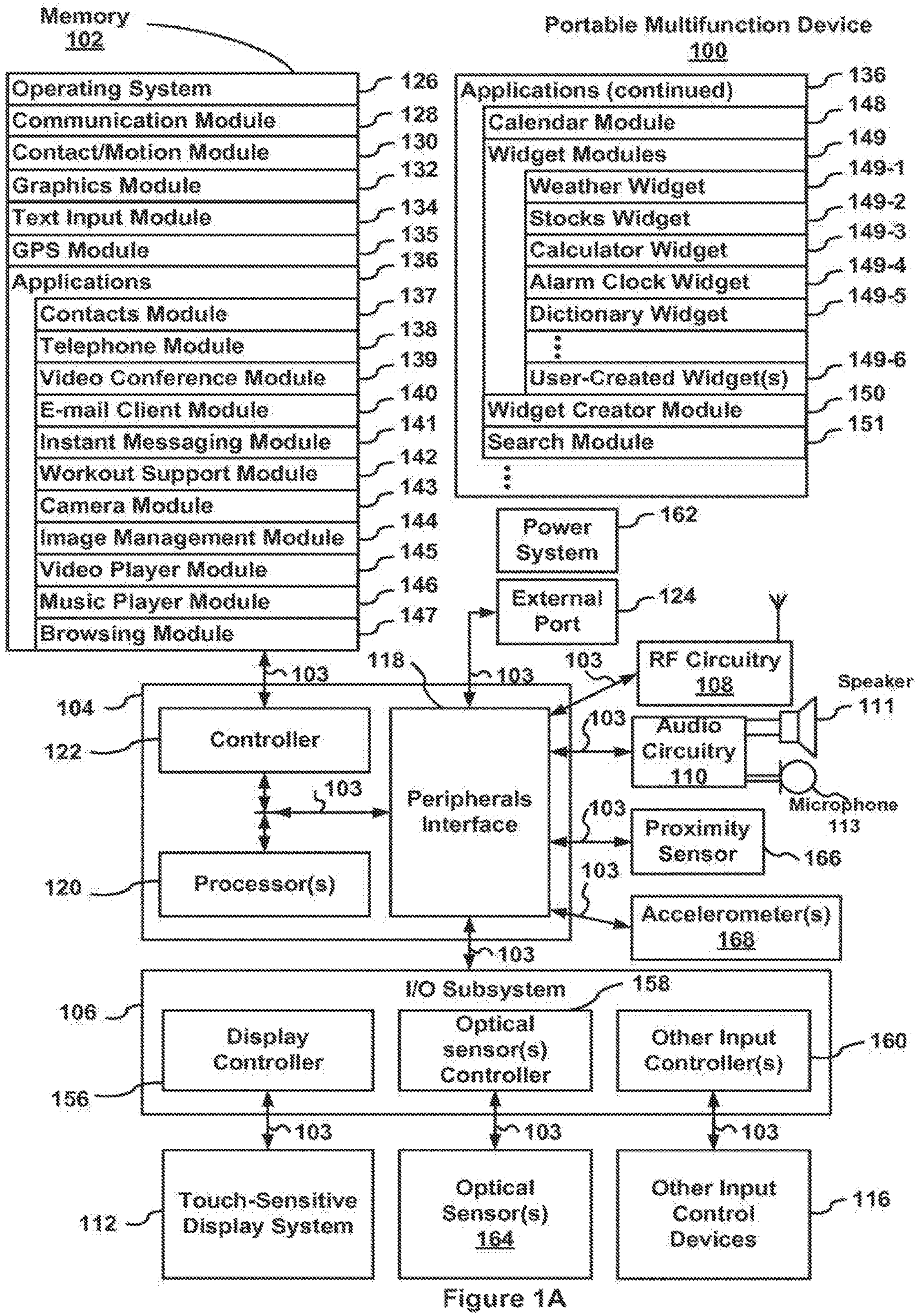
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple, Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615. "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
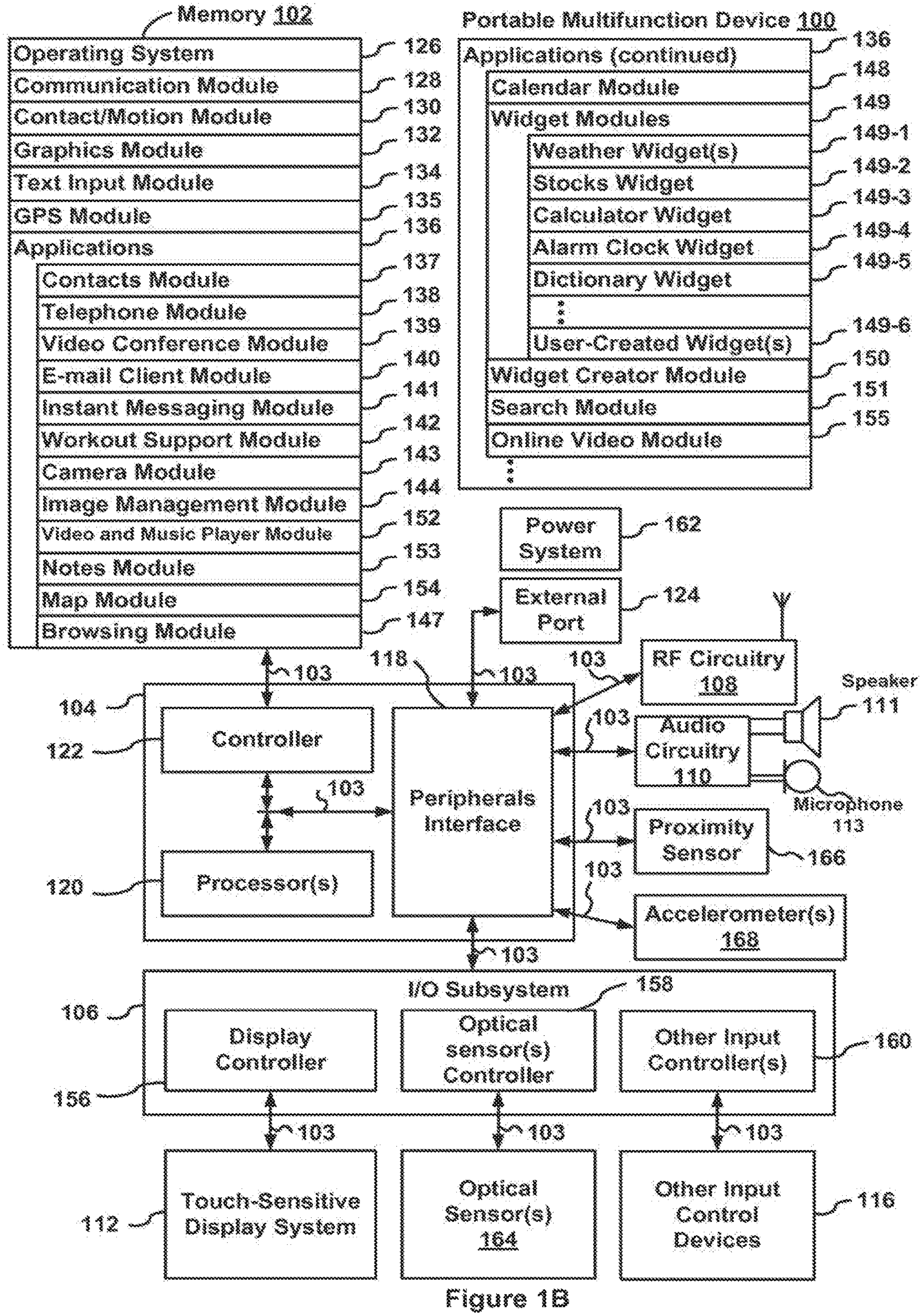

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (L/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.1a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549. "Unlocking a Device by Performing Gestures on an Unlock Image," filed Dec. 23, 2005, which is hereby incorporated by reference in its entirety. A longer press of the push button (e.g., 206) may turn power to the device 100 on or off The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices." filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 14.3 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, OPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, OPS module 135, and browser module 147, the map module 154 may be used to receive, display, modify, and store maps and data associated with maps (e.g., driving directions; data on stores and other points of interest at or near a particular location: and other location-based data).

In conjunction with touch screen 112, display system controller 156, contact module 130, graphics module 132, audio circuitry 110, speaker Ill, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method. and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
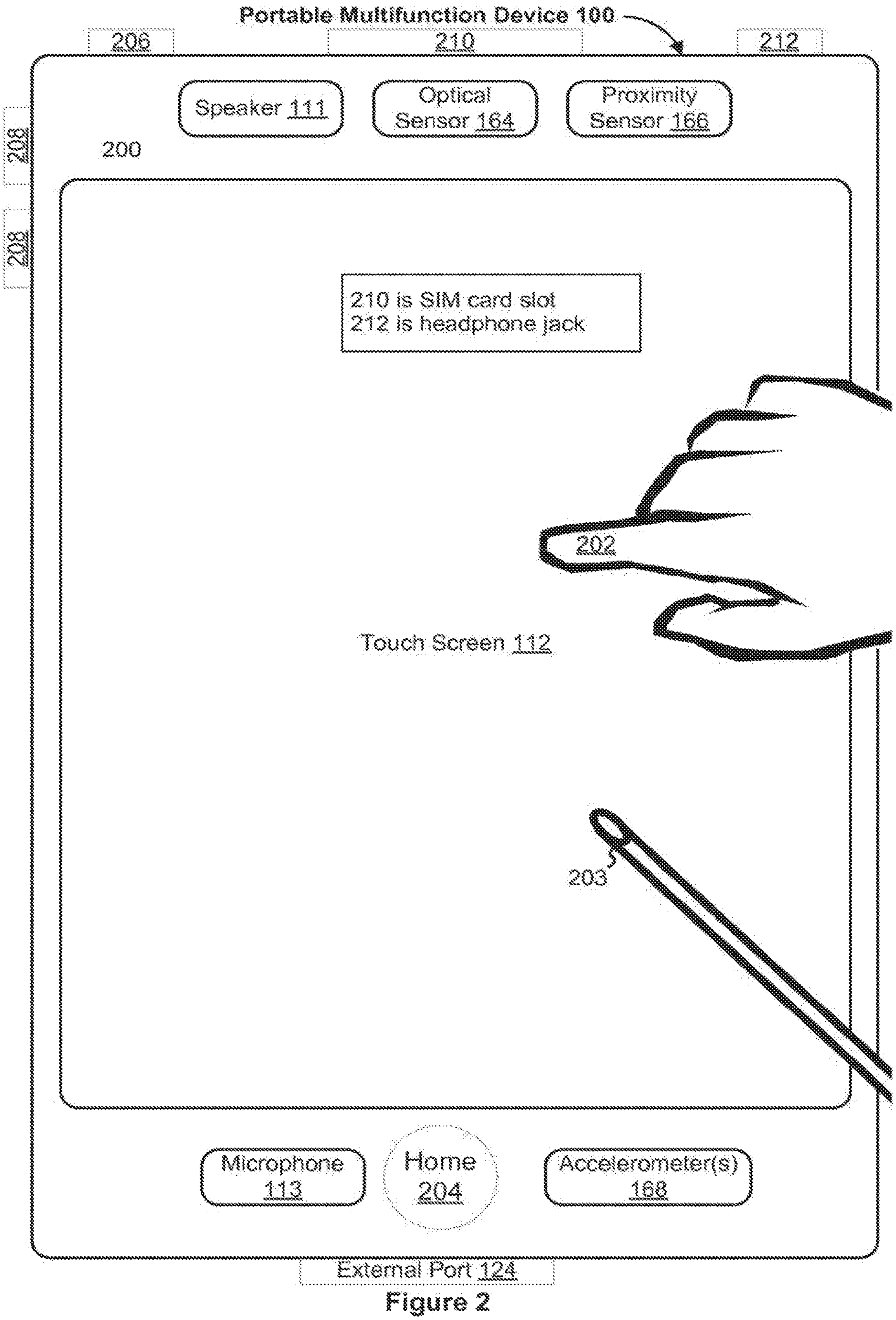
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
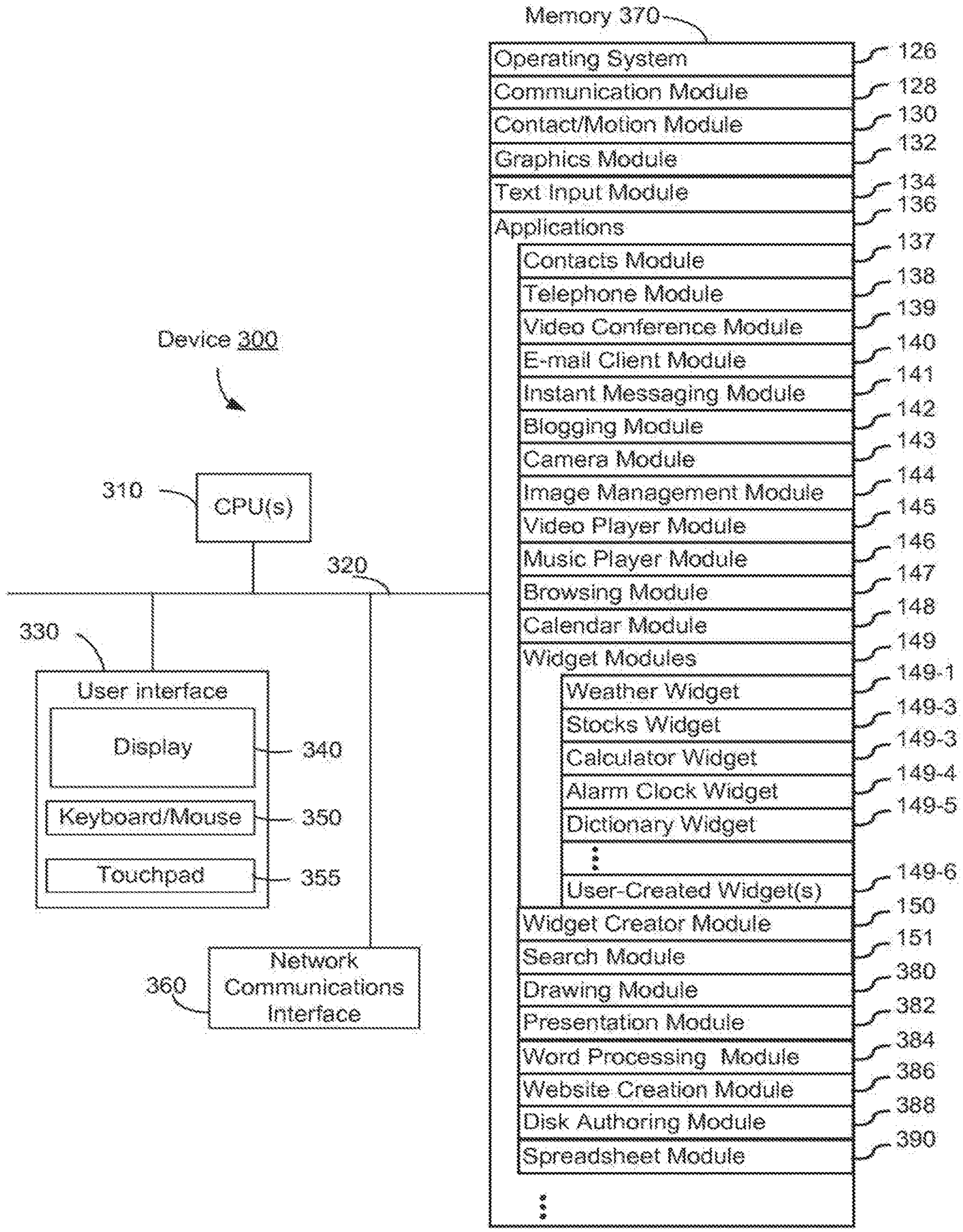
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
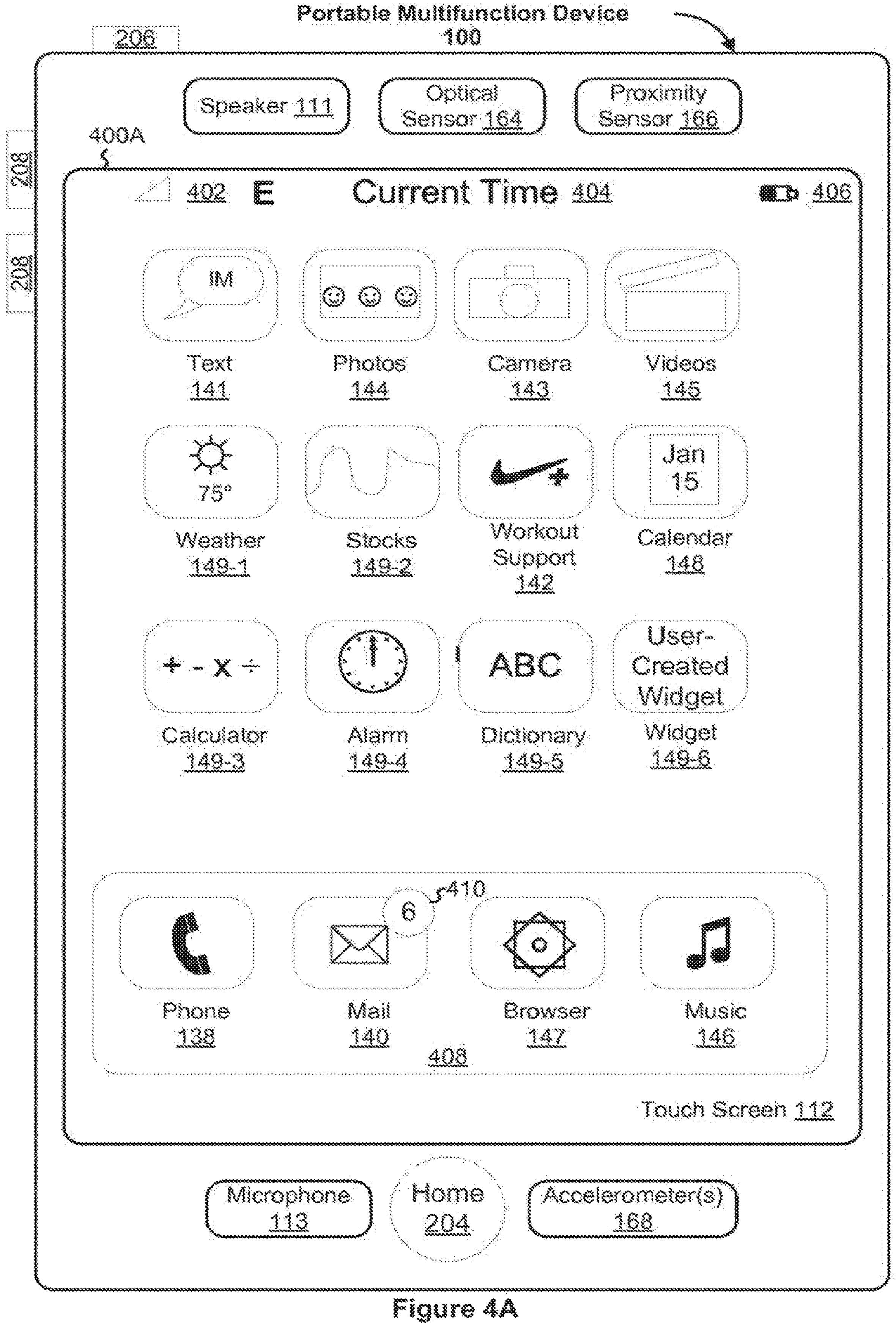
FIGS. 4A and 4B illustrate exemplary user interfaces for a menu of applications on a portable multifunction device in accordance with some embodiments.
Figure 4B:
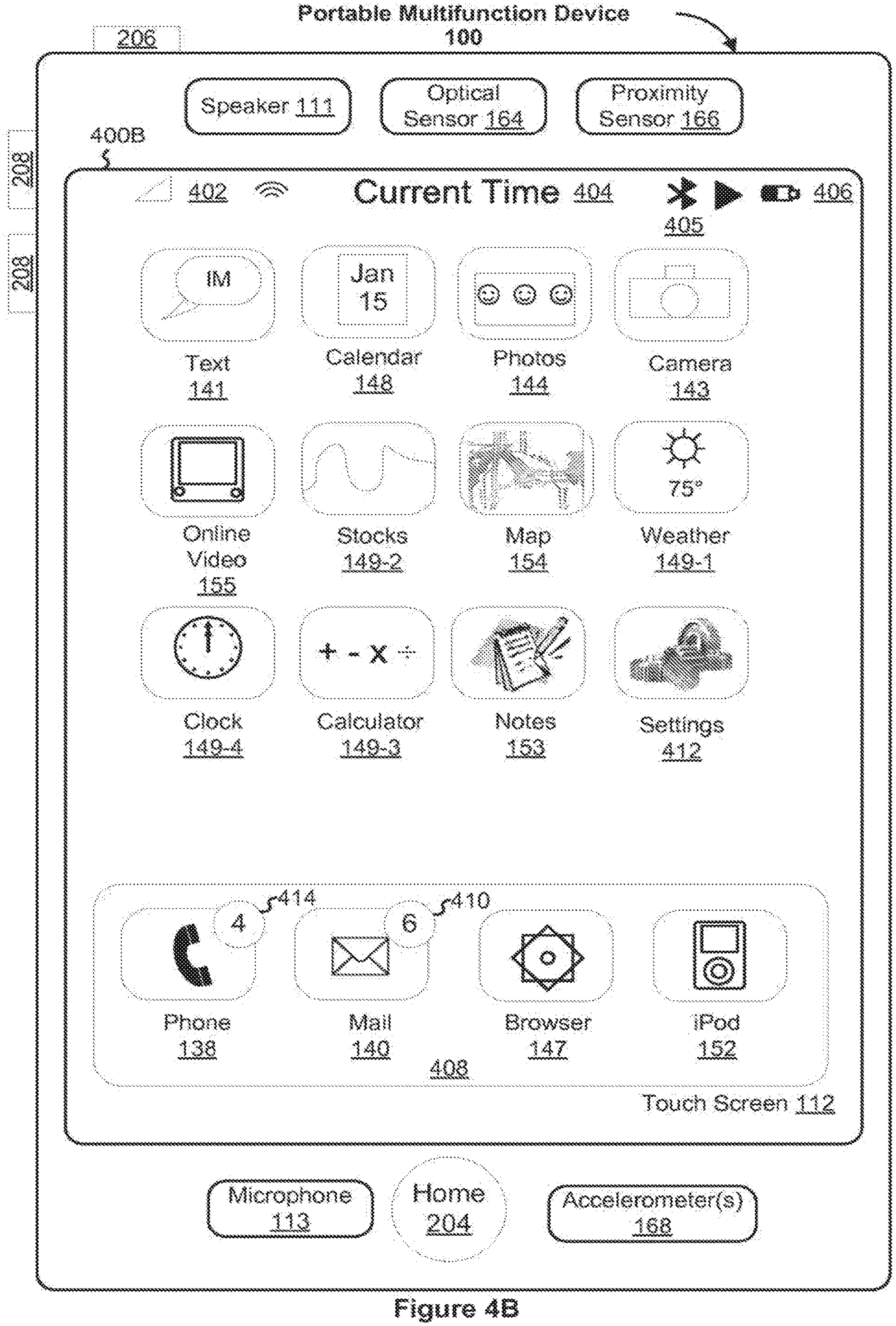

FIGS. 4A and 4B illustrate exemplary user interfaces for a menu of applications on a portable multifunction device 100 in accordance with some embodiments. Similar user interfaces may be implemented on device 300. In some embodiments, user interface 400A and/or 400B includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Workout support 142;
  - Calendar 148;
  - Calculator 149-3;
  - Alarm clock 149-4;
  - Dictionary 149-5; and
  - User-created widget 149-6.

In some embodiments, user interface 400B includes the following elements, or a subset or superset thereof:

- 402, 404, 405, 406, 141, 148, 144, 143, 149-3, 149-2, 149-1, 149-4, 410, 414, 138, 140, and 147, as described above:
- Map 154;
- Notes 153;
- Settings 412, which provides access to settings for the device 100 and its various applications 136, as described further below;
- Video and music player module 152, also referred to as iPod (trademark of Apple. Inc.) module 152; and
- Online video module 155, also referred to as YouTube (trademark of Google, Inc.) module 155.

Figure 4C:
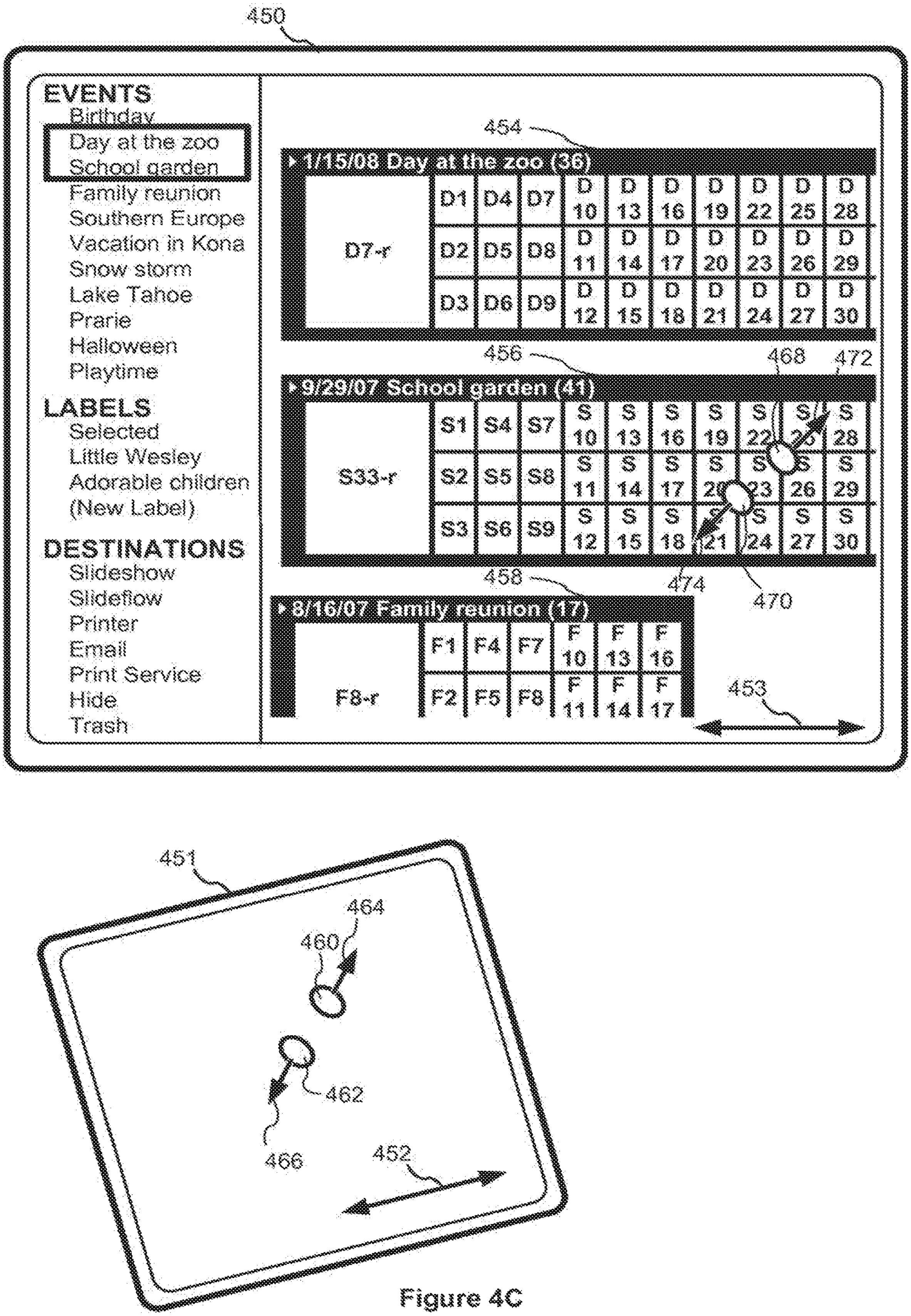
FIG. 4C illustrates exemplary user interfaces for a device with a touch-sensitive surface that is separate from the display in accordance with some embodiments.

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112, FIG. 3) for resizing an array (e.g., 456) of a plurality of arrays (e.g., 454, 456 and 458) of user interface objects, without resizing another array (e.g., 454) of the plurality of arrays in response to an input from the user (e.g., enlarging the array in response to a depinch gesture that includes contacts 460 and 462 with the touch sensitive surface 451).

Although many of the examples which follow will be given with reference to inputs on a touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects a plurality of simultaneous contacts (e.g., 460 and 462 in FIG. 4C) with the touch-sensitive surface 451 at locations that correspond to respective locations on the display (e.g., in FIG. 4C, contact location 460 corresponds to location 468 on display 450 and contact location 462 corresponds to location 470 on display 450).

In the present example, as shown in FIG. 4C, locations (e.g., 468 and 470) on the display 450 that correspond to the simultaneous contacts (e.g., 460 and 462) are located proximate to one of the plurality of arrays (e.g., array 456) of user interface objects (e.g., images S1-S30) on the display (e.g., 450 in FIG. 4C). While continuing to detect the simultaneous user inputs, the device detects a depinching gesture including movement (e.g., 464 and 466) of at the simultaneous contacts (e.g., 460 and 462) on the touch-sensitive surface away from each other, which corresponds to a depinching gesture including corresponding movement (e.g., 472 and 474, respectively) of corresponding locations (e.g., 468 and 470, respectively) on the display away from each other. In response, the device expands the array (e.g., 456 in FIG. 4C) that is proximate to the locations (e.g., 470 and 472) which correspond to the contacts (e.g., 460 and 462) on the touch-sensitive surface (e.g., 451 in FIG. 4C). In this way, user inputs (e.g., contacts 460 and 462) detected by the device on the touch-sensitive surface (e.g., 451 in FIG. 4C) are used by the device to manipulate user interface objects on the display (e.g., 450 in FIG. 4C) of the multifunction device when the touch-sensitive surface is separate from the display. It should be understood that similar methods can be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a computing device with a touch screen display, such as device 300 or portable multifunction device 100.

Figure 5A:
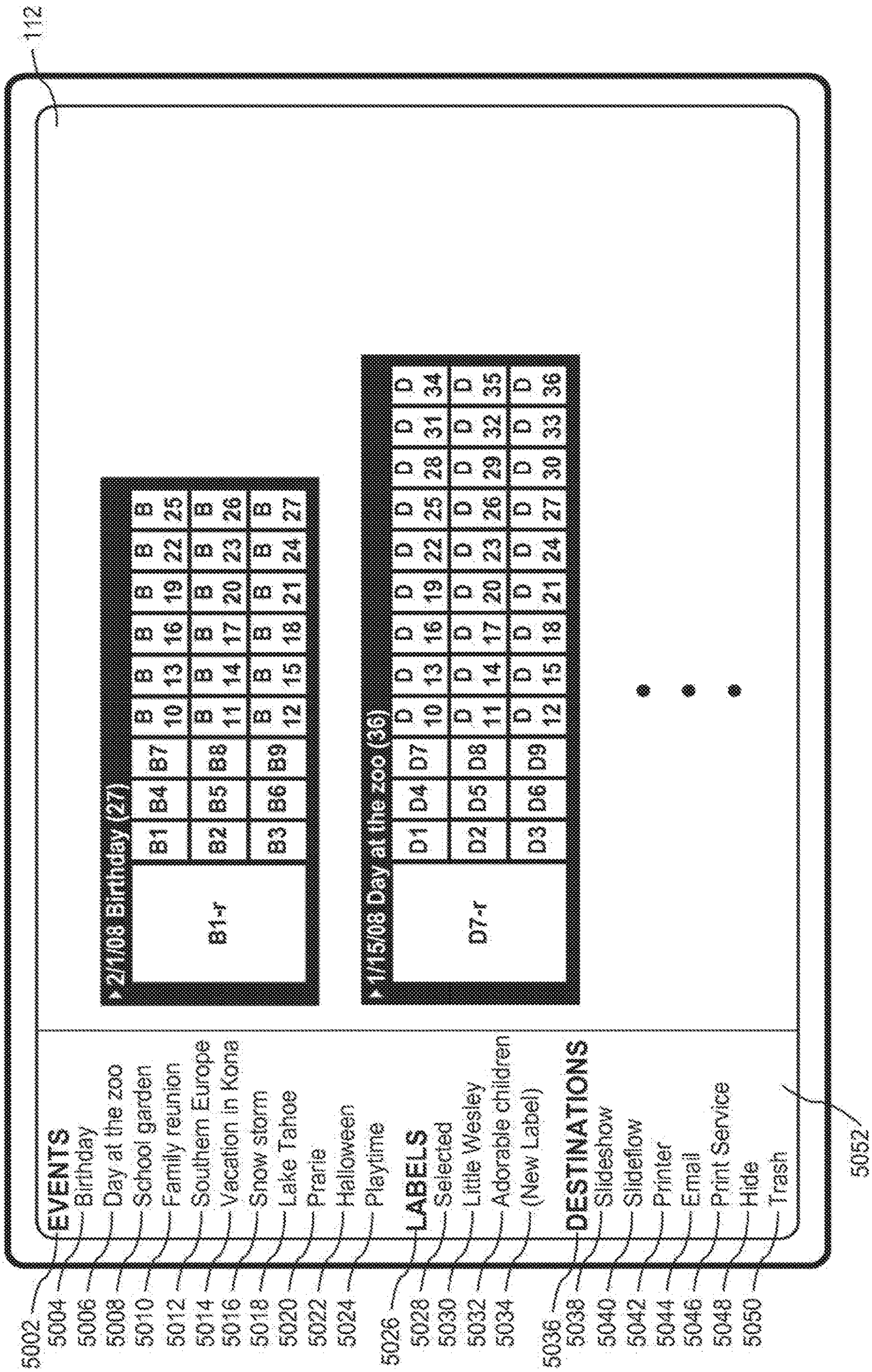
FIGS. 5A-5Y illustrate exemplary user interfaces for moving one or more user interface objects to a destination object and performing an action associated with the destination object on the one or more user interface objects in accordance with some embodiments.
Figure 5B:
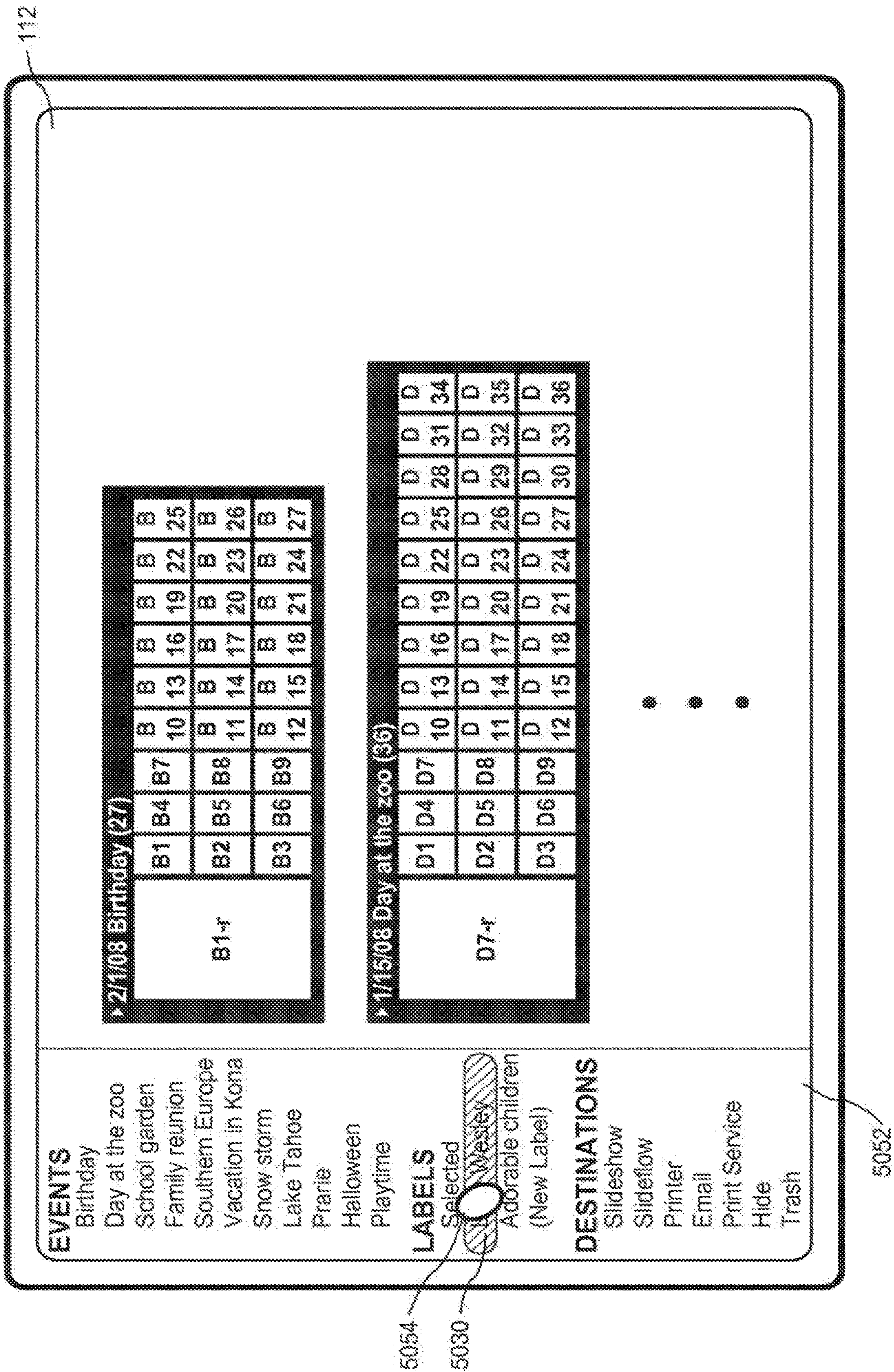
Figure 5C:
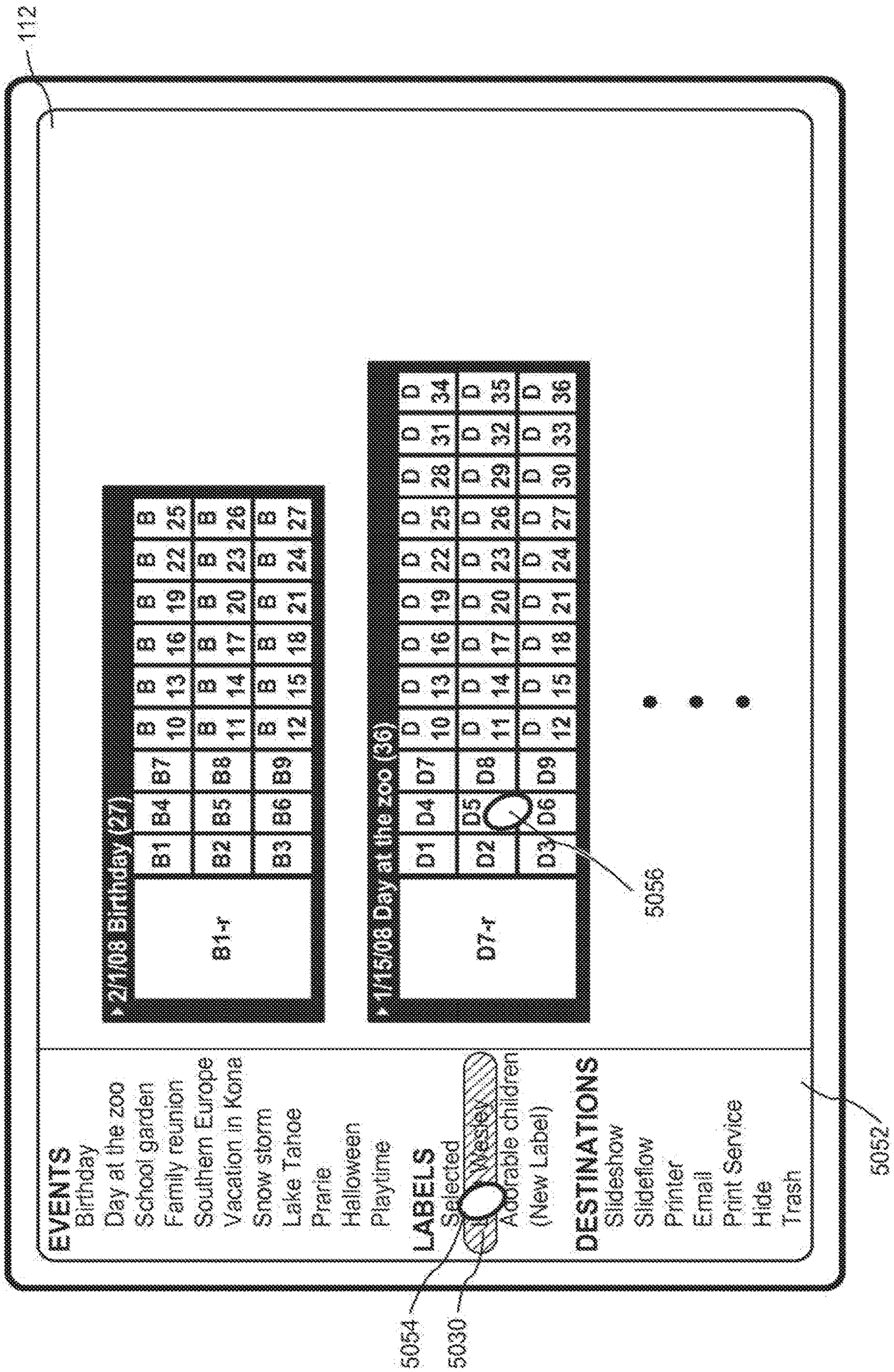
Figure 5D:
Figure 5E:
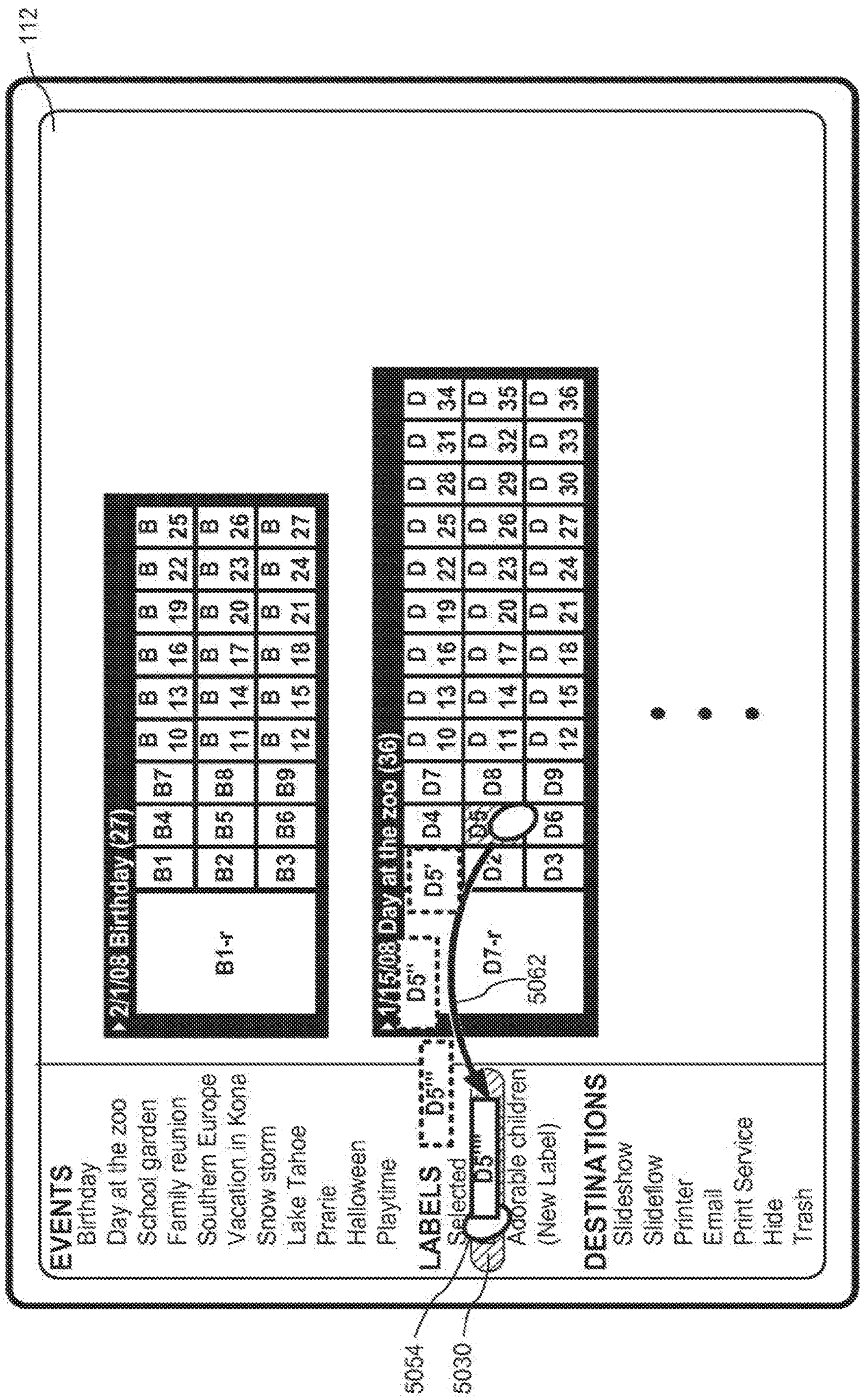
Figure 5F:
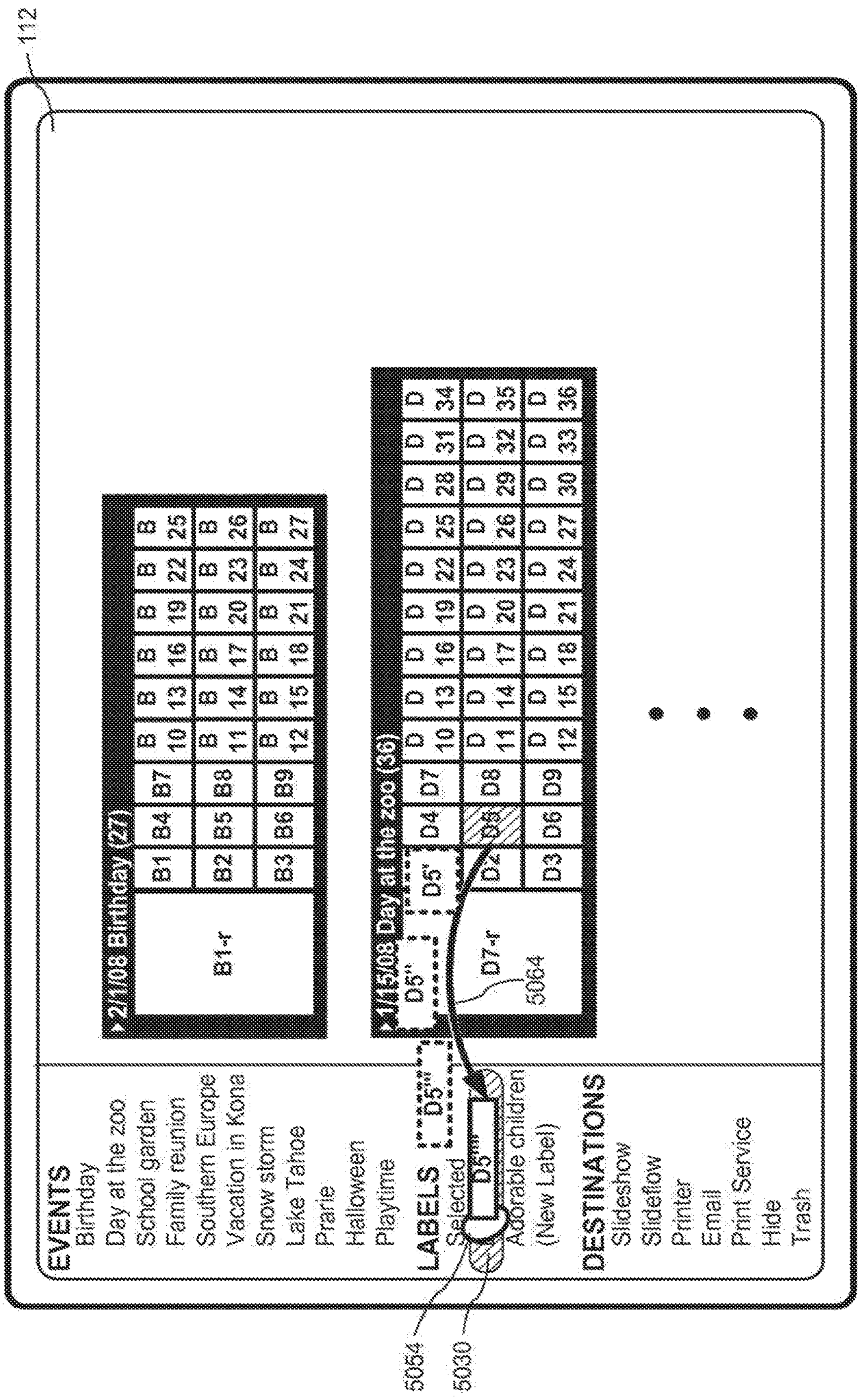
Figure 5G:
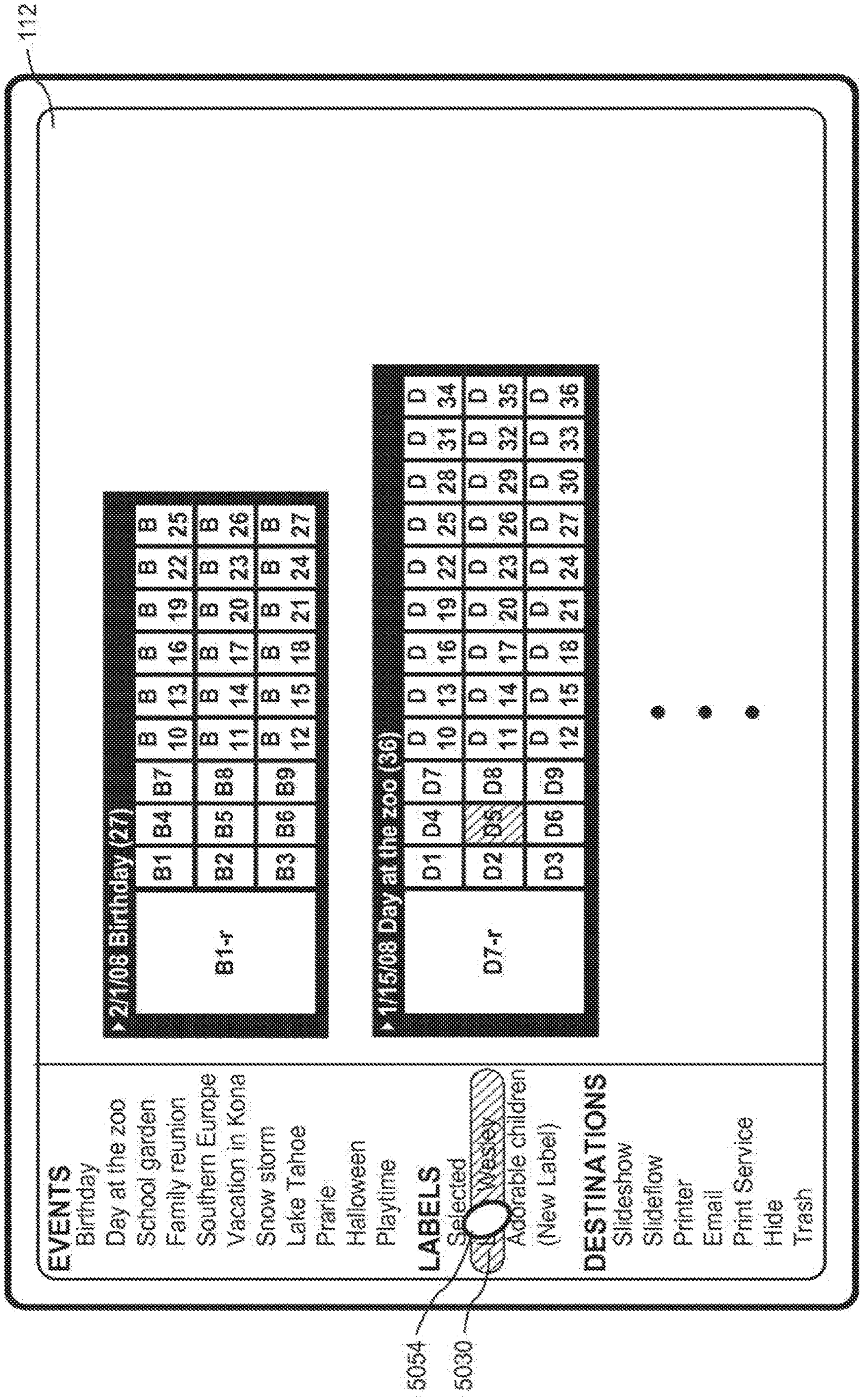
Figure 5H:
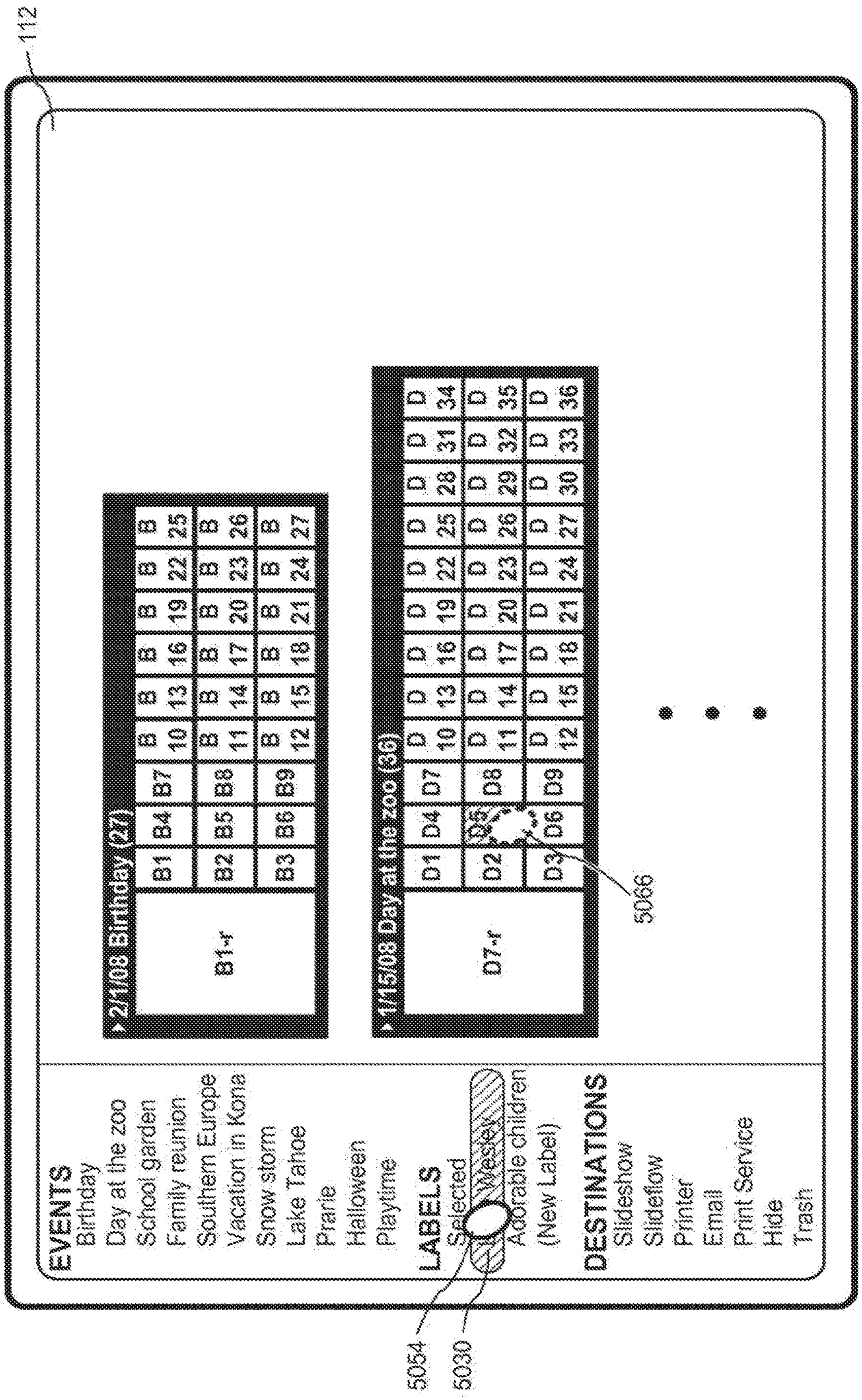
Figure 5I:
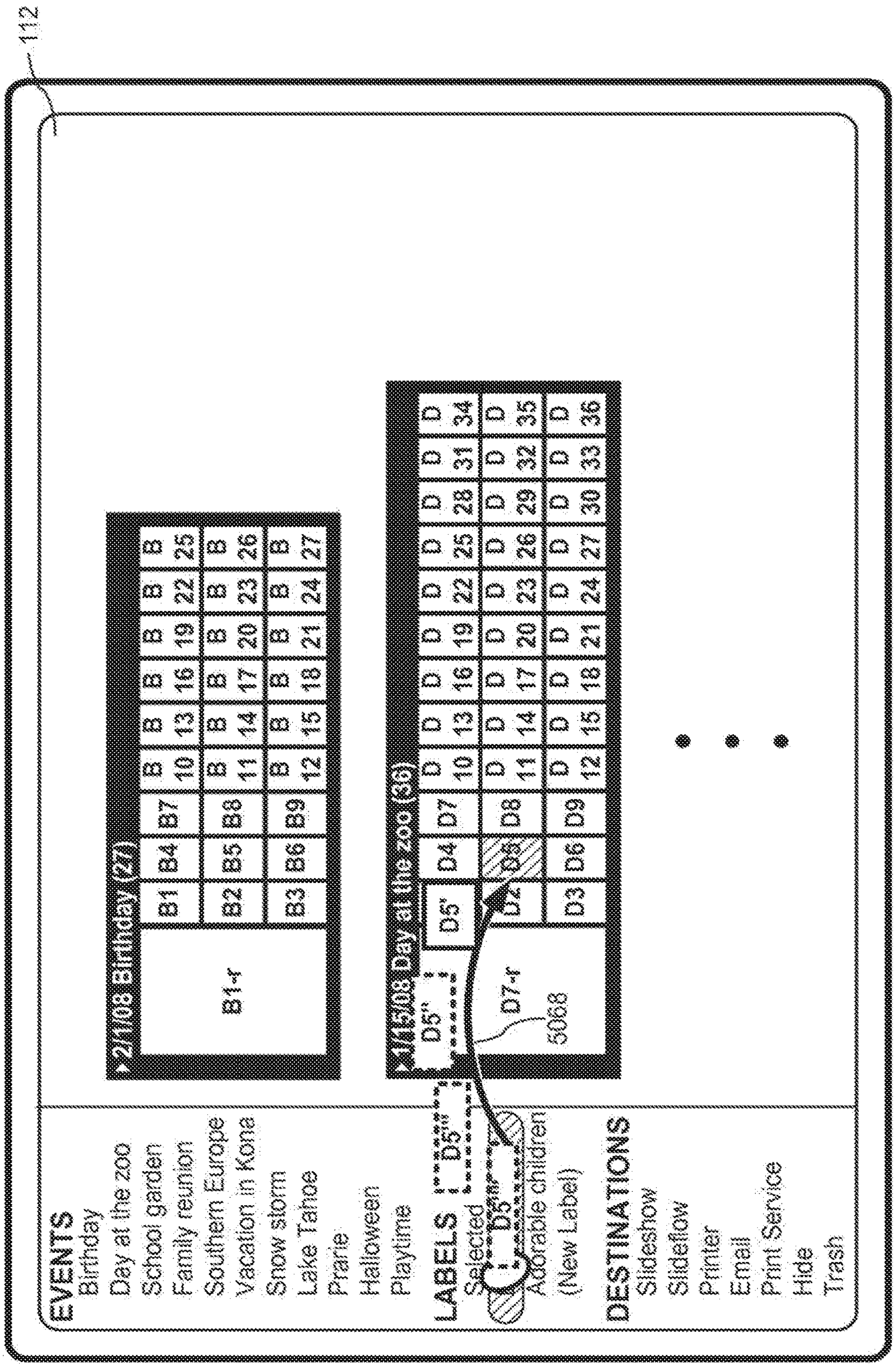
Figure 5J:
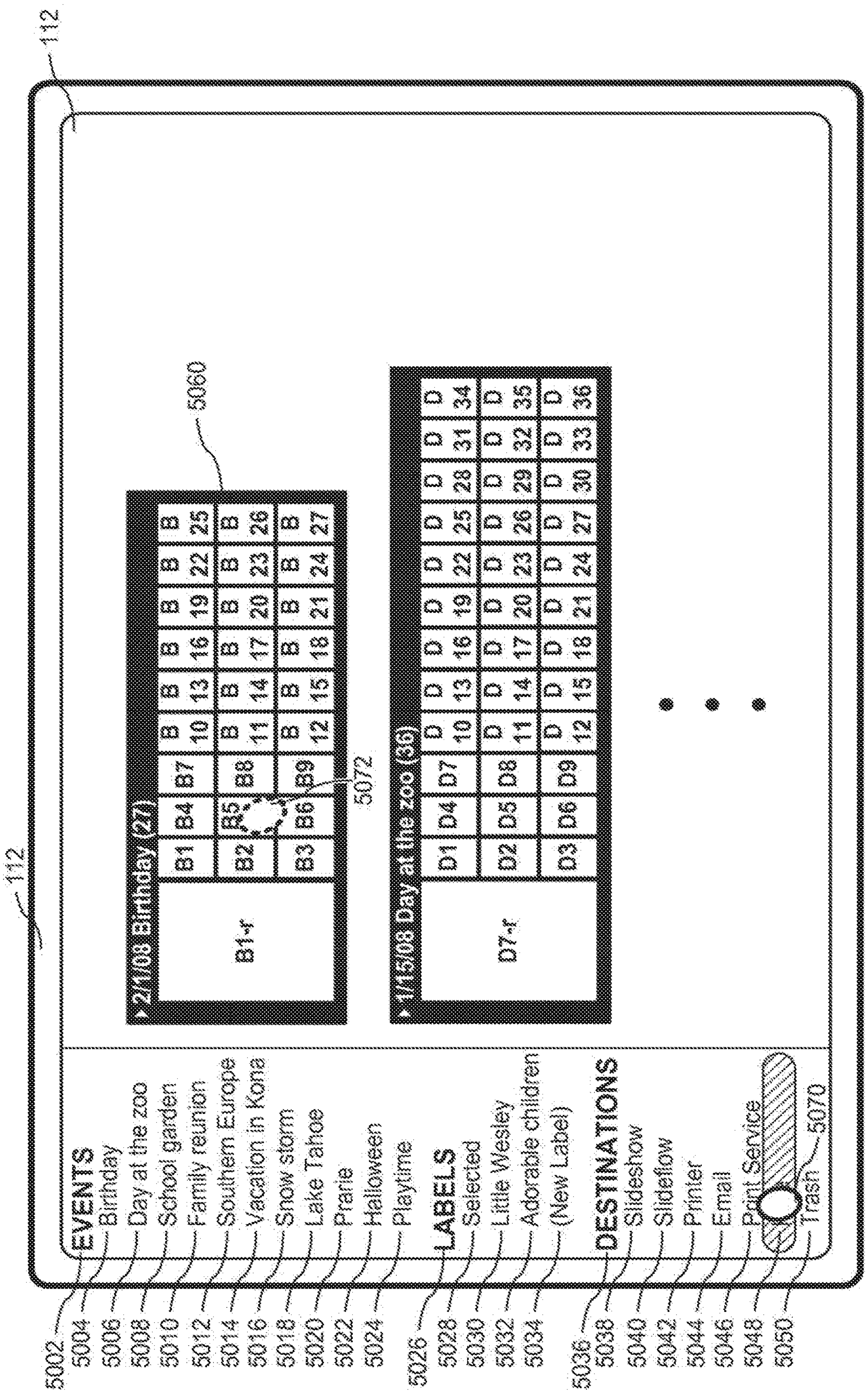
Figure 5K:
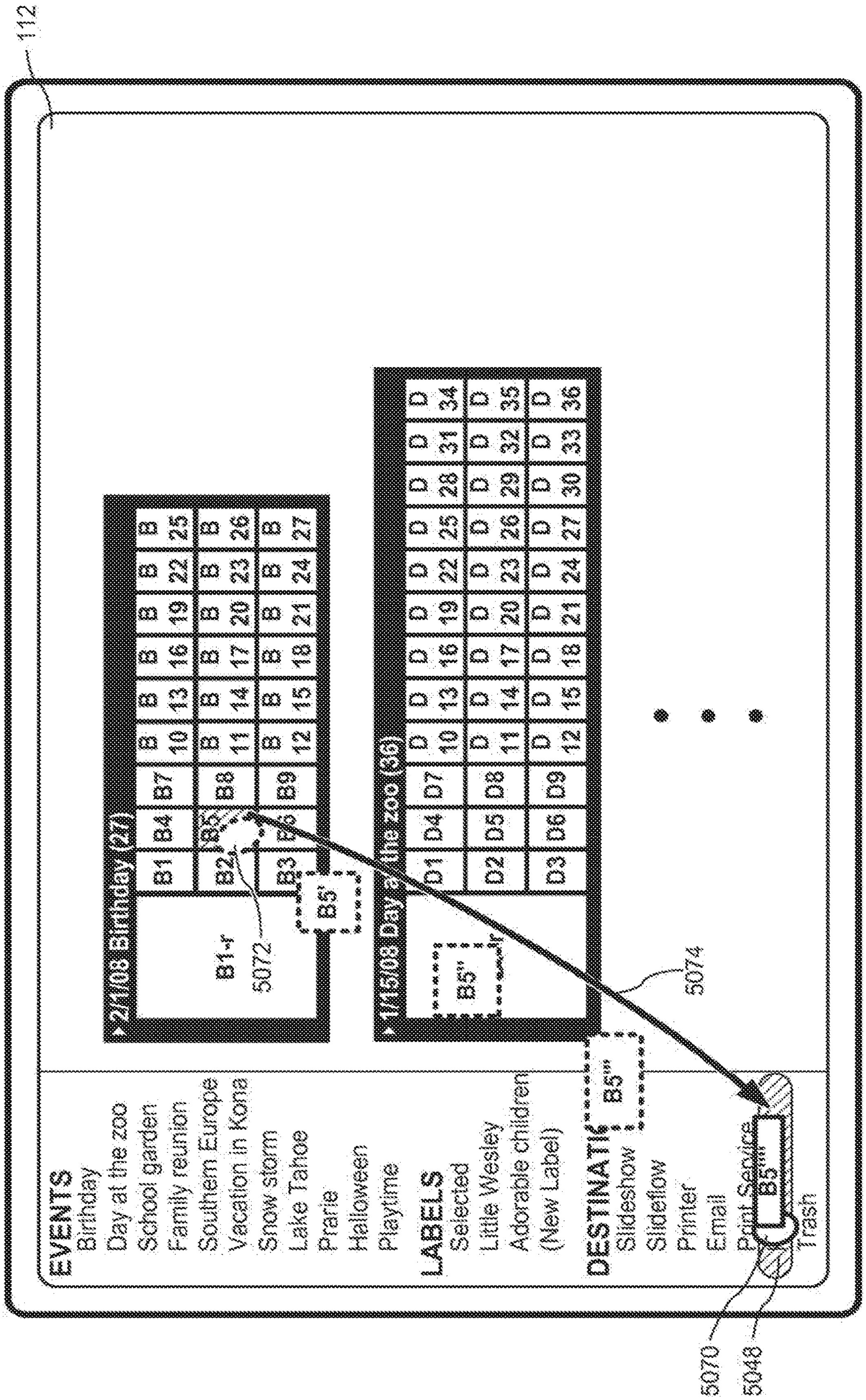
Figure 5L:
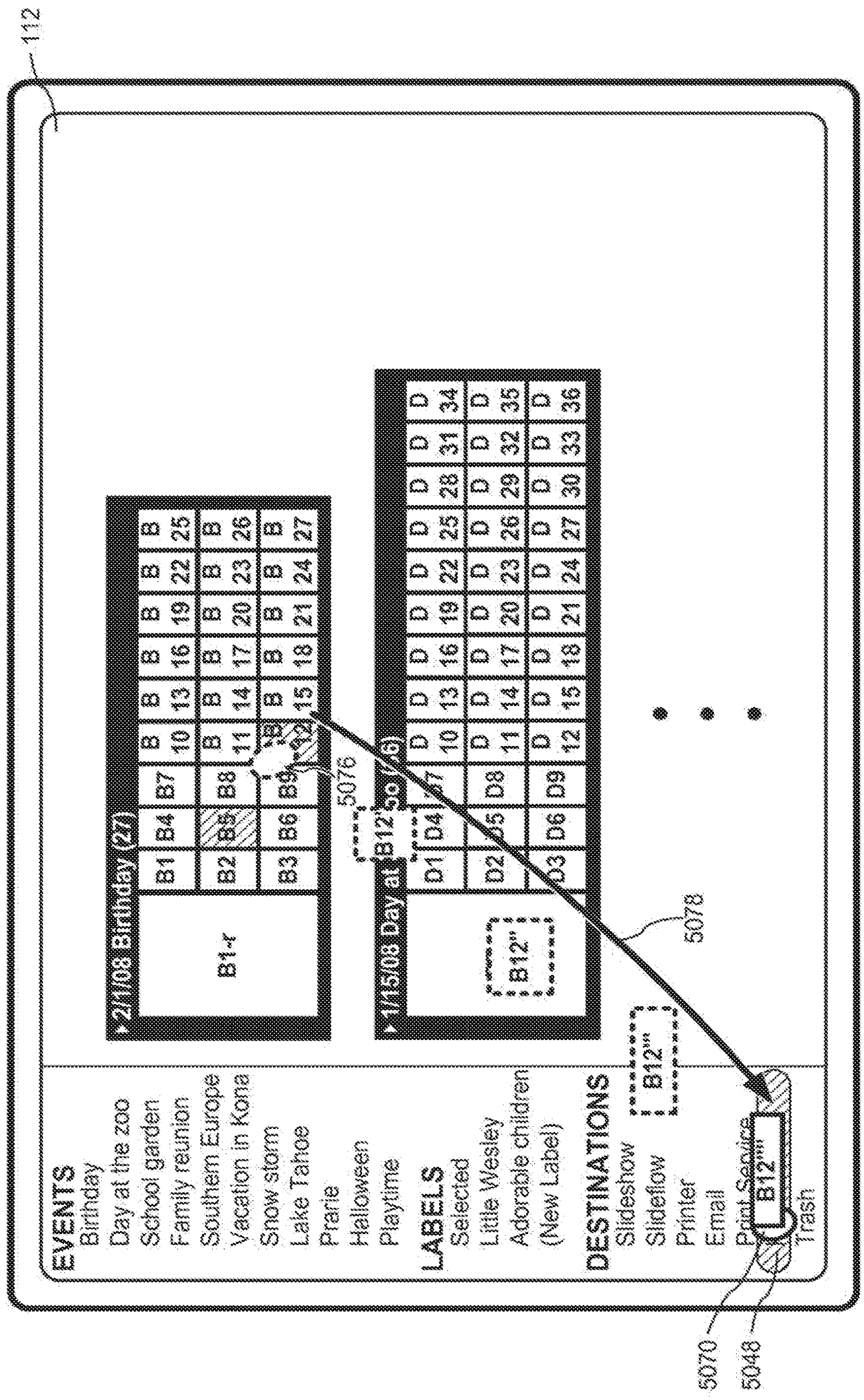
Figure 5M:
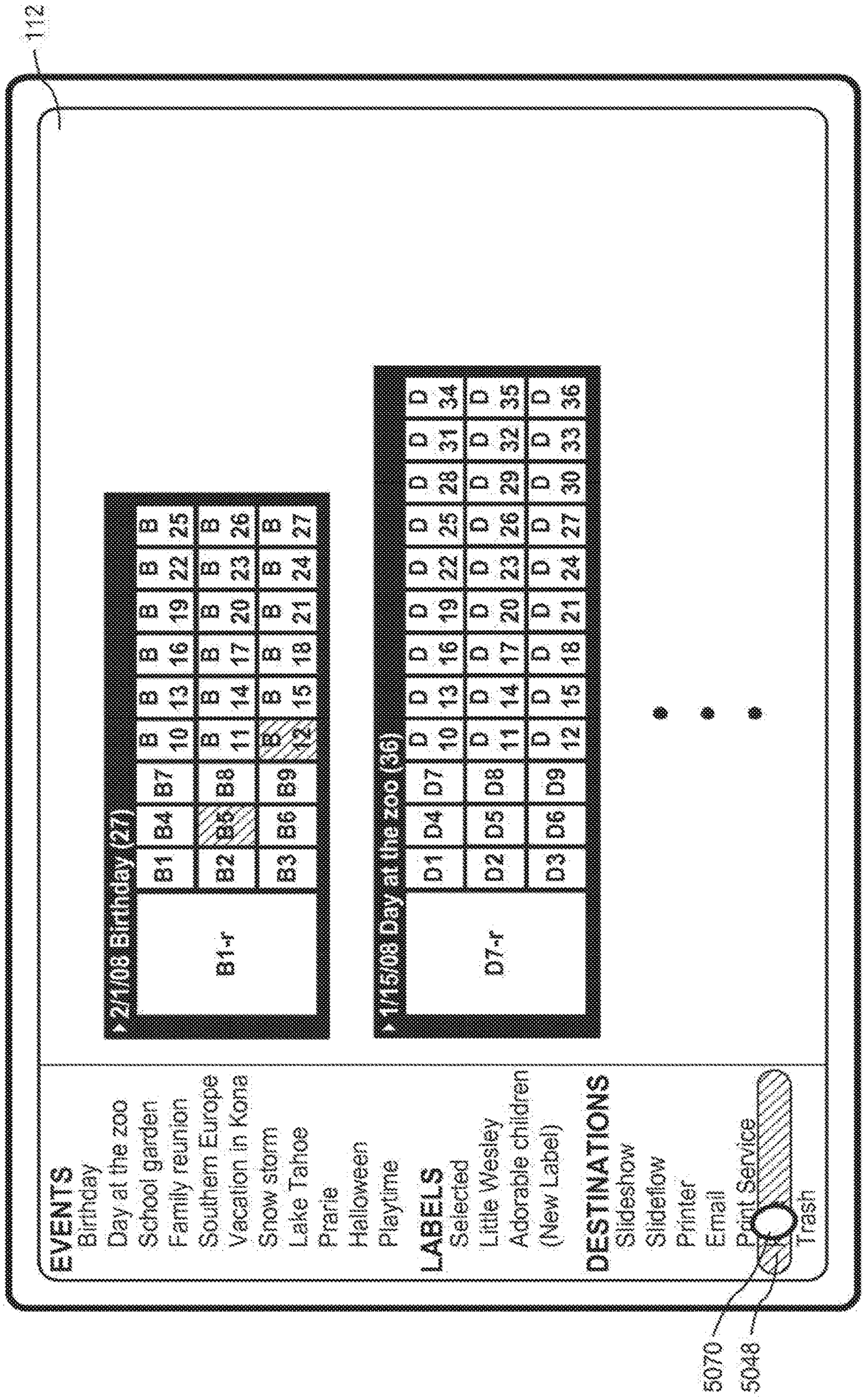
Figure 5N:
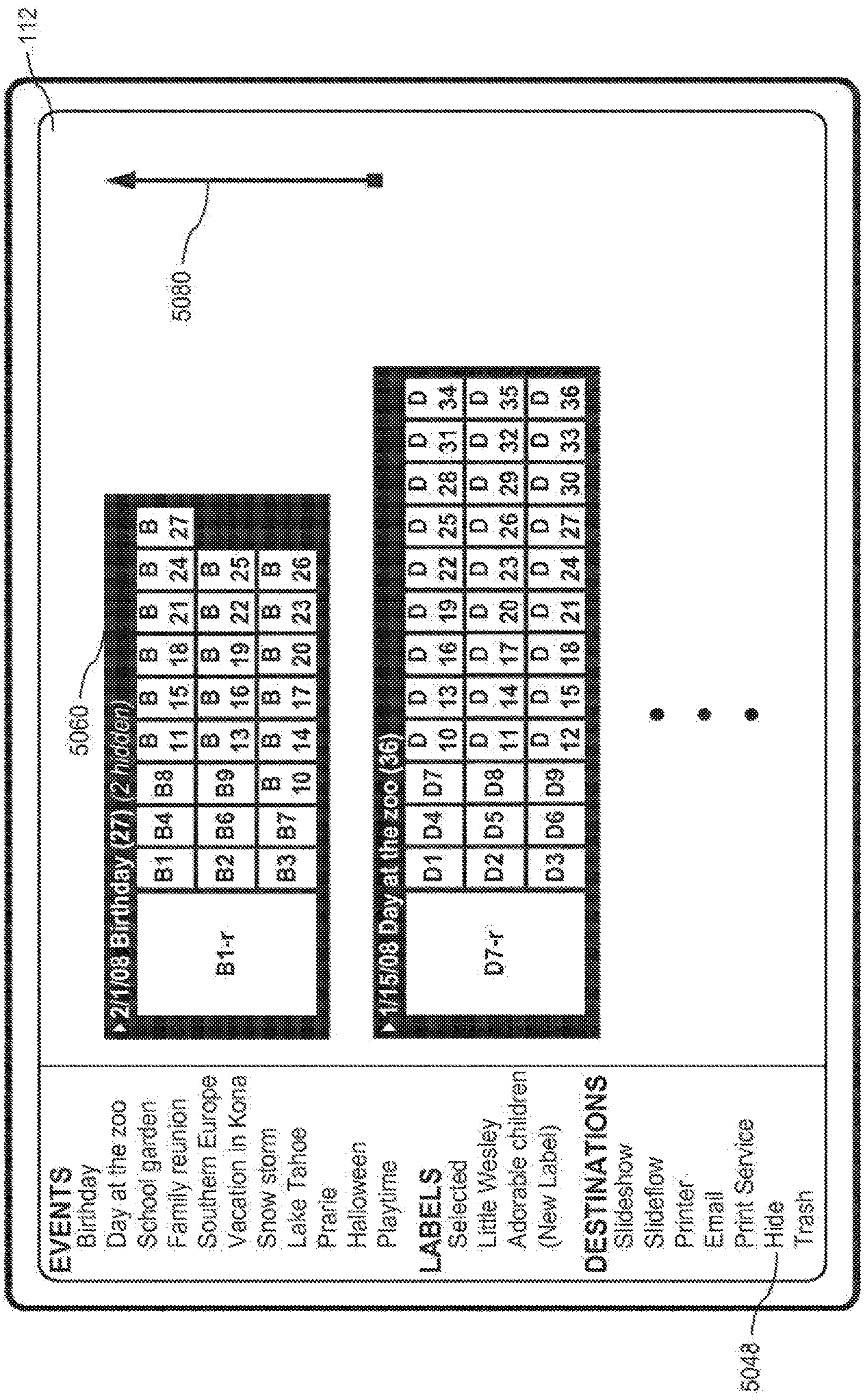
Figure 5O:
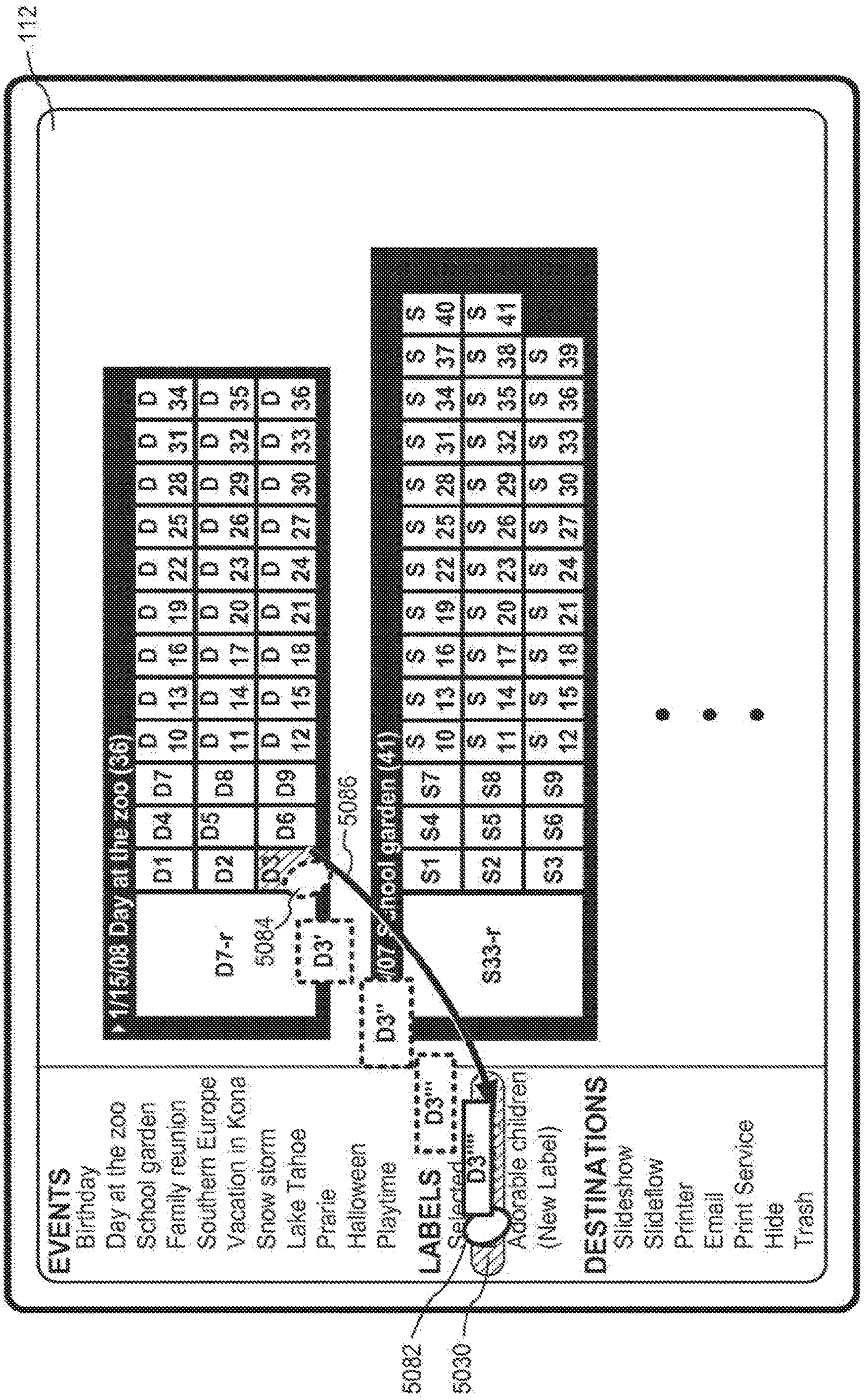
Figure 5P:
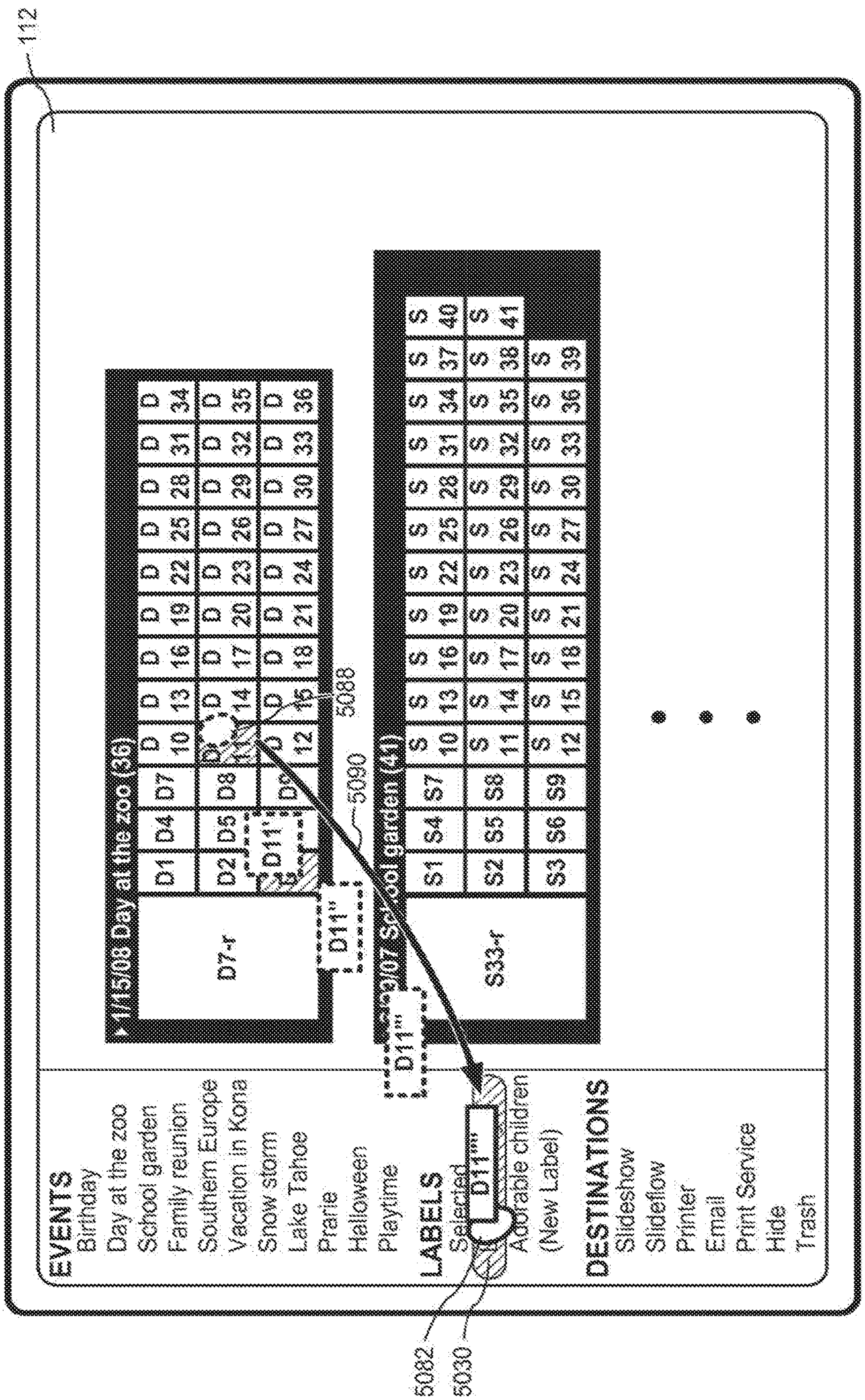
Figure 5Q:
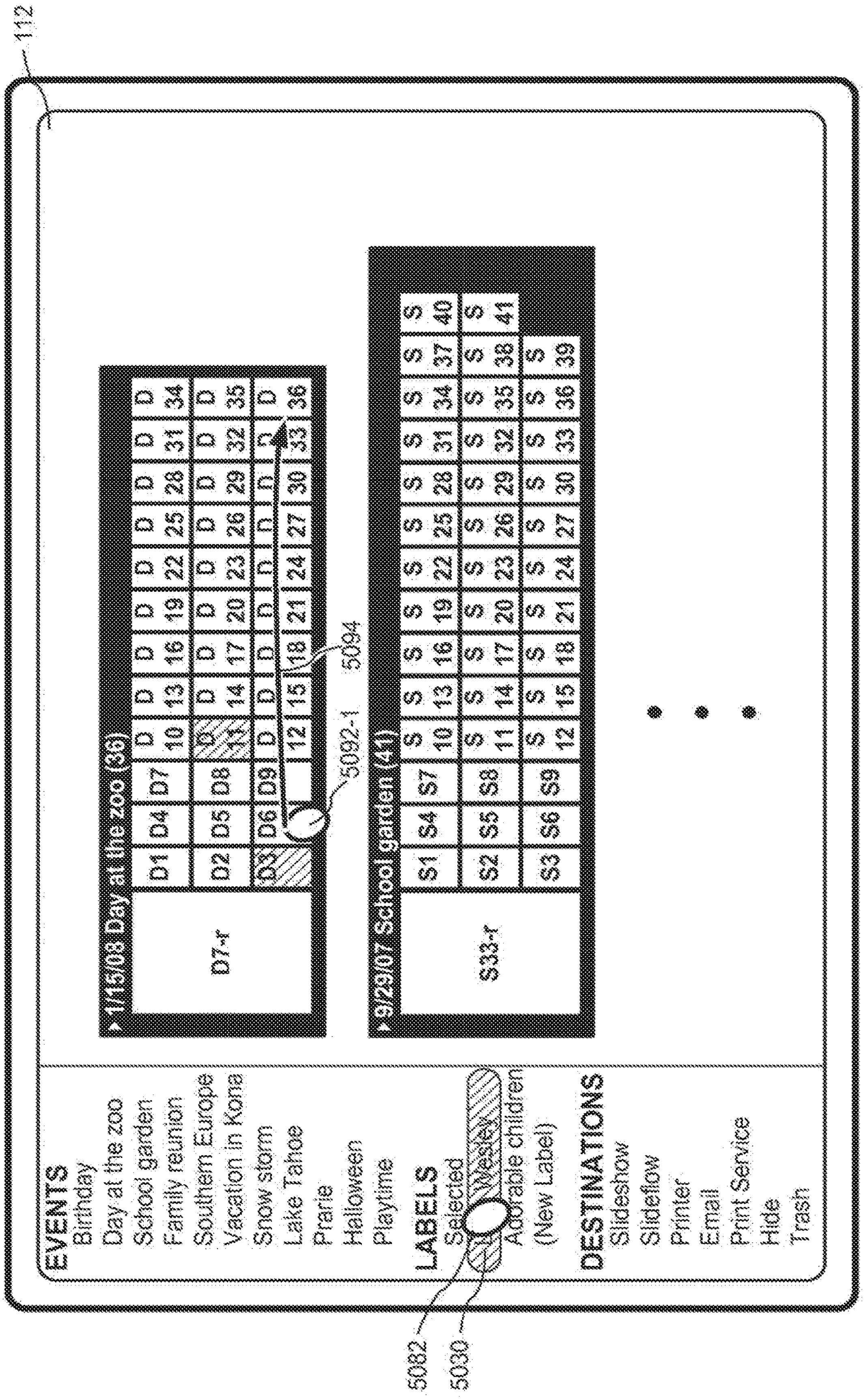
Figure 5R:
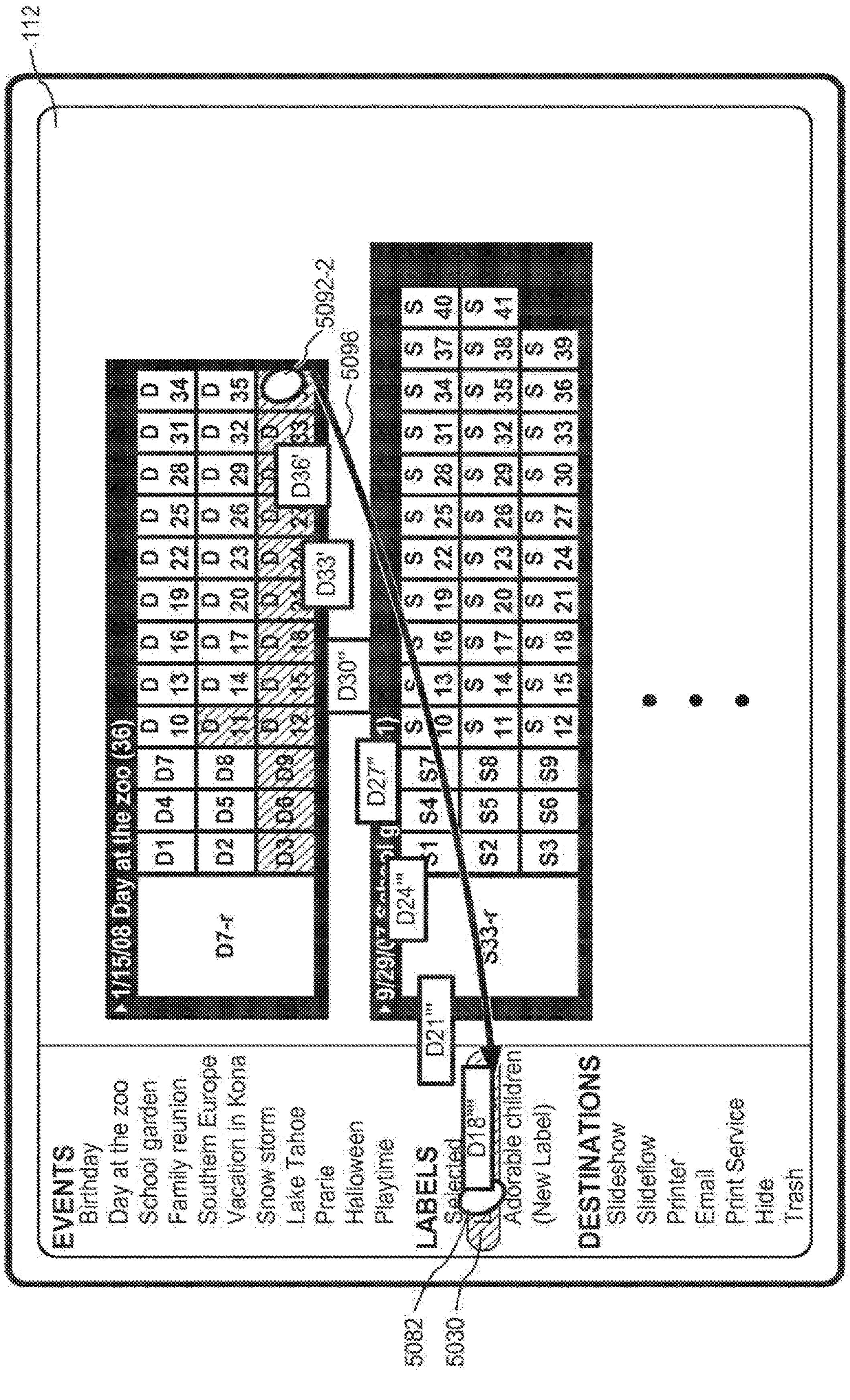
Figure 5S:
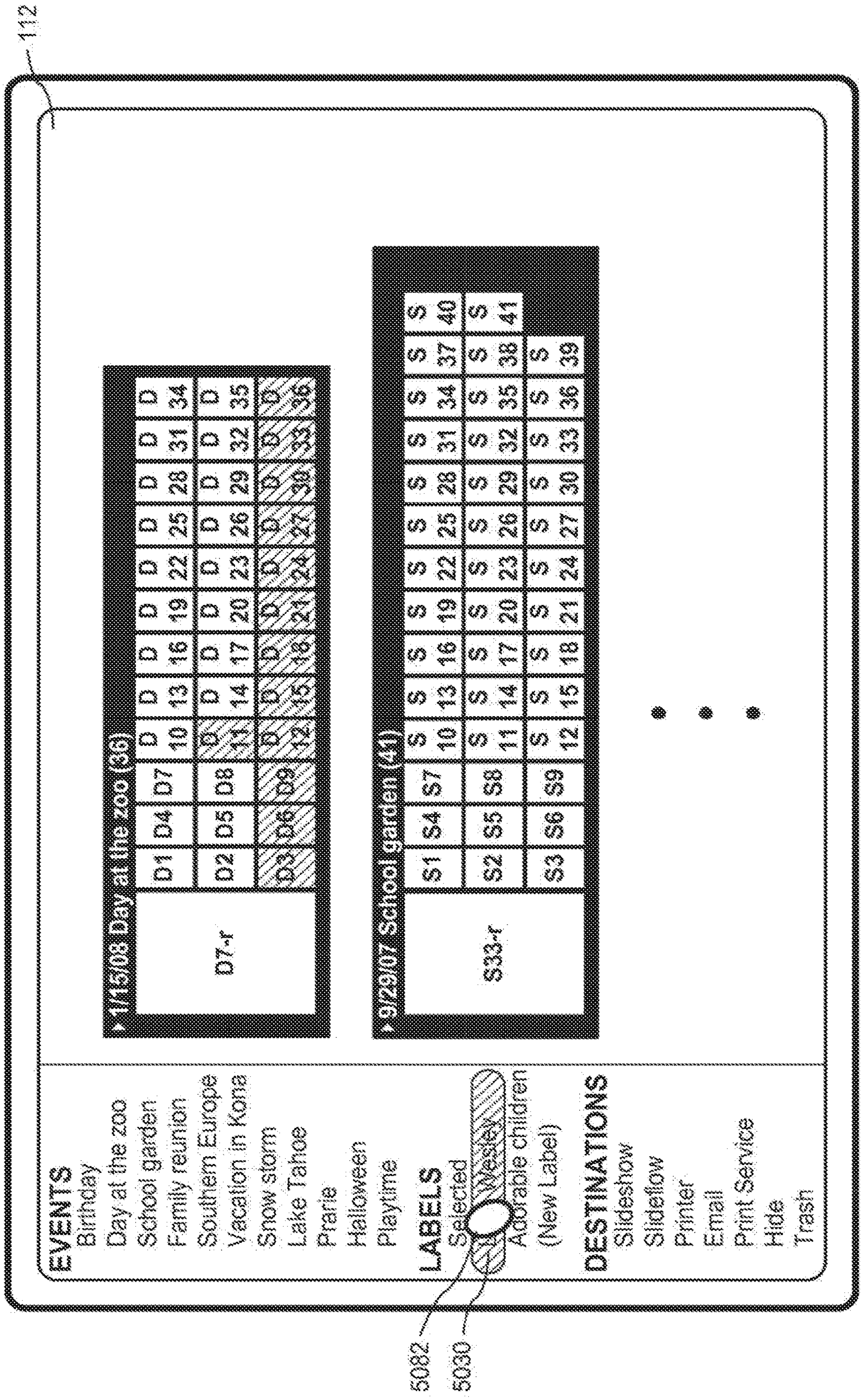
Figure 5T:
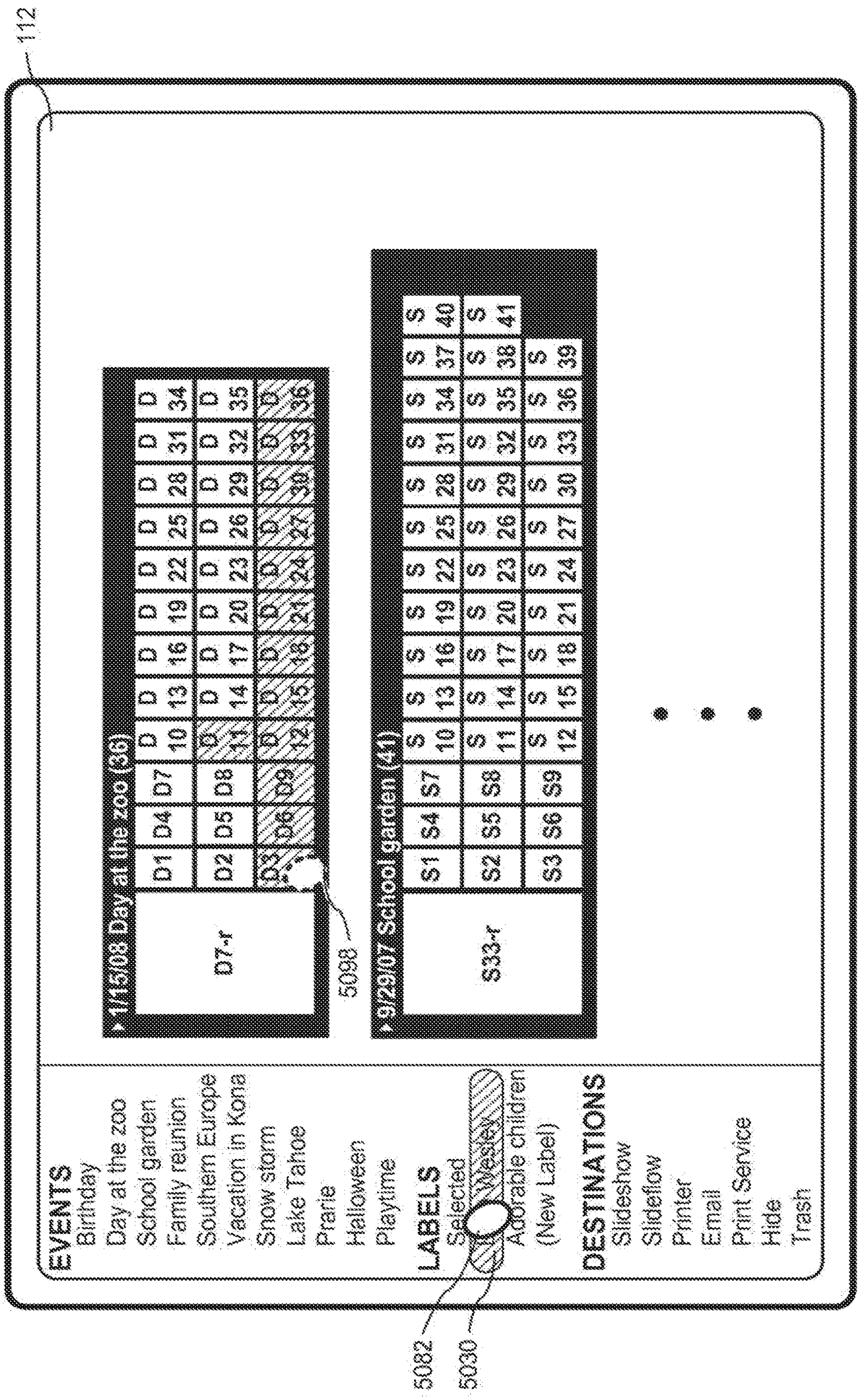
Figure 5U:
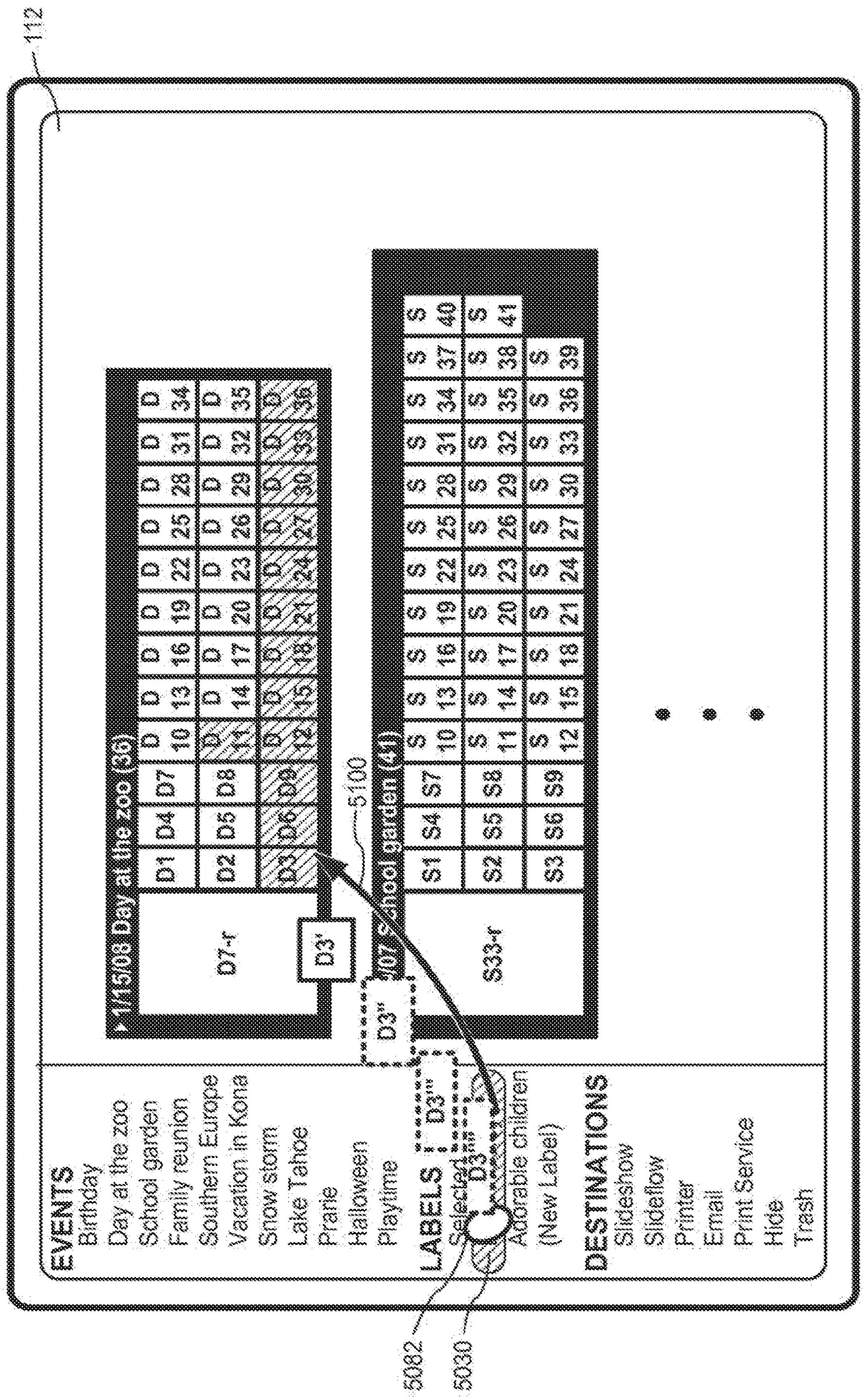
Figure 5V:
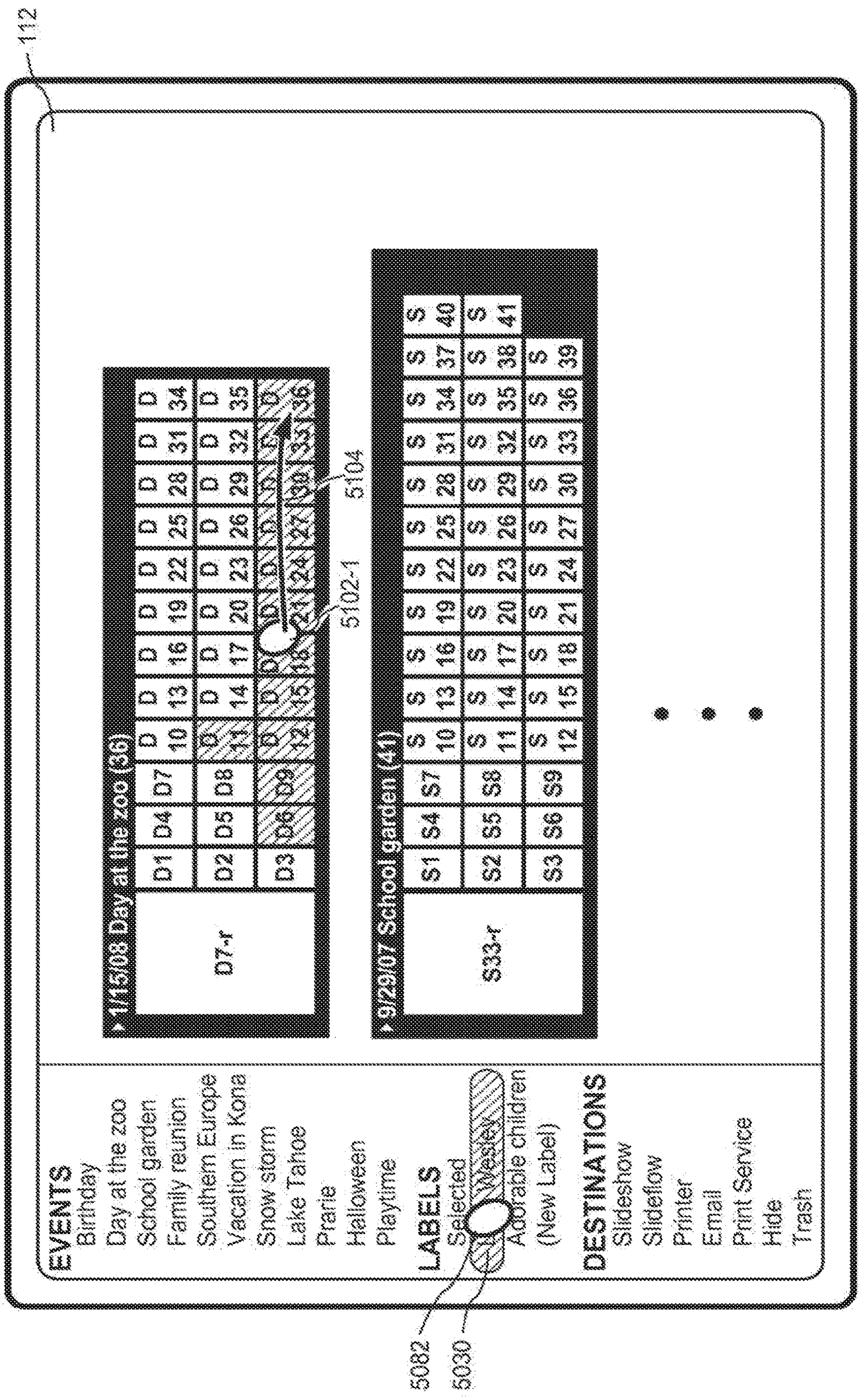
Figure 5W:
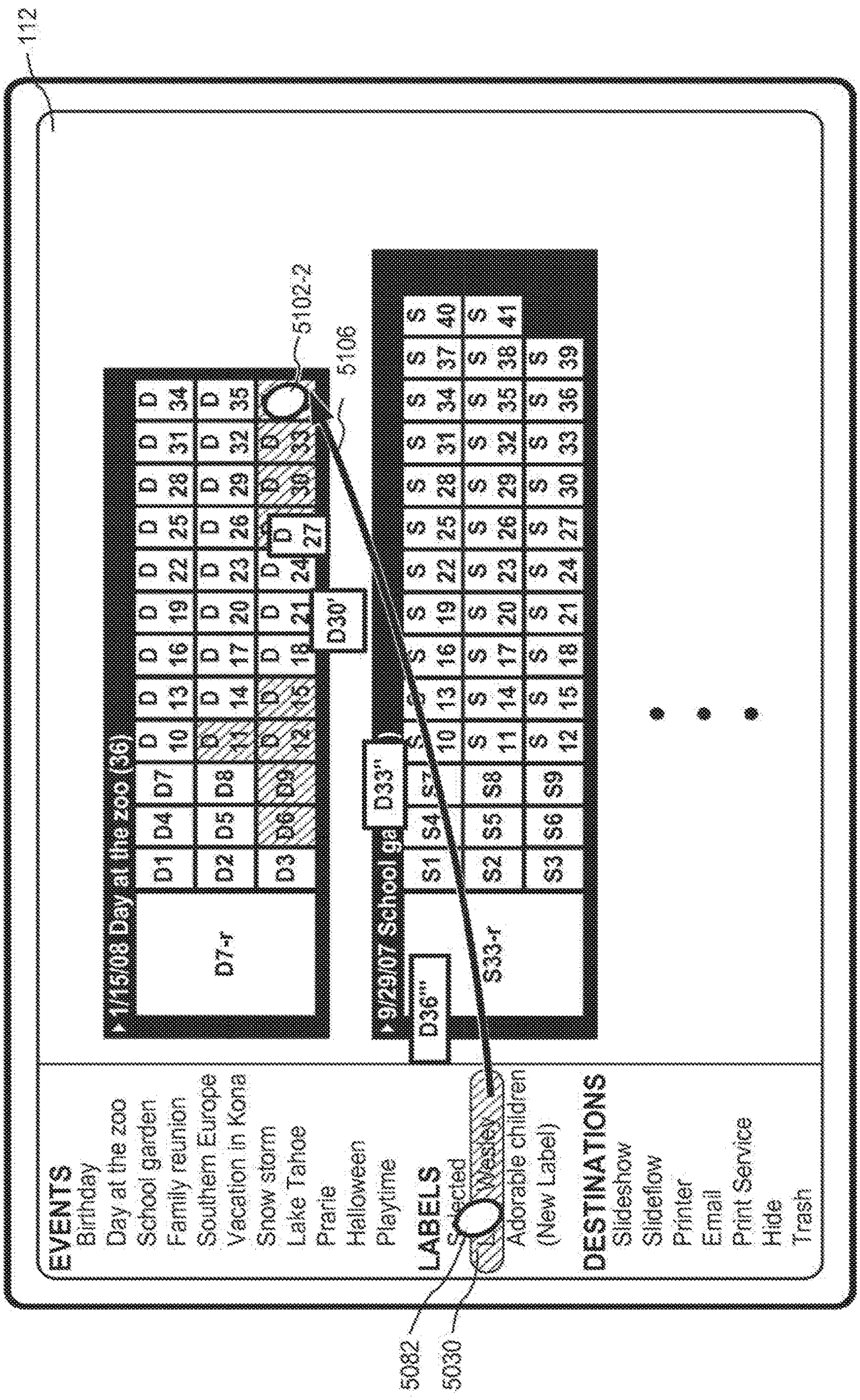
Figure 5X:
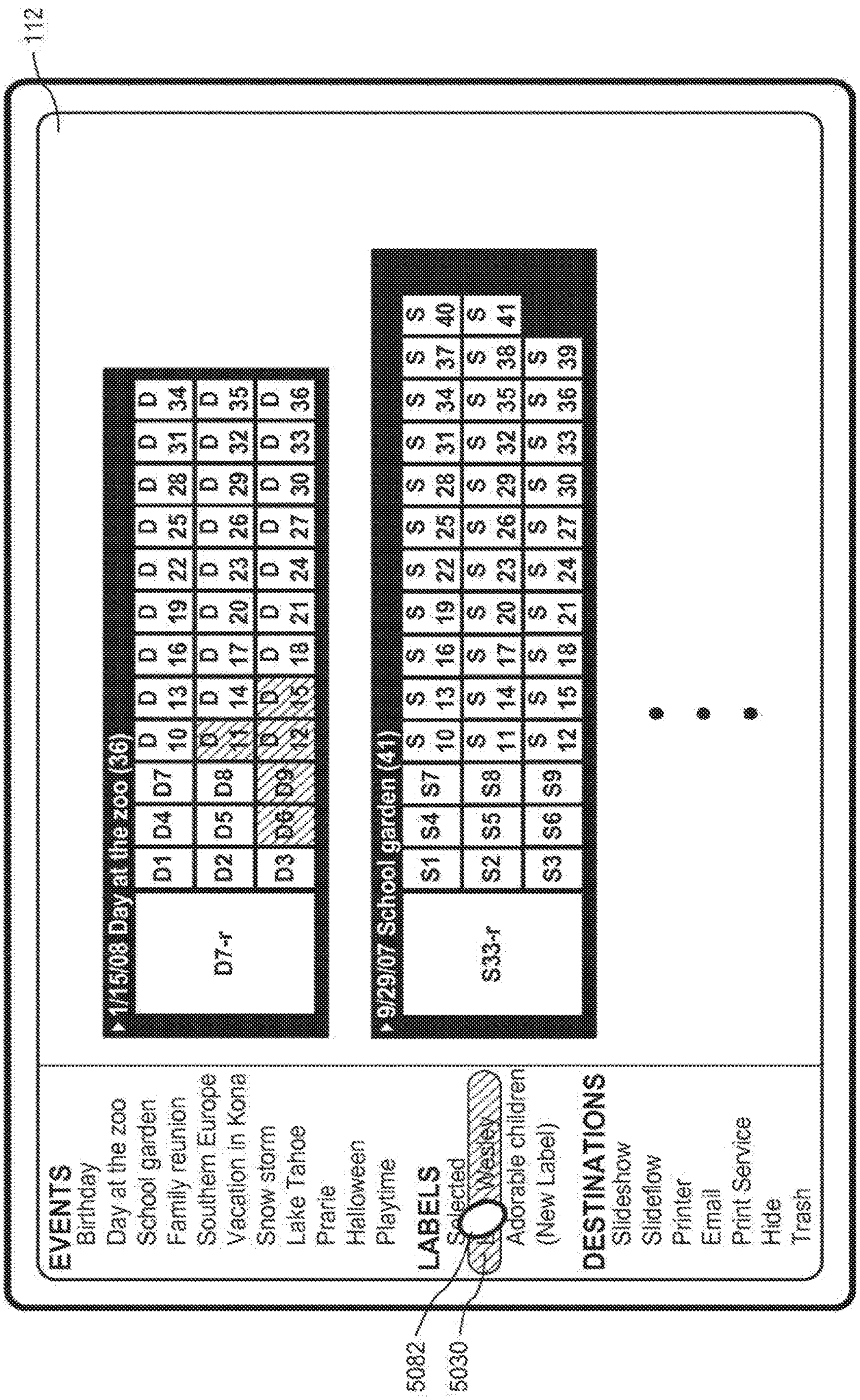
Figure 5Y:
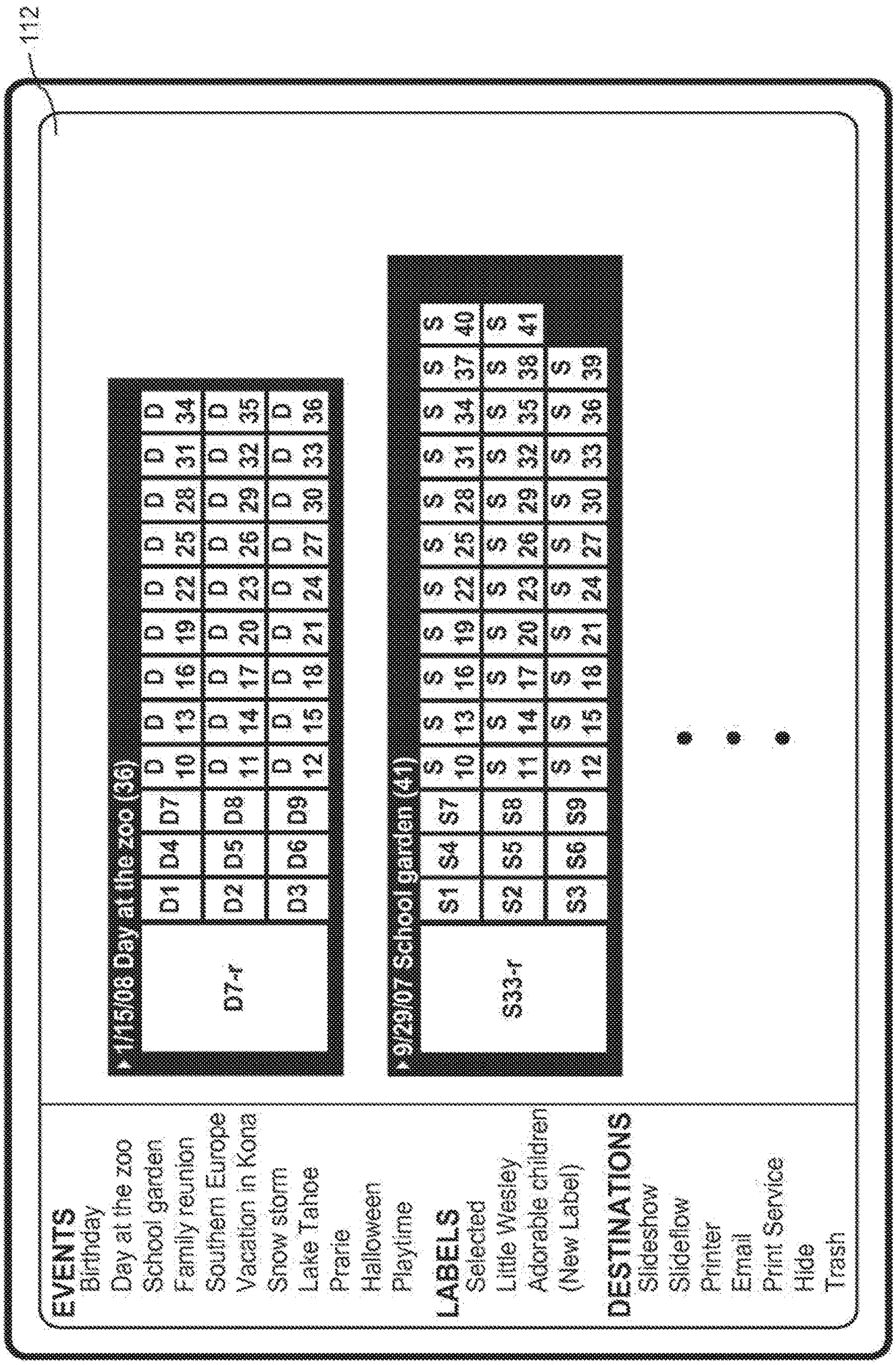

FIGS. 5A-5Y illustrate exemplary user interfaces for moving one or more user interface objects to a destination object and performing an action associated with the destination object on the one or more user interface objects in accordance with some embodiments. The user interfaces in these figures are used to illustrate the processes described below, including the processes in FIGS. 9A-9D and 10A-10B.

FIGS. 5A-5G illustrate user interfaces for detecting a first user input (e.g., contact 5054, FIG. 5B) on a destination object (e.g., the label icon "Little Wesley" 5030); detecting a second user input on a user interface object (e.g., tap gesture 5056 on digital image D5 in FIG. 5C) while still detecting the first input; and performing an action associated with the destination object on the user interface object (e.g., giving image D5 the label "Little Wesley" 5030).

FIGS. 5G-5J illustrate user interfaces for undoing an action associated with a selected destination object (e.g., the label icon "Little Wesley" 5030) in response to detecting a user input on a residual image of the user interface object (e.g., shaded image D5 in FIG. 5H) while still detecting the first input (e.g., contact 5054). In response to detecting tap gesture 5066 in FIG. 5H on the residual image of D5, digital image D5 will not be given the label "Little Wesley" 5030 and image D5 replaces its residual image (FIG. 5J).

FIGS. 5J-5N illustrate user interfaces for performing a hide operation on a plurality of user interface objects (e.g., images B5 and B12) in an array 5060 of user interface objects in response to detecting user inputs (e.g., tap gestures 5072 (FIG. 5K) and 5076 (FIG. 5L)) on the user interface objects (B5 and B12) while continuing to detect a user input (e.g., contact 5070) on a destination object associated with a hide command (e.g., hide icon 5048).

FIGS. 5O-5T illustrate user interfaces for responding to detecting a user input (e.g., contact 5082) on a destination object (e.g., the label icon "Little Wesley" 5030) and then, while still detecting the user input on the destination object, detecting one or more user inputs (e.g., tap gesture 5084 in FIG. 5O, tap gesture 5088 in FIG. 5P, and swipe gesture with contact 5092 and movement 5094 in FIG. 5Q) on a plurality of user interface objects (e.g., digital images D11, D3, D6, D6, D12, D15, D18, D21, D24, D27, D30, D33, and D36) by performing an action associated with the destination object on the plurality of user interface objects (e.g., giving images D11, D3, D6, D6, 12, D15, D18, D21, D24, D27. D30, D33, and D36 the label "Little Wesley" 5030).

FIGS. 5T-5X illustrate user interfaces for responding to user inputs (e.g., tap gesture 5098 (FIG. 5T) and a swipe gesture that includes contact 5102 and movement 5104 of the contact (FIG. 5V)) on residual images of user interface objects (e.g., shaded images D3, D18, D21, D24, D27, D30, D33, D36 in FIG. 5T) by undoing an action associated with a destination object (e.g., the label icon "Little Wesley" 5030) while continuing to detect a user input (e.g., contact 5082) with the destination object. In response to detecting tap gesture 5098 (FIG. 5T) and the swipe gesture (FIG. 5V) on the residual images of D3, D18, D21, D24, D27, D30, D33, and D36, digital images D3, D18, D21, D24, D27, D30, D33, and D36 will not be given the label "Little Wesley" 5030 and images D3, D18, D21, D24, D27, D30, D33, and D36 replace their respective residual images (FIG. 5X).

FIGS. 5X-5Y illustrate a change in the user interface after performing an action associated with a destination object 5030 on a plurality of selected user interface objects (e.g., images D6, D9, D11, D12, D15) in response to ceasing the detect a user input (e.g., contact 5082 in FIG. 5X) on the destination object 5030. After the user releases contact 5082 with the icon 5030 in FIG. 5X, the device ceases to display the residual images of the user interface objects, and the original user interface objects are displayed in their initial user interface locations (FIG. 5Y). In this example, the residual images indicate to a user which images will be labeled "Little Wesley" when the device detects lift off of contact 5082. After lift off of contact 5082, the residual images are replaced with the original objects because all of the original objects D1-D36 and D7-*r* are still part of the "Day at the zoo" event.

Figure 6A:
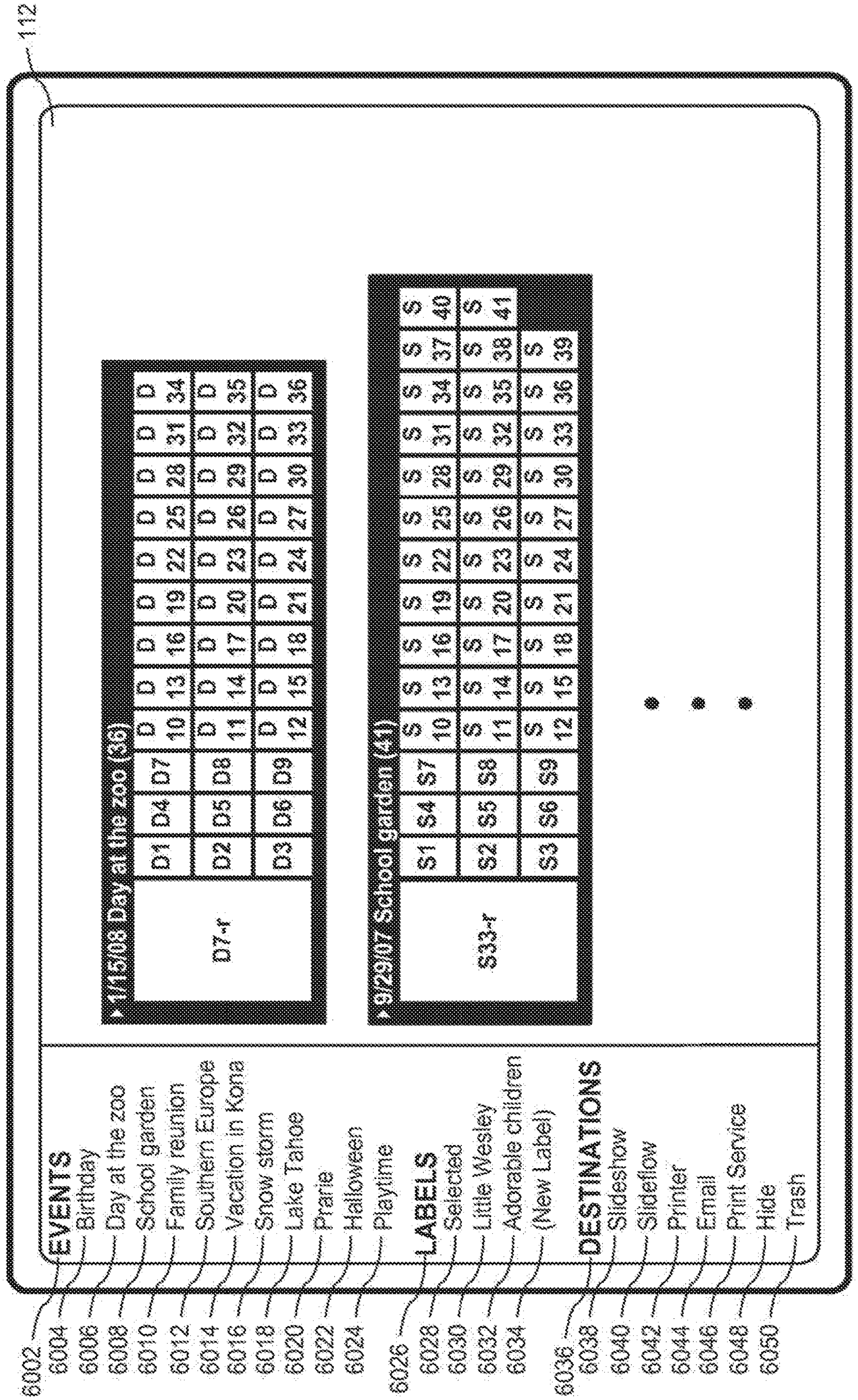
FIGS. 6A-6X illustrate exemplary user interfaces for forming a group of user interface objects, moving the group to a destination object or an area associated with a destination object, and performing an action associated with the destination object on the group of user interface objects in accordance with some embodiments.
Figure 6B:
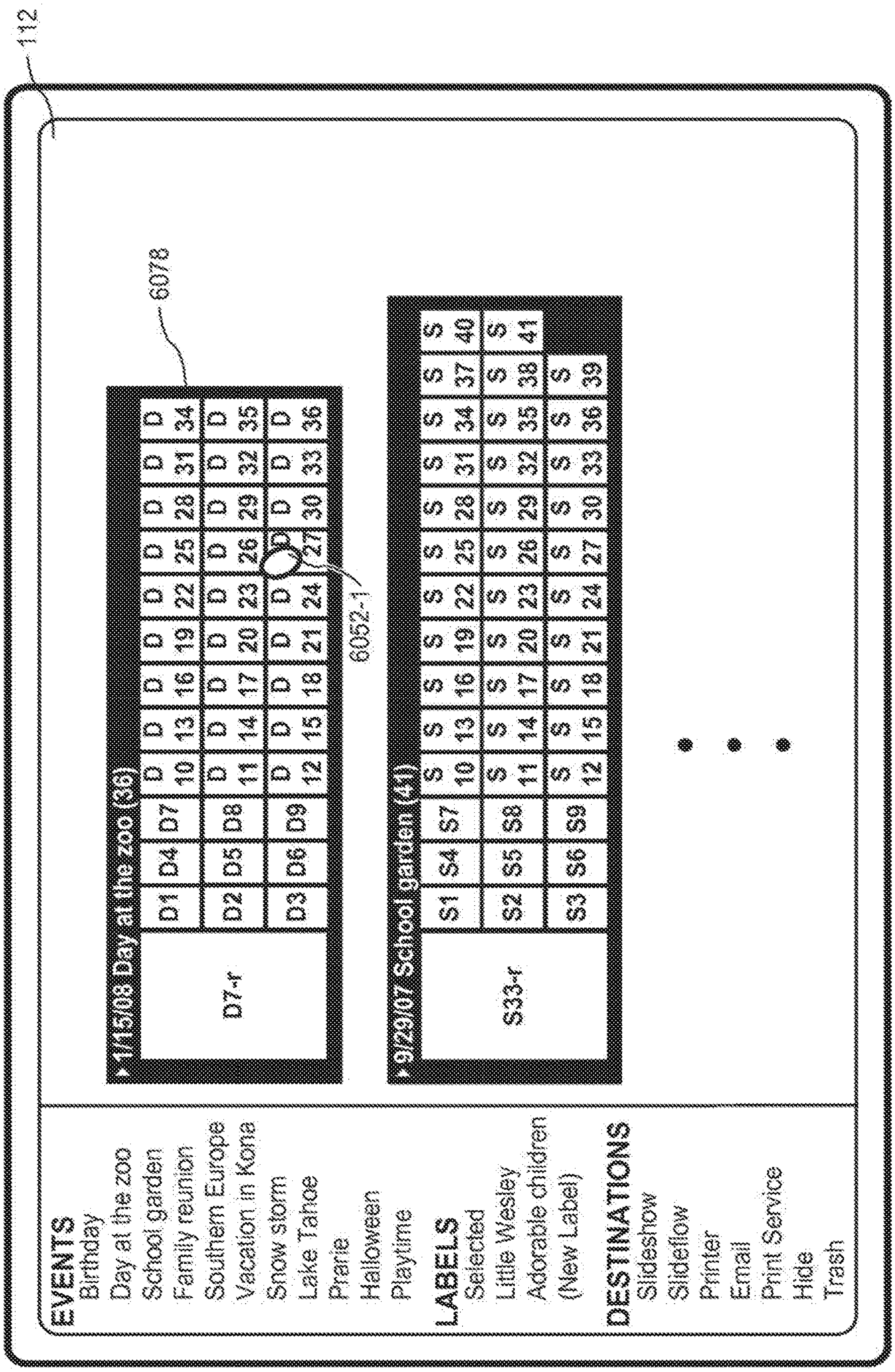
Figure 6C:
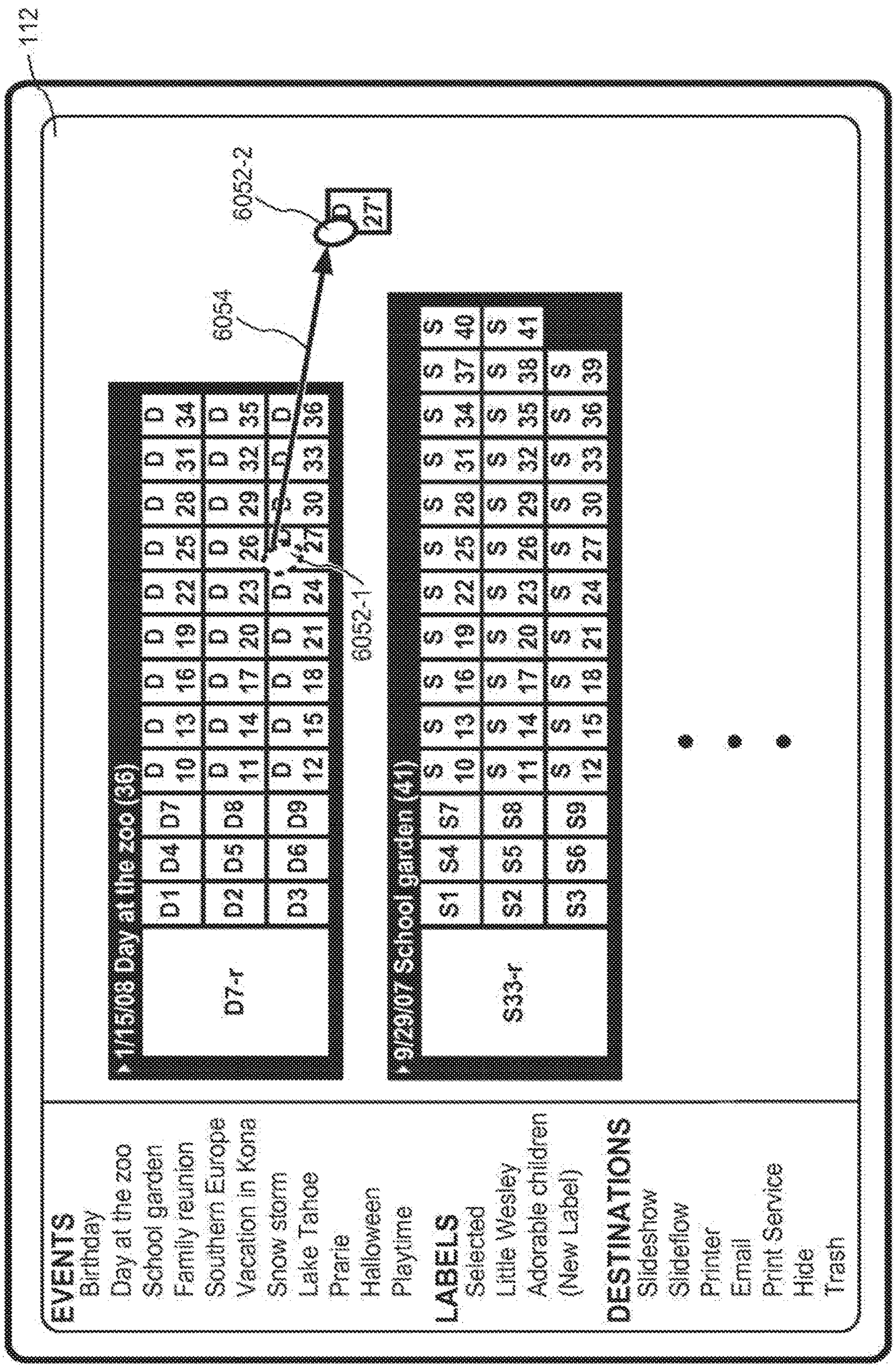
Figure 6D:
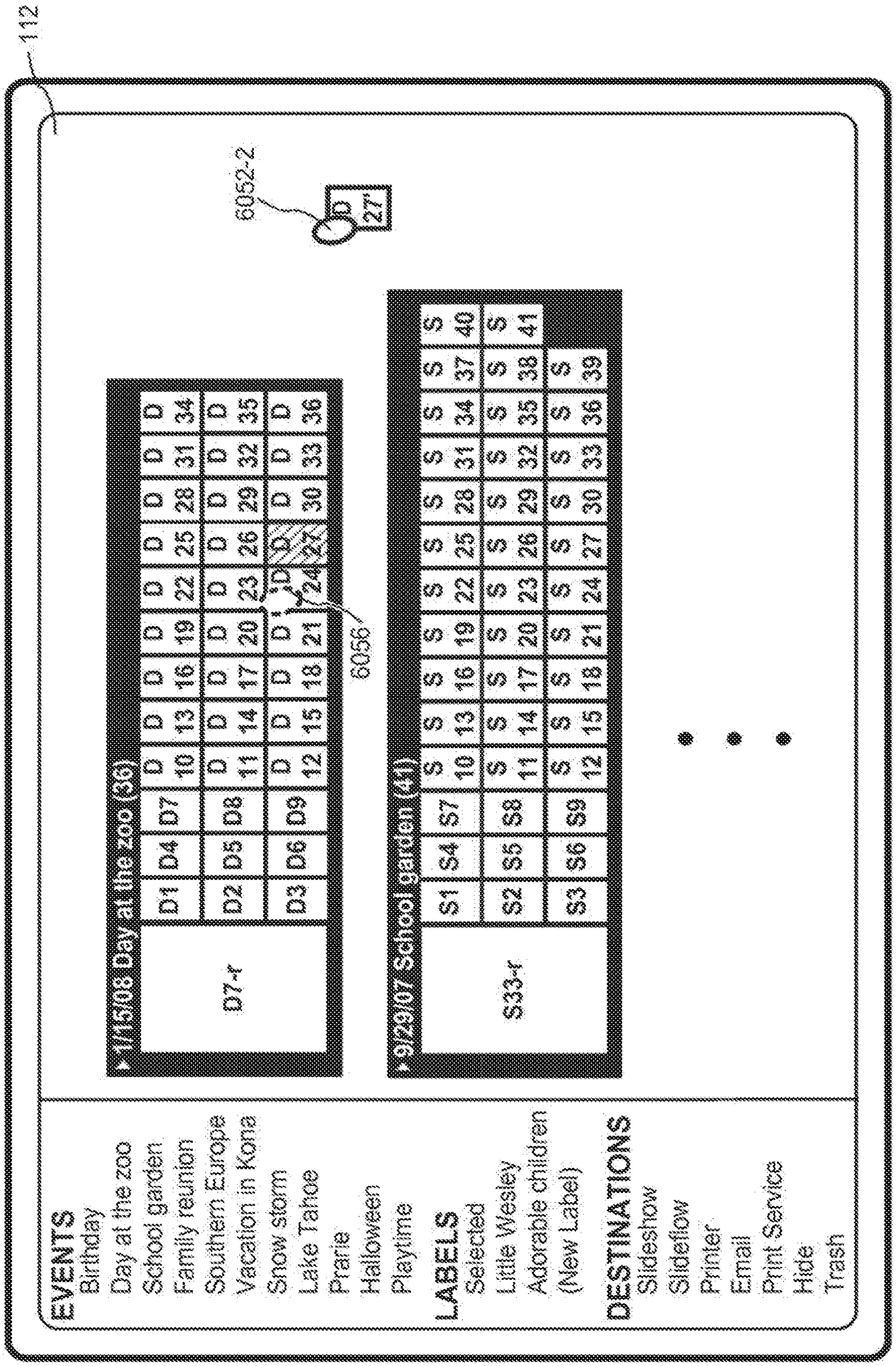
Figure 6E:
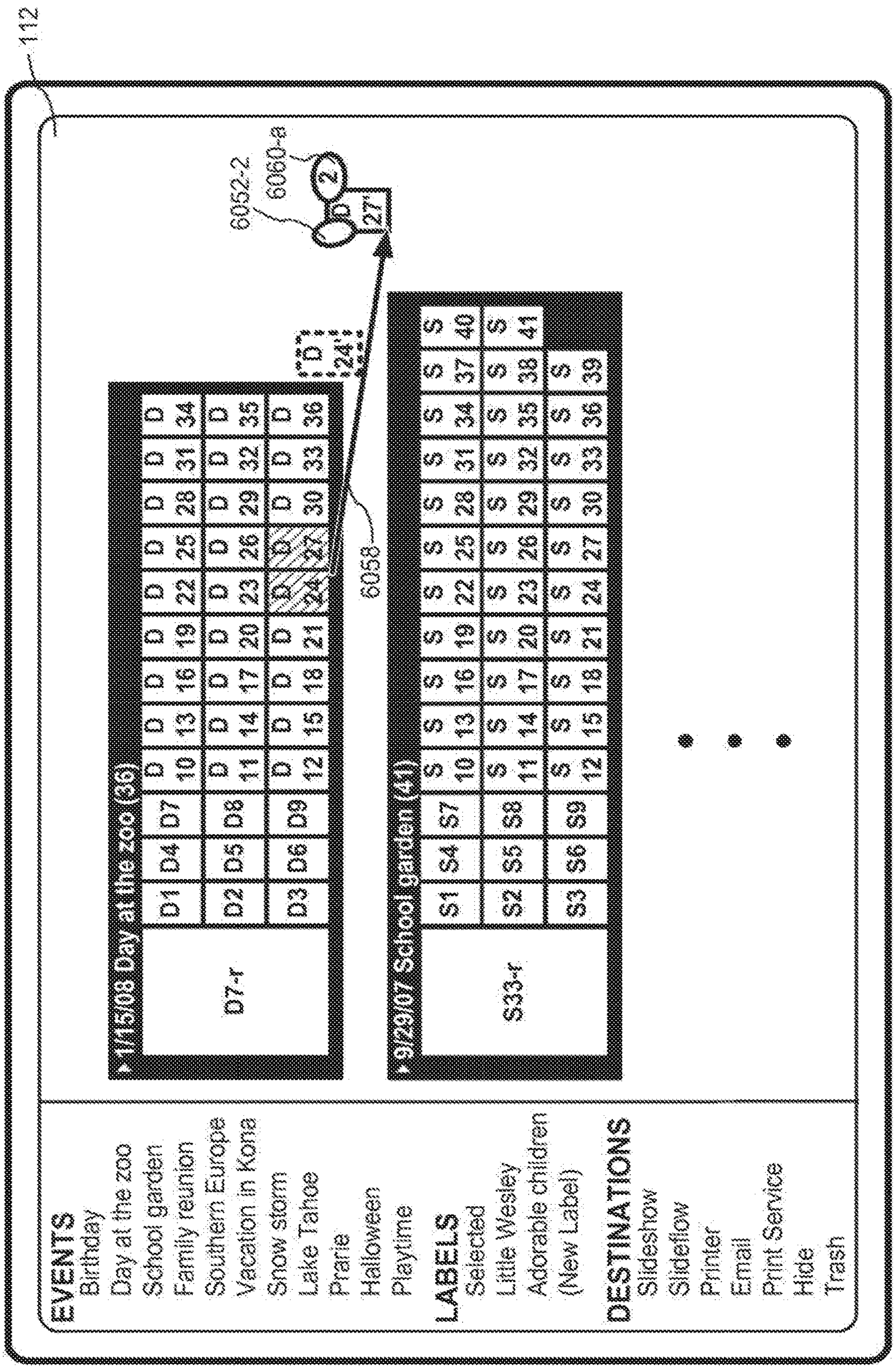
Figure 6F:
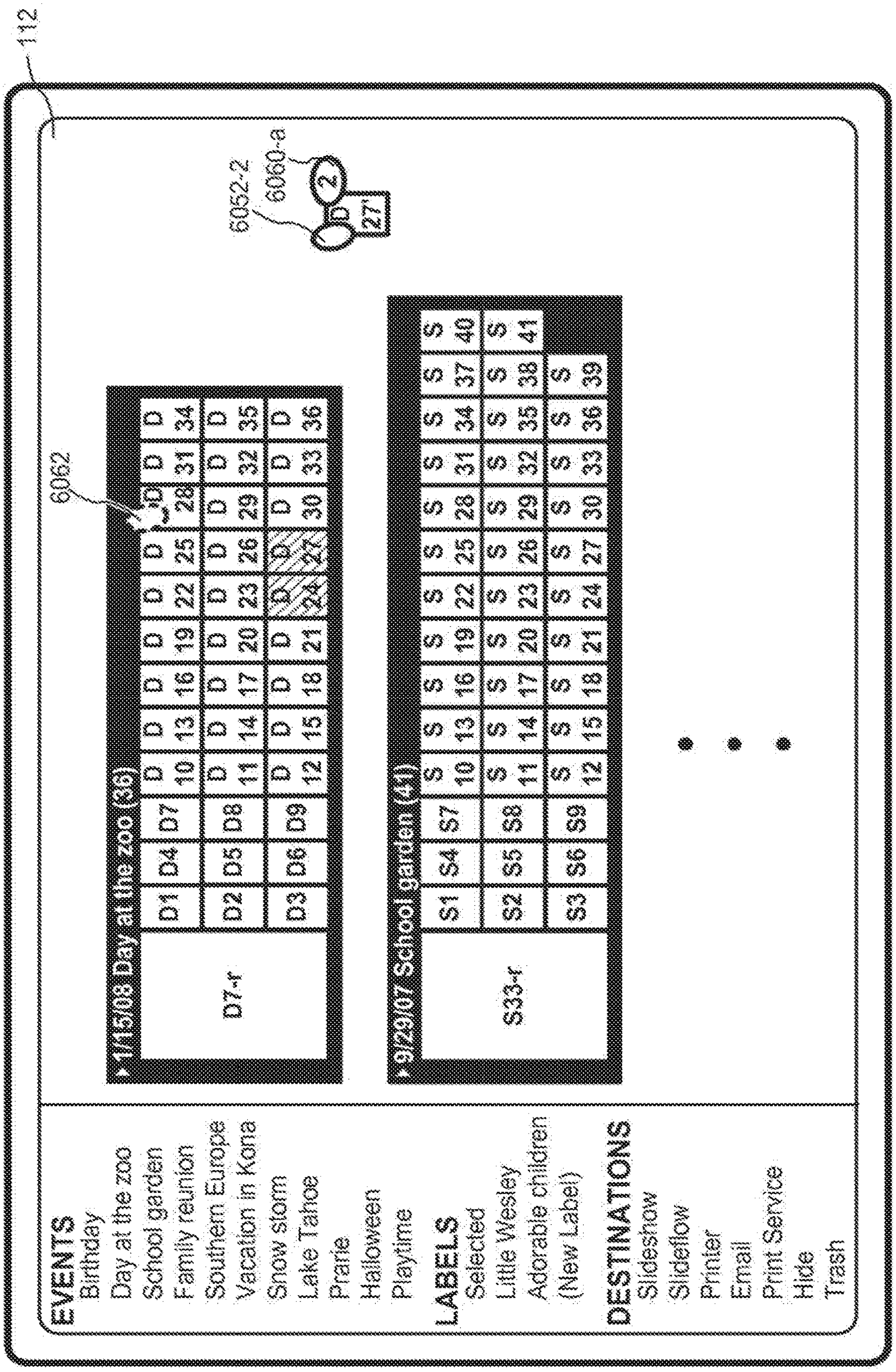
Figure 6G:
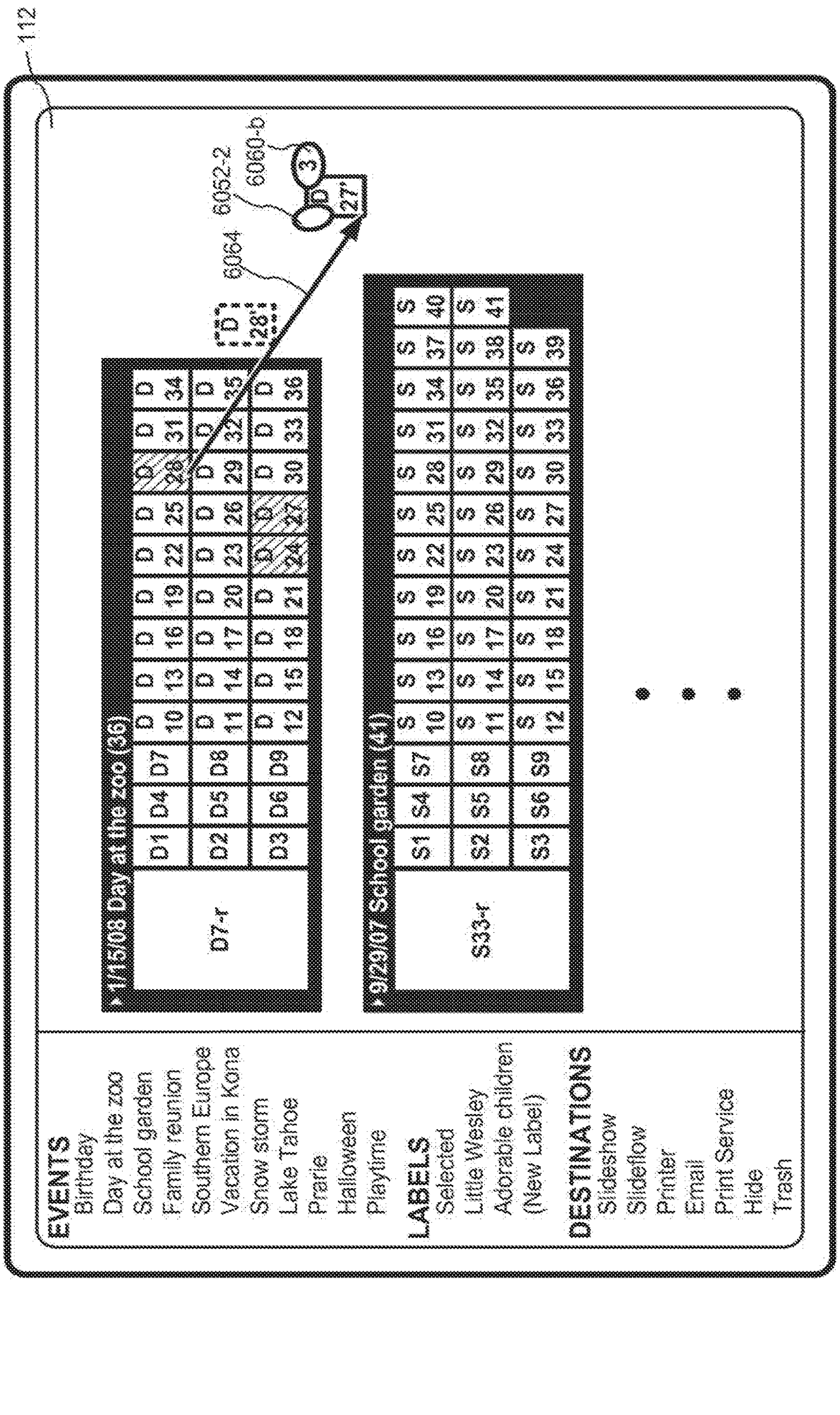
Figure 6H:
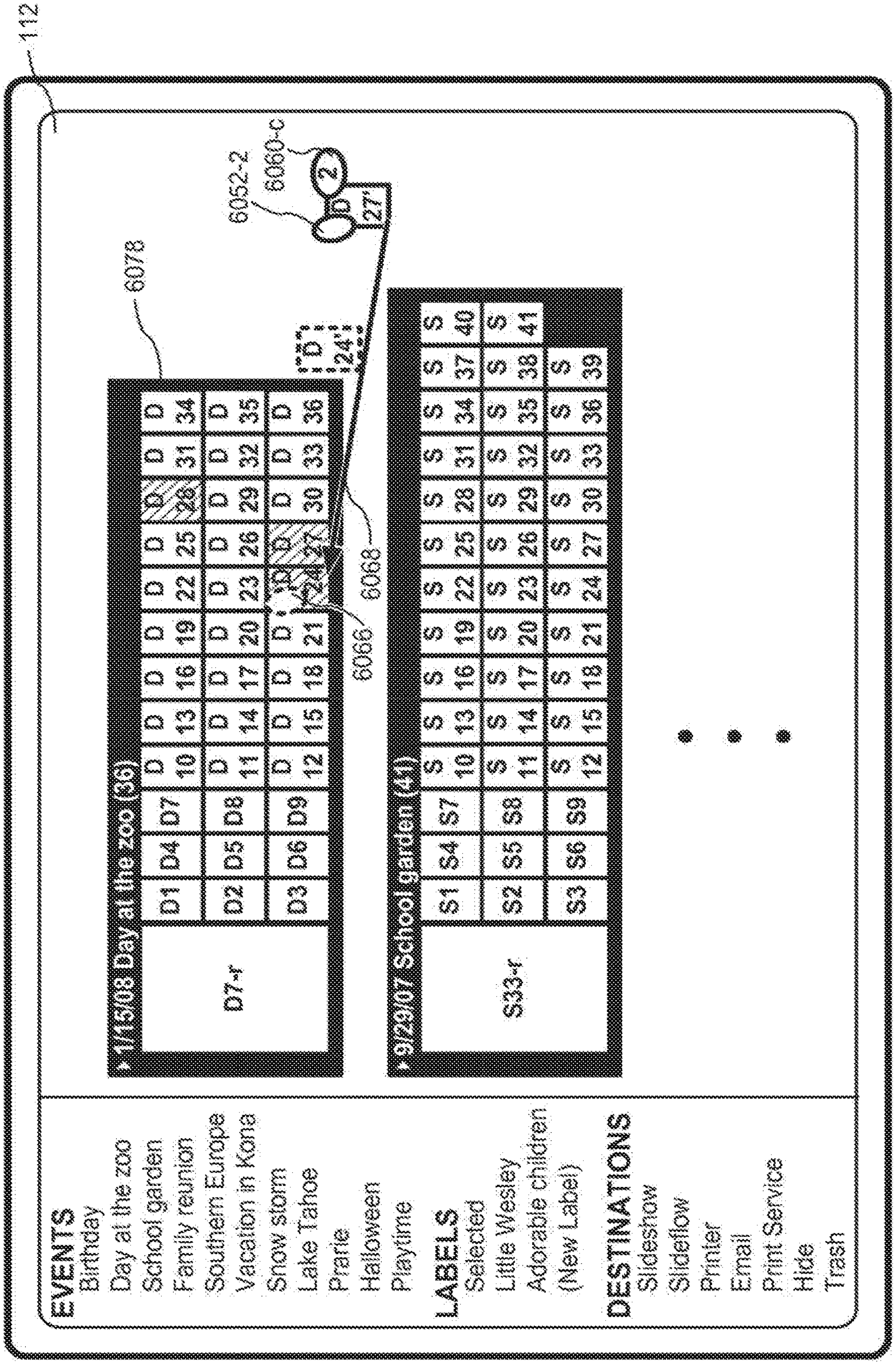
Figure 6I:
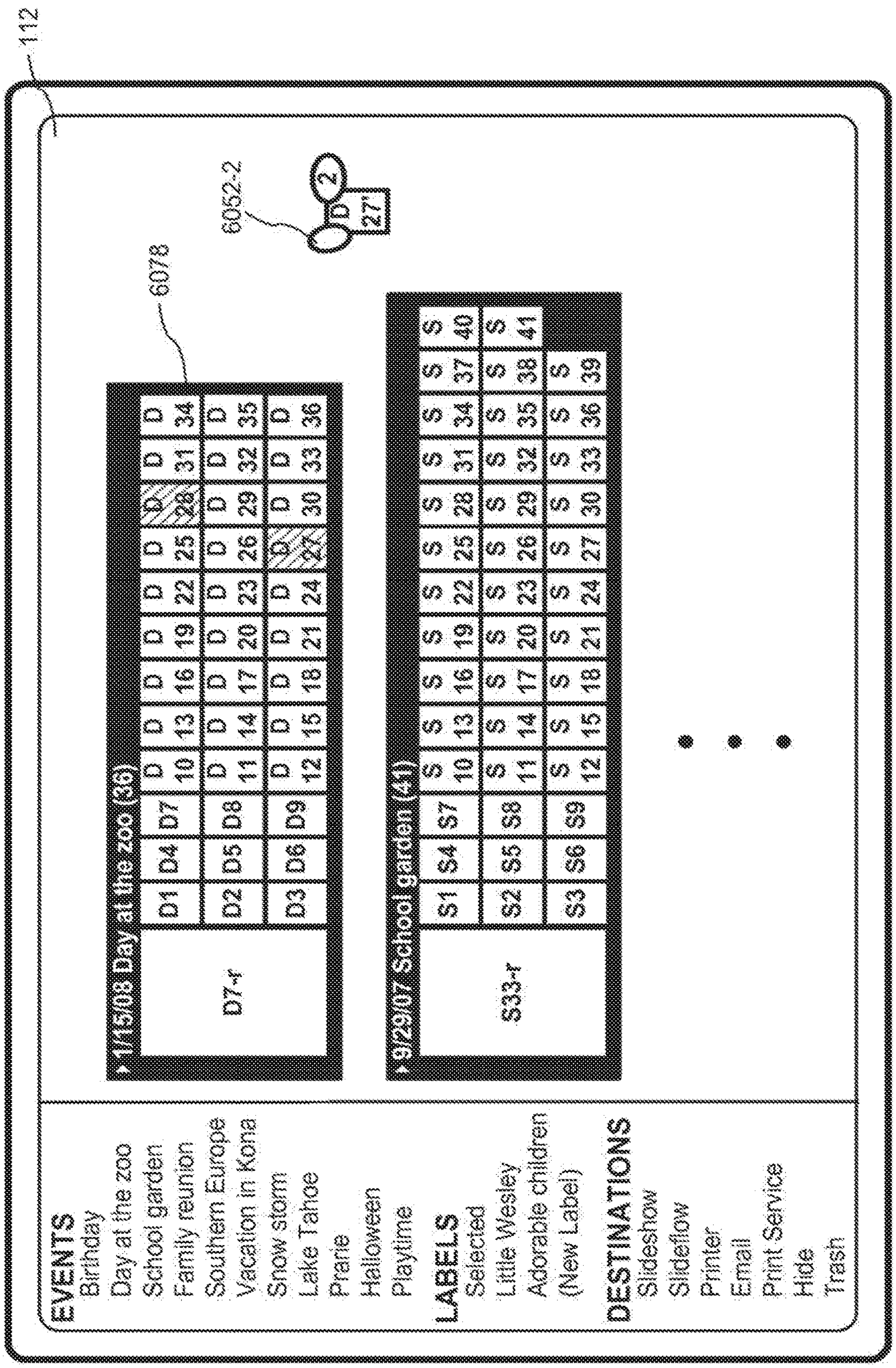
Figure 6J:
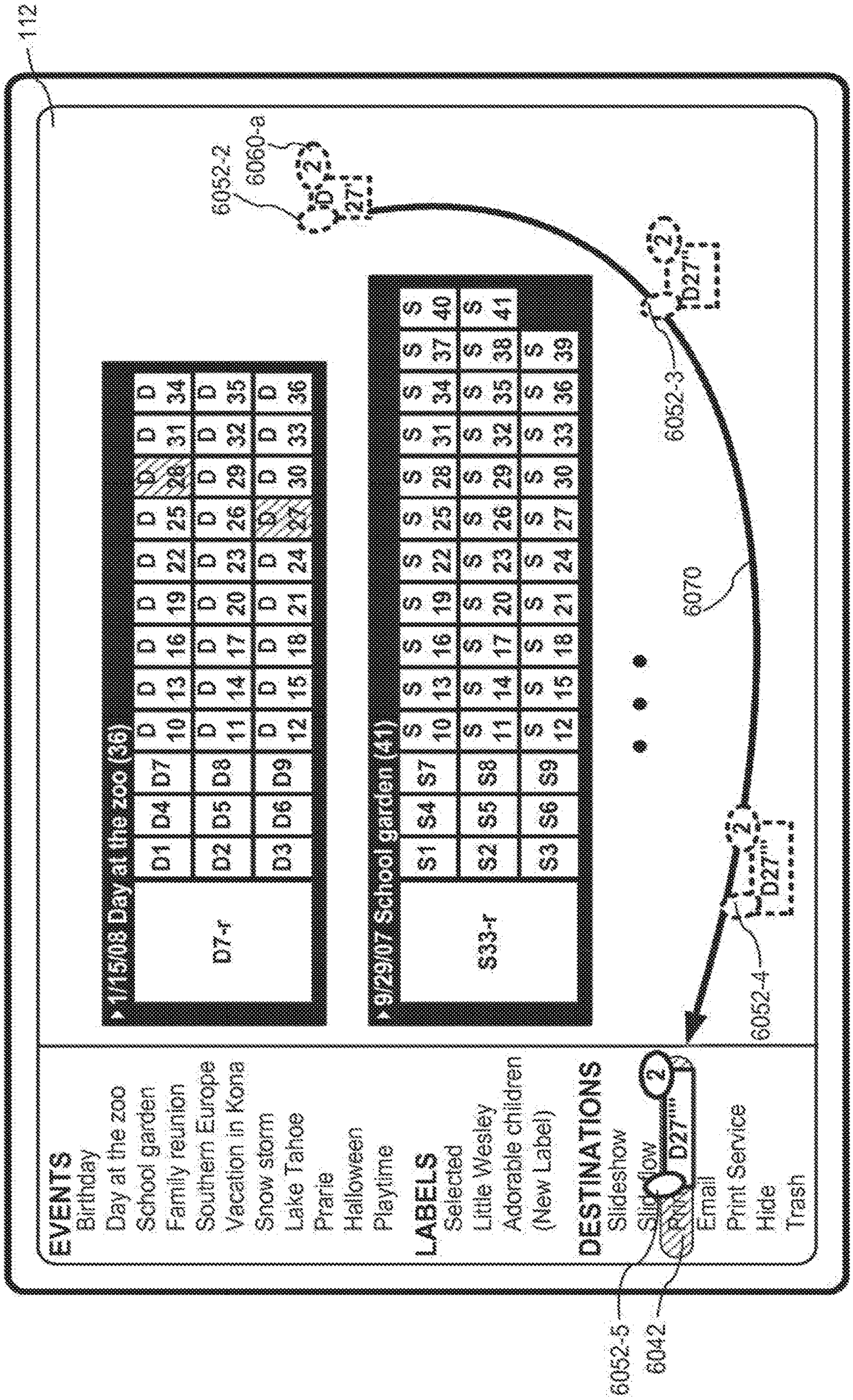
Figure 6K:
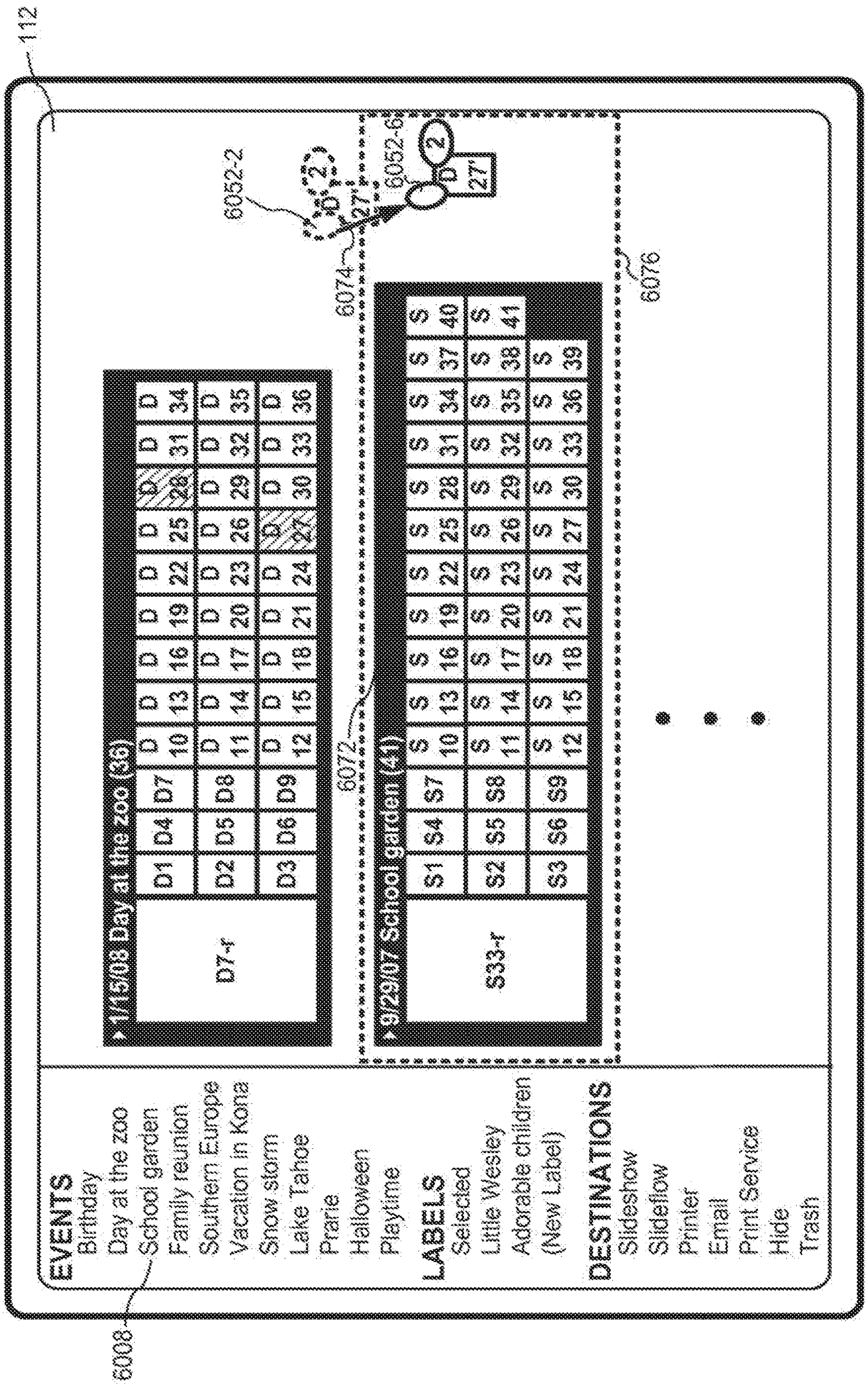
Figure 6L:
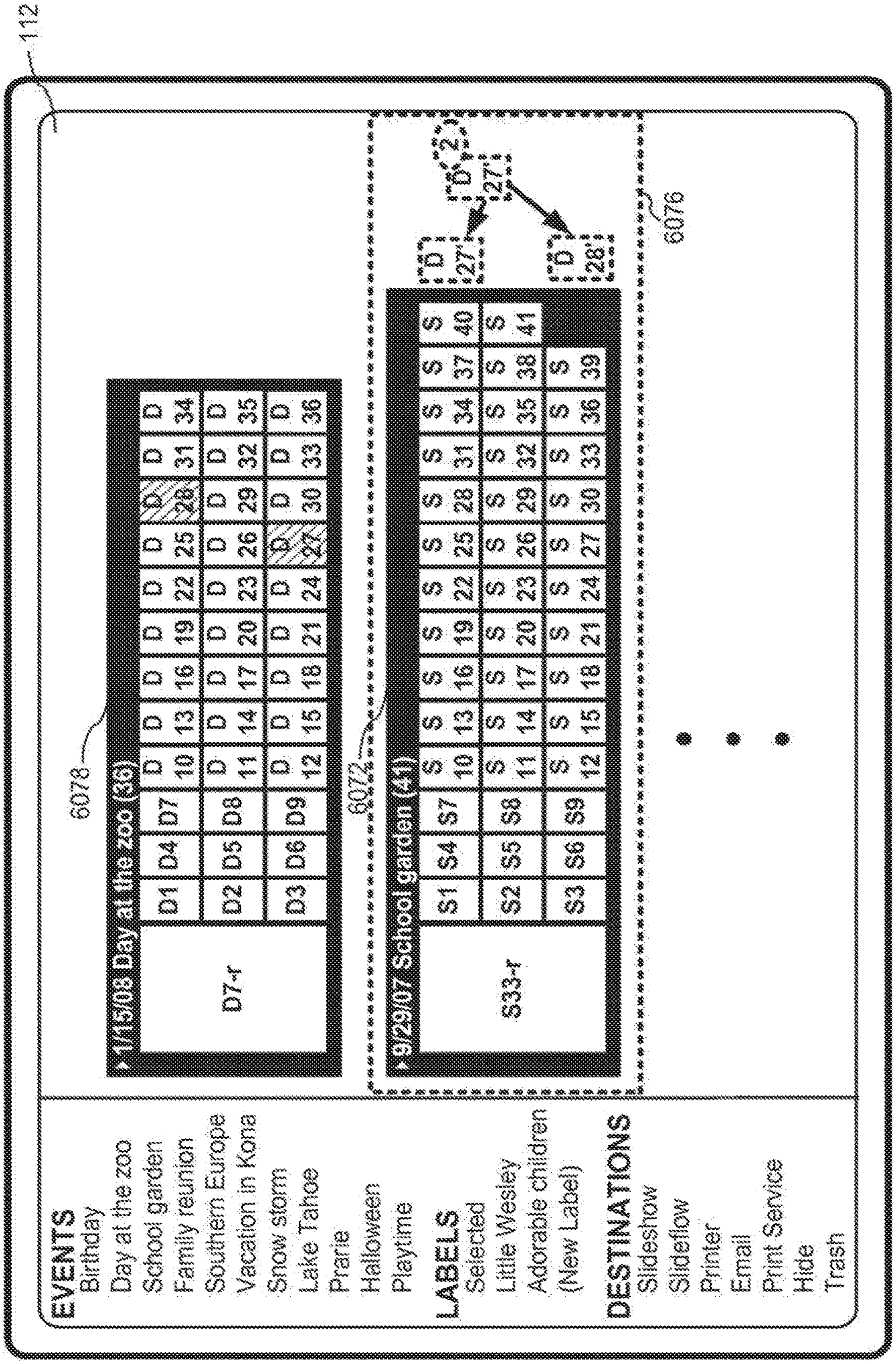
Figure 6M:
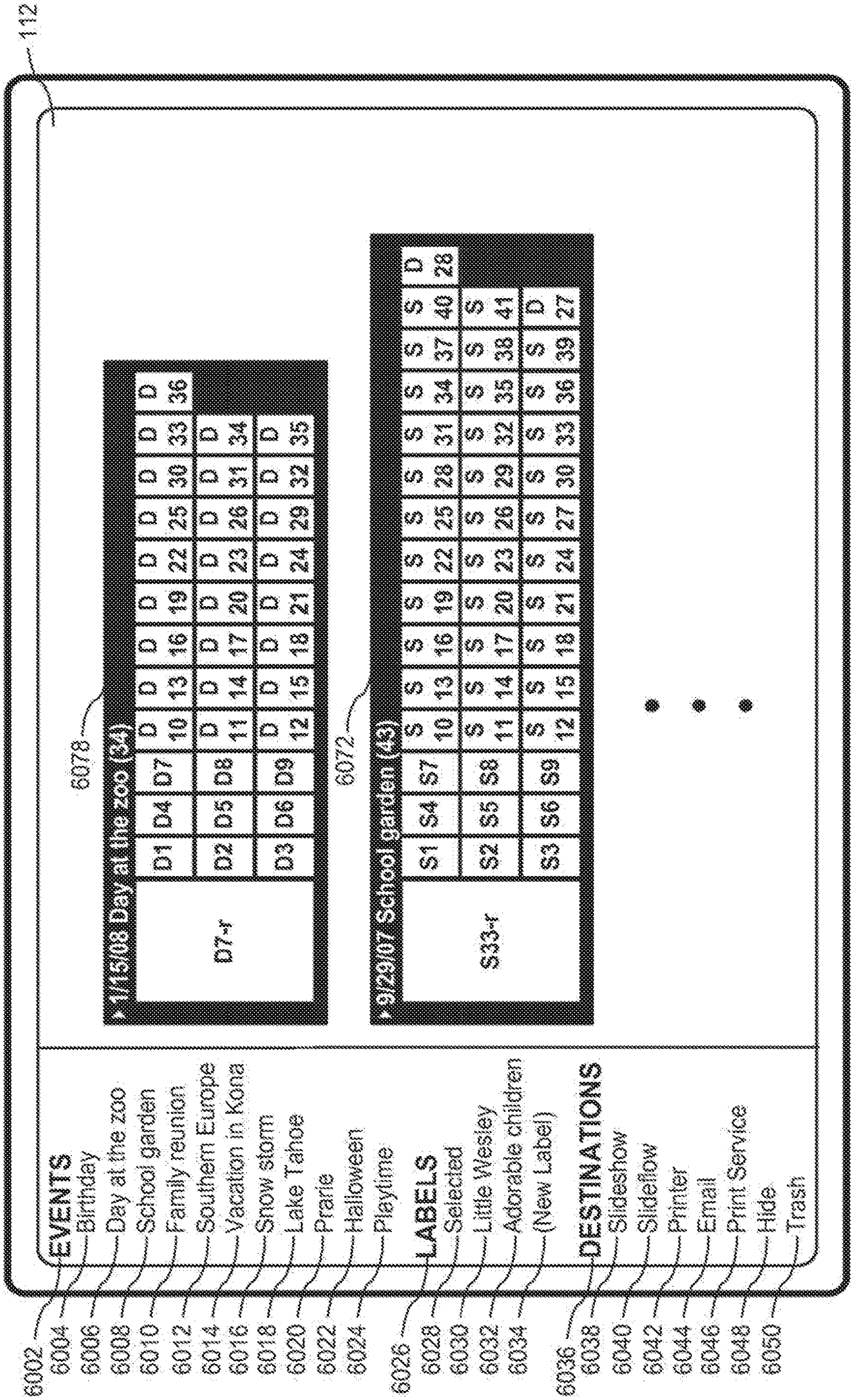
Figure 6N:
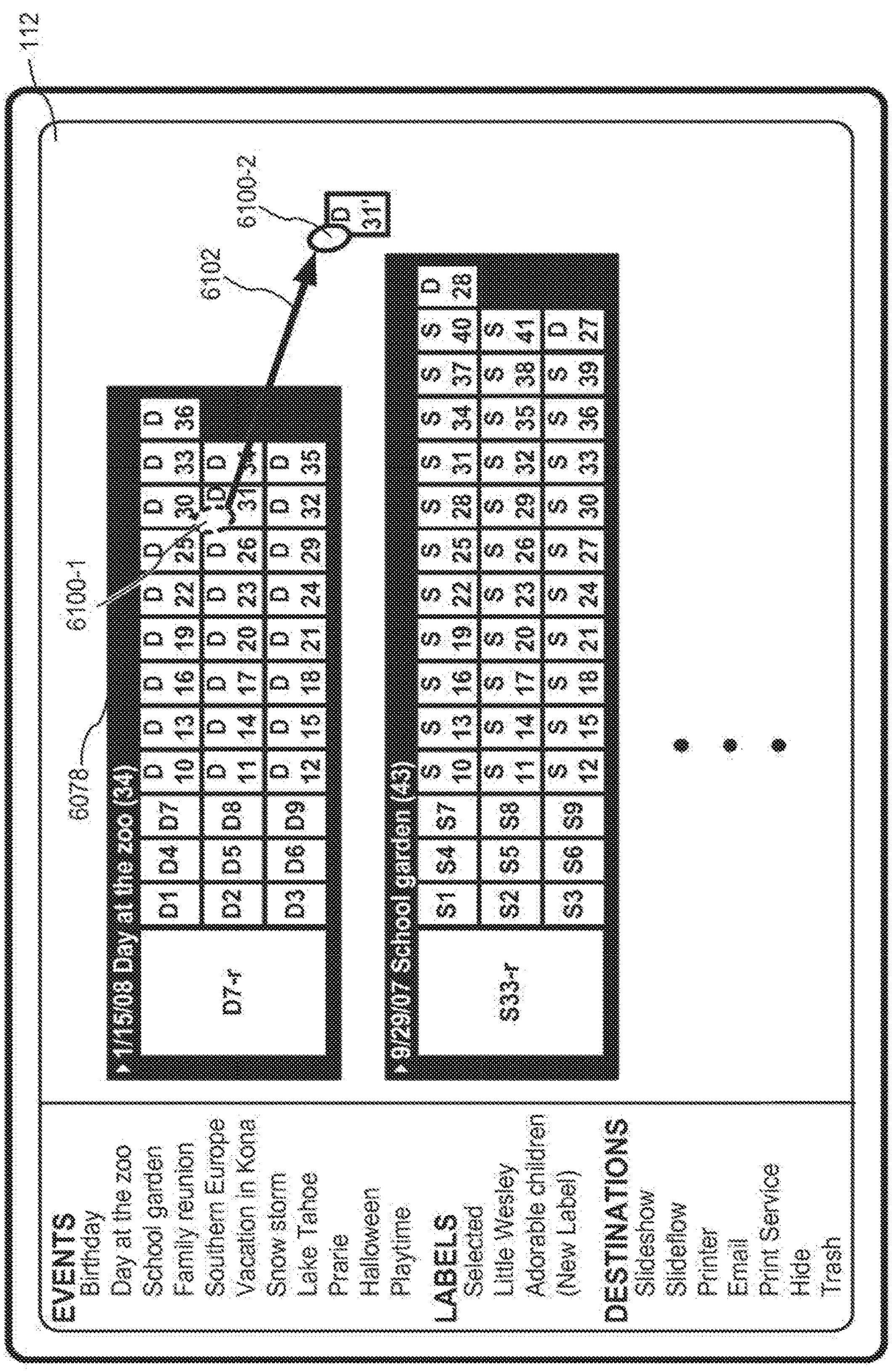
Figure 6O:
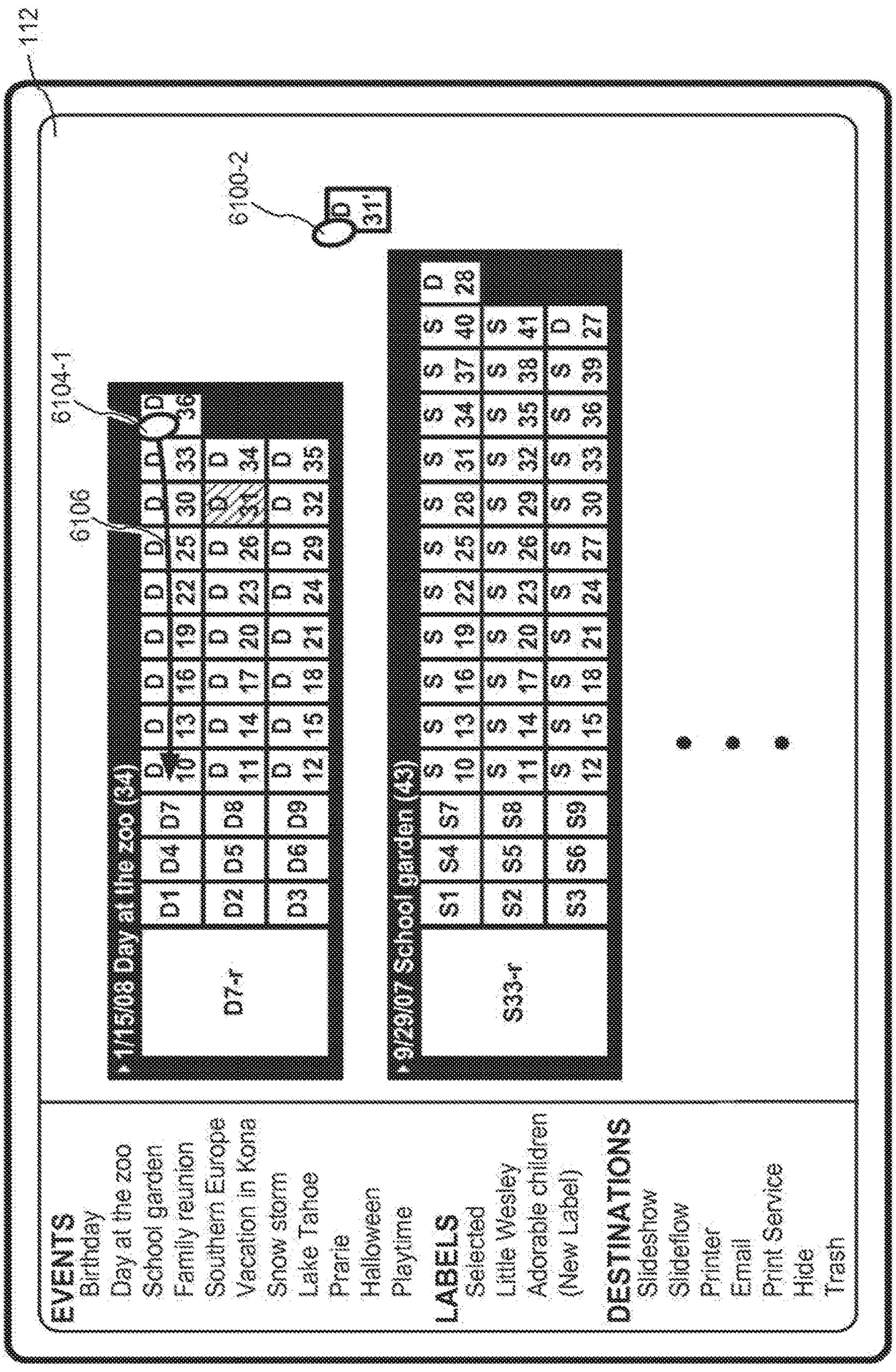
Figure 6P:
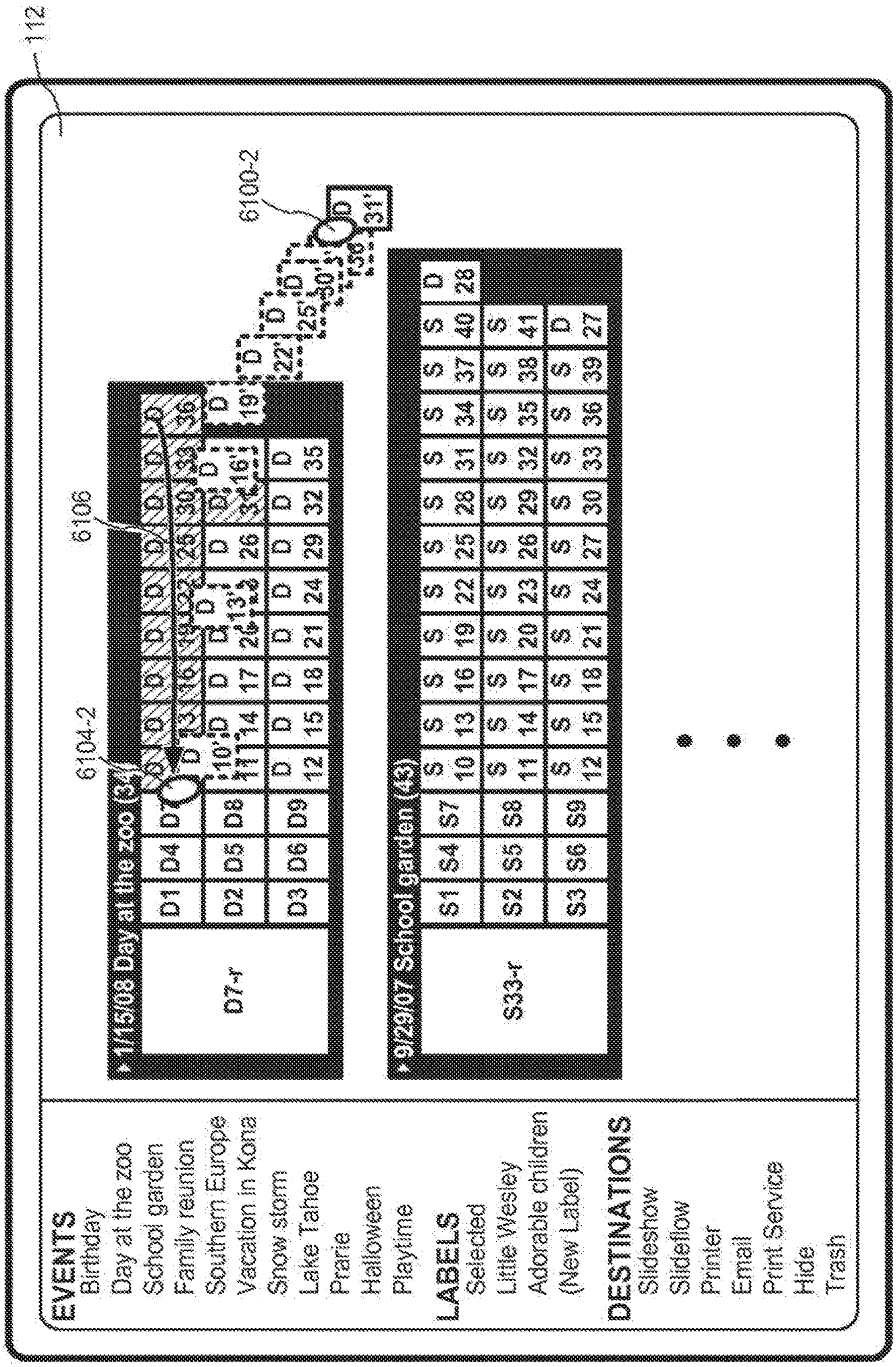
Figure 6Q:
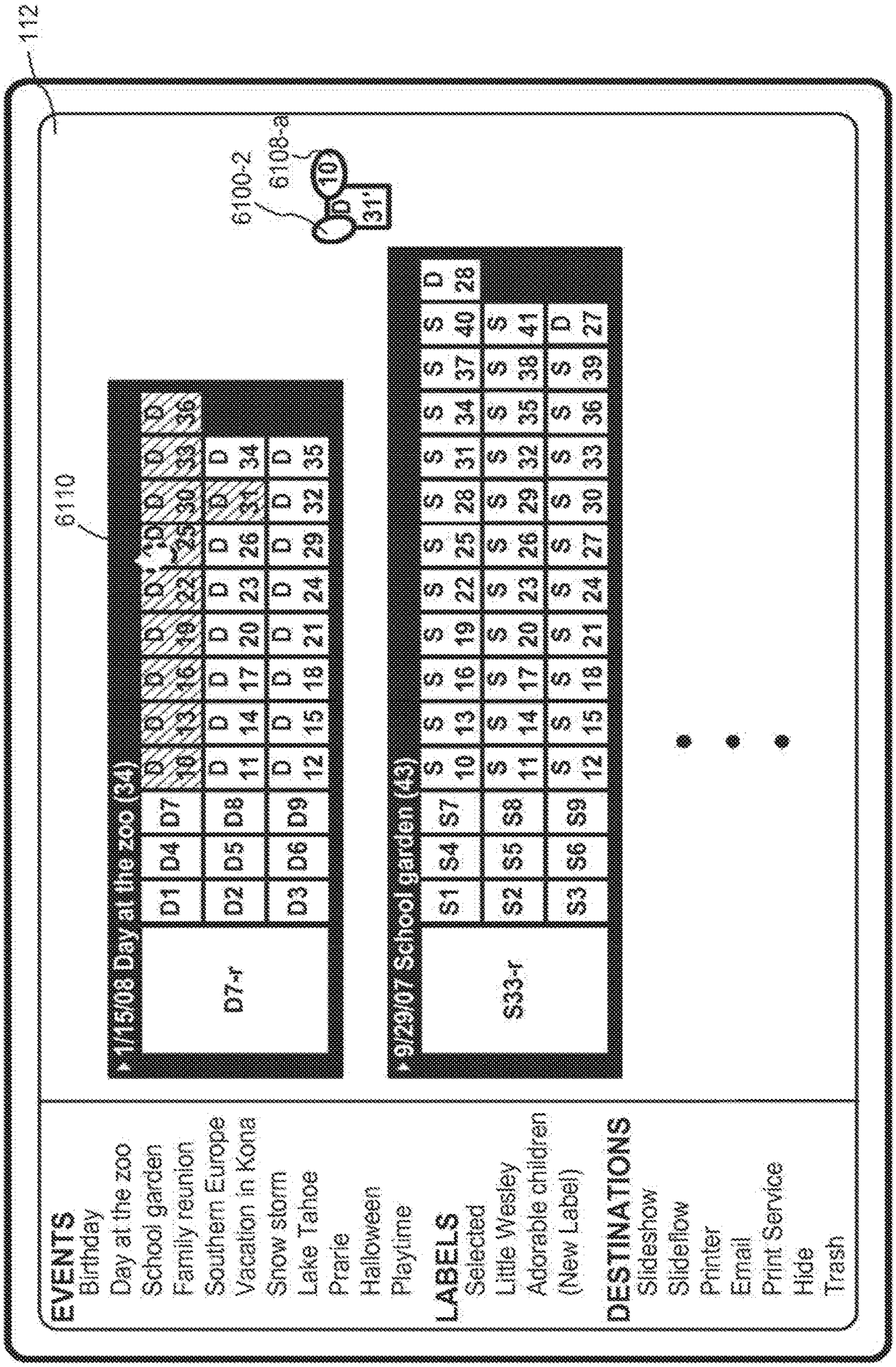
Figure 6R:
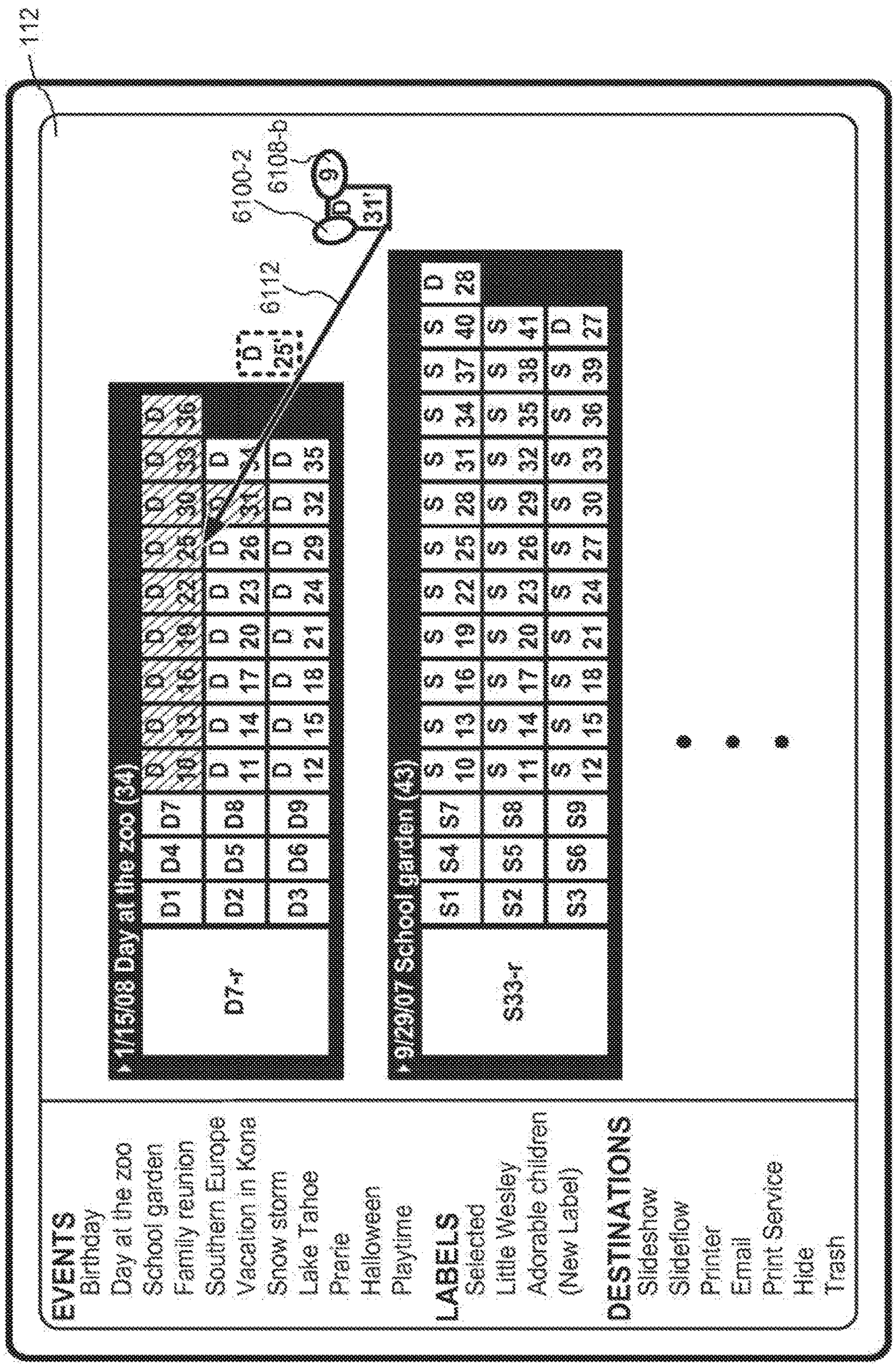
Figure 6S:
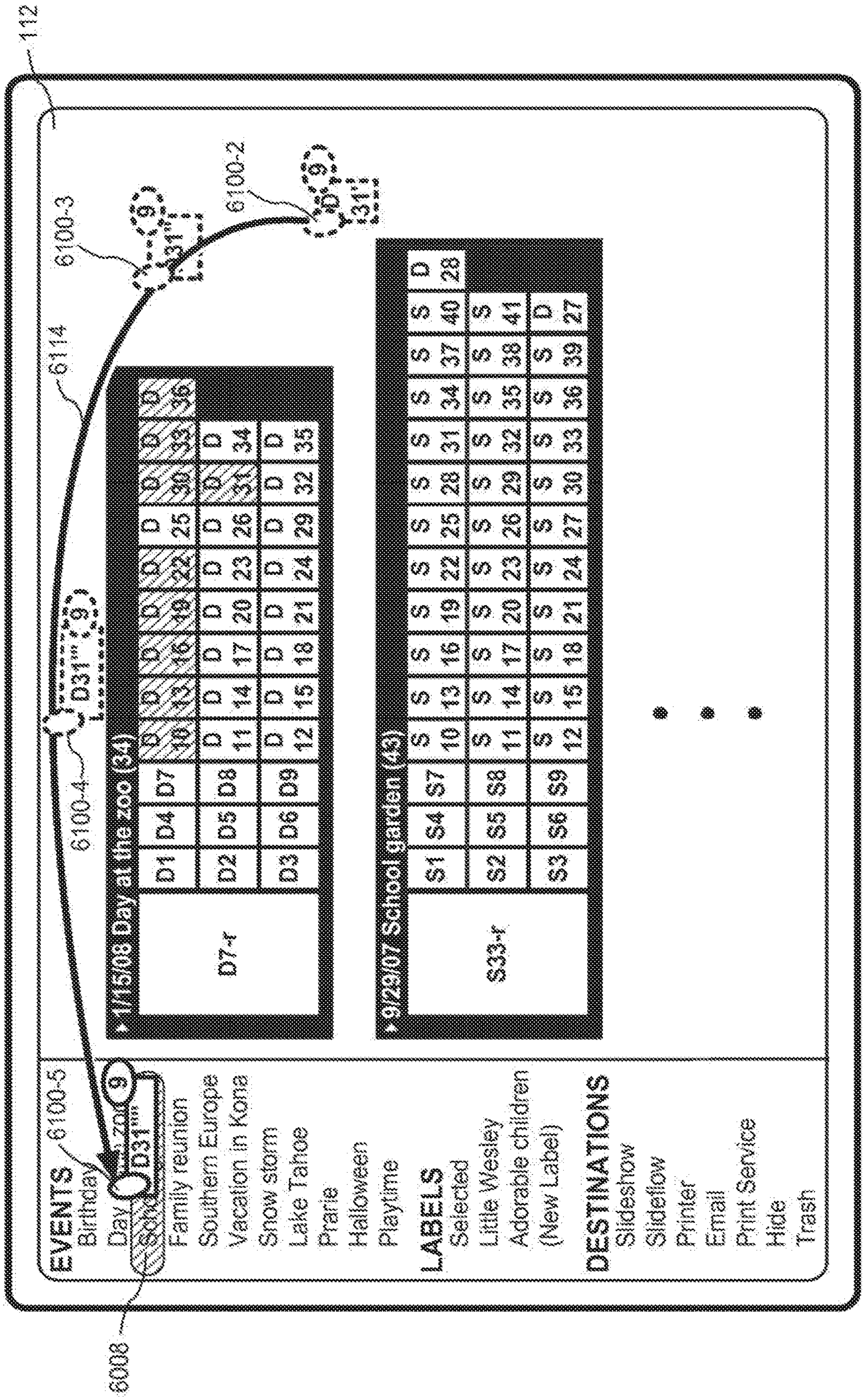
Figure 6T:
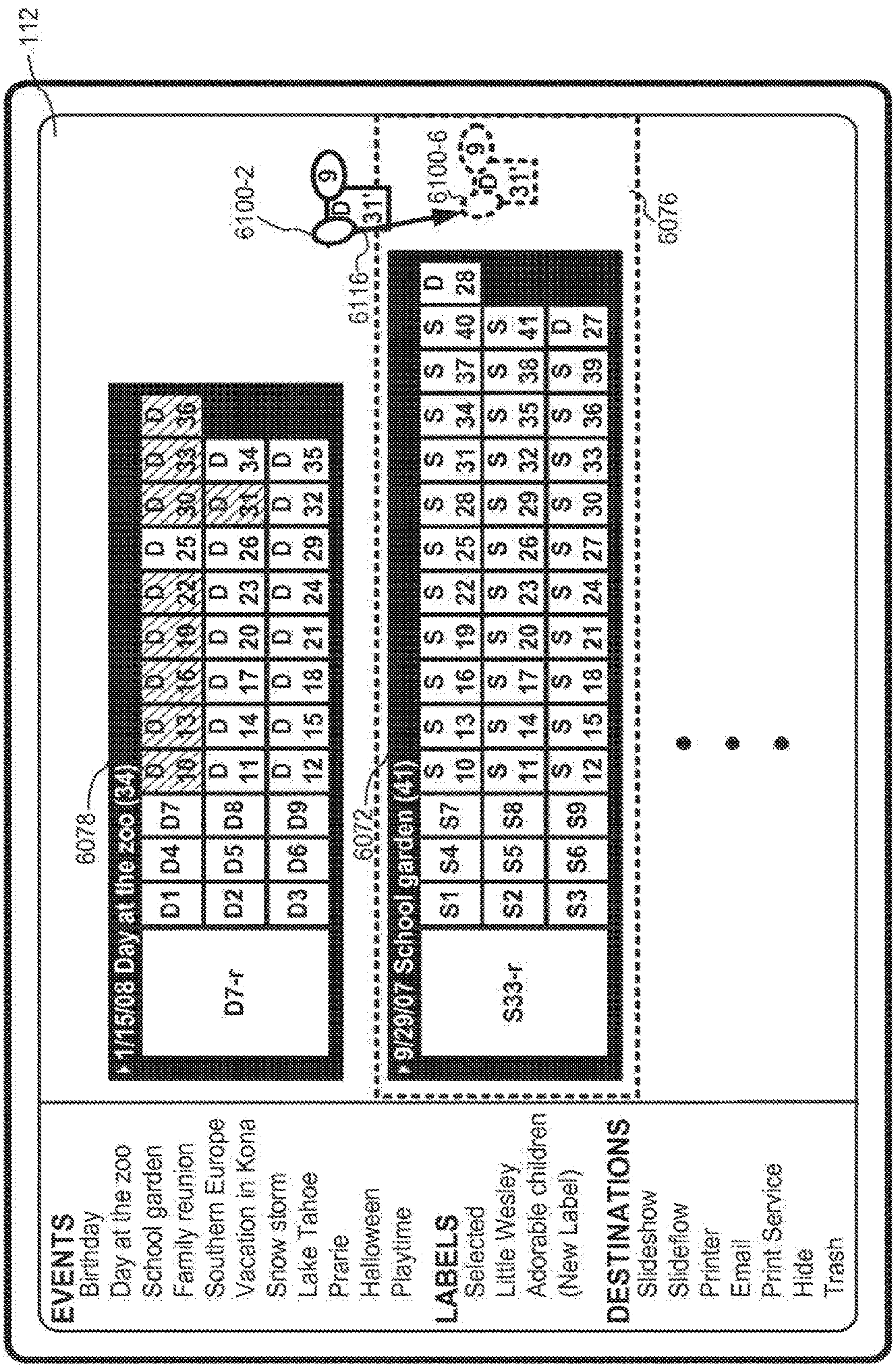
Figure 6U:
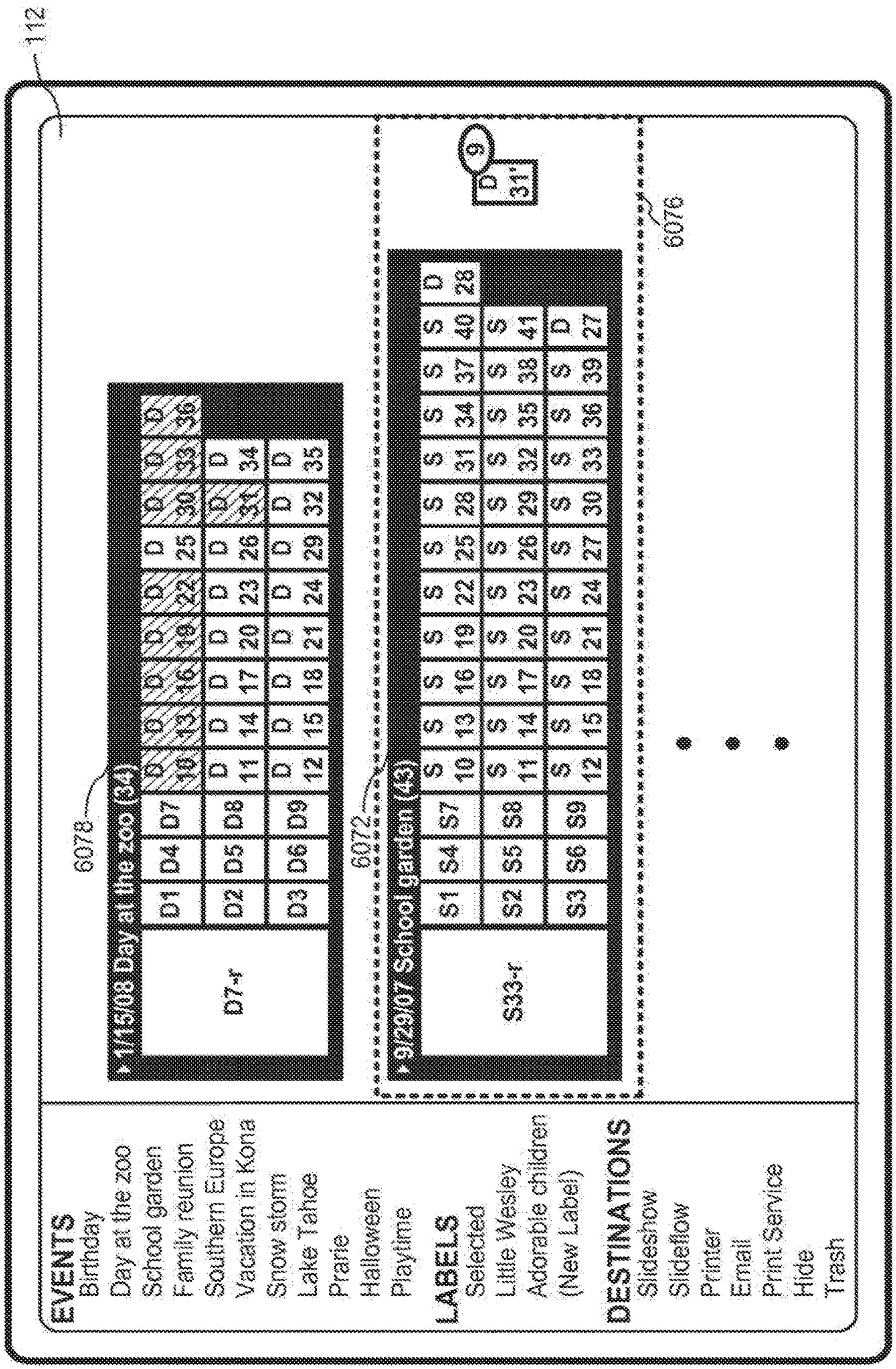
Figure 6V:
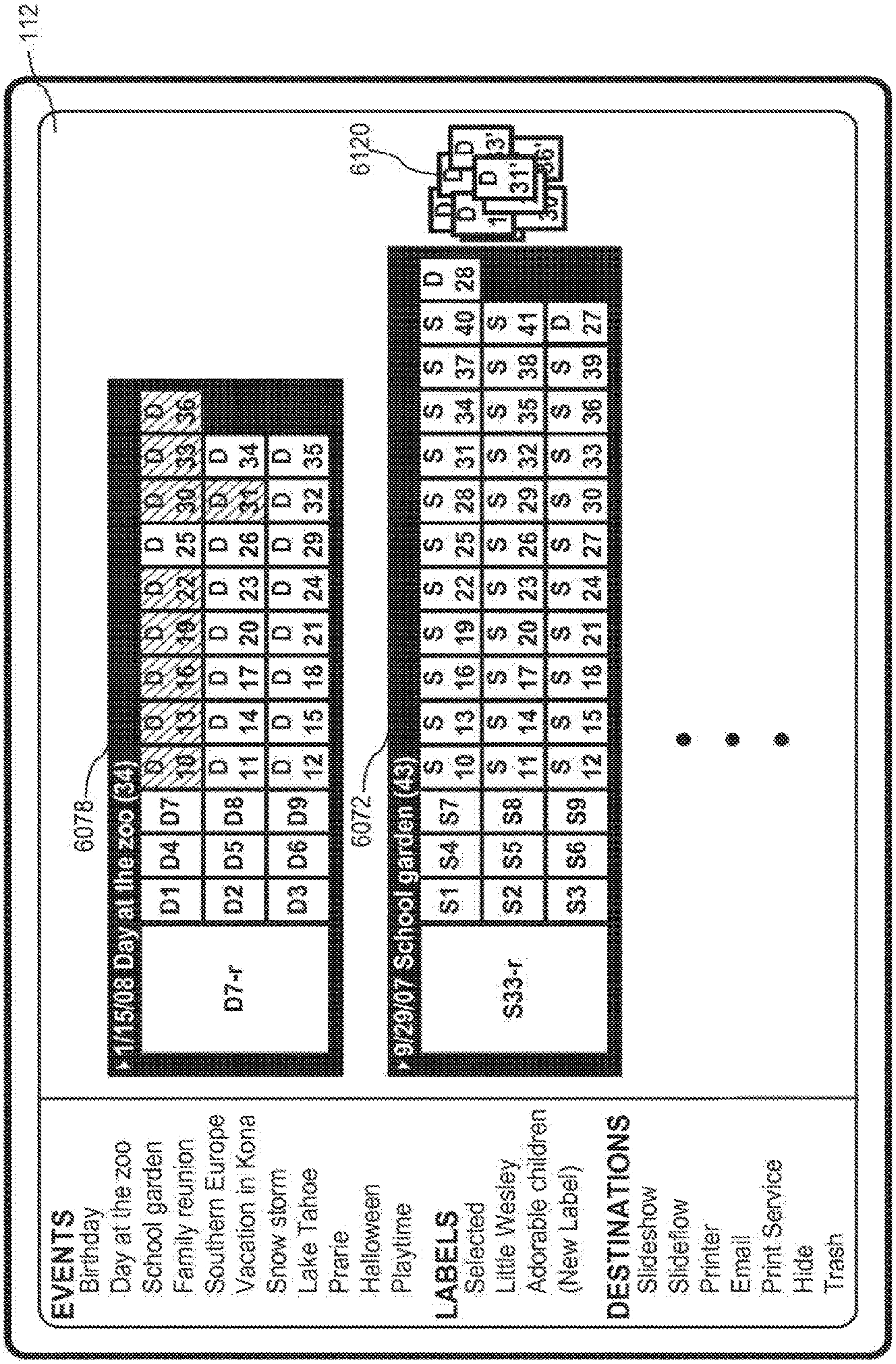
Figure 6W:
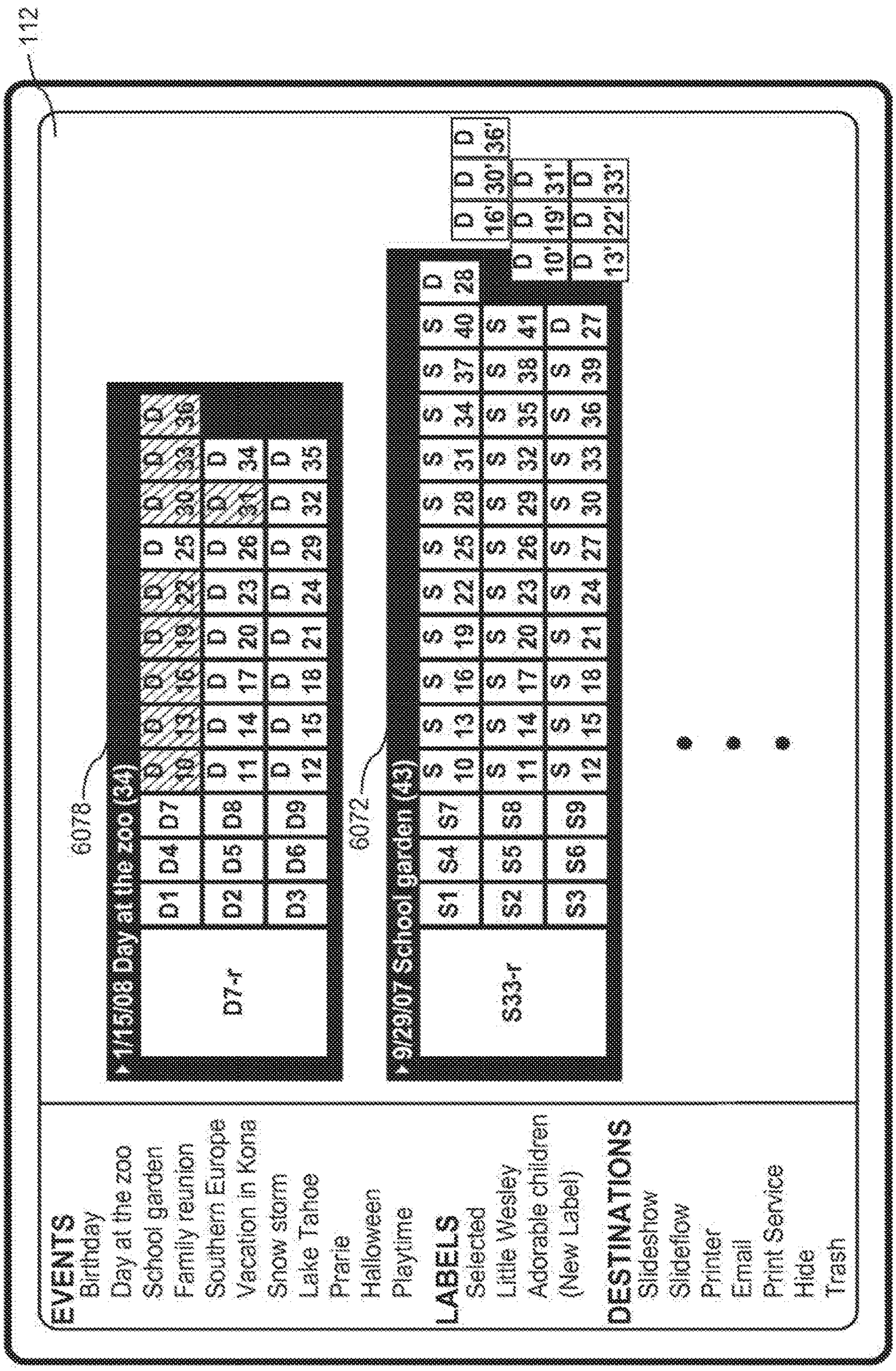
Figure 6X:
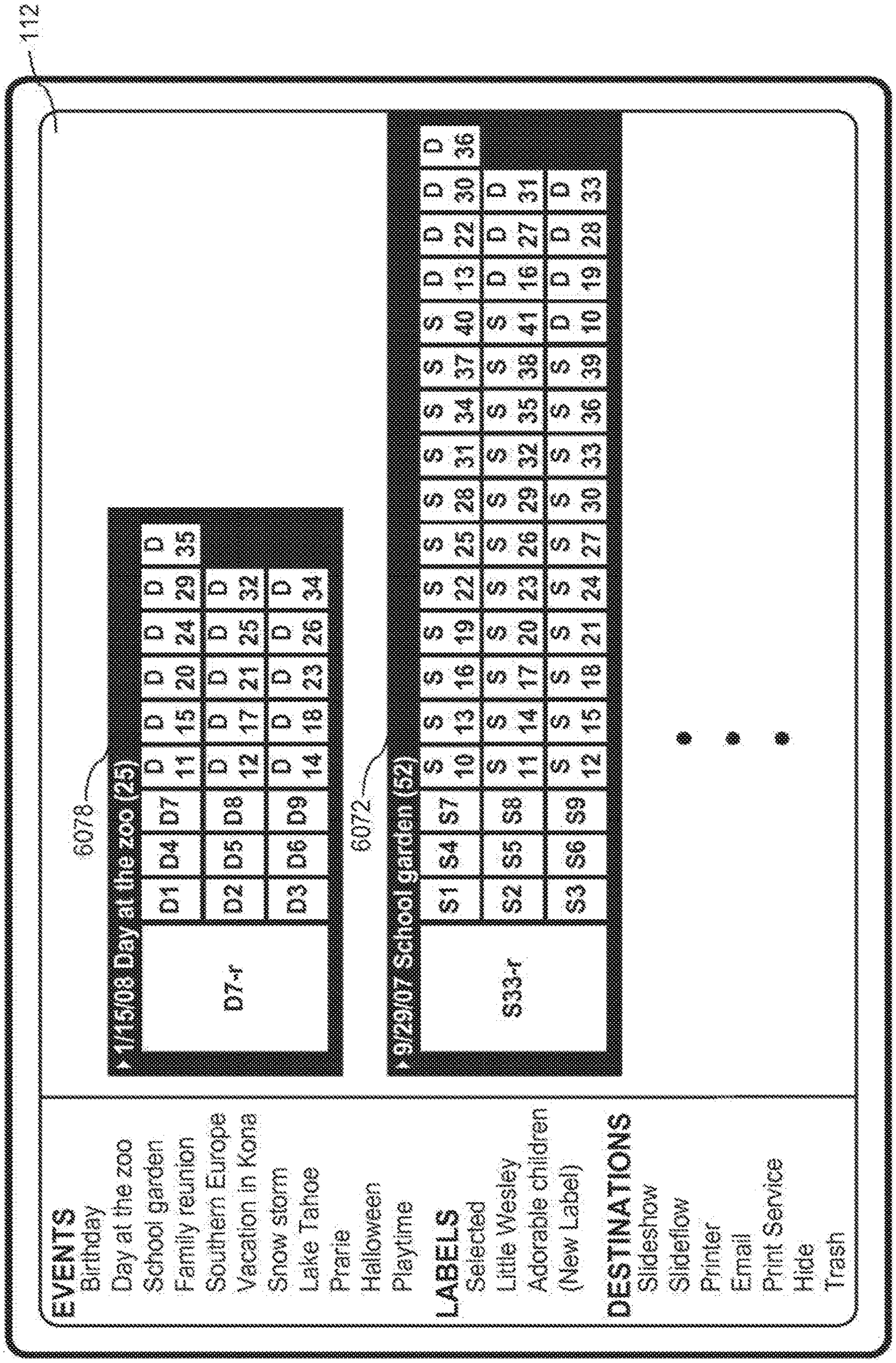

FIGS. 6A-6X illustrate exemplary user interfaces for forming a group of user interface objects, moving the group to a destination object or an area associated with a destination object, and performing an action associated with the destination object on the group of user interface objects in accordance with some embodiments. The user interfaces in these figures are used to illustrate the processes described below, including the processes in FIGS. 11A-11B and 12A-12B.

FIGS. 6A-6G illustrate exemplary user interfaces for forming a group of two or more user interface objects by selecting a user interface object (e.g., image D27, FIG. 6B) from an array 6078 of user interface objects and dragging the selected object off of the array (e.g., in response to detecting contact 6052-1 in FIG. 6B with image D27 and movement 6054 of the contact off of the array in FIG. 6C). Subsequently, additional user interface objects (e.g., images D24 and D28) are grouped with the selected object in response to user inputs (e.g., tap gestures 6056 in FIG. 6D and 6062 in FIG. 6F) on the additional user interface objects.

FIGS. 6H-6I illustrate exemplary user interfaces for removing a user interface object (e.g., image D24) from the group of two or more user interface objects in response to detecting a user input (e.g., tap gesture 6066 in FIG. 6H) with a residual image of the user interface object (e.g., shaded image D24). In response to detecting tap gesture 6066 in FIG. 61H on the residual image of D24, digital image D24 is removed from the group of images (D27 and D28) and image D24 replaces its residual image (FIG. 6I).

FIGS. 6I-6M illustrate exemplary use interfaces for initiating performance of an action on the group of user interface objects (e.g., images D27 and D28). In FIG. 6J, in response to detecting a drag gesture that includes contact 6052 and movement 6070 to the Printer destination object 6042, printing of images D27 and D28 is initiated. In FIGS. 6K-6M, in response to detecting movement 6074 of the group to an area 6076 associated with destination object 6008, images D27 and D28 are made part of the array 6072 of images for the School garden event 6008.

FIGS. 6N-6Q illustrate exemplary user interfaces for forming a group of more than two user interface objects by selecting a user interface object (e.g., image D31, FIG. 6N) from an array 6078 of user interface objects and dragging the selected object off of the array (e.g., in response to detecting contact 6100-1 with image D31 and movement 6102 of the contact off of the array in FIG. 6N). Subsequently, additional user interface objects (e.g., images D10, D13, D16, D19, D22, D25, D30, D33, and D36) are grouped with the selected object in response to user inputs (e.g., a swipe gesture that includes contact 6104 and movement 6106 of the contact in FIG. 6O) on the additional user interface objects.

FIGS. 6Q-6S illustrate-exemplary user interfaces for removing a user interface object (e.g., image D25) from the group of more than two user interface objects in response to detecting a user input (e.g., tap gesture 6110 in FIG. 6Q) with a residual image of the user interface object (e.g., shaded image D25 in FIG. 6Q). In response to detecting tap gesture 6110 in FIG. 6Q on the residual image of D25, digital image D25 is removed from the group of images (D10, D13, D16, D19, D22, D30, D31, D33, and D36) and image D25 replaces its residual image (FIG. 6I).

FIGS. 6S-6X illustrate exemplary use interfaces for initiating performance of an action on the group of user interface objects (e.g., images D10, D13, D16, D19, D22, D30-D31, D33, and D36). In FIG. 6S, in response to detecting a drag gesture that includes contact 6100 and movement 6114 to the School garden event destination object 6008, images D10, D13, D16, D19, D22, D30, D31, D33, and D36 are made part of the array 6072 of images for the School garden event 6008 (FIG. 6X). In FIGS. 6T-6X, in response to detecting movement 6116 of the group to an area 6076 associated with destination object 6008, images D10, D13, D16, D19, D22, D30, D31, D33, and D36 are made part of the array 6072 of images for the School garden event 6008.

Figure 7A:
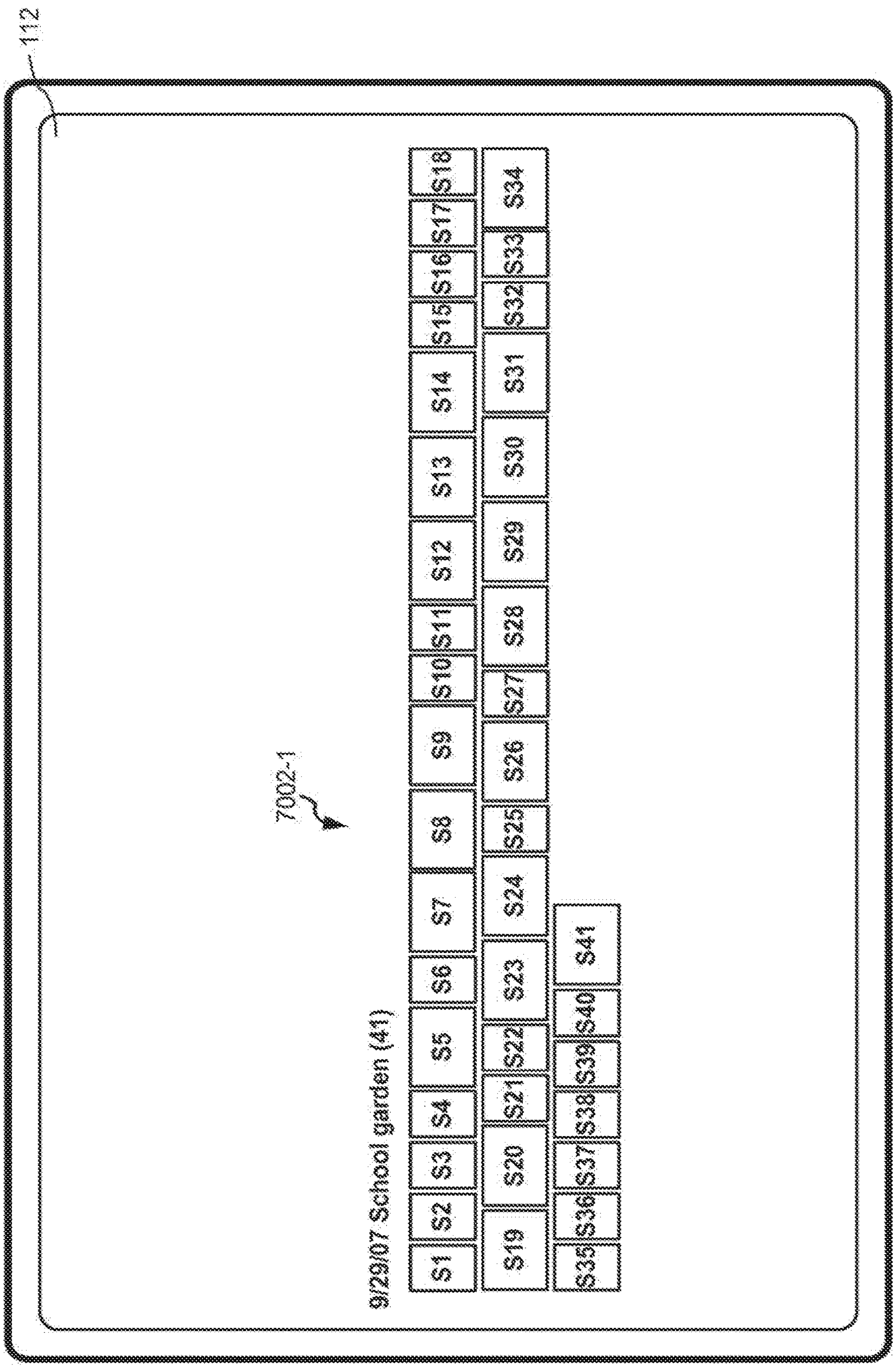
FIGS. 7A-7O illustrate exemplary user interfaces for zooming and rearranging user interface objects in an array with a multifinger gesture in accordance with some embodiments.
Figure 7B:
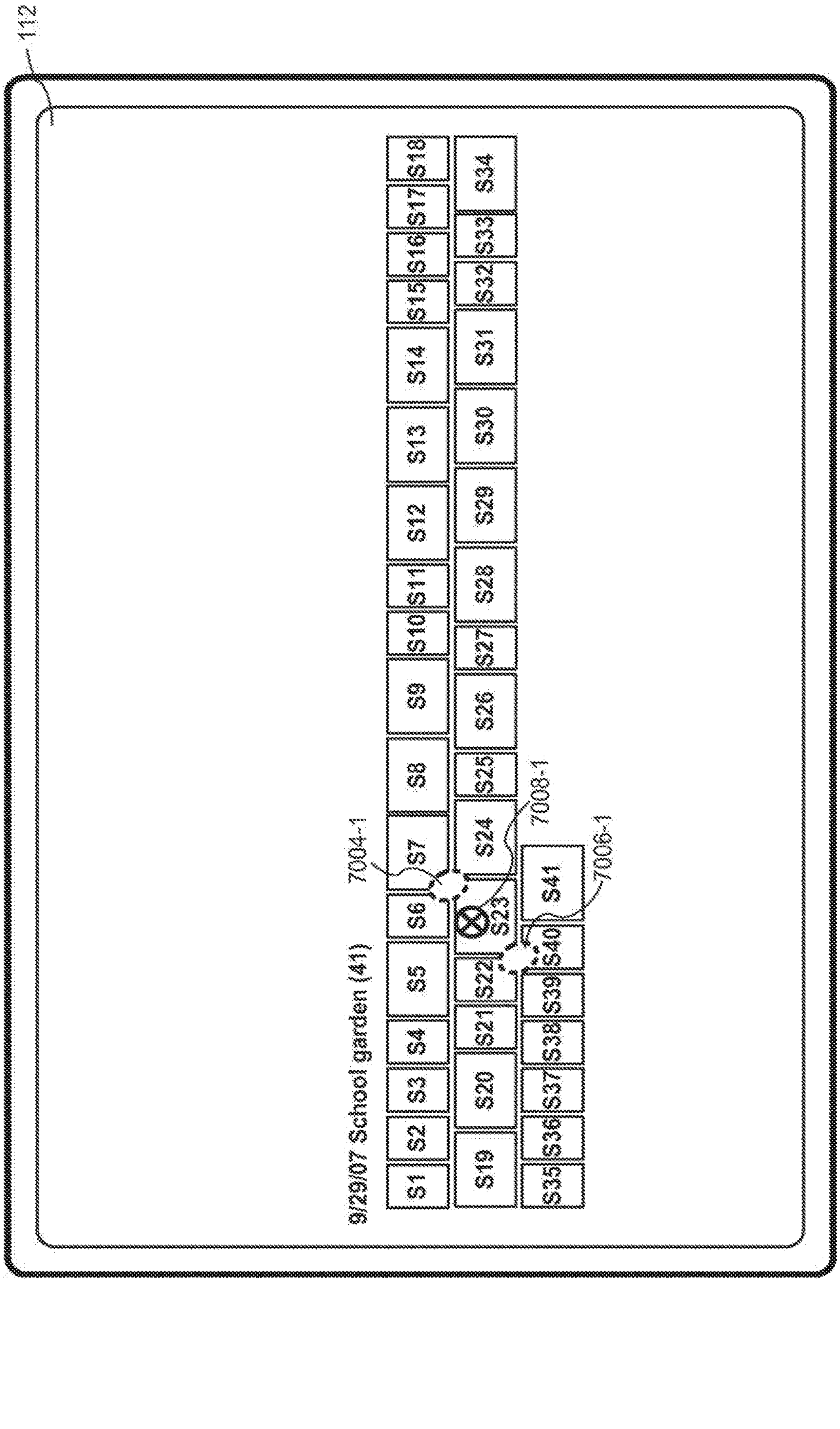
Figure 7C:
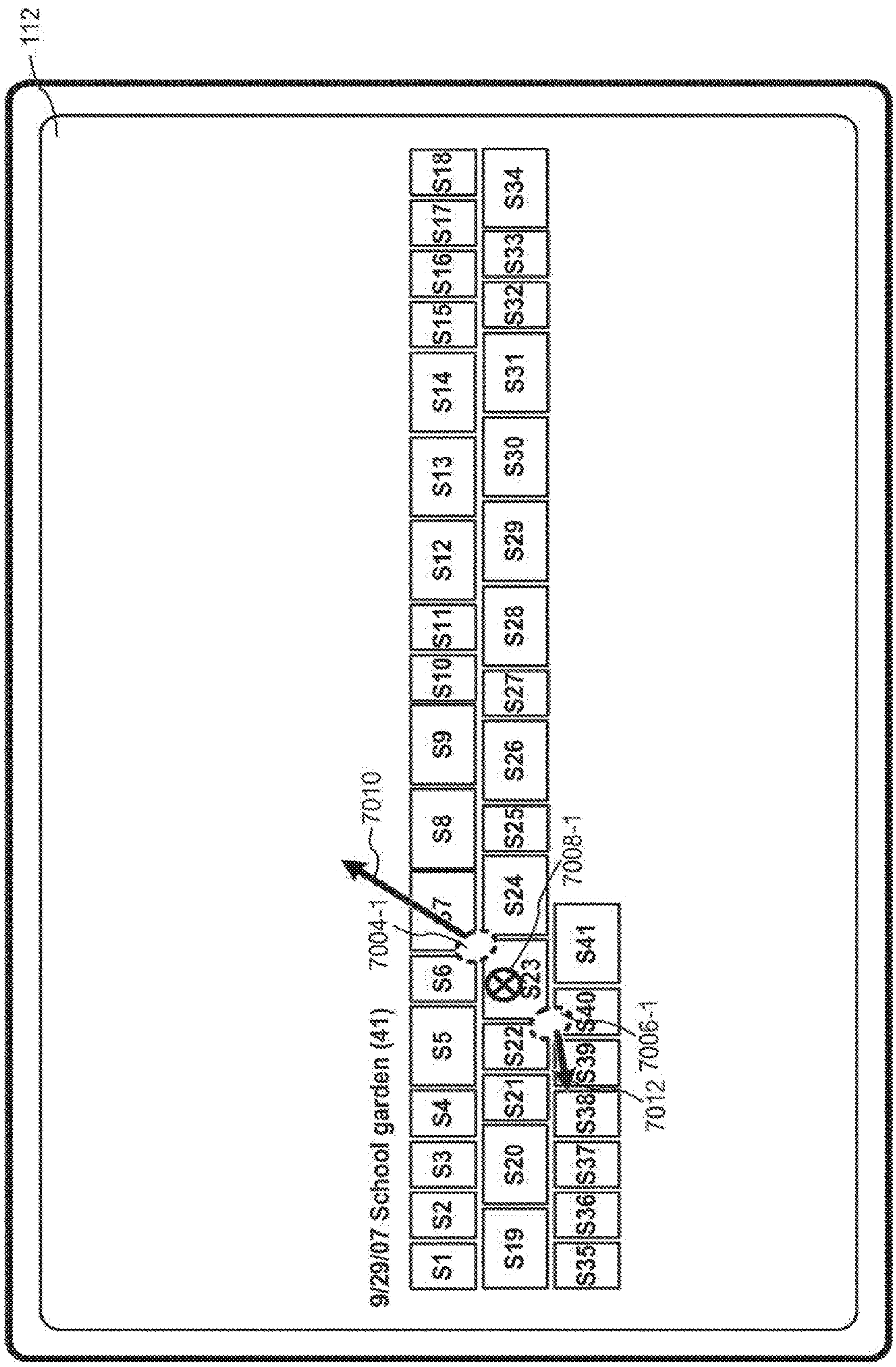
Figure 7D:
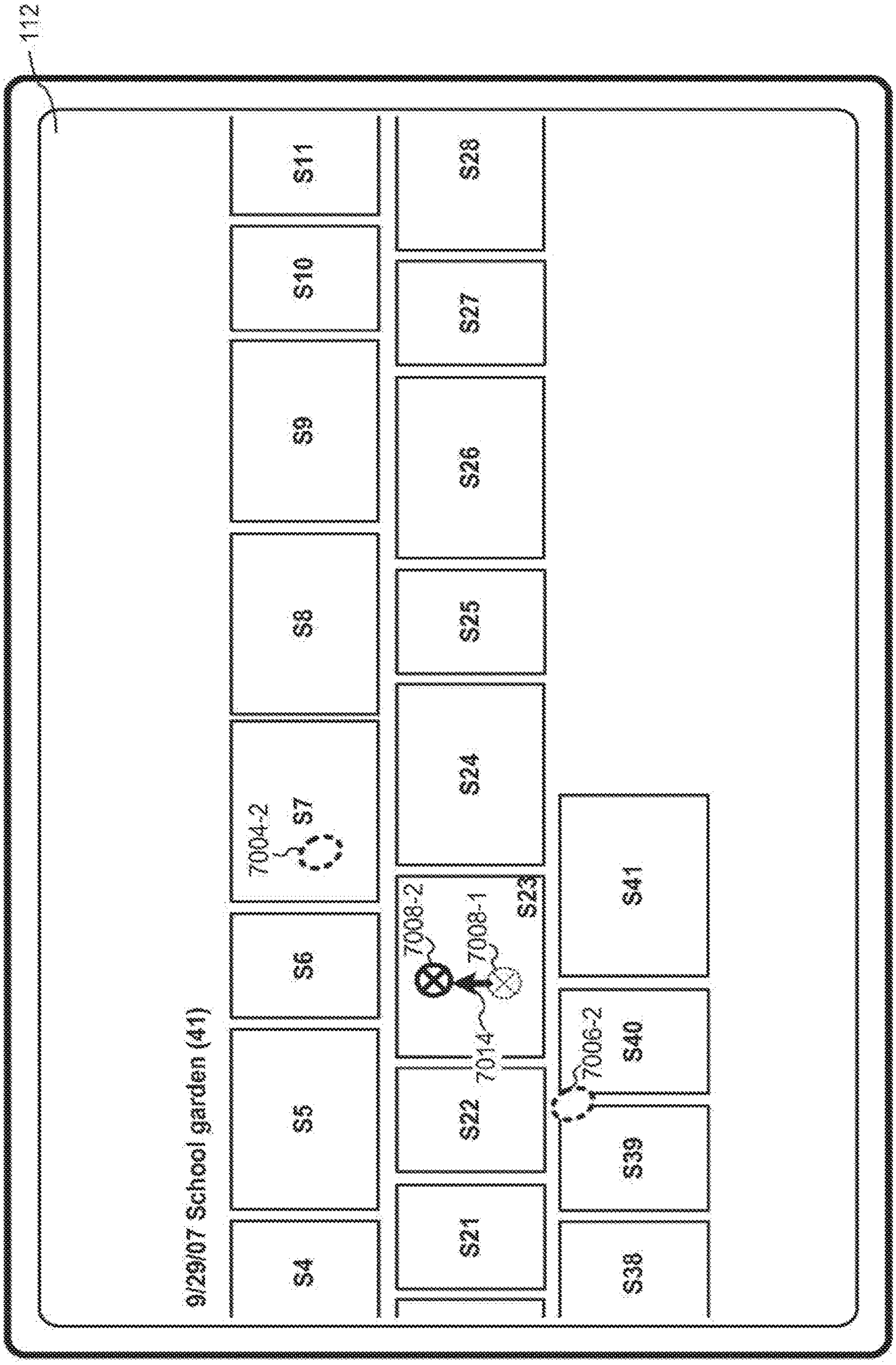
Figure 7E:
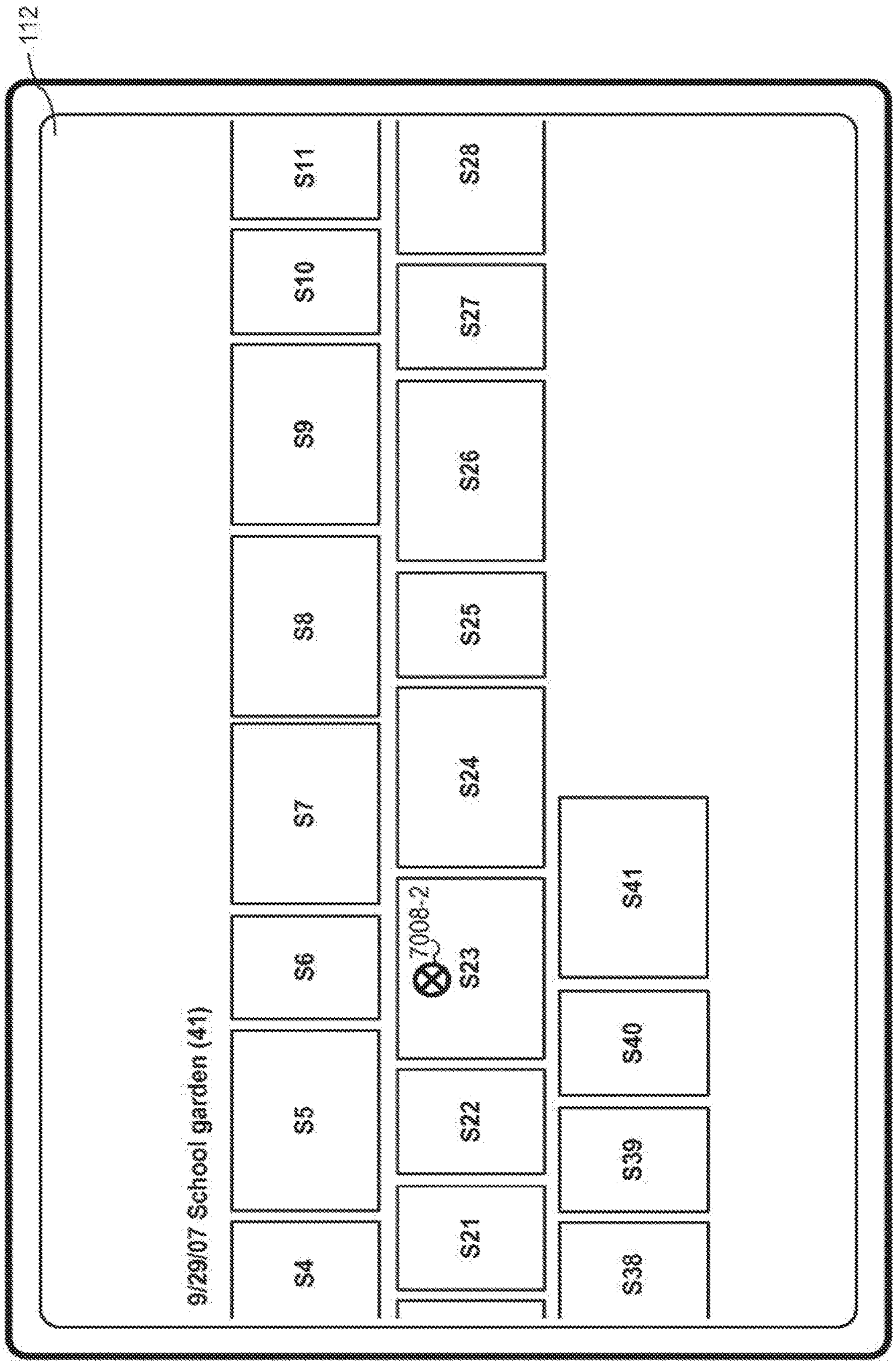
Figure 7F:
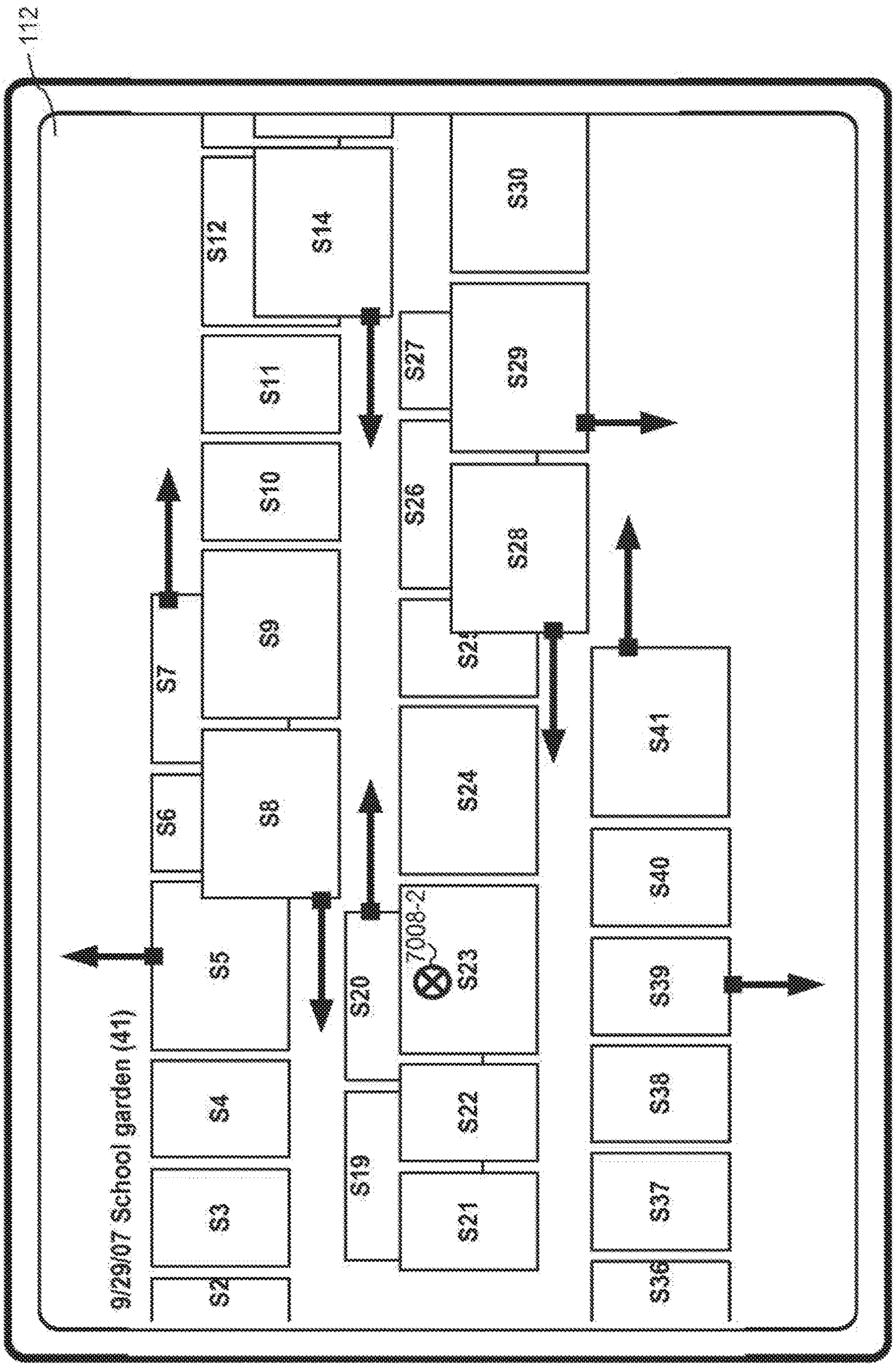
Figure 7G:
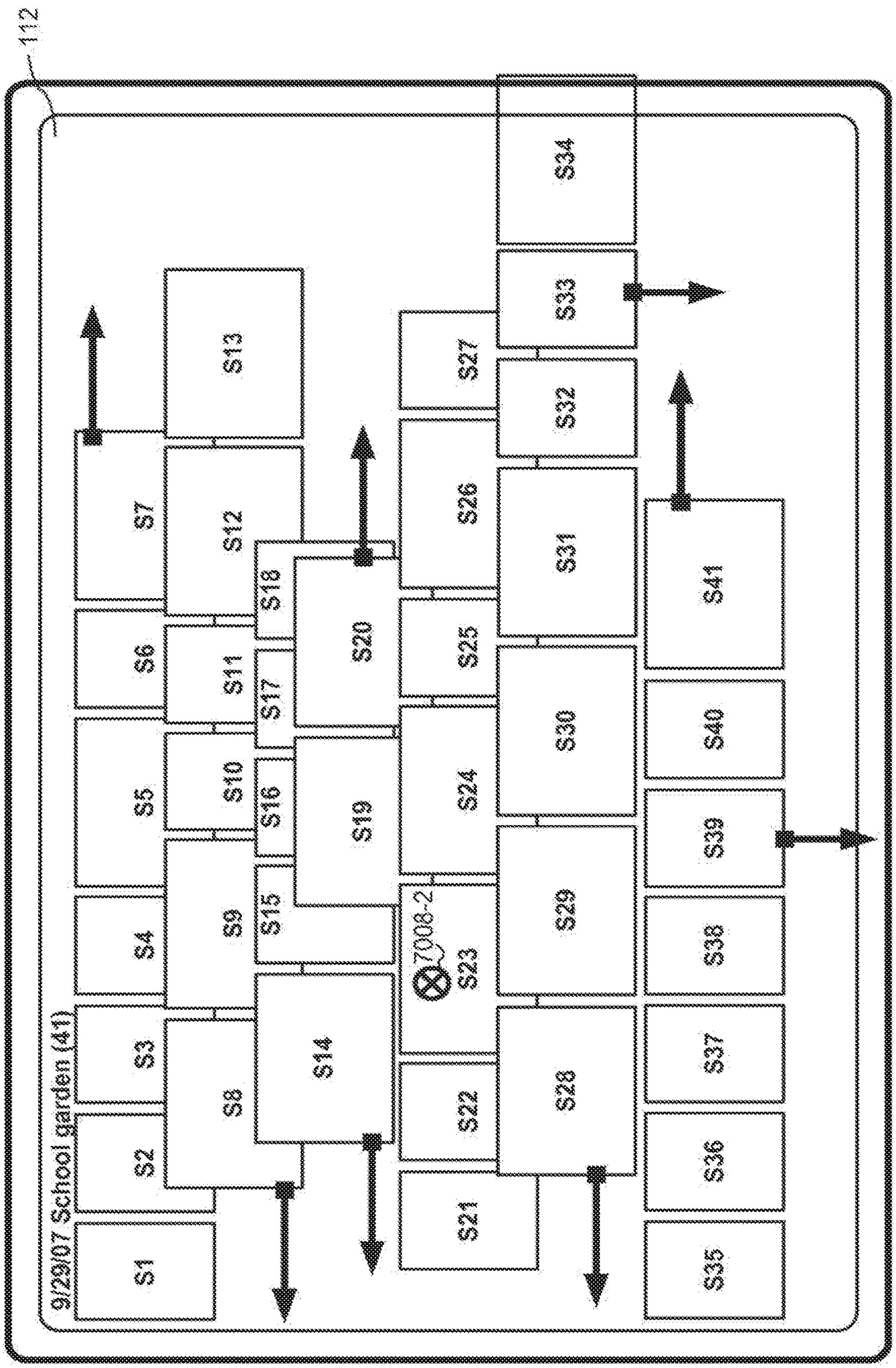
Figure 7H:
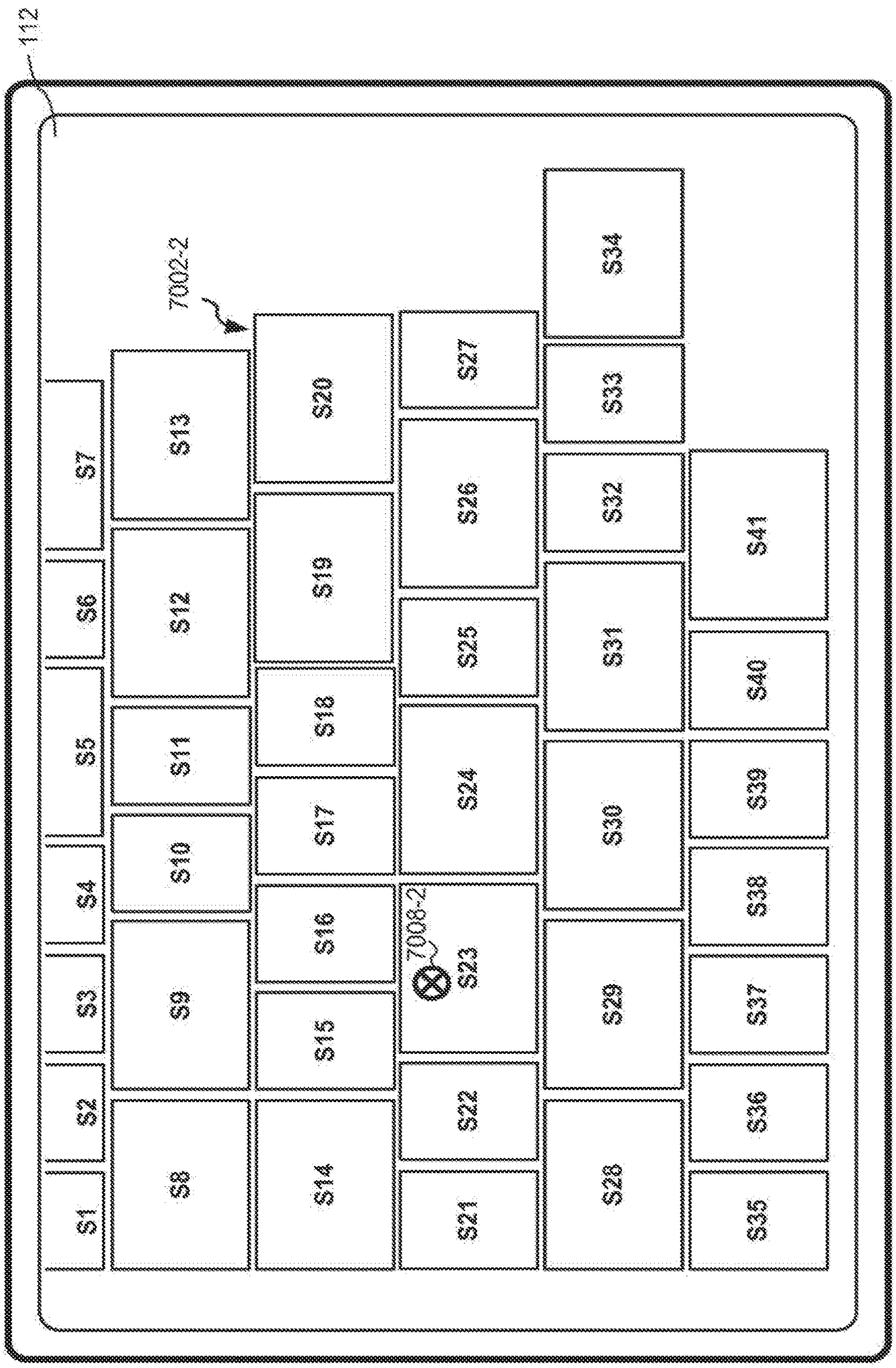
Figure 7I:
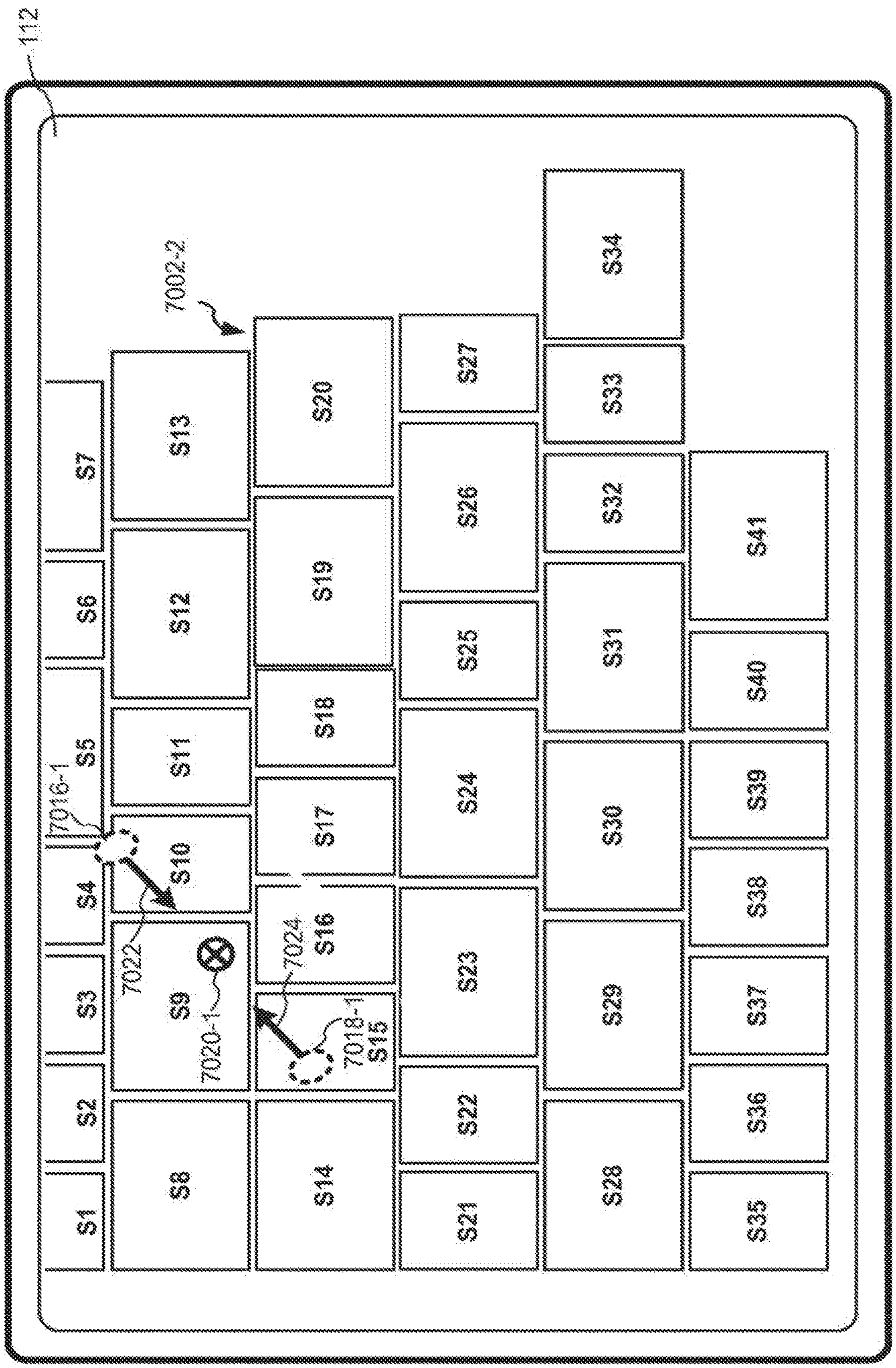
Figure 7J:
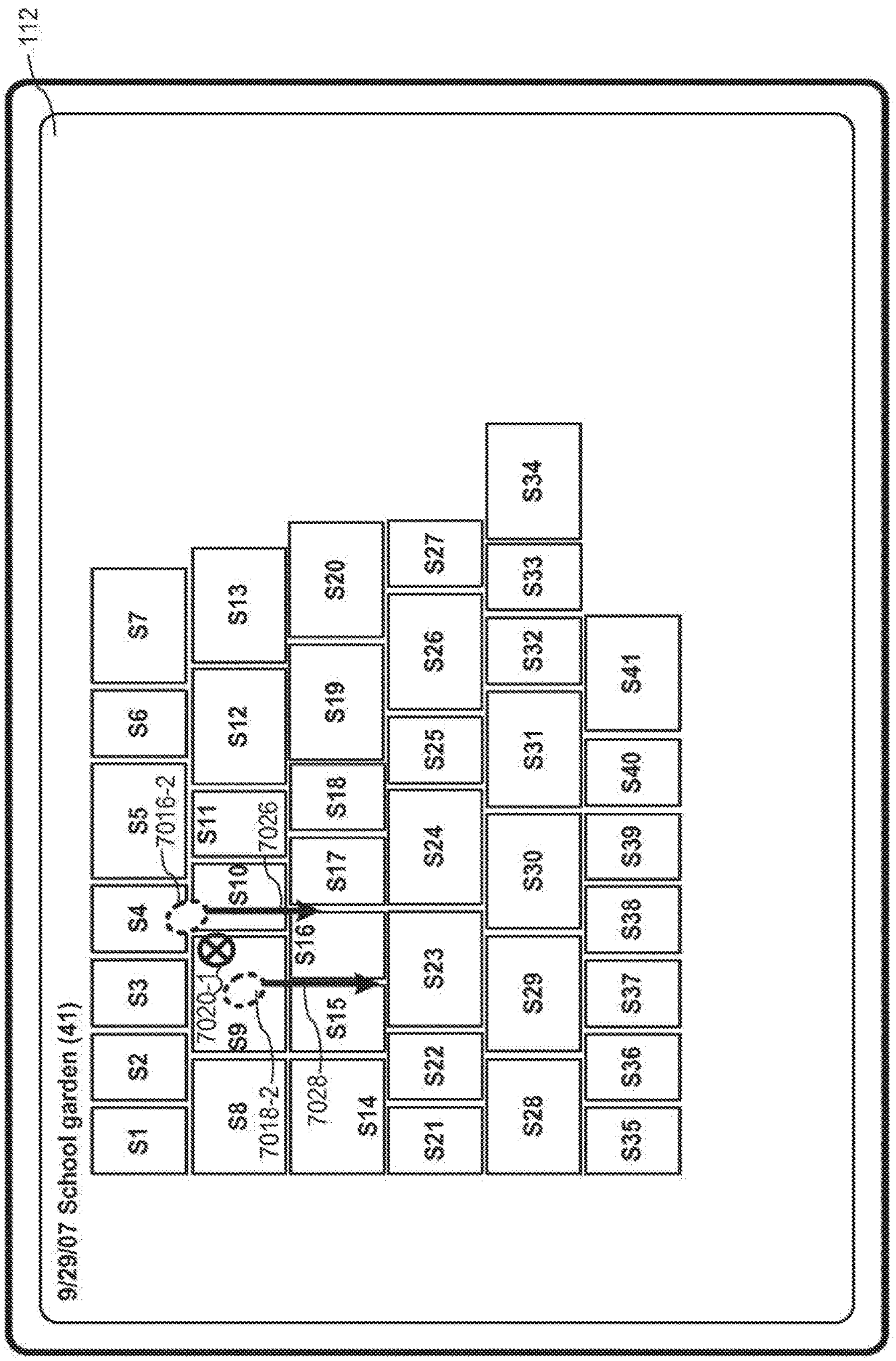
Figure 7K:
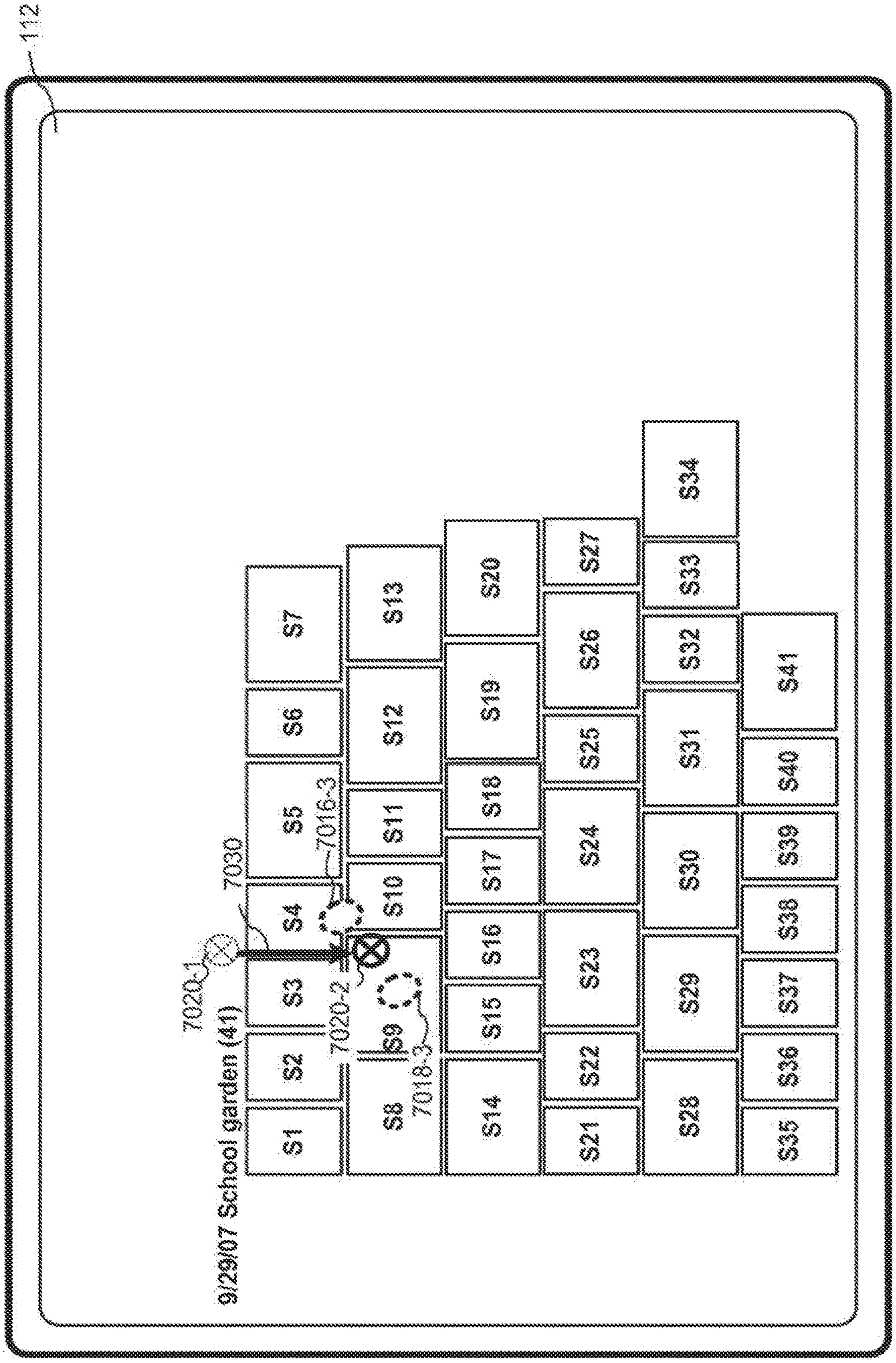
Figure 7L:
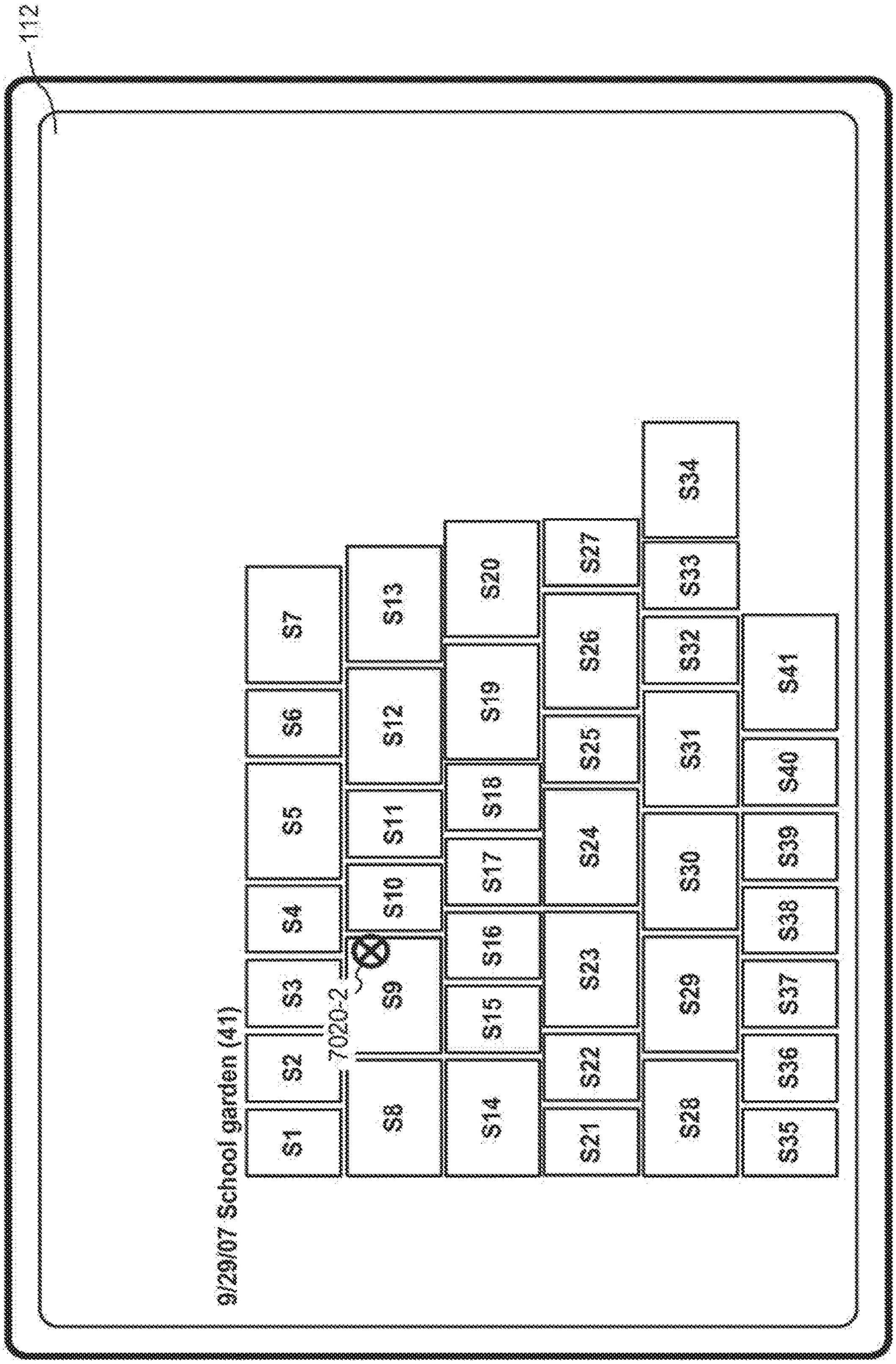
Figure 7M:
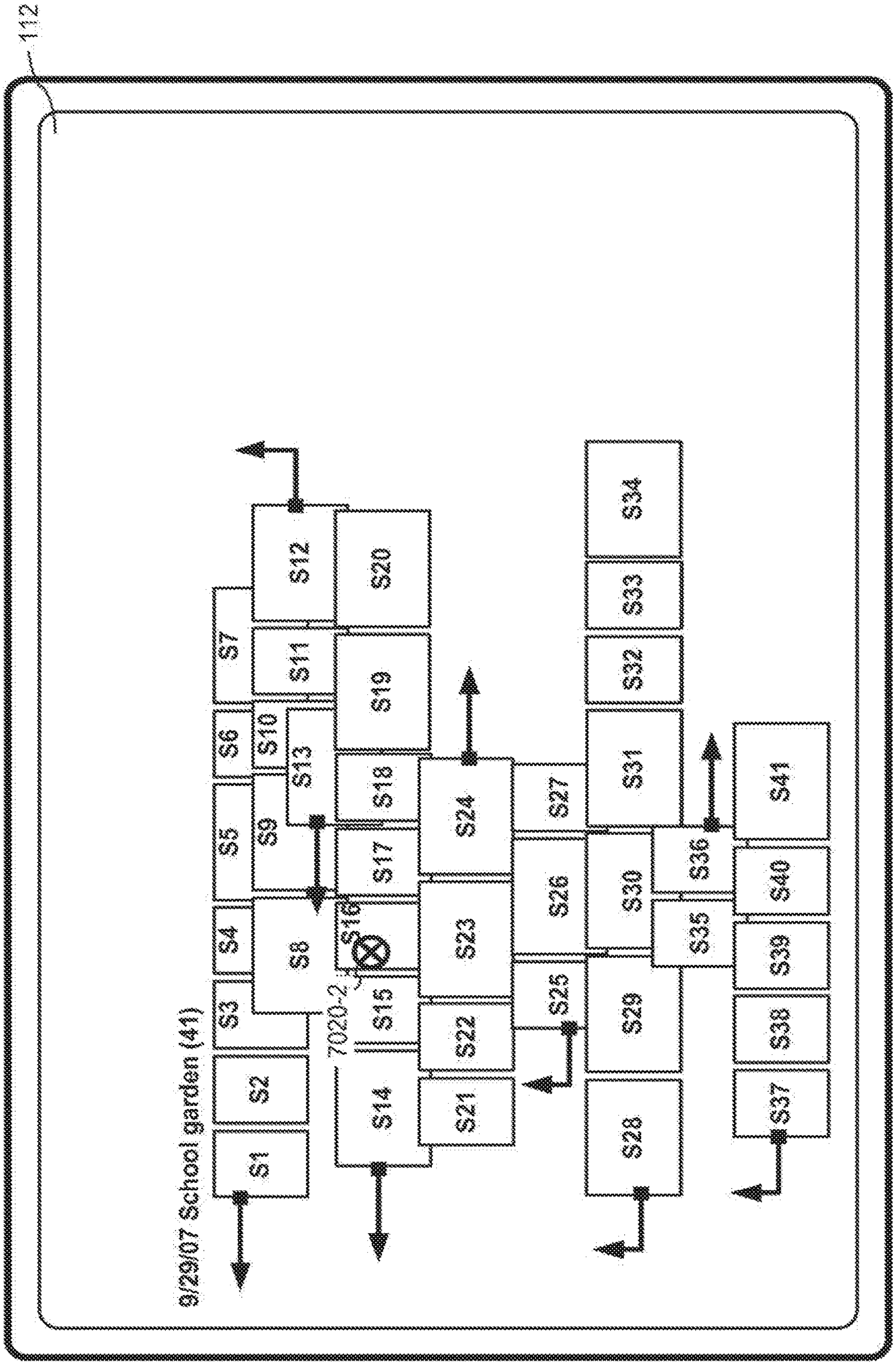
Figure 7N:
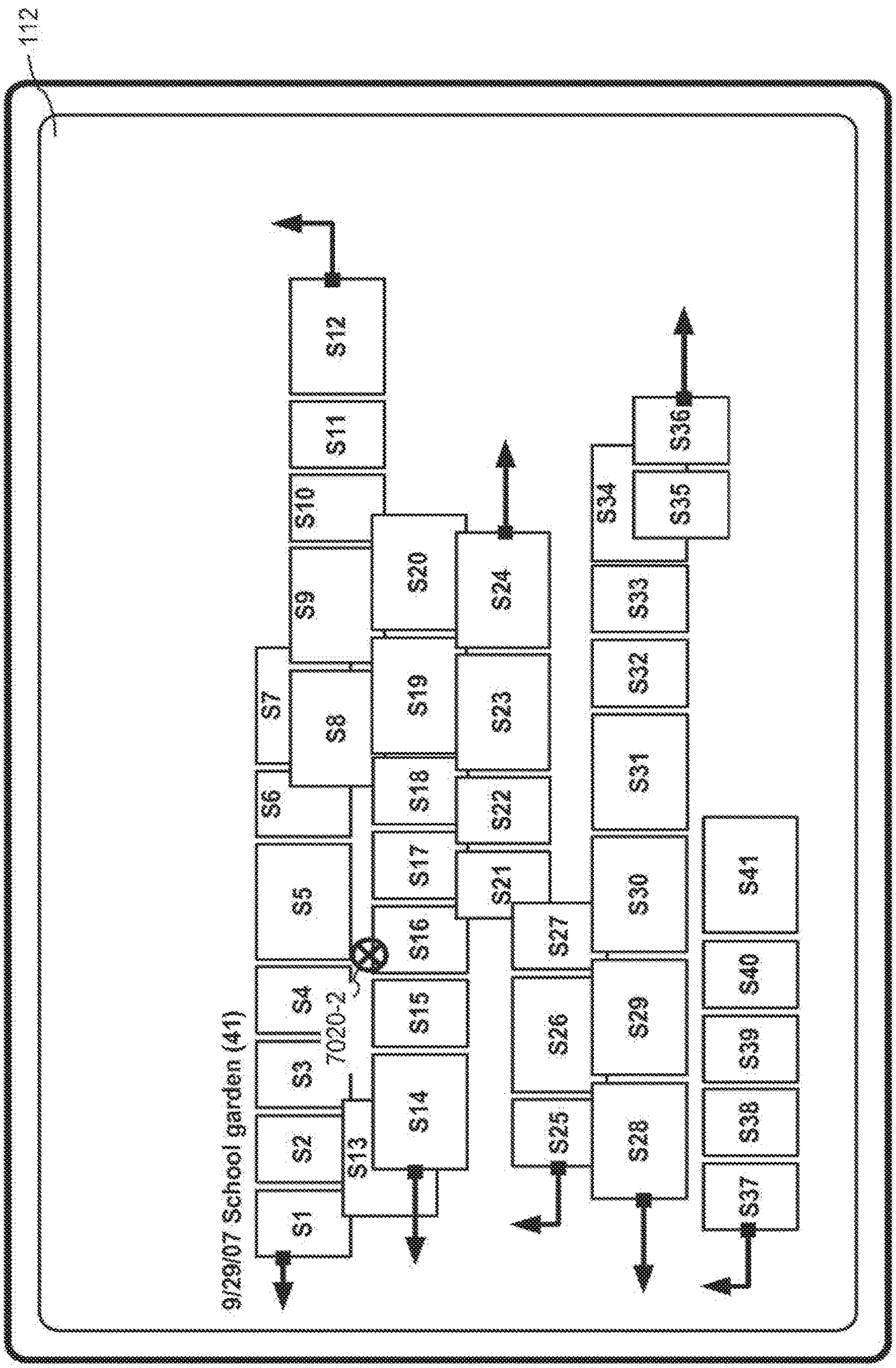
Figure 7O:
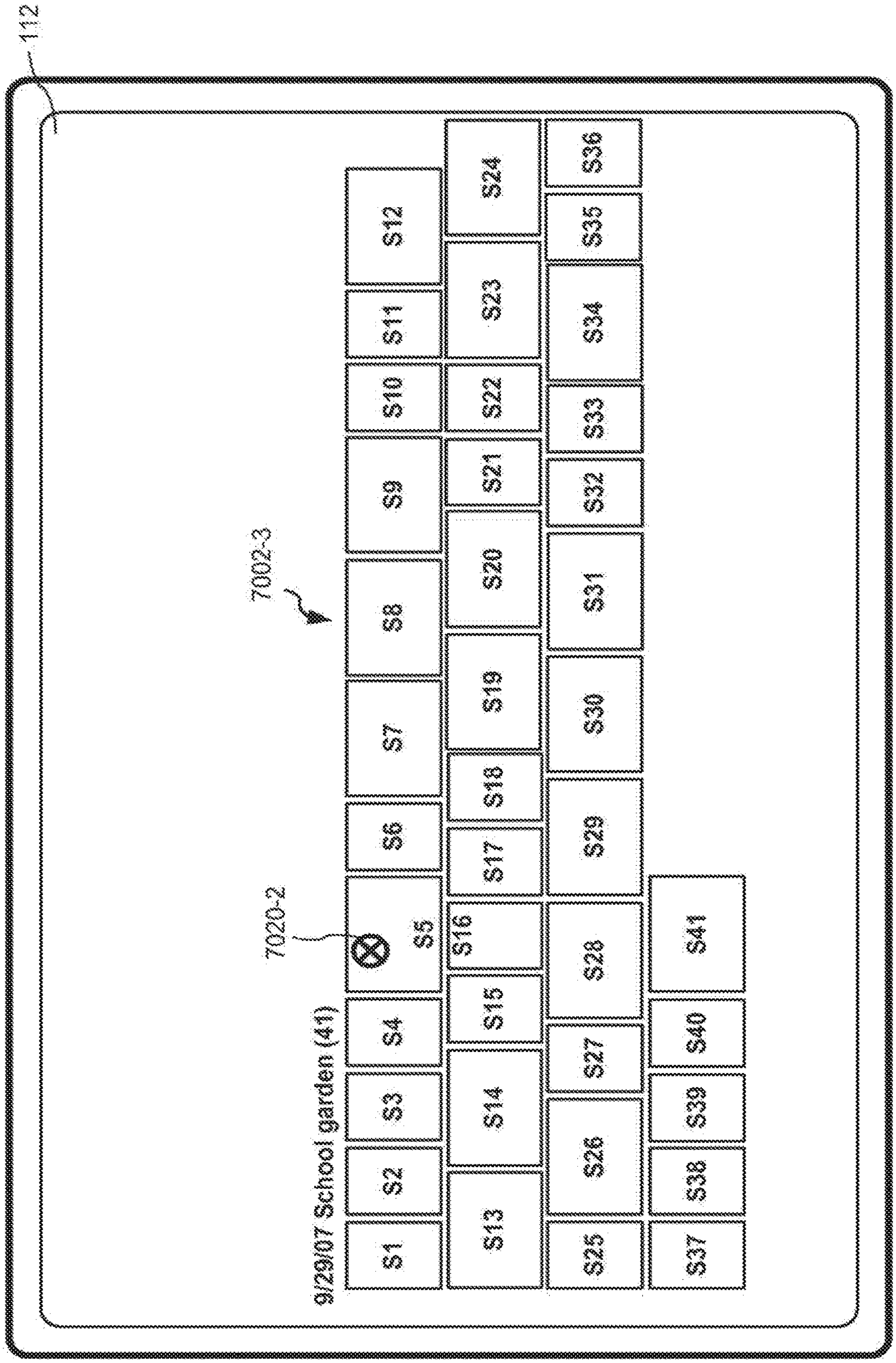

FIGS. 7A-7O illustrate exemplary user interfaces for zooming (e.g., zooming in) and rearranging user interface objects in an array with a multifinger gesture in accordance with some embodiments. The user interfaces in these figures are used to illustrate the processes described below, including the processes in FIGS. 13A-13B.

FIGS. 7A-7D illustrate exemplary user interfaces for zooming user interface objects (e.g., images S1-S41 in array 7002) in response to detecting a multifinger gesture (e.g., a depinching gesture made with contacts 7004 and 7006).

FIGS. 7D-7I illustrate exemplary user interfaces for rearranging user interface objects (e.g., images S1-S41) in response to detecting a release of user inputs (e.g., contacts 7004-2 and 7006-2 in FIG. 7D) after enlarging the array of user interface objects. Image S23, which was located at the centroid of the depinch gesture, is easy to locate after the rearrangement because it maintains its vertical position on the display, FIGS. 7I-7J illustrate exemplary user interfaces for zooming (e.g., zooming out) user interface objects (e.g., images S1-S41 in array 7002) in response to detecting a multifinger gesture (e.g., a pinching gesture made with contacts 7016 and 7018).

FIGS. 7J-7K illustrate exemplary user interfaces for changing the vertical position of the array of user interface objects (e.g., images S1-S41 in array 7002) in response to detecting a vertical change in the position of the centroid (e.g., 7020) of a plurality of user inputs (e.g., contacts 7016 and 7018).

FIGS. 7K-7O illustrate exemplary user interfaces for rearranging user interface objects (e.g., images S1-S41) in response to detecting a release of user inputs (e.g., contacts 7016-3 and 7018-3 in FIG. 7K) after reducing the array of user interface objects. Image S9, which was located at the centroid of the pinch gesture, is easy to locate after the rearrangement because it maintains its vertical position on the display, FIGS. 8A-8UU illustrate exemplary user interfaces for manipulating user interface objects in a plurality of arrays of user interface objects in accordance with some embodiments. The user interfaces in these figures are used to illustrate the processes described below, including the processes in FIGS. 14A-14I, 15A-15B, 16A-16B, and 17A-17B.

Figure 8A:
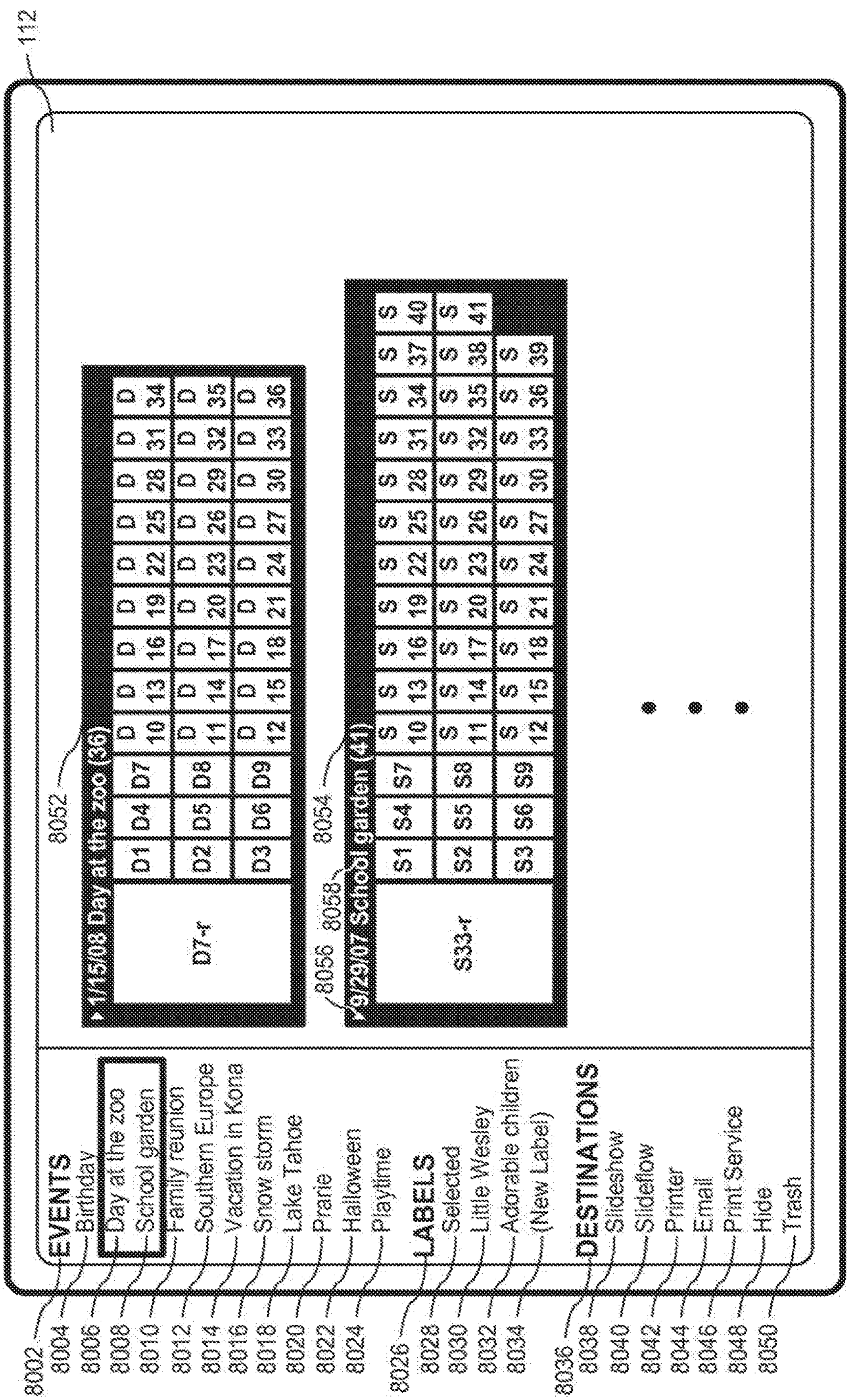
FIGS. 8A-8UU illustrate exemplary user interfaces for manipulating user interface objects in a plurality of arrays of user interface objects in accordance with some embodiments.
Figure 8B:
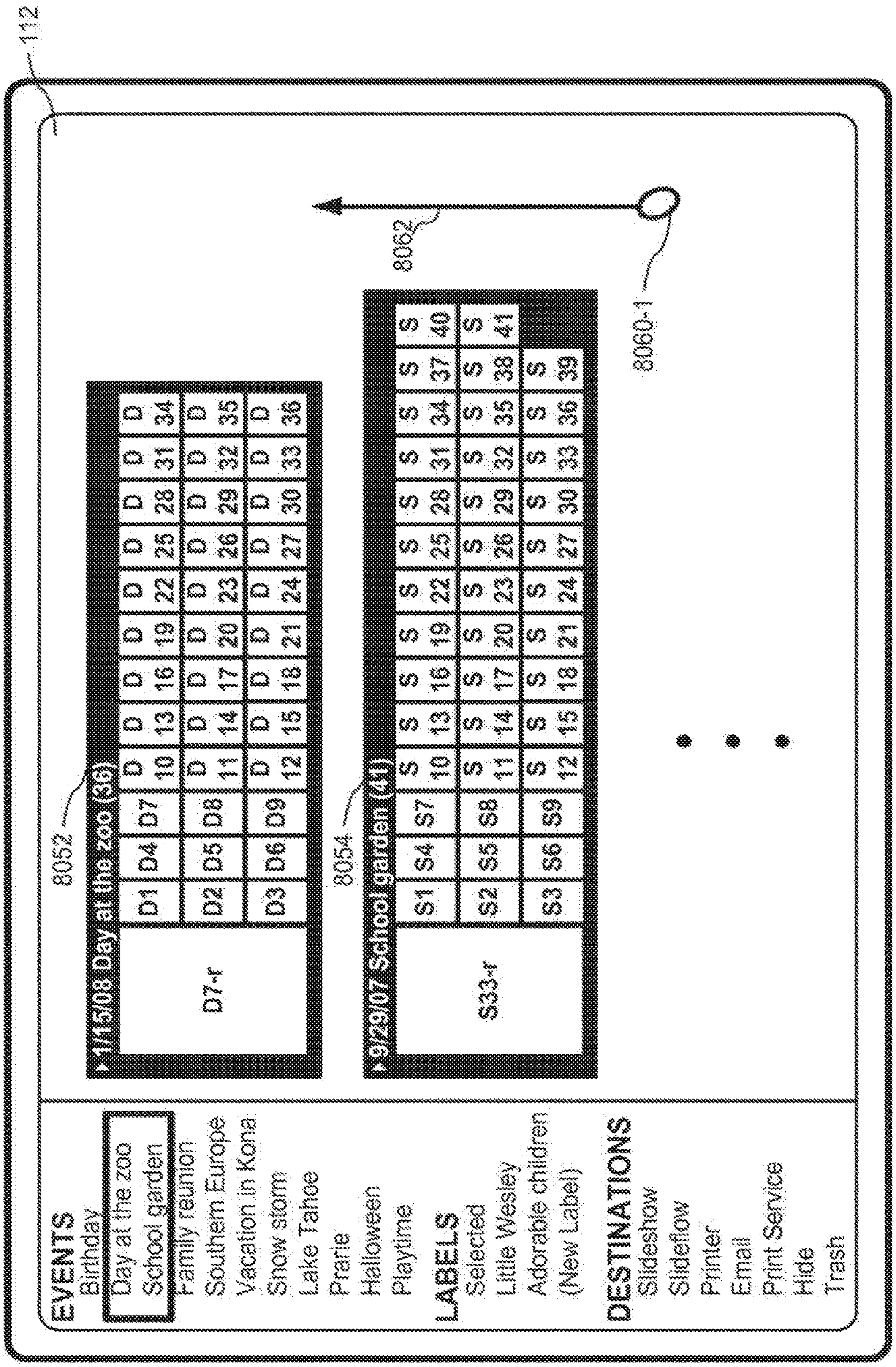

FIGS. 8A-8D illustrate exemplary user interfaces for vertically scrolling a plurality of arrays (e.g., arrays 8052, 8054, 8064, and 8066) of user interface objects in response to detecting a user input (e.g., a substantially vertical swipe gesture that includes contact 8060 and movement 8062 of the contact, FIG. 8B).

Figure 8C:
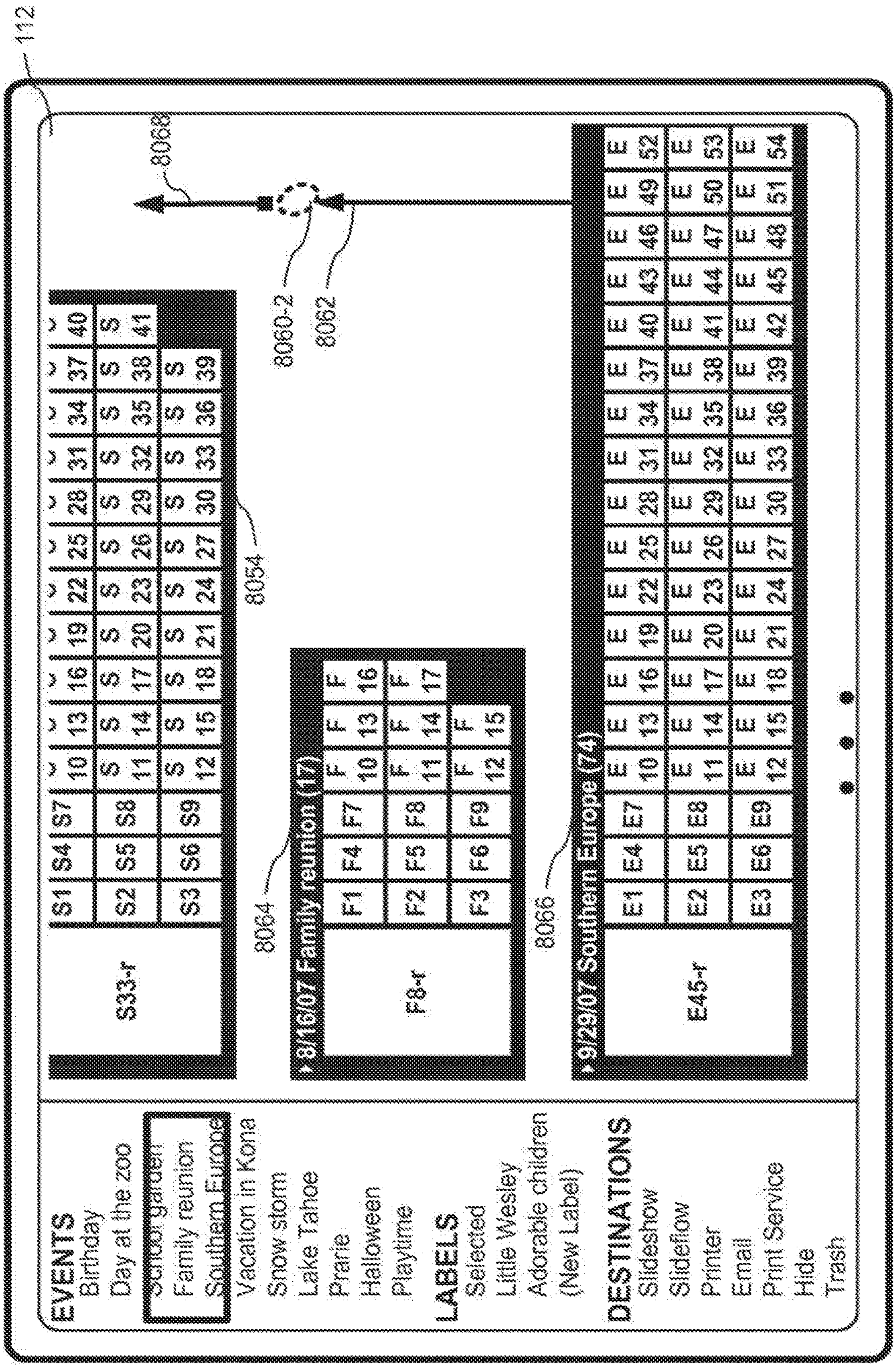
Figure 8D:
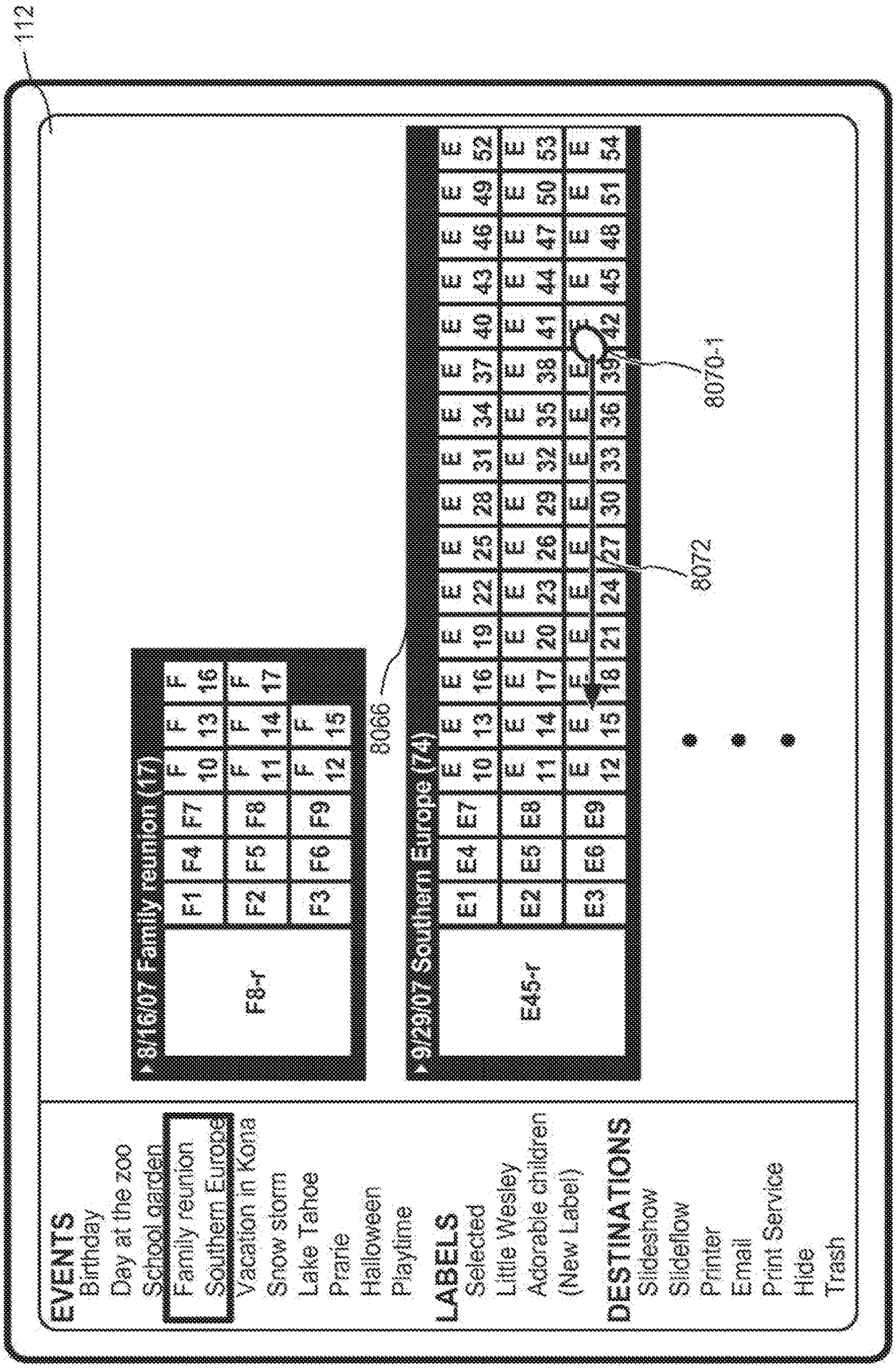
Figure 8E:
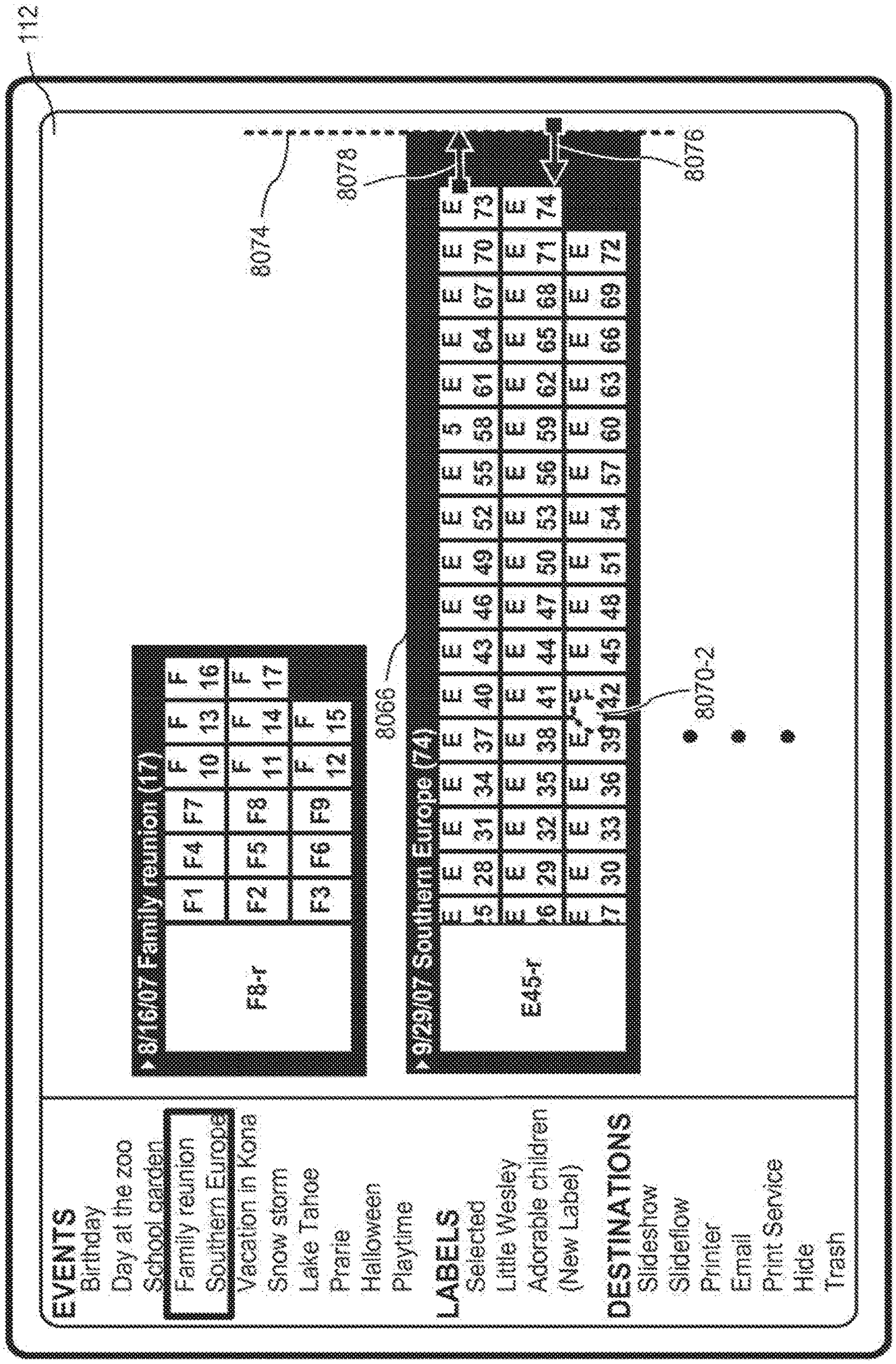
Figure 8F:
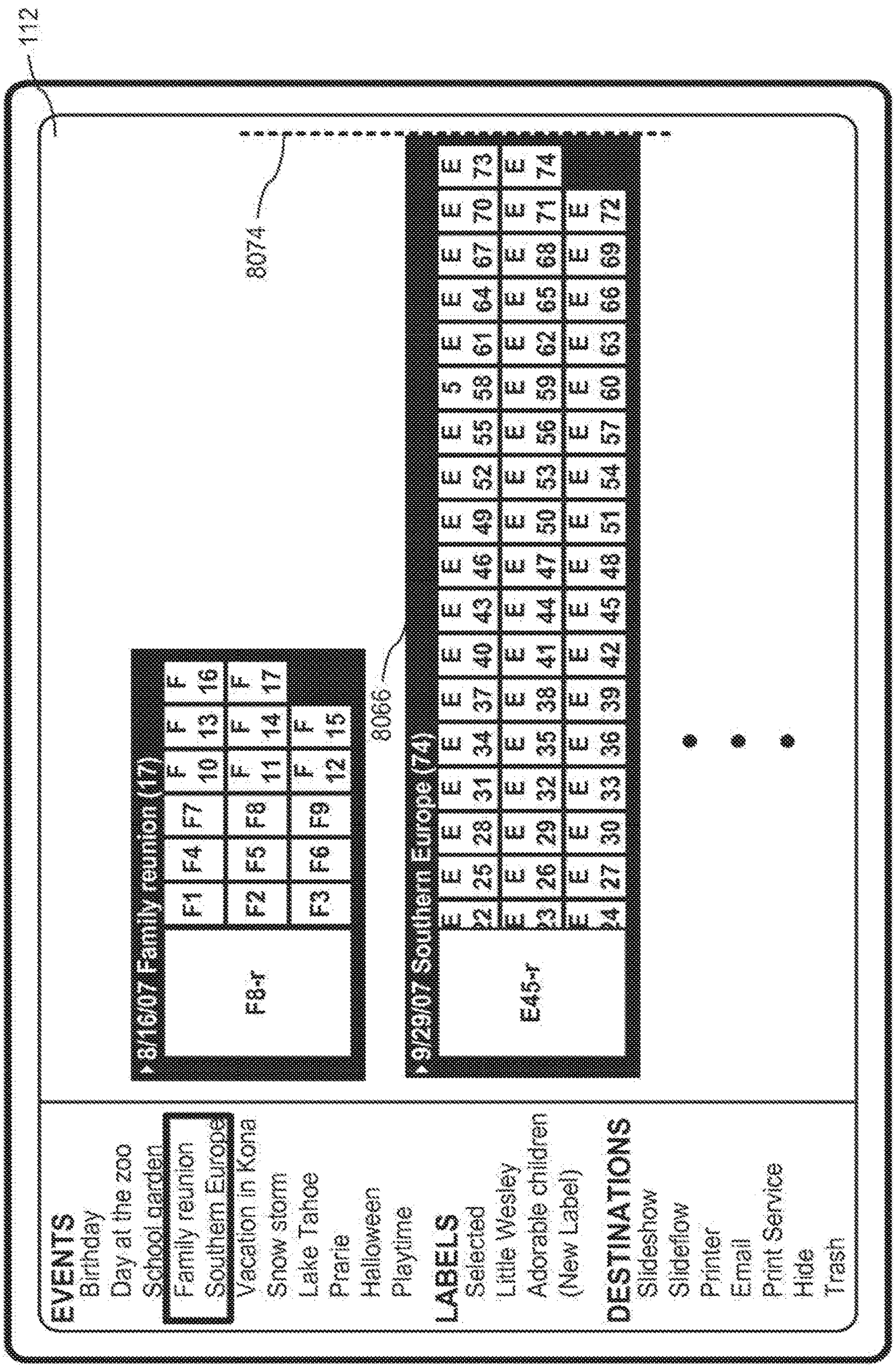
Figure 8G:
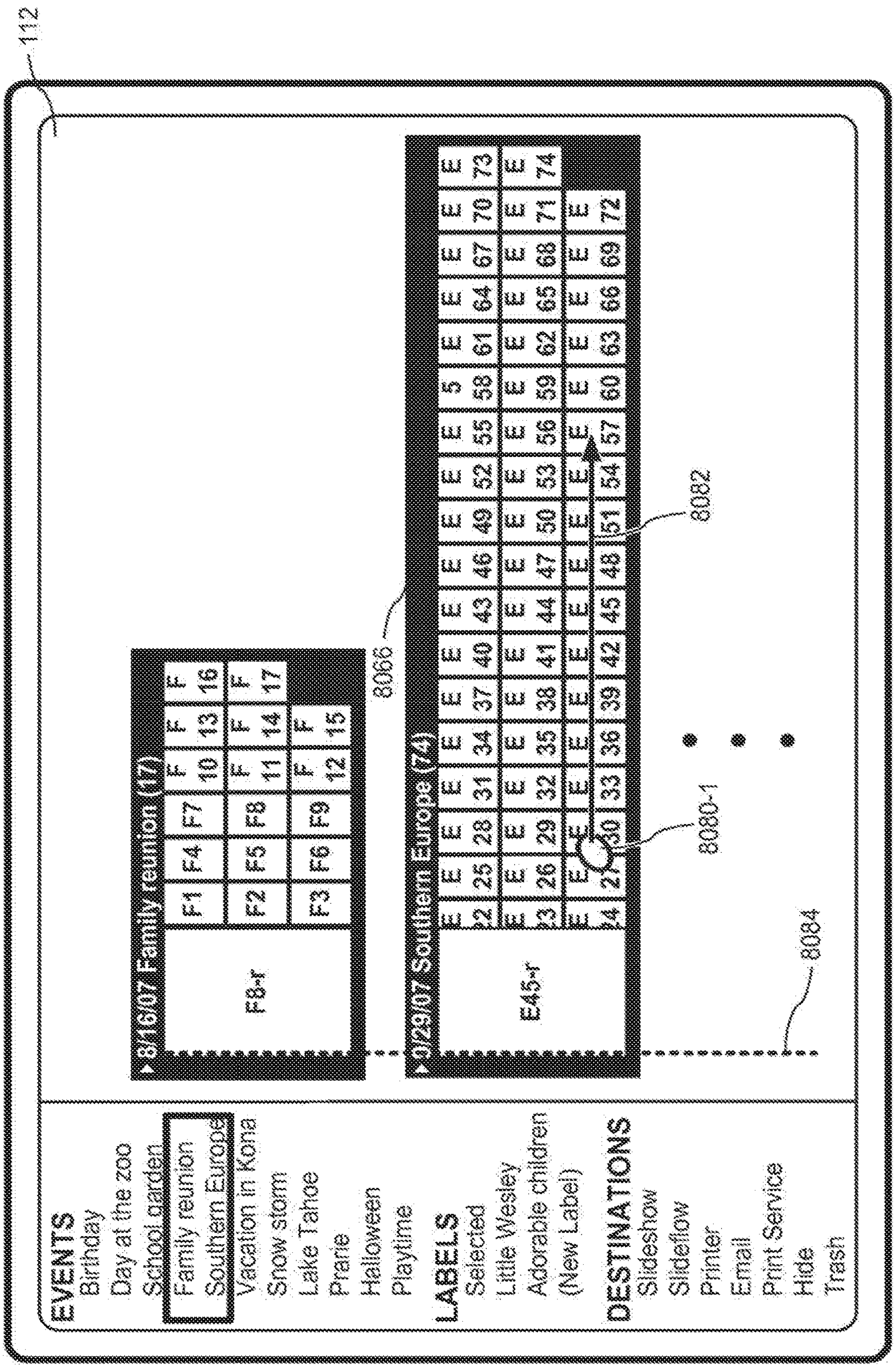
Figure 8H:
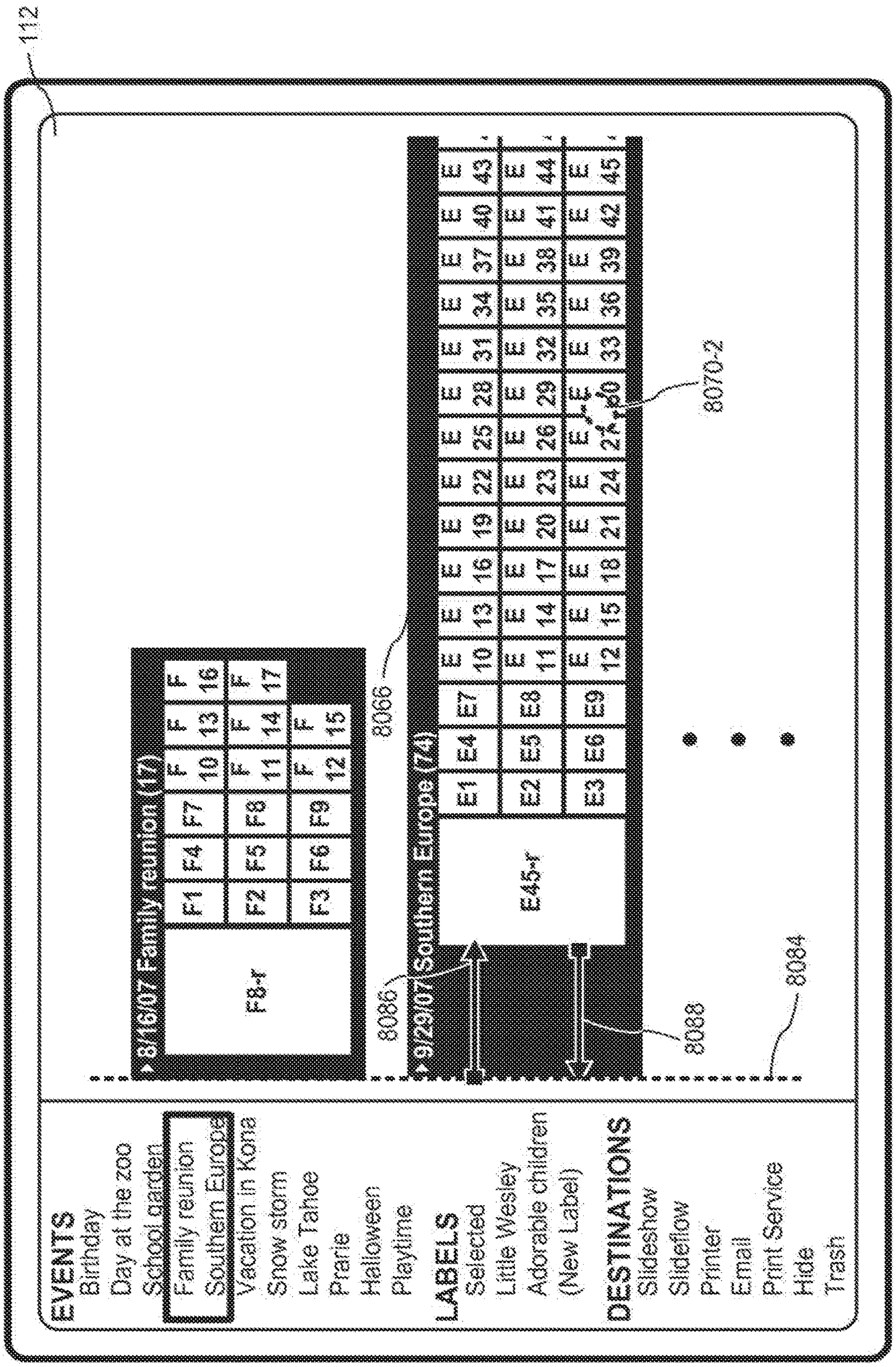

FIGS. 8D-8I illustrate exemplary user interfaces for horizontally scrolling an array (e.g., 8066) of user interface objects (e.g., images E1-E74) without scrolling the other arrays (e.g., arrays 8052, 8054, and 8064) of user interface objects in response to detecting a user input (e.g., a horizontal swipe gesture, such as contact 8070 and movement 8072 of the contact in FIG. 8D or contact 8080 and movement 8082 of the contact in FIG. 8G). FIGS. 8E-8F illustrate a rubber-band-like effect to indicate that the end of array 8066 is being displayed during detection of a horizontal scrolling gesture. FIGS. 8G-8H illustrate a rubber-band-like effect to indicate that the beginning of array 8066 is being displayed during detection of a horizontal scrolling gesture.

Figure 8I:
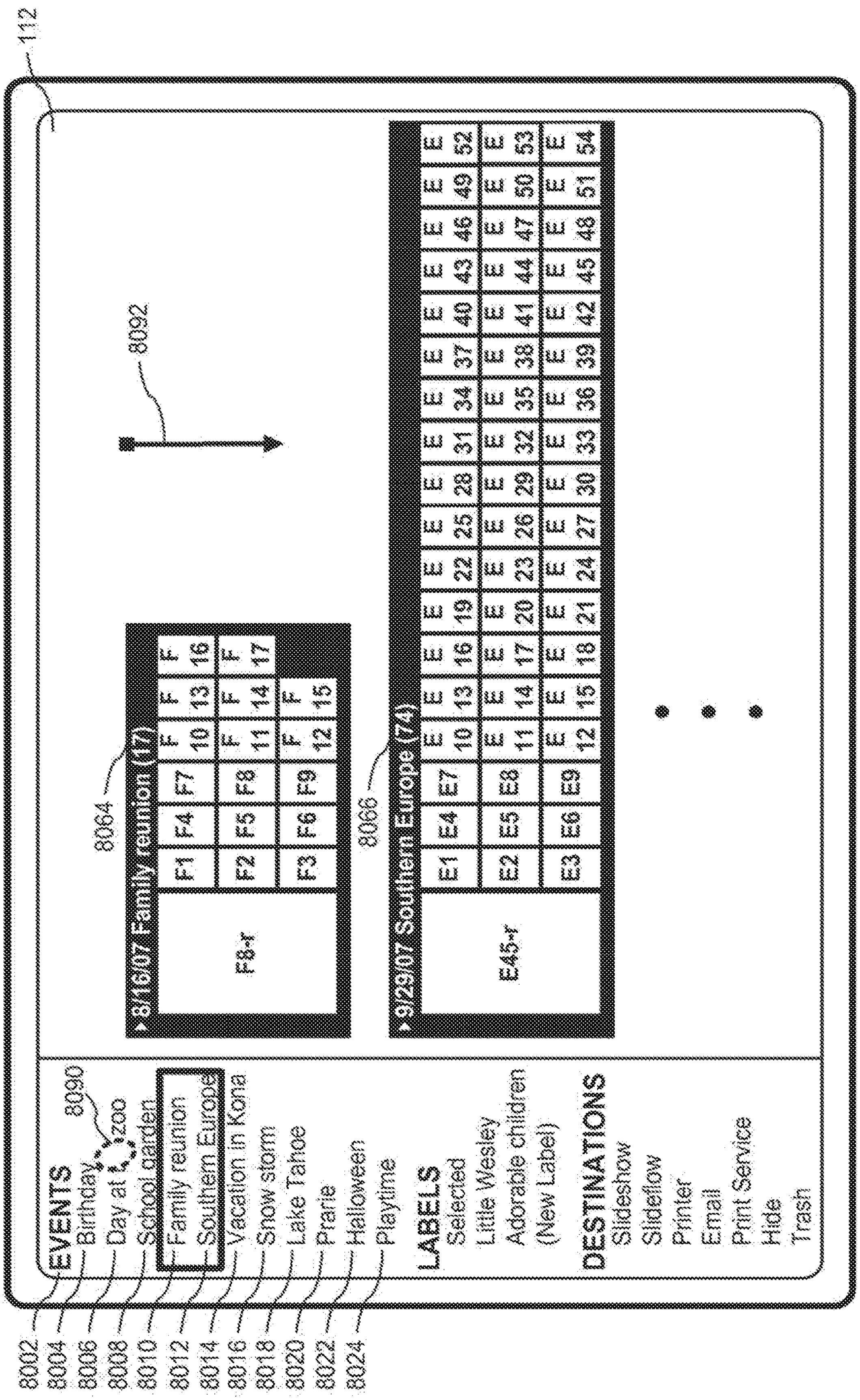
Figure 8J:
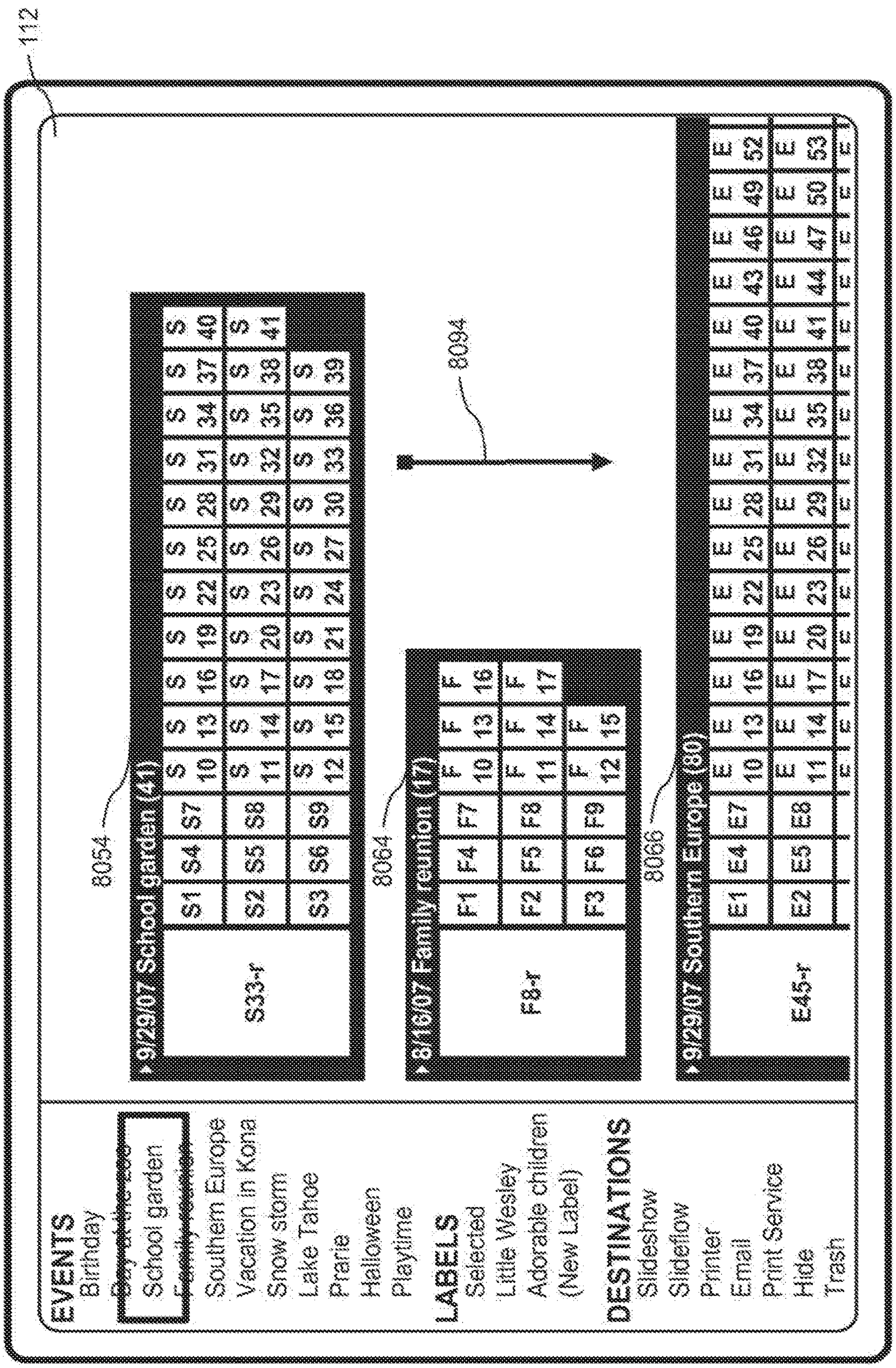
Figure 8K:
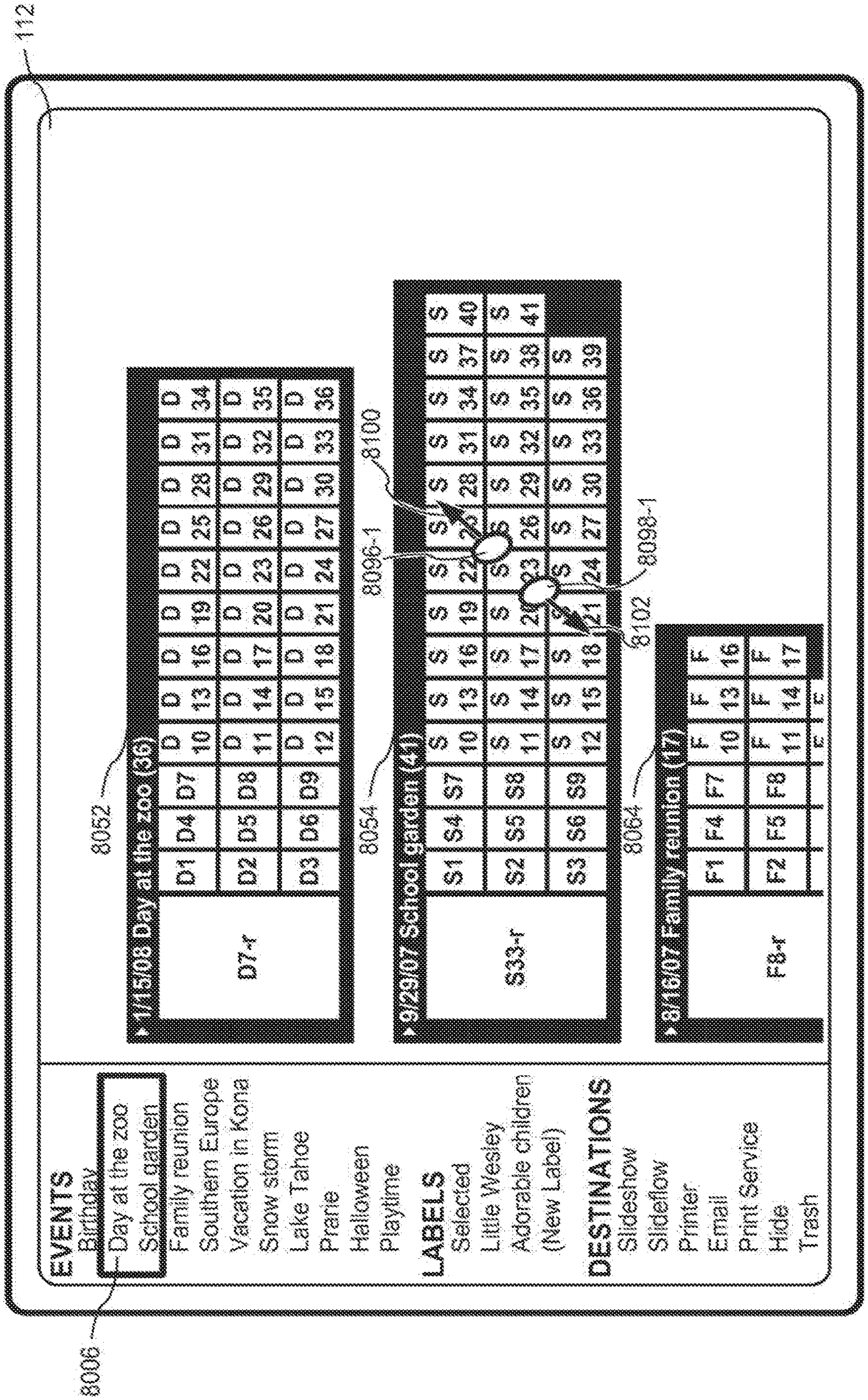

FIGS. 8I-8K illustrate exemplary user interfaces for scrolling a plurality of arrays (e.g., 8052, 8054, 8064 and 8066) to a particular array (e.g., 8052) in response to detecting a user input (e.g., tap gesture 8090 in FIG. 8I) on an array name icon (e.g., 8008) that is associated with the particular array (e.g., 8052).

Figure 8L:
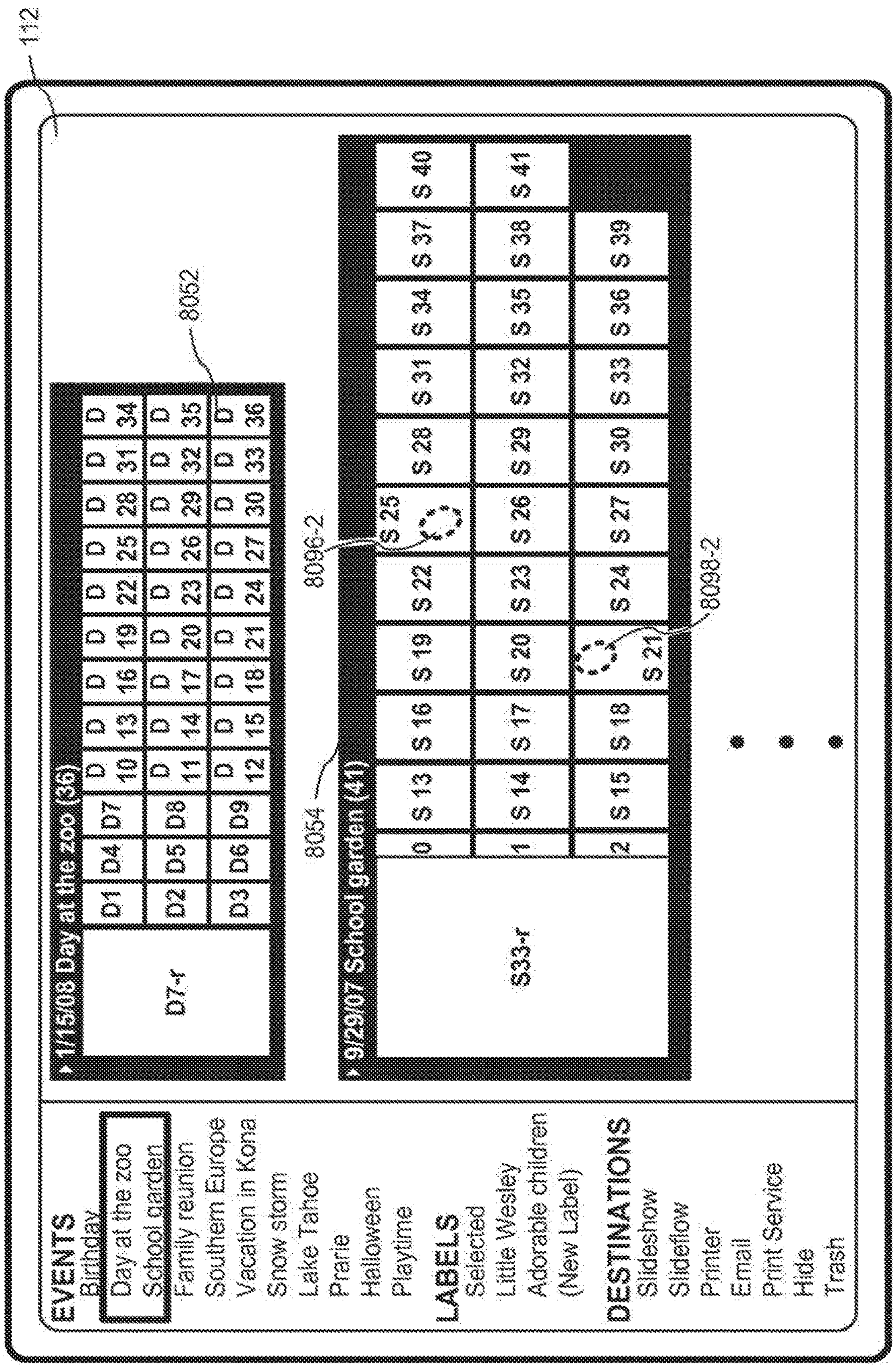
Figure 8M:
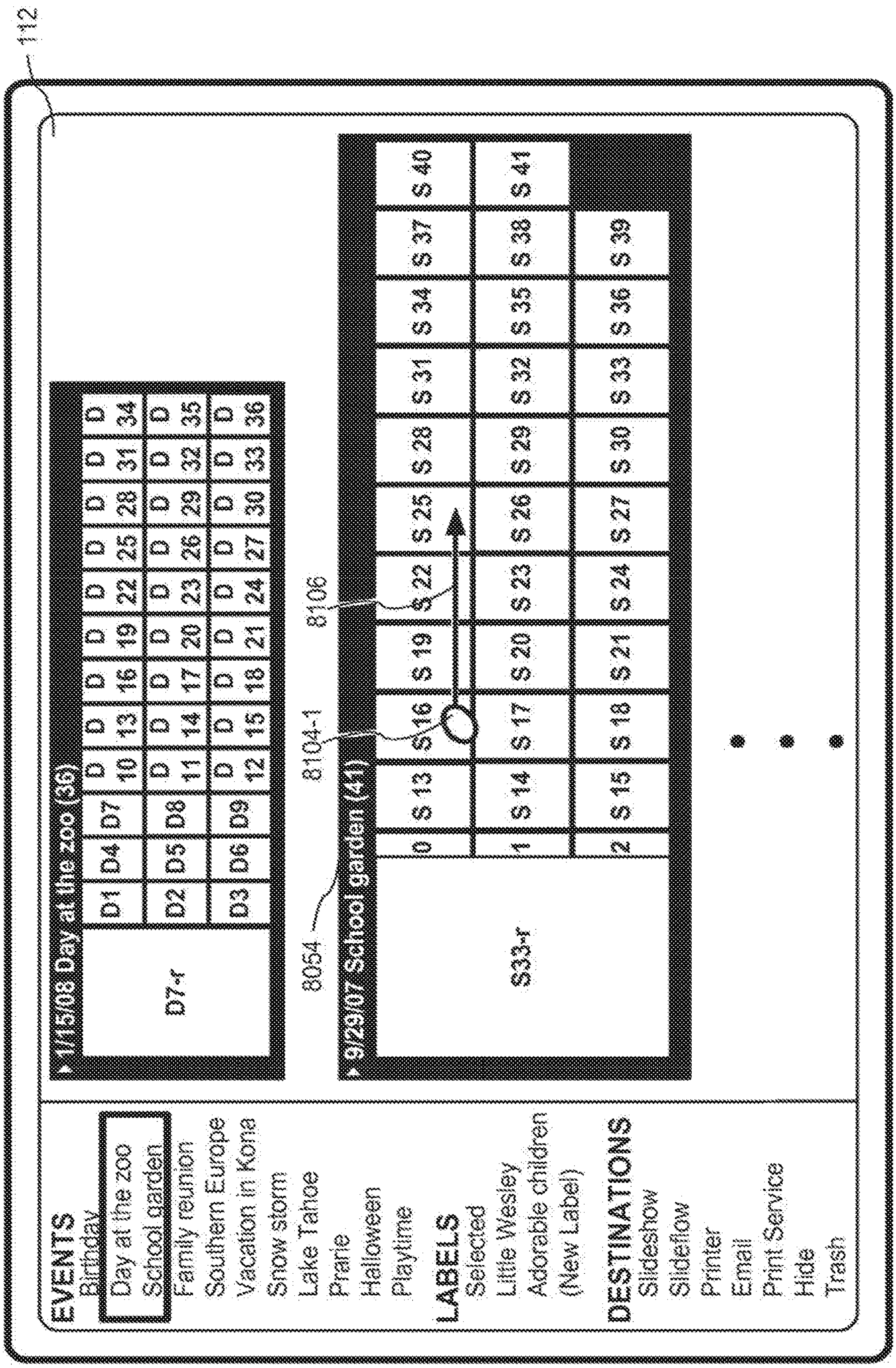
Figure 8N:
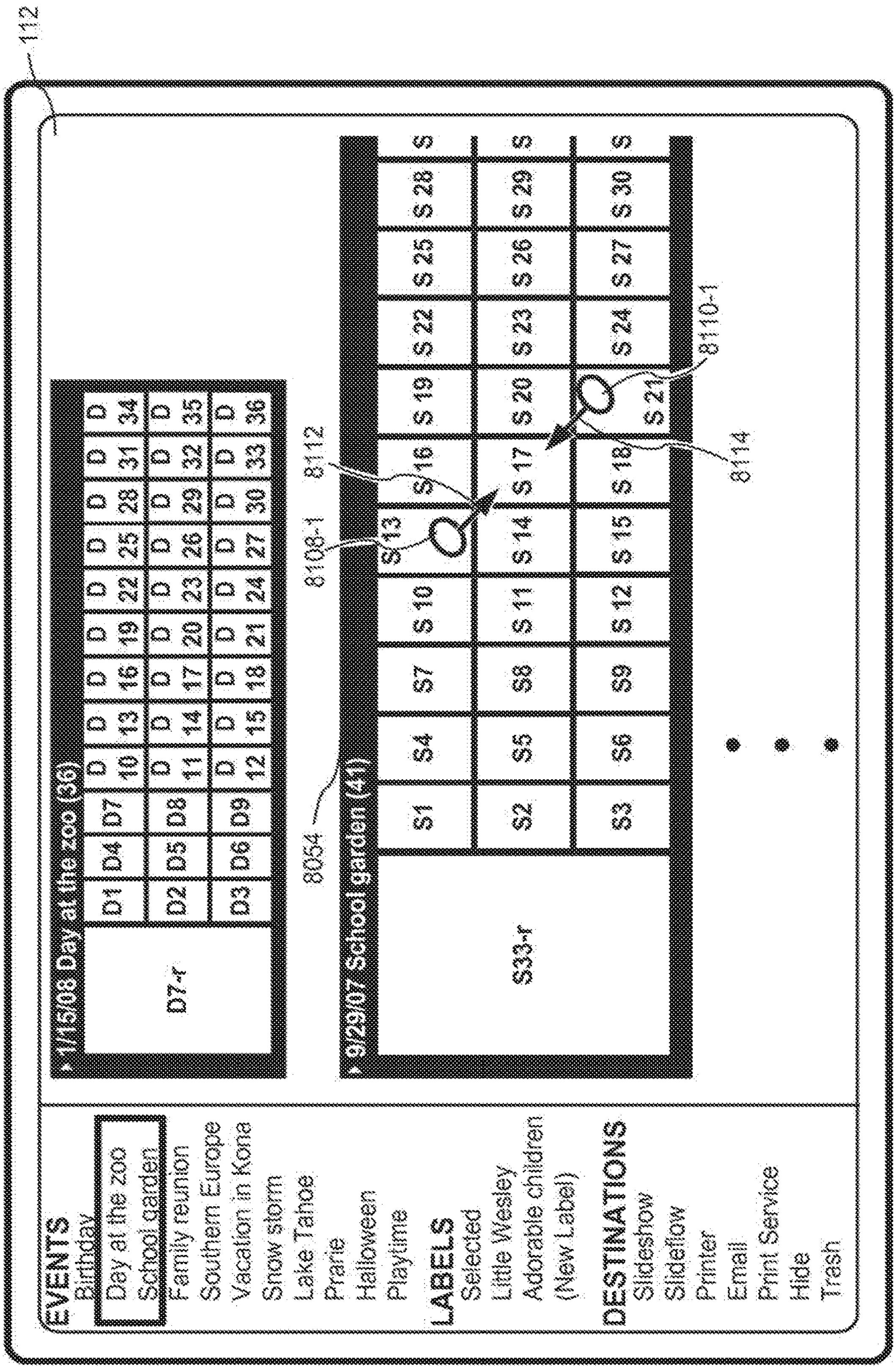

FIGS. 8K-5P illustrate exemplary user interfaces for resizing one array (e.g., 8054) in the plurality of arrays, without resizing other arrays in the plurality of arrays in response to detecting an input from the user (e.g., enlarging array 8054 in response to detecting a depinch gesture that includes contacts 8096 and 8098 in FIG. 8K, or reducing the size of array 8054 in response to detecting a pinch gesture that includes contacts 8108 and 8110 in FIG. 8N).

Figure 8O:
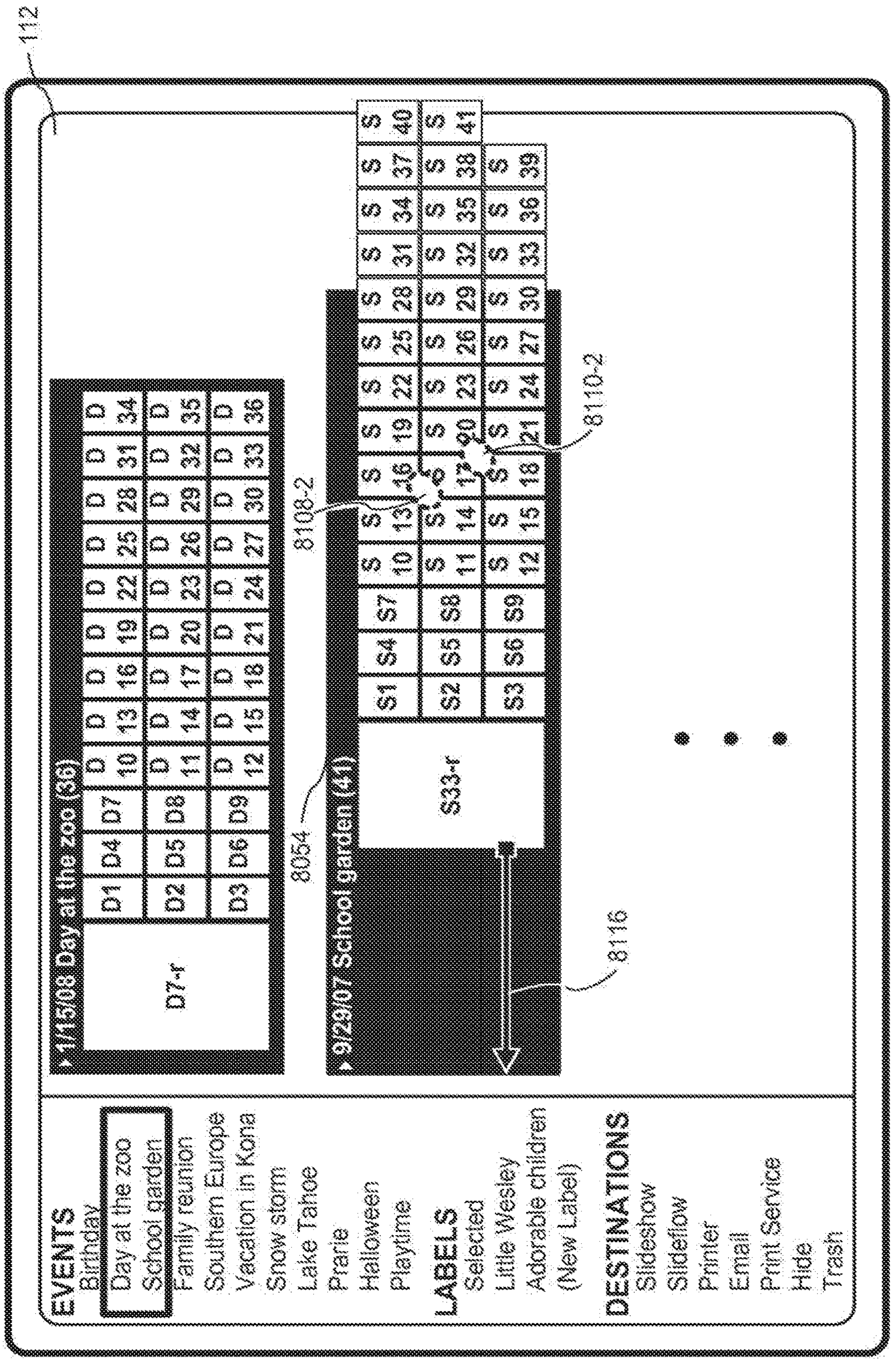
Figure 8P:
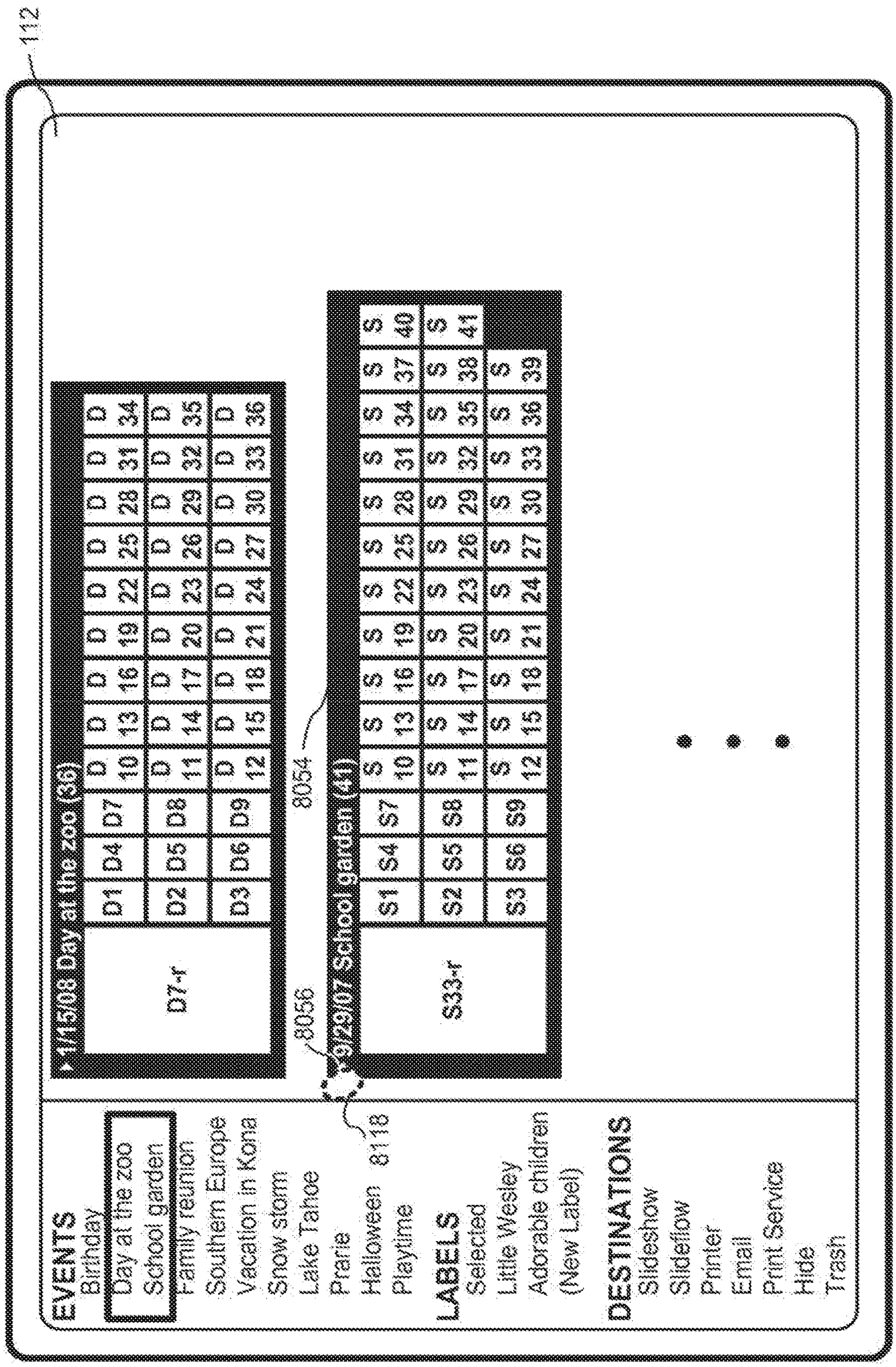
Figure 8Q:
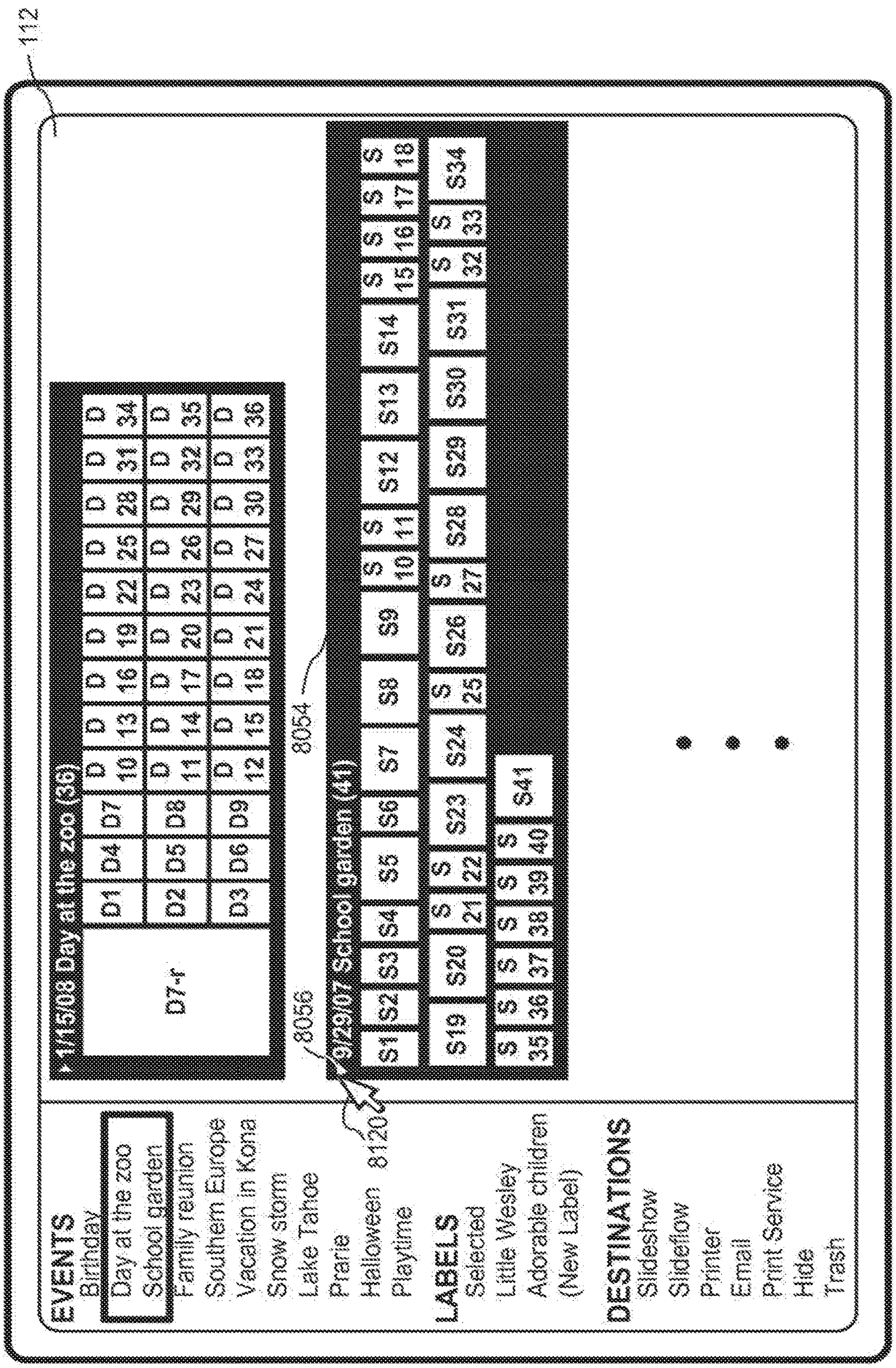
Figure 8R:
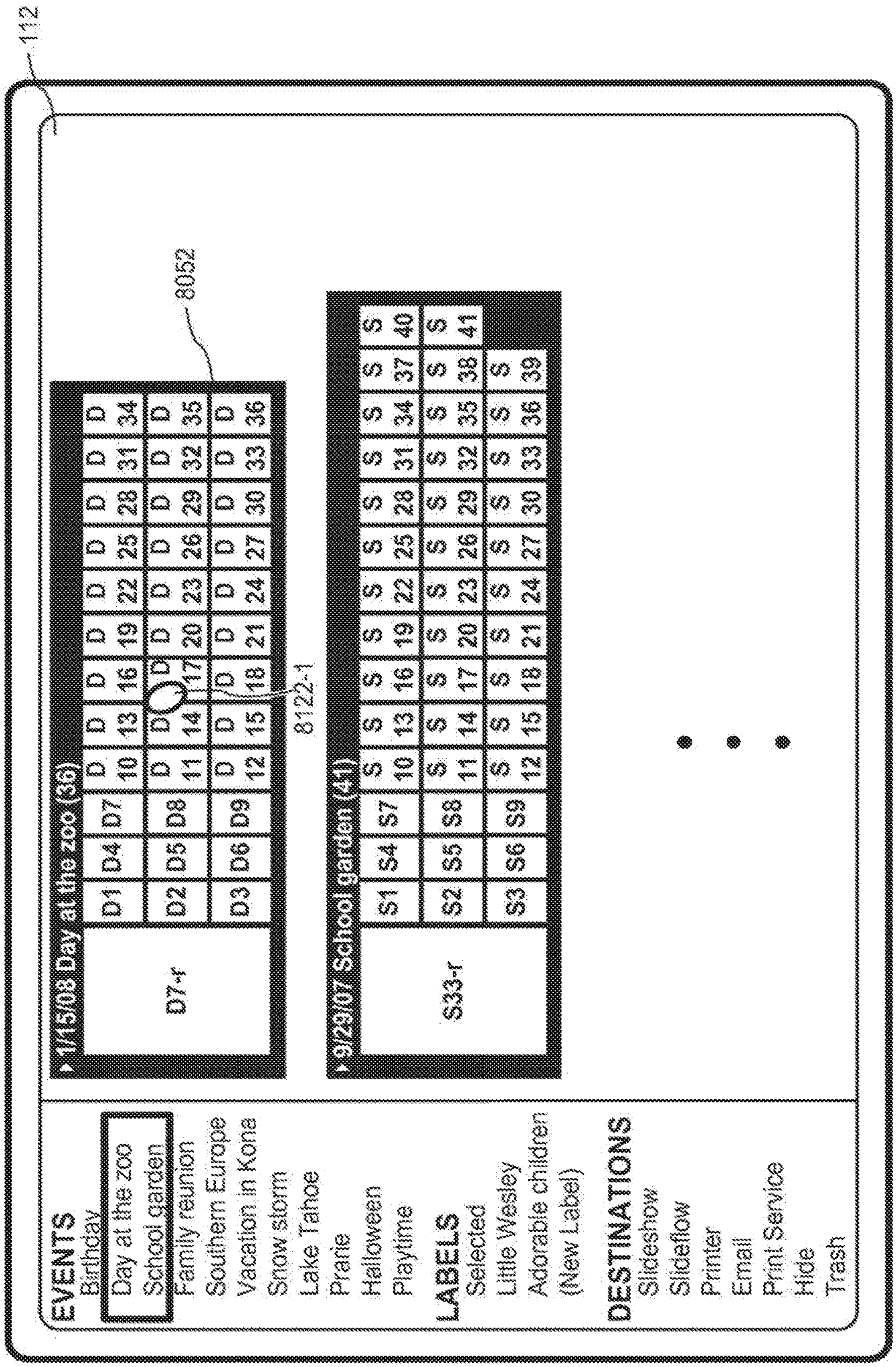

FIGS. 8P-8R illustrate exemplary user interfaces for toggling the display of a representative user interface object (e.g., representative image S33-*r*) for an array (e.g., 8054) in response to detecting a user input on a representative user interface object toggle icon 8056 (e.g., tap gesture 8118 in FIG. 8P or a mouse click while a cursor 8120 is on the representative user interface object toggle icon 8056 in FIG. 8Q). These figures also illustrate exemplary user interfaces for rearranging the user interface objects (e.g., images S1-S41) concurrently with toggling the display of the representative user interface object.

Figure 8S:
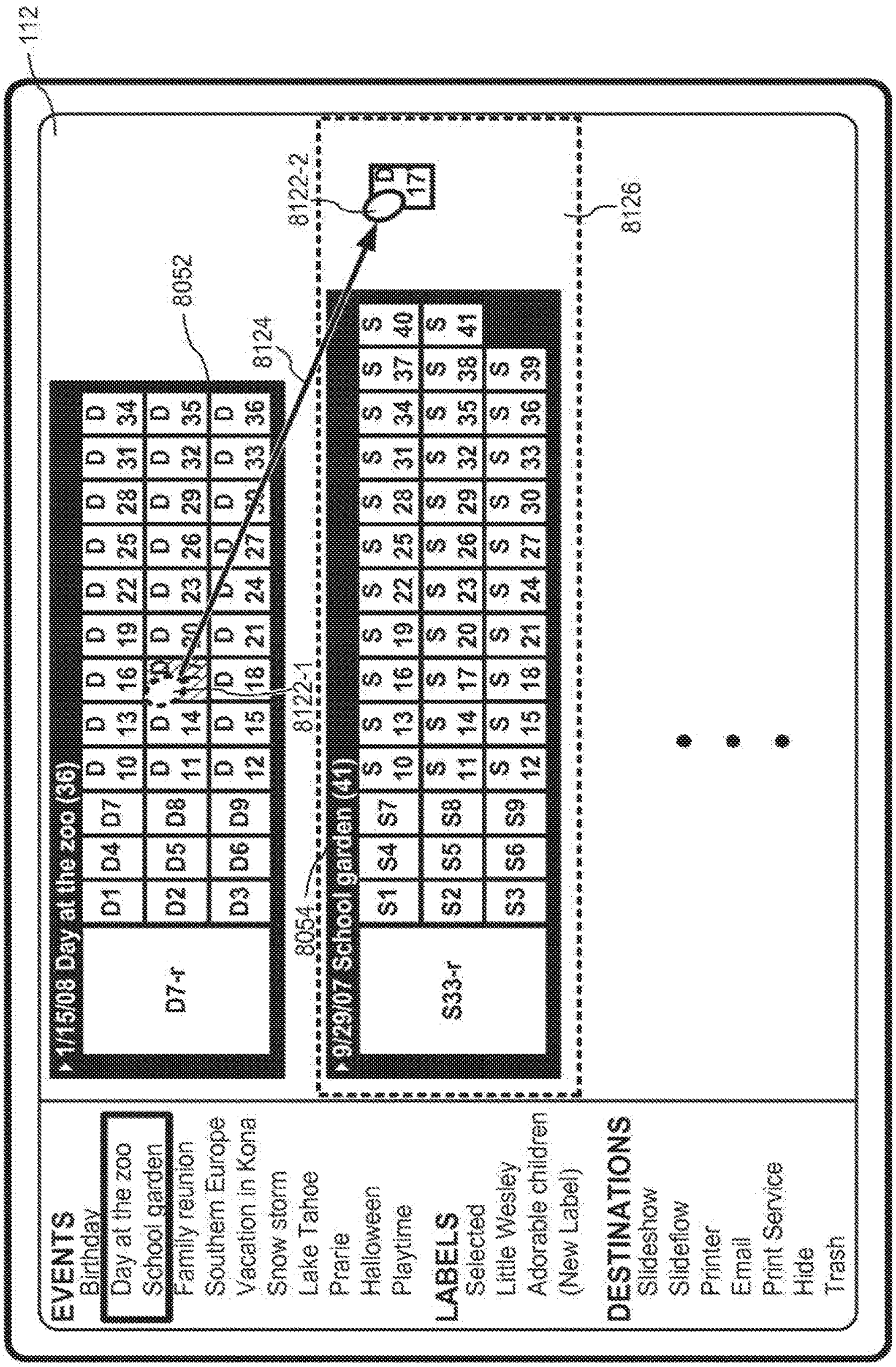

FIGS. 8R-8V illustrate exemplary user interfaces for associating a user interface object (e.g., image D17) in a first array 8052 of user interface objects with a second array 8054 of user interface objects in response to detecting a user input (e.g., contact 8122 and movement 8124 of the contact to an area 8126 associated with the array 8054 in FIG. 8S) and subsequent cessation of the input. In this example, image D17 in the "Day at the zoo" event array 8052 is added to the "School garden" event array 8054.

Figure 8T:
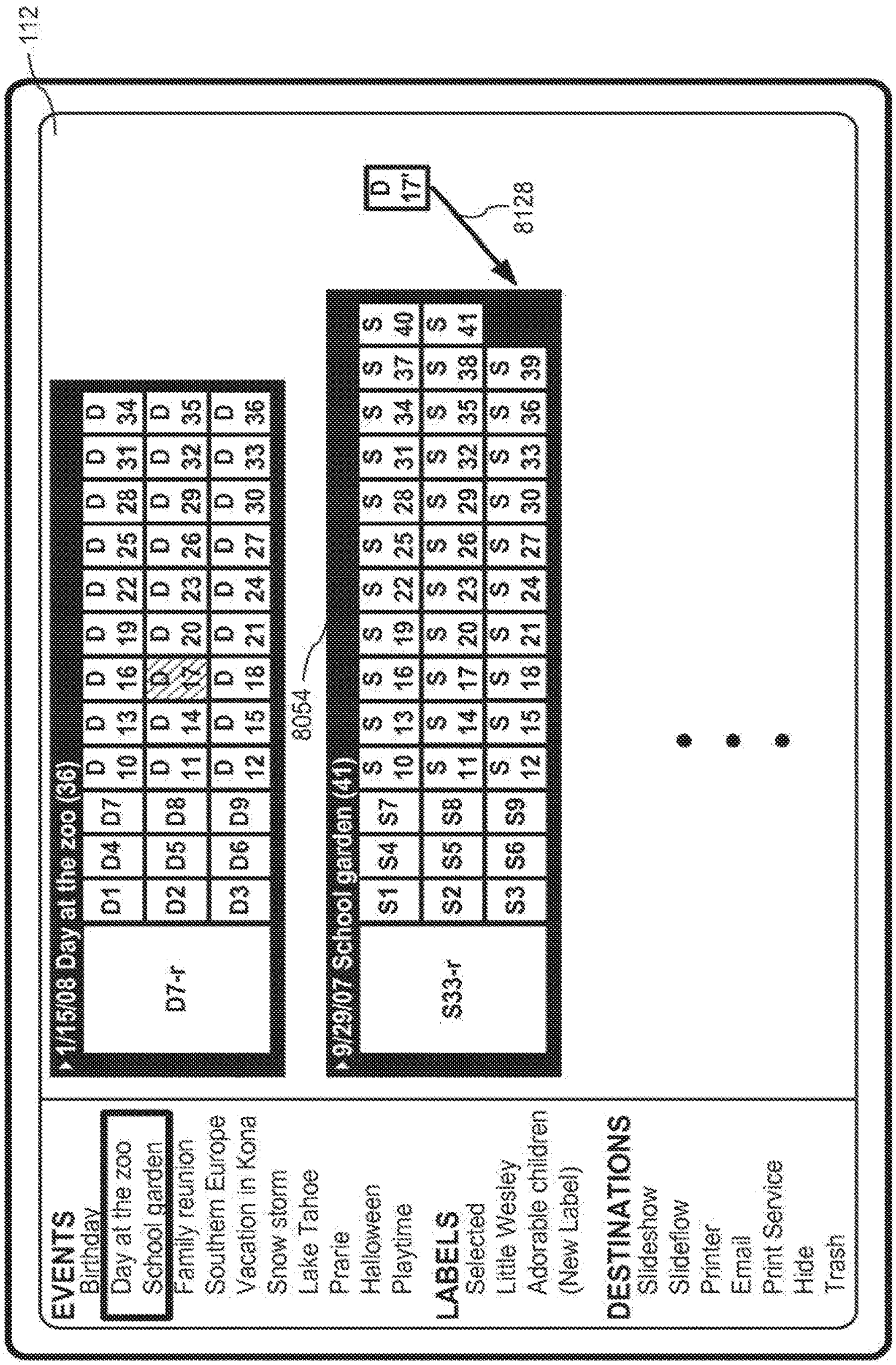
Figure 8U:
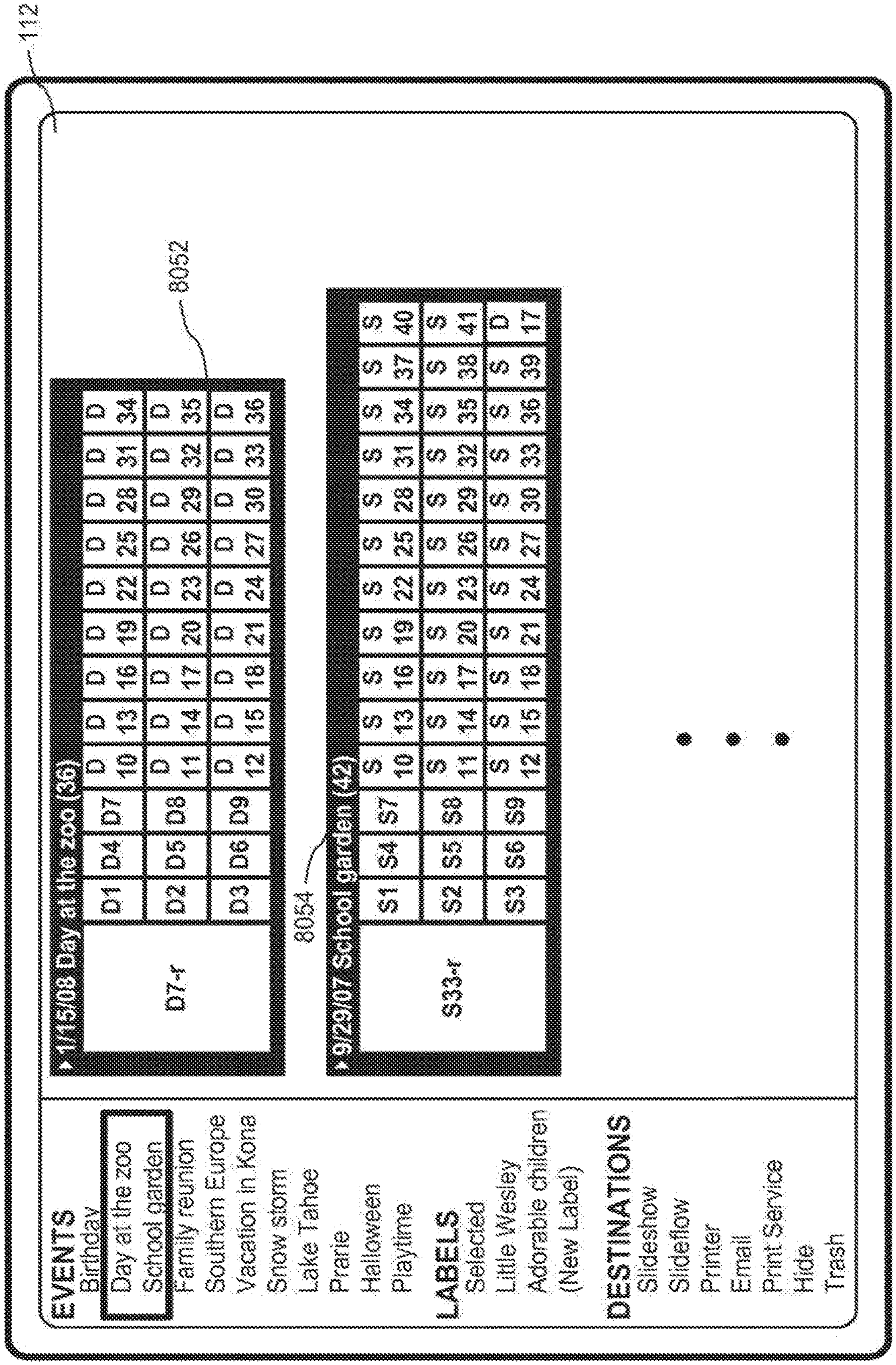
Figure 8V:
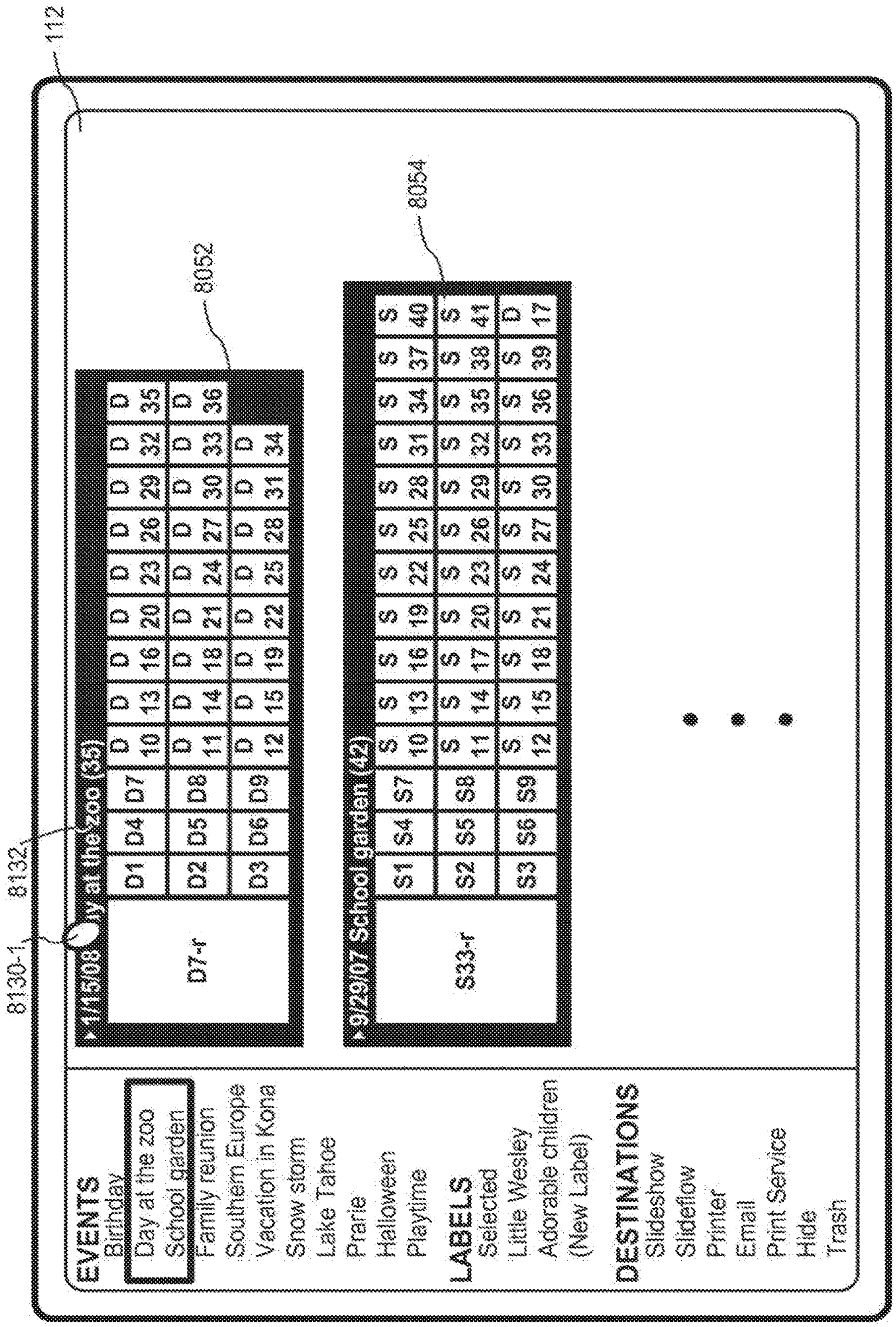

FIGS. 8V-8AA illustrate exemplary user interfaces for selecting all of the user interface objects in an array (e.g., images D1-D16, D18-D36 in array 8052, FIG. 8V) in response to detecting a user input (e.g., contact 8130-1, FIG. 8V) on an array name icon (e.g., 8132) for the array. An action is performed on all of the selected user interface objects in response to detecting a user input (e.g., contact 8130 and movement 8132 of the contact to an area 8134 associated with the "Family reunion" event icon 8010 in FIG. 8X) and subsequent cessation of the input. In this example, all of the images from the "Day at the zoo" array 8052 are made part of the "Family reunion" array 8064, as illustrated in FIG. 8AA.

FIGS. 8AA-8DD illustrate exemplary user interfaces for displaying a plurality of representative user interface icons (e.g., representative images B1-*r*, D7-*r*, S33-*r*, F8-*r*, E45-*r*, V17-*r*, N5-*r*, L2-*r*, R11-*r*, H27-*r* and P6-*r* in FIGS. 8CC- 8DD) in response to detecting activation (e.g., by tap gesture 8140 in FIG. 8AA) of a respective menu category icon (e.g., Events icon 8002 in FIG. 8AA).

FIGS. 8CC and 8EE illustrate exemplary user interfaces for responding to a user input (e.g., tap gesture 8142 in FIG. 8CC) on a representative user interface icon (e.g., representative image B1-*r* in FIG. 8CC for the Birthday array 8144) by displaying the corresponding array (e.g., 8144 in FIG. 8EE).

FIGS. 8FF-8JJ illustrate exemplary user interfaces for, while detecting a user input (e.g., contact 8146) with a destination object (e.g., "Adorable children" label icon 8032), responding to a user input (e.g., tap gesture 8148 in FIG. 8GG) on an array name icon (e.g., 8132) for an array (e.g., 8052) of user interface objects by performing an action associated with the destination object (e.g., 8032) on all of the user interface objects (e.g., images D1-D6, D18-D36) in the array 8052 of user interface objects). In this example, images D1-D16, D18-D36 in array 8052 would be given the label "Adorable children."

FIGS. 8JJ-8LL illustrate exemplary user interfaces for undoing an action associated with a selected destination object (e.g., 8032) in response to detecting a user input (e.g., tap gesture 8150) on a residual image of a user interface object (e.g., shaded image D12 in FIG. 8JJ). In this example, image D12 will not be labeled "Adorable children" and the residual shaded image of D12 (FIG. 8JJ) is replaced by the original unshaded image of D12 (FIG. 8LL).

FIGS. 8MM-8NN illustrate exemplary user interfaces for responding to a plurality of user inputs with a plurality of destination objects (e.g., tap gestures 8158, 8160 and 8162 on icons 8006, 8008 and 8032, respectively), while continuing to detect a user input (e.g., contact 8154 in FIG. 8MM) with a user interface object (e.g., image B26), by performing plurality of actions (e.g., an action associated with each of the destination objects 8006, 8008 and 8032) on the user interface object (e.g., adding image B26 to the "Day at the zoo" array 8052 and the School garden array 8054 (FIG. 8NN), and adding the label "Adorable children" to image B26).

FIGS. 8NN-8QQ illustrate exemplary user interfaces for responding to a user input (e.g., double tap gesture 8164, FIG. 8NN) on a first user interface object (e.g., image D29) in an array (e.g., 8054) of user interface objects by displaying an enlarged representation of the first user interface object (e.g., image D29-*f* in FIG. 8OO), and then displaying an enlarged representation of a second user interface object (e.g., image D30-*f* in FIGS. 8PP-8QQ) that is adjacent to the first user interface object in the array in response to a user input (e.g., a swipe gesture that includes contact 8166 and movement 8168 of the contact, FIG. 8OO) on the enlarged representation of the first user interface object.

FIGS. 8OO and 8RR illustrate exemplary user interfaces for responding to a user input (e.g., press and hold gesture 8172 in FIG. 8OO) on an enlarged representation of a user interface object (e.g., image D29-*f* in FIG. 8OO) by displaying the enlarged representation of the user interface object (e.g., image D29-*f* in FIG. 8RR) in cover flow mode.

FIGS. 8SS-8UU illustrate exemplary user interfaces for responding to a user input (e.g., contact 8174 and subsequent movement 8176 of the contact in FIG. 8SS) on a user interface object (e.g., image D22) in an array (e.g., 8052) by replacing the current representative user interface object (e.g., representative image D7-*r* in FIG. 8SS) for the array (e.g. 8052) with a new representative user interface object (e.g., representative image D22-*r* in FIG. 8UU) that is a representation of the user interface object (e.g., image D22) on which the user input was detected.

FIGS. 9A-9D are flow diagrams illustrating a method 900 of moving one or more user interface objects to a destination object and performing an action associated with the destination object on the one or more user interface objects in accordance with some embodiments. The method 900 is performed at a computing device (e.g., device 300, FIG. 3, or portable multifunction device 100, FIG. 1) with a touch screen display (e.g., 112 in FIGS. 5A-5J). Some operations in method 900 may be combined and/or the order of some operations may be changed.

As described below, the method 900 provides an intuitive way to manipulate user interface objects in response to multiple simultaneous user inputs at a computing device with a touch screen display. The method reduces the cognitive burden on a user when providing instructions to perform an action on one or more of the user interface objects, thereby creating a more efficient human-machine interface. For battery-operated computing devices, enabling a user to perform actions on one or more user interface objects faster and more efficiently conserves power and increases the time between battery charges.

The device simultaneously displays (902) on the touch screen display (e.g., 112 in FIG. 5A) a plurality of user interface objects (e.g., digital images B1-B27, B1-*r* and/or D1-D36, D7-*r* in FIG. 5A) and at least one destination object (e.g., icons 5004, 5006, 5008, 5010, 5012, 5014, 5016, 5018, 5020, 5022, 5024, 5028, 5030, 5032, 5034, 5038, 5040, 5042, 5044, 5046, 5048, and/or 5050 in FIG. 5A). The user interface objects are 'selectable objects' (i.e., objects configured to be selectable by a user).

In some embodiments, the user interface objects (e.g., B1-B27, B1-*r*, D1-D36-*r*, etc.) are (904) digital images (e.g., photographic images and/or digital graphics). In some embodiments, the user interface objects are (906) digital content (e.g., digital images, videos, music albums or individual tracks, audio books, and/or podcasts). In some embodiments, the user interface objects are (908) electronic documents (e.g., word processing, spreadsheets, and/or presentation documents). In some embodiments, the user interface objects are (910) folders (e.g., user interface objects that represent a collection of other user interface objects in a hierarchical directory). For example, if user interface object B1 is a folder in a hierarchical directory structure, then selection and activation of user interface object B I will display the contents of the folder (e.g., user interface objects associated with files at a lower level in the hierarchical directory).

In some embodiments, the destination object (e.g., label icon 5030) is (912) operable to associate metadata with one or more of the user interface objects. In some embodiments, the metadata is (914) stored with the first user interface object upon performance of an action (e.g., the metadata is stored in a data structure that corresponds to the user interface object). In some embodiments, the metadata is (916) stored, upon performance of an action, in a data structure that is separate from a data structure that corresponds to the user interface object (e.g., in a data structure associated with the destination object).

In some embodiments, the metadata comprises a representation of an event (e.g., metadata corresponding to event icons 5004, 5006, 5008, 5010, 5012, 5014, 5016, 5018, 5020, 5022, and 5024 in FIG. 5A). For example, when the user interface objects are images, the event Birthday 5004 may be associated with a set of images (e.g., B1-B27). In some embodiments, events are mutually exclusive (e.g., a user interface object may be associated with at most a single event). In other words, in these embodiments, when a user interface object is already associated with a first event, if it is associated with a second event that is distinct from the first event, it ceases to be associated with the first event. In some embodiments, events are nonexclusive (e.g., a user interface object may be simultaneously associated with multiple distinct events).

In some embodiments, the metadata comprises (918) a label (e.g., a user-defined label or a user rating). For example, in FIG. 5A, where the user interface objects are images, the label "Little Wesley" 5030 is associated with a set of images that the user has given the label "Little Wesley" (in this example, it should be understood that, typically, these images will be the images that include a child named Wesley). In some embodiments, labels are nonexclusive (e.g., a user interface object may be simultaneously associated with multiple distinct labels).

In some embodiments, the destination object represents (920) a set of user interface objects (e.g., a set of user interface objects with a common label, such as Little Wesley 5030 in FIG. 5A). In some embodiments, the destination object represents (922) an electronic document (e.g., a slideshow 5038, an email message, a web site, a book, or a word processing document). In some embodiments, the destination object represents (924) a folder. In some embodiments, the destination object represents (926) an output device (e.g., a printer 5042 or a print service 5046). In some embodiments, the destination object is (928) displayed as a menu item (e.g., 5004-5024, 5028-5034, or 5038-5050) in a menu (e.g., a menu item in a sidebar menu 5052).

The device detects (930) a first input (e.g., contact 5054 in FIG. 58) by a user on a destination object (e.g., "Little Wesley" 5030 in FIG. 5B). For example, the first input may include any of: a thumb or other finger contact, a stylus contact, or a mouse input such as a mouse click when a cursor controlled by the mouse is over the destination icon. In some embodiments, the destination object is in a list of destination objects (e.g., a menu item in a sidebar menu 5052 or palette, which is easy to select with a thumb). For example, in FIG. 5B, the menu 5052 is located along the left side of the touch screen display 112, and thus for a user holding the computing device in two hands, the thumb of the left hand will typically be naturally positioned near the sidebar menu 5052.

Operations 934-966 are performed while the device continues (932) to detect the first input (e.g., contact 5054 in FIGS. 5B-5I) by the user on the destination object (e.g., "Little Wesley" 5030 in FIGS. 5B-5I).

The device detects (934) a second input (e.g., contact 5056 in FIG. 5C) by the user (e.g., a finger gesture such as a tap gesture, a stylus contact, or a mouse input such as a mouse click when a cursor controlled by the mouse is over the first user interface object) on a first user interface object (e.g., user interface object D5 in FIG. 5C) displayed at an initial first user interface object position on the touch screen display. If the first and second inputs are finger gestures, the finger that makes the first input is different from the finger that makes the second input (e.g., contact 5054 is a contact from the thumb of the left hand and contact 5056 is a contact from an index finger of the right hand of the user). The destination object (e.g., "Little Wesley" 5030 in FIG. 5C) is different from the first user interface object (e.g., D5 in FIG. 5C).

In some embodiments, the second input by the user is (936) a tap input (e.g., a tap gesture including contact 5056 and release of the contact). In some embodiments, the second input is a finger gesture and the response to the second finger gesture is initiated when a finger-down event (e.g., 5056 in FIG. 5C) in the second finger gesture is detected. In some embodiments, the response to the second finger gesture is initiated when a finger-up event in the second finger gesture is detected (e.g., when contact 5056 in FIG. 5C ceases to be detected, as described below with reference to FIG. 5F).

In some embodiments, the second input by the user is (938) a finger swipe gesture (e.g., contact 5058 and subsequent movement 5060 across the touch screen in FIG. 5D) that contacts the first user interface object (e.g., image D5 in FIG. 5D).

In response to detecting the second input (e.g. contact 5056 in FIG. 5C) by the user on the first user interface object (e.g., 5D in FIG. 5C), the device performs (940) an action on the first user interface object. The action is associated with the destination object. For example, when the destination object is a label (e.g., "Little Wesley" 5030 in FIG. 5C) and the first user interface object (e.g., D5 in FIG. 5C) is an image, the action is to associate the label with the image (e.g., store the label in metadata associated with the image). In some embodiments, the action is a preparatory action, such as preparing to perform an action that will occur upon detecting lift off of the first input (e.g., lift off of a first finger contact by the user) from the destination object. Exemplary actions include, without limitation: associating a label with digital content or an electronic document; moving digital content or an electronic document from one event to another event; moving digital content or an electronic document to a folder; and printing/publishing a copy of the digital content or electronic document.

In some embodiments, the destination object corresponds (942) to a set of objects and the action performed is adding or preparing to add the first user interface object to the set of objects. For example, if the first contact was with a menu item that is representative of an event (e.g., "Birthday" icon 5004 in FIG. 5D), then the action performed is adding or preparing to add the first user interface object (e.g., D5 in FIG. 5D) to the "Birthday" event. In some embodiments, the destination object (e.g., "Birthday" icon 5004) corresponds (944) to an array (e.g., 5060 in FIG. 5D) of objects (e.g., B1-B27 and B1-*r*) and the action performed is adding or preparing to add the first user interface object (e.g., U5 in FIG. 5D) to the array (e.g., 5060 in FIG. 5D) of objects (e.g., B1-B27 and B1-*r*). In some embodiments, the destination object corresponds (946) to a grid of objects and the action performed is adding or preparing to add the first user interface object to the grid of objects. For example, in FIG. 5D, user interface objects B1-B27 are arranged in a three by nine array of user interface objects.

In some embodiments, the destination object corresponds (948) to a folder and the action performed is adding or preparing to add the first user interface object to the folder. In some embodiments, the destination object corresponds (950) to a label (e.g., "Little Wesley" 5030 in FIG. 5D) and the action performed is adding or preparing to add the label (e.g., "Little Wesley") to the first user interface object (e.g., D5 in FIG. 5D).

In some embodiments, the destination object corresponds (952) to a hide label (e.g., 5048 in FIG. 5D) and the action performed is adding or preparing to add the hide label to the first user interface object (e.g., D5 in FIG. 5D) and ceasing to display or preparing to cease to display the first user interface object. In some embodiments, a residual image of each object (e.g., a shaded or semitransparent image of each original object) to be hidden is displayed until lift off of the first input (e.g., lift off of the first finger contact 5030 by the user) is detected, at which point display of the residual image(s) ceases and remaining unbidden user interface objects in the array are rearranged to fill the spaces left by the hidden objects (e.g., as described in greater detail below with reference to FIGS. 5J-5N, except in the present example only a single object would be hidden instead of the multiple objects which are hidden in FIGS. 5-5N).

In some embodiments, the destination object (e.g., 5042 or 5046 in FIG. 5A) corresponds (954) to an output device (e.g., a printer, a print service or a fax, etc.) and the action performed is sending the first user interface object (e.g., D5 in FIG. 5D) to the output device. For example, when the user interface object is an image, and the destination object is a printer, upon detecting the second input by the user, the device will print (or prepare to print) the image on a printer associated with the device.

In some embodiments, in response to detecting the second input by the user on the first user interface object, the device displays (956) an animation of the first user interface object moving from the initial first user interface object position into the destination object. For example, FIG. 5E illustrates an animation of user interface object D5 moving from the initial first user interface object position into the destination object "Little Wesley" 5030. In this animation the user interface object D5 moves along a path (e.g., 5062 in FIG. 5E) from the initial location at D5 to the destination object 5030. In one embodiment, as the first user interface object moves along the path, the user interface object is resized so as to match the size of the destination object. An illustrative example of the movement and resizing (e.g., from D5, to D5', to D5'', to D5''', and finally to D5'''' in FIG. 5E) of the destination object is shown in FIG. 5E, in this example, the destination object 5030 is larger along the horizontal dimension (i.e., longer) and smaller along the vertical dimension (i.e., shorter) than the first user interface object D5. Thus, as illustrated in FIG. 5E, the user interface object D5 is stretched horizontally and compressed vertically as it moves (e.g., from D5, to D5', to D5'', to D5''' and finally to D5'''' in FIG. 5E) towards the destination object 5030. It should be understood that, typically the various resized representations of the user interface object (e.g., D5, D5', D5'', D5''' and D5'''' in FIG. 5E) are not simultaneously displayed, but are instead displayed in sequence as the user interface object moves along the path 5062 towards the destination object. In some embodiments, where the user interface object includes an image, the image is distorted as the object is resized. The animation indicates to a user that an action associated with the destination object will be applied to the first user interface object.

In some embodiments, when the second input is a finger gesture, the animation and the response to the finger gesture are initiated when a finger-up event in the finger gesture is detected (e.g., when contact 5056 in FIG. 5C ceases to be detected, as shown in FIG. 5F). For example, FIG. 5F illustrates an animation of user interface object D5 moving from the initial first user interface object position into the destination object "Little Wesley" 5030. In this animation, the user interface object D5 moves along a path (e.g., 5064 in FIG. 5F) from the initial location at D5 to the destination object 5030, as described above for FIG. 5E. In this embodiment, the animation is displayed when the finger lift off is detected (e.g., a finger-up event) from a user interface object rather than when finger contact on the user interface object is detected (e.g., a finger-down event). In some embodiments, the lift-off contact position is distinct from the initial contact position (e.g., set-down position). This embodiment may be used where the user interface objects are small relative to the size of the finger contact because the user is able to more accurately determine the lift-off position of the contact than the initial contact position (e.g., set-down position).

In some embodiments, while still detecting the first input (e.g., contact 5054 in FIG. 5G) with the destination object (e.g., "Little Wesley" 5030 in FIG. 5G), in response to detecting the second input by the user on the first user interface object, the device displays (958) a residual image of the first user interface object (e.g., shaded user interface object D5 in FIG. 5G) at the initial first user interface object position on the touch screen display. In some embodiments, the residual image (e.g., shaded user interface object D5 in FIG. 5G) is an image of the first user interface object with reduced opacity (e.g., a semitransparent or transparent image of the first user interface object). In some embodiments, the residual image of the first user interface object is (960) visually distinct from the first user interface object. In some embodiments, the residual image of the first user interface object is (962) a grayed-out, translucent, semi-transparent, reduced contrast, or ghost image of the first user interface object.

In some embodiments, the device detects (964) a third input by the user (e.g., a finger gesture such as a tap gesture 5066 in FIG. 5H, a stylus tap gesture, or a mouse input such as a mouse click when a cursor controlled by the mouse is over the residual image of the first user interface object) on the residual image (e.g., shaded user interface object D5 in FIG. 5H) of the first user interface object at the initial first user interface object position on the touch screen display while continuing to detect the first input (e.g., contact 5054 in FIG. 5H) by the user on the destination object (e.g., "Little Wesley" 5030 in FIG. 5H). In response to detecting the third finger input (e.g., tap gesture 5066 in FIG. 5H) by the user on the residual image (e.g., shaded D5 in FIG. 5H) of the first user interface object at the initial first user interface object position on the touch screen display, the device undoes the action performed on the first user interface object and displays the first user interface object at the initial first user interface object position. For example, user interface object D5 will not be labeled "Little Wesley" and the residual shaded image of D5 (FIG. 5H) is replaced by the original unshaded image of D5 (FIG. 5J).

In some embodiments, in response to detecting the third finger input (e.g., tap gesture 5066) by the user on the residual image (e.g., shaded image D5 in FIG. 5H) of the first user interface object at the initial first user interface object position on the touch screen display, the device displays (966) an animation of the first user interface object moving from the destination object back to the initial first user interface object position. The animation indicates to a user that an action associated with the destination object will not be applied to the respective user interface object. For example, FIG. 5I illustrates an exemplary animation of undoing the prior movement of user interface object D5 from the initial first user interface object position into the destination object "Little Wesley" 5030 (as shown in FIGS. 5E and 5F). In this animation, the user interface object D5 moves along a path (e.g., 5068 in FIG. 5I) from an initial location at the destination object 5030 to the original position of the first user interface object (e.g., D5 in FIG. 5I). In one embodiment, as the first user interface object moves along the path, the user interface object is initially displayed as a resized representation so as to match the size of the destination object. An illustrative example of the movement and resizing (e.g., from D5'''' to D5''' to D5'' to D5' in FIG.

5I and finally to D5 in FIG. 5J) of the destination object is shown in FIGS. 5I-5J. In this example, destination object 5030 is larger along the horizontal dimension (i.e., longer) and smaller along the vertical dimension (i.e., shorter) than the first user interface object D5. Thus, as illustrated in FIG. 5I, the user interface object is initially displayed as a representation of the user interface object (e.g., D5"") that is stretched horizontally and compressed vertically compared to the original user interface object (e.g., D5). As the user interface object moves (e.g., from D5''' to D5''' to D5'' to D5' and finally to D5) towards the original position of the user interface object D5 the user interface object is compressed horizontally and stretched vertically so that it returns to the dimensions of the original user interface object D5. It should be understood that, typically the various resized representations of the user interface object (e.g., D5, D5', D5'', D5''' and D5"" shown in FIG. 5I) are not simultaneously displayed, but are instead displayed in sequence as the user interface object moves along the path 5068 towards the initial first user interface object position. In some embodiments, where the user interface object includes an image, the image is distorted as the object is resized.

After the device undoes the action performed on the first user interface object, the first user interface object is displayed at the initial first user interface object position, (e.g., image D5, as shown in FIG. 5J).

Note that details of the processes described above with respect to method 900 (e.g., FIGS. 9A-9D) are also applicable in an analogous manner to the methods described below. For example, the user interface objects and destination objects described below may have one or more of the characteristics of the user interface objects and destination objects described with reference to method 900. For brevity, these details are not repeated below.

Figure 10A:
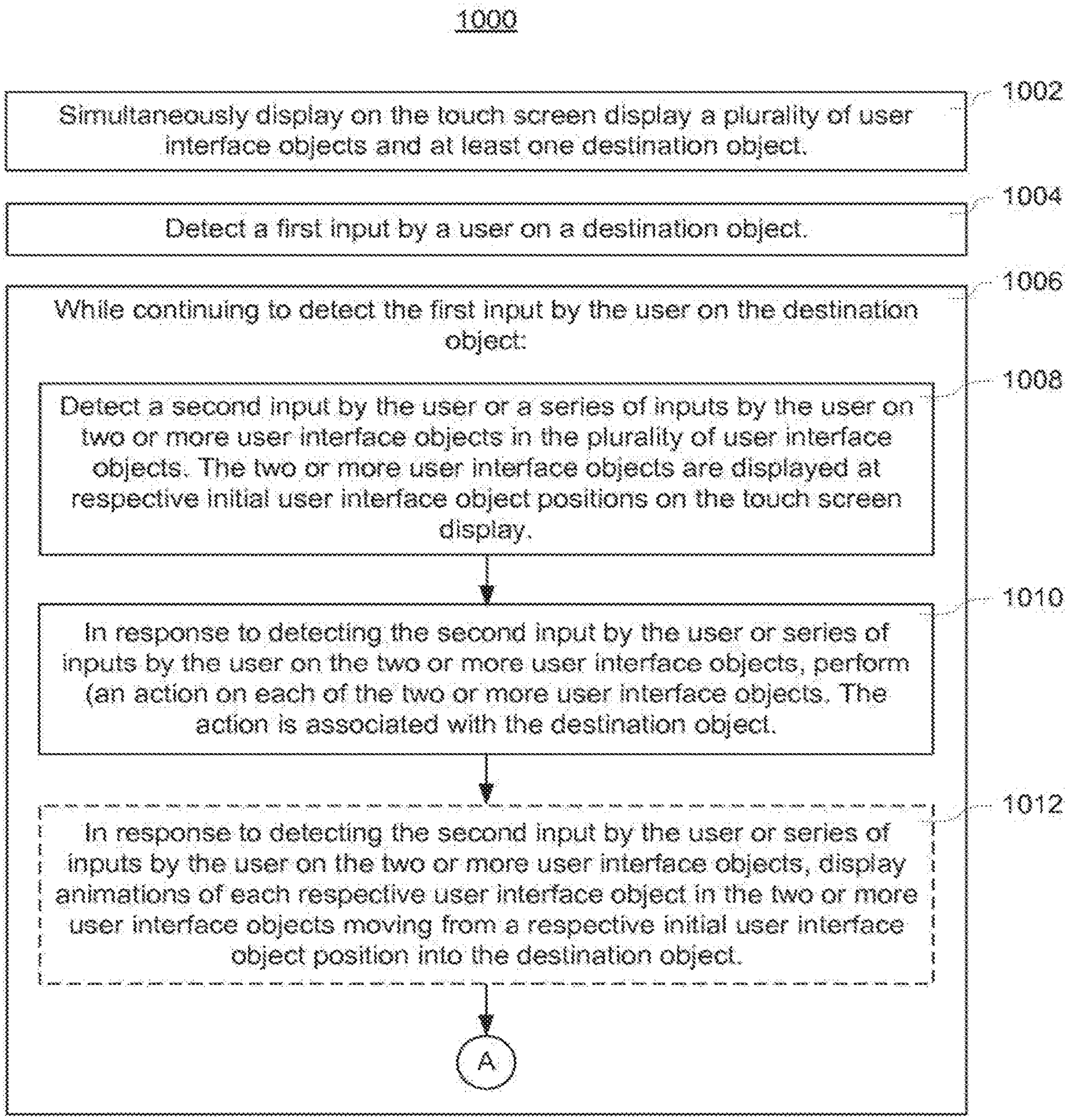
FIGS. 10A-10B are flow diagrams illustrating a method of moving multiple user interface objects to a destination object and performing an action associated with the destination object on the multiple user interface objects in accordance with some embodiments.
Figure 10B:
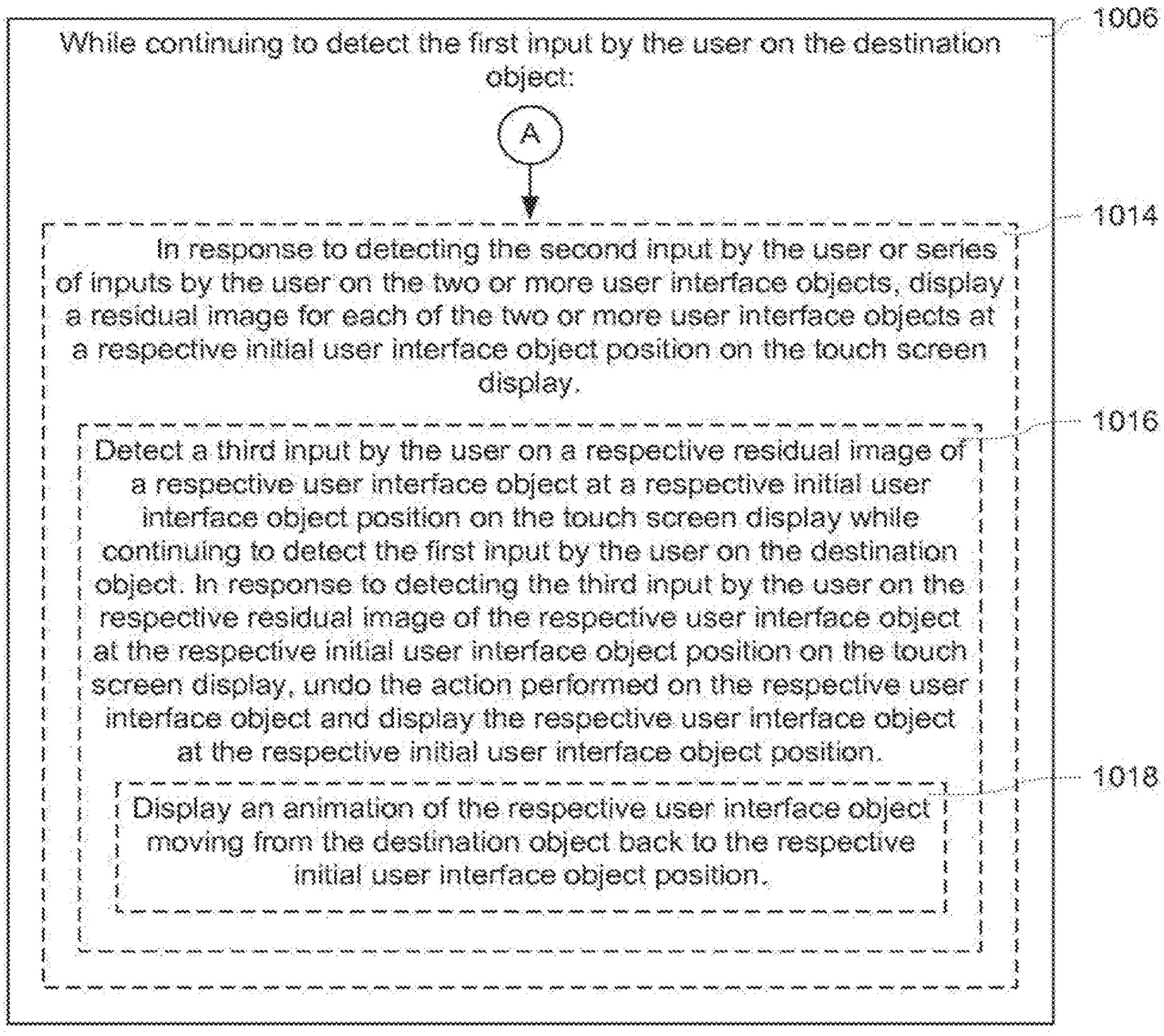

FIGS. 10A-10B are flow diagrams illustrating a method 1000 of moving multiple user interface objects to a destination object and performing an action associated with the destination object on the multiple user interface objects in accordance with some embodiments. The method 1000 is performed at a computing device (e.g., device 300, FIG. 3, or portable multifunction device 100, FIG. 1) with a touch screen display (e.g., 112 in FIGS. 5J-5Y. Some operations in method 1000 may be combined and/or the order of some operations may be changed.

As described below, the method 1000 provides an intuitive way to manipulate a plurality of user interface objects at a computing device with a touch screen display. The method reduces the cognitive burden on a user when simultaneously manipulating a plurality of user interface objects using simultaneous user inputs, thereby creating a more efficient human-machine interface. For battery-operated computing devices, enabling a user to manipulate user interface objects faster and more efficiently conserves power and increases the time between battery charges.

The device simultaneously displays (1002) on the touch screen display (e.g., 112 in FIG. 53) a plurality of user interface objects (e.g., digital images B1-B27, B1-*r* and/or D1-D36, D7-*r* in FIG. 5J) and at least one destination object (e.g., icons 5004, 5006, 5008, 5010, 5012, 5014, 5016, 5018, 5020, 5022, 5024, 5028, 5030, 5032, 5034, 5038, 5040, 5042, 5044, 5046, 5048, and/or 5050 in FIG. 5J). In some embodiments, the user interface objects are selectable objects' (i.e., objects configured to be selectable by a user).

The device detects (1004) a first input by a user on a destination object (e.g., a thumb or other finger contact, a stylus contact, or a mouse input such as a mouse click when a cursor controlled by the mouse is over the destination icon). In some embodiments, the destination object is in a list of destination objects (e.g., a menu item in a sidebar menu or palette, which is easy to select with a thumb).

Operations 1008-1018 are performed while the device continues (1006) to detect the first input by the user on the destination object (e.g., contact 5070 on "Hide" icon 5048 in FIGS. 5J-5M or contact 5082 with "Little Wesley" label icon 5030 in FIGS. 5O-5X).

The device detects (1008) a second input by the user or a series of inputs by the user on two or more user interface objects in the plurality of user interface objects. The two or more user interface objects are displayed at respective initial user interface object positions on the touch screen display. If both inputs are finger inputs, the finger that makes the first input (e.g., the first finger contact by the user) is different from the finger that makes the second input or series of inputs. For example, the device detects a series of tap gestures (e.g., tap gestures 5084 and 5088 as shown in FIGS. 5O and 5P, respectively) with a finger or stylus or a series of mouse clicks on the two or more user interface objects, a swipe gesture (e.g., contact 5092-1 and movement 5094 of the contact as shown in FIGS. 5Q-5R) with a finger or stylus that contacts the two or more user interface objects, or multiple simultaneous finger gestures (such as concurrent finger contacts on the two or more user interface objects).

In response to detecting the second input by the user or series of inputs by the user on the two or more user interface objects, the device performs (1010) an action on each of the two or more user interface objects. The action is associated with the destination object. In some embodiments, the action is a preparatory action, such as preparing to perform an action that will occur upon detecting lift off of the first input (e.g., lift off of the first finger contact by the user) from the destination object.

In some embodiments, in response to detecting the second input by the user or series of inputs by the user on the two or more user interface objects, the device displays (1012) animations (e.g. as described in greater detail below with reference to FIGS. 5K, 5L and 5R) of each respective user interface object in the two or more user interface objects moving from a respective initial user interface object position into the destination object. The animations indicate to a user that an action associated with the destination object will be applied to the respective user interface objects.

In some embodiments, in response to detecting the second input by the user or series of inputs by the user on the two or more user interface objects, the device displays (1014) a residual image (e.g., shaded user interface objects B5 and B12 in FIG. 5M, as described in greater detail below) for each of the two or more user interface objects at a respective initial user interface object position on the touch screen display.

For example, in FIG. 5J, the device detects a first input (e.g., contact 5070) by the user on a destination object (e.g., "Hide" icon 5048). In this example, the device detects a second input by the user (e.g., tap gesture 5072 in FIG. 5J) or a series of inputs (e.g., tap gesture 5072 in FIG. 5J followed by tap gesture 5076 in FIG. 5L) by the user on two or more user interface objects in the plurality of user interface objects. The two or more user interface objects (e.g., B5 and B12 in FIG. 5J) are displayed at respective initial user interface object positions on the touch screen display. In this example, in response to detecting each of the second inputs (e.g., contacts 5072 in FIG. 5K and 5076 in FIG. 5L) by the user on the two or more user interface objects, the device performs an action on each of the two or more user interface objects. The action is associated with the destination object. In some embodiments, the action is a preparatory action, such as preparing to hide the user interface objects upon detecting lift off of the first input (e.g., lift off of the first finger contact 5070 by the user) from the destination object (e.g., “Hide” 5048 in FIG. 5M).

In this example, in response to detecting tap gesture 5072, the device displays an animation showing user interface object B5 resizing (e.g., from B5, to B5', to B5'', to B5''', and finally to B5'''' in FIG. 5K) and moving towards or into the destination object (e.g., “Hide” icon 5048 in FIG. 5K) along a path 5074 from the initial user interface object B5 location to the destination object 5048. Similarly, in response to detecting tap gesture 5076, the device displays an animation showing user interface object B12 resizing (e.g., from B12, to B12', to B12'', to B2''', and finally to B12'''' in FIG. 5L) and moving towards or into the destination object (e.g., “Hide” icon 5048 in FIG. 5S) along a path 5078 from the initial user interface object location to the destination object.

In this example, while the device continues to detect the first user input (e.g., contact 5070 in FIG. 5M) with the destination object (e.g., “Hide” icon 5048 in FIG. 5M), the device displays a residual image for each of the two or more user interface objects (e.g., shaded user interface objects D5 and D12 in FIG. 5M) at a respective initial user interface object position on the touch screen display. In this example, when the device ceases to detect the first user input (e.g., when the device detects lift-off of contact 5070 in FIG. 5M) the device performs the action by hiding the user interface objects (e.g., the device ceases to display the residual images for the two or more user interface objects B5 and B12 and rearranges the remaining unhidden user interface objects in the array so as to fill in the spaces left by the hidden objects. Thus, as shown in FIG. 5N, the user interface objects that the user selected while simultaneously selecting the “Hide” destination object (e.g., B5 and B12) are not displayed in the “Birthday” array (e.g., 5060 in FIG. 5N).

As described in greater detail below with reference to FIGS. 8A-8D, in some embodiments the user interface is scrolled so that different user interface items are displayed. For example, in FIG. 5N, the device scrolls 5080 the user interface items upwards, so that new user interface objects (e.g., S1-S39, and S33-*r* in FIG. 5O) are displayed and old user interface objects (e.g., B1-B27 in the “Birthday” array 5060) are no longer displayed.

As another example of selecting multiple user interface objects, in FIG. 5O, the device detects a first input (e.g., contact 5082) by the user on a destination object (e.g., “Little Wesley” 5030). In this example, the device detects a second input by the user (e.g., 5084 in FIG. 5O) or a series of inputs (e.g., tap gesture 5084 in FIG. 5O followed by tap gesture 8088 in FIG. 5P and swipe gesture including contact 5092-1 and subsequent movement 5094 of the contact in FIG. 5Q to contact location 5092-2 in FIG. 5R) by the user on two or more user interface objects in the plurality of user interface objects. The two or more user interface objects (e.g., D3 in FIG. 5O, D11 in FIG. 5P and D6, D9, D12, D15, D18, D21, D24, D30, D33, D36 in FIG. 5Q) are displayed at respective initial user interface object positions on the touch screen display. In this example, in response to detecting each of the second inputs by the user (e.g., contact 5084 in FIG. 5O followed by contact 8088 in FIG. 5P and swipe gesture including contact 5092-1 and subsequent movement 5094 of the contact in FIG. 5Q), the device performs an action on each of the two or more user interface objects. The action is associated with the destination object (e.g., “Little Wesley” 5030 in FIGS. 5O-5Q). In some embodiments, the action is a preparatory action, such as preparing to add a label “Little Wesley” 5030 to the selected user interface objects upon detecting lift off of the first input (e.g., lift off of the first finger contact by the user) from the destination object (e.g., “Little Wesley” 5030 in FIGS. 5O-5Q).

In this example, in response to detecting contact 5084, the device displays an animation showing user interface object D3 resizing (e.g., from D3, to D3', to D3'', to D3''', and finally to D3'''' in FIG. 5O) and moving towards or into the destination object (e.g., “Little Wesley” 5030 in FIG. 5O) along a path 5086 from the initial user interface object D3 location to the destination object 5030. Similarly, in response to detecting contact 5088, the device displays an animation showing user interface object D11 resizing (e.g., from D11, to D11', to D11'', to D11''', and finally to D11'''' in FIG. 5P) and moving towards or into the destination object (e.g., “Little Wesley” 5030 in FIG. 5P) along a path 5090 from the initial user interface object D11 location to the destination object 5030.

The device also displays an animation in response to detecting the swipe gesture (e.g., contact 5092-1 and subsequent movement 5094 of the contact in FIG. 5Q to contact location 5092-2 in FIG. 5R) on D6, D9, D12, D15, D18, D21, D24, D30, D33, D36 in FIG. 5Q by showing some or all of the user interface objects D6, D9, D12, 15, D18, D21, D24, D30, D33, D36 resizing and moving towards or into the destination object 5030. For illustrative purposes, respective user interface objects D18'''', D21''', D24''', D27'', D30'', D33' and D36' are each shown moving from their respective initial positions towards the destination object (e.g., “Little Wesley” 5030 in FIG. 5Q) along a respective path (e.g., 5096 for user interface object D36) from the initial user interface object location for the respective user interface object to the destination object.

In this example, while the device continues to detect the first user input (e.g., contact 5082 in FIG. 5S) with the destination object (e.g., “Little Wesley” 5030 in FIG. 5S), the device displays a residual image for each of the two or more user interface objects (e.g., shaded user interface objects D3, D6, D9, D11, D12, D15, D18, D21, D24, D27, D30, D33, D36 in FIG. 5S) at a respective initial user interface object position on the touch screen display. In this example, when the device ceases to detect the first user input (e.g., when the device detects lift-off of contact 5082 in FIG. 5S), the device performs the action by adding the label “Little Wesley” to the metadata of the user interface objects that were selected by the user (e.g., D3, D6, D9, D11, D12, D15, D18, D21, D24, D27, D30, D33, D36 in FIG. 5S).

In some embodiments, the device detects (1016) a third input by the user (e.g., a finger gesture such as a tap gesture 5098 on the residual image of D3 in FIG. 5T; a finger swipe gesture with contact 5102-1 and movement 5104 of the contact over the residual images of D18, D21, D24, D27, D30, D33, and D36 in FIG. 5V; a stylus tap gesture; or a mouse input such as a mouse click when a cursor controlled by the mouse is over a respective residual image of a respective user interface object) on a respective residual image of a respective user interface object at a respective initial user interface object position on the touch screen display while continuing to detect the first input by the user on the destination object (e.g., contact 5082 on icon 5030). In response to detecting the third input by the user on the respective residual image of the respective user interface object at the respective initial user interface object position on the touch screen display, the device undoes the action performed on the respective user interface object and displays the respective user interface object at the respective initial user interface object position. For example, user interface objects D3, D18, D21, D24, D27, D30, D33, and D36 will not be labeled "Little Wesley" and the residual shaded images of D3, D18, D21, D24, D27, D30, D33, and D36 (FIG. 5S) are replaced by the original unshaded images of D3, D18, D21, D24, D27, D30, D33, and D36 (FIG. 5X).

In some embodiments, the device displays (1018) an animation of the respective user interface object moving from the destination object back to the respective initial user interface object position (e.g., as shown in FIGS. 5U and 5W, and described in greater detail below). The animation indicates to a user that an action associated with the destination object will not be applied to the respective user interface object.

For example, in FIG. 5T the device detects a third user input (e.g., tap gesture 5098) on the residual image of D3 (e.g., shaded user interface object D3 in FIG. 5T). In response to detecting the tap gesture 5098, the device undoes the action performed on the respective user interface object and displays an animation of the respective user interface object moving from the destination object (e.g., "Little Wesley" 5030 in FIG. 5U) back to the initial user interface object position D3. In this example, the device displays an animation showing user interface object (e.g., D3"") that is stretched horizontally and compressed vertically compared to the original user interface object (e.g., D3). As the user interface object moves (e.g., from D3"" to D3'" to D3" to D3') along a path 5100 from the destination object location (e.g., "Little Wesley" 5030 in FIG. 5U) towards the original position of the user interface object D3 the user interface object is compressed horizontally and stretched vertically so that it returns to the dimensions of the original user interface object D3. As shown in FIG. 5V, the device displays the respective user interface object (e.g., unshaded user interface object D3 in FIG. 5V) at the respective initial user interface object position.

Similarly, in some embodiments, in response to a swipe gesture that includes contact with a plurality of residual images of user interface objects, the device will undo the action performed on the plurality of respective user interface object associated with the residual images of the user interface objects. For example, in FIG. 5V the device detects a third user input (e.g., contact 5102-1 and movement 5104 in FIG. 5V of the contact to location 5102-2 in FIG. 7W) on the residual images of D18, D21, D24, D27, D30, D33 and D36. In response to detecting the swipe gesture, the device undoes the action performed on the respective user interface objects and displays an animation of the respective user interface objects moving from the destination object (e.g., "Little Wesley" 5030 in FIG. 5W) back to their respective initial user interface object positions. In this example, the device displays an animation showing some or all of the user interface objects (e.g., D18, D21, D24, D30, D33, D36) resizing and moving. For illustrative purposes, exemplary user interface objects D36'", D33", D30", and D27 are shown moving from the destination object (e.g., "Little Wesley" 5030 in FIG. 5W) to their respective initial positions along respective paths (e.g., 5106 for user interface object D36). In FIG. 5W, user interface objects D18, D21 and D24 are shown as having already been returned to their respective initial positions. In some embodiments, the movement and resizing of each of these user interface objects is performed in accordance with the animation for moving and resizing user interface object D3 as described previously with reference to FIG. 5U.

In some embodiments, after the device undoes the action performed on the respective user interface objects (e.g., D18, D21, D24, D30, D33, and D36 in FIG. 5W), the device displays the respective user interface object at the respective initial user interface object position, as shown in FIG. 5X. In some embodiments, after the user releases the first contact (e.g., contact 5082 in FIG. 5X) with the destination object (e.g., icon 5030 in FIG. 5X), the device ceases to display the residual images of the user interface objects, and the original user interface objects are displayed (e.g., as shown in FIG. 5Y) in their initial user interface locations. In this example, the residual images indicate to a user which images will be labeled "Little Wesley" when the device detects lift off of contact 5082. After lift off of contact 5082, the residual images are replaced with the original objects because all of the original objects D1-D36 and D7-*r* are still part of the "Day at the zoo" event.

Figure 11A:
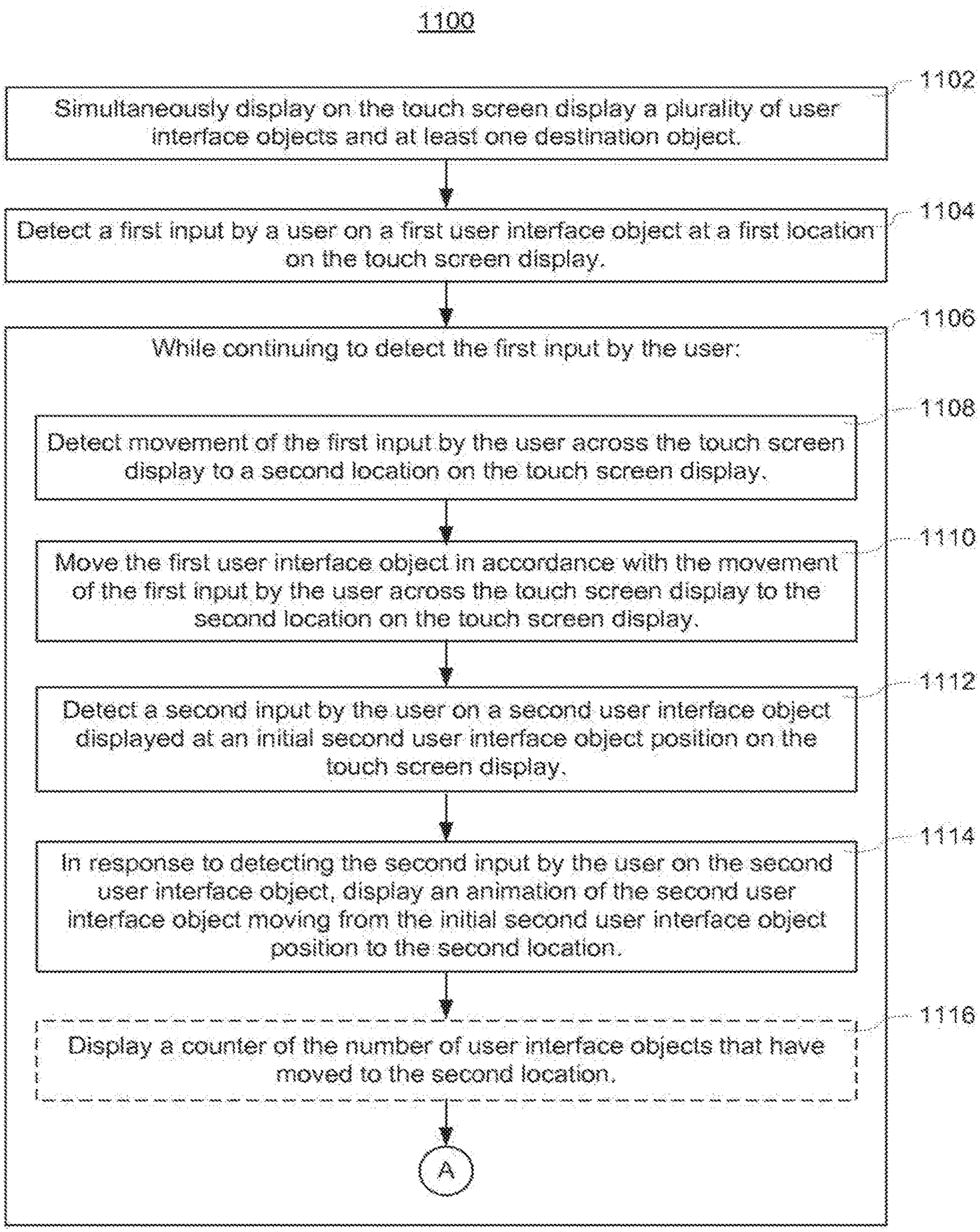
FIGS. 11A-11B are flow diagrams illustrating a method of forming a group of user interface objects, moving the group to a destination object or an area associated with a destination object, and performing an action associated with the destination object on the group of user interface objects in accordance with some embodiments.
Figure 11B:
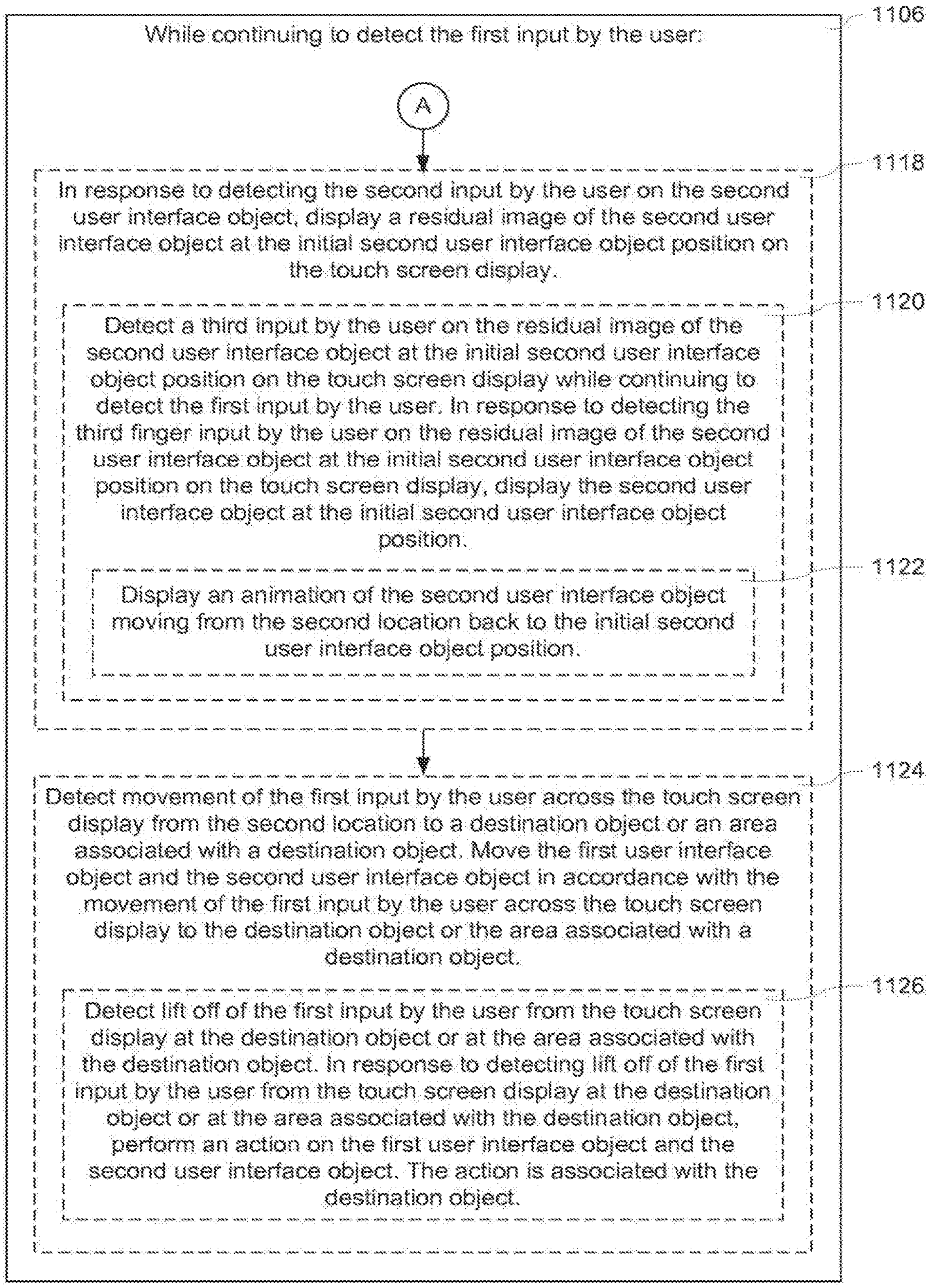

FIGS. 11A-11B are flow diagrams illustrating a method 1100 of forming a group of user interface objects, moving the group to a destination object or an area associated with a destination object, and performing an action associated with the destination object on the group of user interface objects in accordance with some embodiments. The method 1100 is performed at a computing device (e.g., device 300, FIG. 3, or portable multifunction device 100, FIG. 1) with a touch screen display (e.g., 112 in FIGS. 6A-6M). Some operations in method 1100 may be combined and/or the order of some operations may be changed.

As described below, the method 1100 provides an intuitive way to form and manipulate a group of user interface objects and perform actions on the group of user interface objects at a computing device with a touch screen display. The method reduces the cognitive burden on a user when manipulating a plurality of user interface objects, thereby creating a more efficient human-machine interface. For battery-operated computing devices, enabling a user to manipulate user interface objects faster and more efficiently conserves power and increases the time between battery charges.

The device simultaneously displays (1102) on the touch screen display (e.g., 112 in FIG. 6A) a plurality of user interface objects (e.g., digital images D1, D2, D3, D4, D5, D6, D7, D8, D9, D10, D11, D12, D13, D14, D15, D16, D17, D18, D19, D20, D21, D22, D23, D24, D25, D26, D27, D28, D29, D30, D31, D32, D33, D34, D35, D36, D7-*r*, and/or S1, S2, S3, S4, S5, S6, S7, S8, S9, S10, S11, S12, S13, S14, S15, S16, S17, S18, S19, S20, S21, S22, S23, S24, S25, S26, S27, S28, S29, S30, S31, S32, S33, S34, S35, S36, S37, S38, S39, S33-*r* in FIG. 6A) and at least one destination object (e.g., icons 6004, 6006, 6008, 6010, 6012, 6014, 6016, 6018, 6020, 6022, 6024, 6028, 6030, 6032, 6034, 6038, 6040, 6042, 6044, 6046, 6048, and/or 6050 in FIG. 6A). In some embodiments, the user interface objects are 'selectable objects' (i.e., objects configured to be selectable by a user).

The device detects (1104) a first input by a user (e.g., a press and hold finger contact 6052 (FIG. 6B), stylus contact, or mouse click) on a first user interface object (e.g., image D27) at a first location on the touch screen display.

Operations 1108-1126 are performed while the device continues (1106) to detect the first input (e.g., contact 6052 in FIGS. 6B-6L) by the user.

The device detects (1108) movement of the first input by the user across the touch screen display to a second location on the touch screen display. For example, as shown in FIG. 6C, the device detects movement of a finger contact 6052 from a first location 6052-1 that corresponds to the initial position of user interface object D27 to a second location 6052-2 on the touch screen display.

The device moves (1110) the first user interface object in accordance with the movement 6054 of the first input by the user across the touch screen display to (or proximate to) the second location on the touch screen display. For example, as shown in FIG. 6C, the device moves the user interface object D27 from an initial location to a second location D27' on the user interface that is proximate to the location 6052-2 of the contact.

The device detects (1112) a second input by the user (e.g., a finger gesture such as a tap gesture 6056 in FIG. 6D, a stylus contact, or a mouse input such as a mouse click when a cursor controlled by the mouse is over the second user interface object) on a second user interface object (e.g., D24 in FIG. 6D) displayed at an initial second user interface object position on the touch screen display.

In response to detecting the second input by the user on the second user interface object, the device displays (1114) an animation of the second user interface object moving 6058 from the initial second user interface object position (e.g., D24 in FIG. 58) to (or proximate to) the second location (e.g., proximate to the location of the contact 6052-2 in FIG. 6E). The animation may move the second user interface object to, proximate to, or into the first user interface object (e.g., D27' in FIG. 6E). For example, in FIG. 6E, the second user interface object (e.g., D24') is shown moving towards the first user interface object (e.g., D27). The animation indicates to a user that the second user interface object is being grouped with the first user interface object.

In some embodiments, the device displays (1116) a counter (e.g., 6060 in FIG. 6E) of the number of user interface objects that have moved to the second location (e.g., in response to detecting the second input by the user on the second user interface object). In the example above, as the device is animating the movement of the second user interface object to the first user interface object, the device displays a counter to "2" (e.g., 6060-*a* in FIG. 6E) to indicate that two user interface objects (e.g., D27 and D24) have moved to the second location.

In some embodiments, in response to detecting the second input (e.g., tap gesture 6056 in FIG. 6D) by the user on the second user interface object, the device displays (1118) a residual image (e.g., shaded user interface object D24 in FIG. 6E) of the second user interface object at the initial second user interface object position on the touch screen display.

It should be understood that selecting a second user interface object, as described above can be repeated for any number of user interface objects, and in some embodiments, as each user interface object is selected, an animation is displayed and the counter increases to the number of selected user interface objects. For example, in FIG. 6F the device detects another input by the user (e.g., a finger gesture such as a tap gesture 6062 in FIG. 6F, a stylus contact, or a mouse input such as a mouse click when a cursor controlled by the mouse is over the user interface object) on another user interface object (e.g., D28 in FIG. 6F) displayed at an initial user interface object position on the touch screen display. In response to detecting this input by the user on the user interface object, the device displays an animation of the user interface object moving (e.g., 6064 in FIG. 6G) from the initial user interface object position (e.g., D28 in FIG. 6F) to (or proximate to) the second location (e.g., the location of the contact 6052-2 in FIG. 6G). The animation may move the user interface object to, proximate to, or into the first user interface object (e.g., D27' in FIG. 6G). For example, in FIG. 6G, a representation of the user interface object D28' is shown moving towards the first user interface object (e.g., D27'). In some embodiments, the device displays a counter (e.g., 6060 in FIG. 6G) of the number of user interface objects that have moved to the second location (e.g., in response to detecting the input(s) by the user on one or more second user interface objects). In the example above, as the device is animating the movement of the user interface object D28 to the first user interface object, the device increments a counter to "3" (e.g., 6060-*b* in FIG. 6G) to indicate that three user interface objects (e.g., D27, D24 and D28) have moved to the second location.

In some embodiments, the device detects (1120) a third input by the user (e.g., a finger gesture such as a tap gesture 6066 in FIG. 6H, a stylus tap gesture, or a mouse input such as a mouse click when a cursor controlled by the mouse is over the residual image of the second user interface object) on the residual image of the second user interface object (e.g., shaded user interface object D24 in FIG. 6H) at the initial second user interface object position on the touch screen display while continuing to detect the first input by the user (e.g., contact 605-2, FIG. 6H). In response to detecting the third finger input by the user on the residual image of the second user interface object at the initial second user interface object position on the touch screen display, the device displays the second user interface object at the initial second user interface object position (e.g., unshaded user interface object D24 in FIG. 6I).

In some embodiments, the device displays (1122) an animation of the second user interface object moving (e.g., movement 6068 in FIG. 6H) from the second location back to the initial second user interface object position. The animation indicates to a user that the second user interface object is being removed from the group of objects at the second location. The animation may move the second user interface object from or out of the first user interface object. For example, in FIG. 6H, a representation of the second user interface object (e.g., D24') is shown moving from the first user interface object (e.g., D27' in FIG. 6H) towards the initial position of the second user interface object (e.g., D24 in FIG. 6H). In some embodiments, the device displays a counter (e.g., 6060-*c* in FIG. 6H) of the number of user interface objects that are still located at the second location. In the example above, as the device is animating the movement of the second user interface object D24' towards the initial second user interface object position on the touch screen, the device decrements a counter to "2" (e.g., 6060-*c* in FIG. 6H) to indicate that only two user interface objects (e.g., D27 and D28) remain in the second location. It should be understood that only two user interface objects "remain" at a location because three user interface objects (e.g., D27, D24 and D28) have moved to the location and one (e.g., D24) has moved away from the location. Thus, as described in the example above, in FIG. 6I the original user interface object D24 is displayed in its original location.

In some embodiments, the device detects (1124) movement of the first input (e.g., movement 6070 in FIG. 6J, which includes movement of contact 6052 from contact location 6052-2 to contact location 6052-3, to contact location 6052-4, to contact location 6052-5) by the user across the touch screen display from the second location (e.g., 6052-2) to a destination object (e.g., "Printer" object 6042 in FIG. 6J) or an area associated with a destination object. The device moves the first user interface object and the second user interface object in accordance with the movement of the first input by the user across the touch screen display to the destination object or the area associated with a destination object (e.g., movement of the user interface object D27 from D27' to D27", to D27''' and finally to D27'''' which is proximate to the destination object "Printer" 6042 in FIG.

63). In some embodiments, as the device moves the first user interface object, the device resizes the user interface object so as to match the size of the destination object. An illustrative example of the movement and resizing (e.g., from D27', to D27'', D27''', and finally to D27'''' in FIG. 6J) of the destination object is shown in FIG. 6J. In this example, the destination object (e.g., "Printer" 6042 in FIG. 6J) is larger along the horizontal dimension (i.e., longer) and smaller along the vertical dimension (i.e., shorter) than the first user interface object (e.g., D27' in FIG. 6J). Thus, as illustrated in FIG. 6J, the user interface object D27 is stretched horizontally and compressed vertically as it moves (e.g., from D27', to D27'', to D27''' and finally to D27'''' in FIG. 6J) towards the destination object 6042. It should be understood that, typically the various resized representations of the user interface object (e.g., D27', D27'', D27''' and D27'''' in FIG. 6J) are not simultaneously displayed, but are, instead, displayed in sequence as the user interface object moves along a path towards the destination object. In some embodiments, where the user interface object includes an image, the image is distorted as the object is resized.

In some embodiments, the device detects (1126) lift off of the first input by the user (e.g., lift off of the first finger contact by the user, lift off of the stylus contact, or a mouse up event) from the touch screen display at the destination object or at the area associated with the destination object. In response to detecting lift off of the first input (e.g., contact 6052-5 in FIG. 6J) by the user from the touch screen display at the destination object or at the area associated with the destination object, the device performs an action on the first user interface object and the second user interface object (e.g., the device initiates printing of user interface objects D27 and D28). The action is associated with the destination object (e.g., "Print" 6042 in FIG. 6J). Exemplary actions include, without limitation: associating a label with digital content or an electronic document; moving digital content or an electronic document from one event to another event; moving digital content or an electronic document to a folder; and printing/publishing a copy of the digital content or electronic document.

As an example of movement of the first input to an area associated with a destination object, in FIG. 6K, the destination object is the "School garden" icon 6008 and the area associated with the "School garden" icon 6008 is a rectangular area 6076 that includes an array 6072 of images labeled as being images of the "School garden" event. In this example, the first input by the user (e.g., contact 6052) is moved (e.g., movement 6074 in FIG. 6K) to a location 6052-6 within the area 6076 that is associated with the destination object "School garden" icon 6008. While the device is detecting the contact (e.g., 6052-6 in FIG. 6K) in the area 6076 that is associated with the destination object 6008, the device detects lift off of the first input 6052 by the user, as shown in FIGS. 6K-6L (where contact 6052-6 ceases to be detected in FIG. 6L). In response to detecting the lift off of the user input (e.g., the release of contact 6052-6), the device performs an action on the user interface objects (e.g., D27 and D28) that were associated with the first input by the user (e.g., contact 6052). The action is associated with the destination object 6008. In this example, the device associates images D27 and D28 with the "School garden" event 6008 and displays an animation of representations of the user interface objects (e.g., D27' and D28' in FIG. 6L) moving into the array 6072 of images labeled as being images of the "School garden" event. In some embodiments, the user interface objects are associated with the new array 6072 in addition to being associated with the old array 6078 of user interface objects to which the user interface objects previously belonged. In contrast, in other embodiments, as shown in FIG. 6M, the user interface objects (e.g., D27 and D28) are associated with the new array (e.g., "School garden" array 6072) and disassociated with the old array to which they previously belonged (e.g., "Day at the zoo" array 6078). In FIG. 6M, the user interface objects D27 and D28 are shown in the new array 6072 of user interface objects, while they are not shown in the old array 6078 of user interface objects, and the remaining user interface objects (e.g., D1-D26 and D29-D36) in the old array 6078 of user interface objects are rearranged to fill in the gaps caused by the removal of the user interface objects D27 and D28.

Figure 12A:
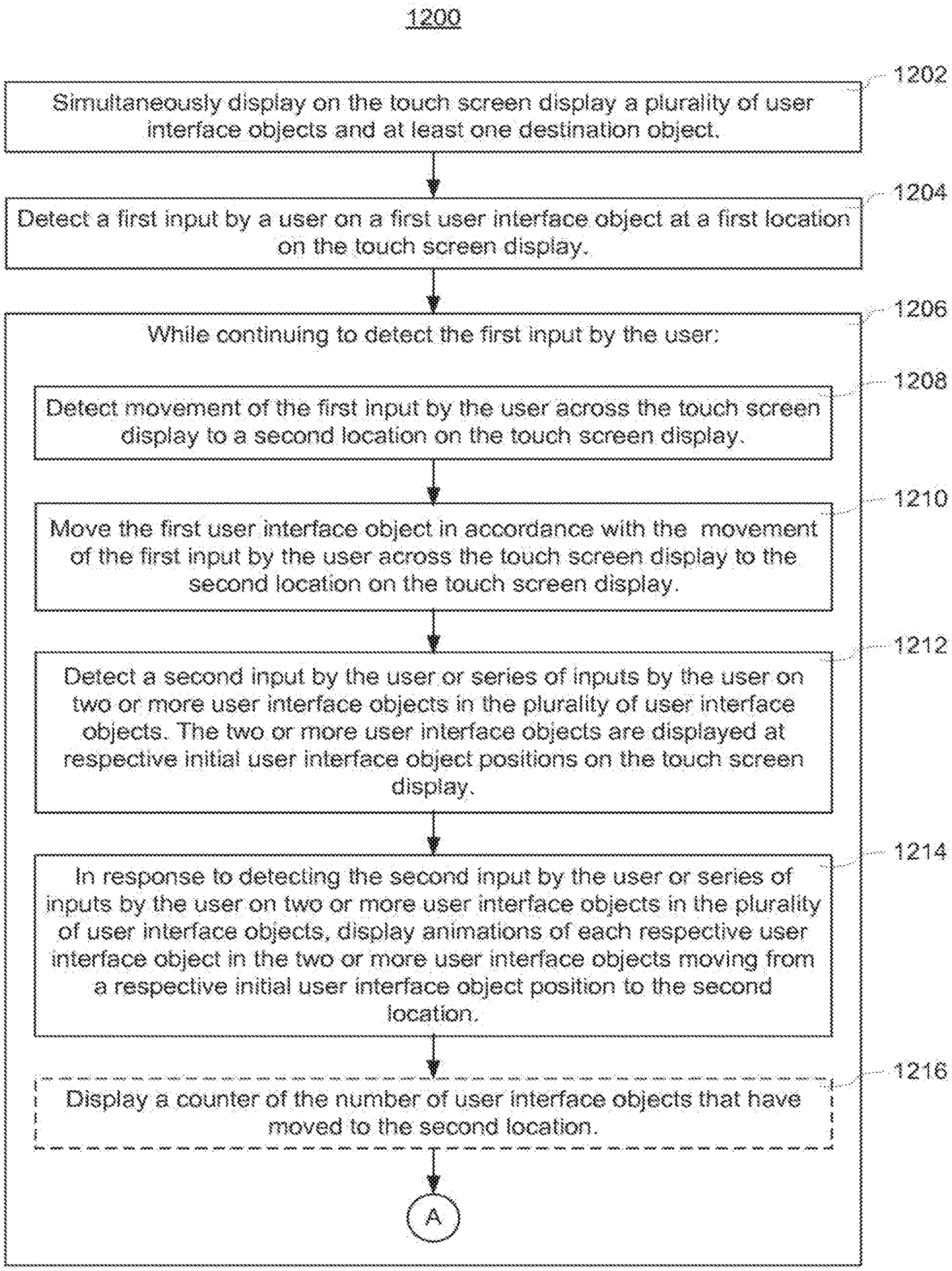
Figure 14A:
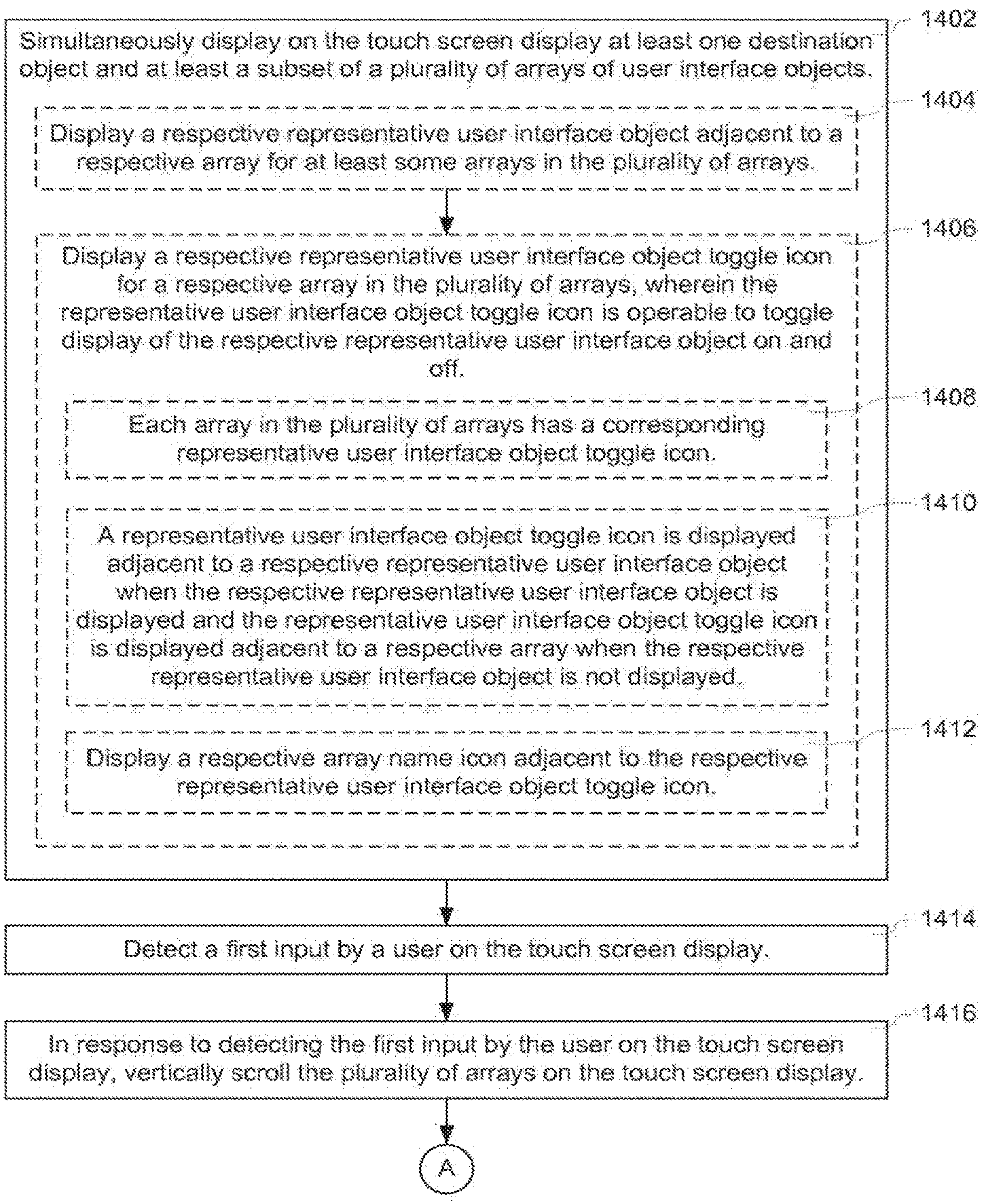
Figure 14B:
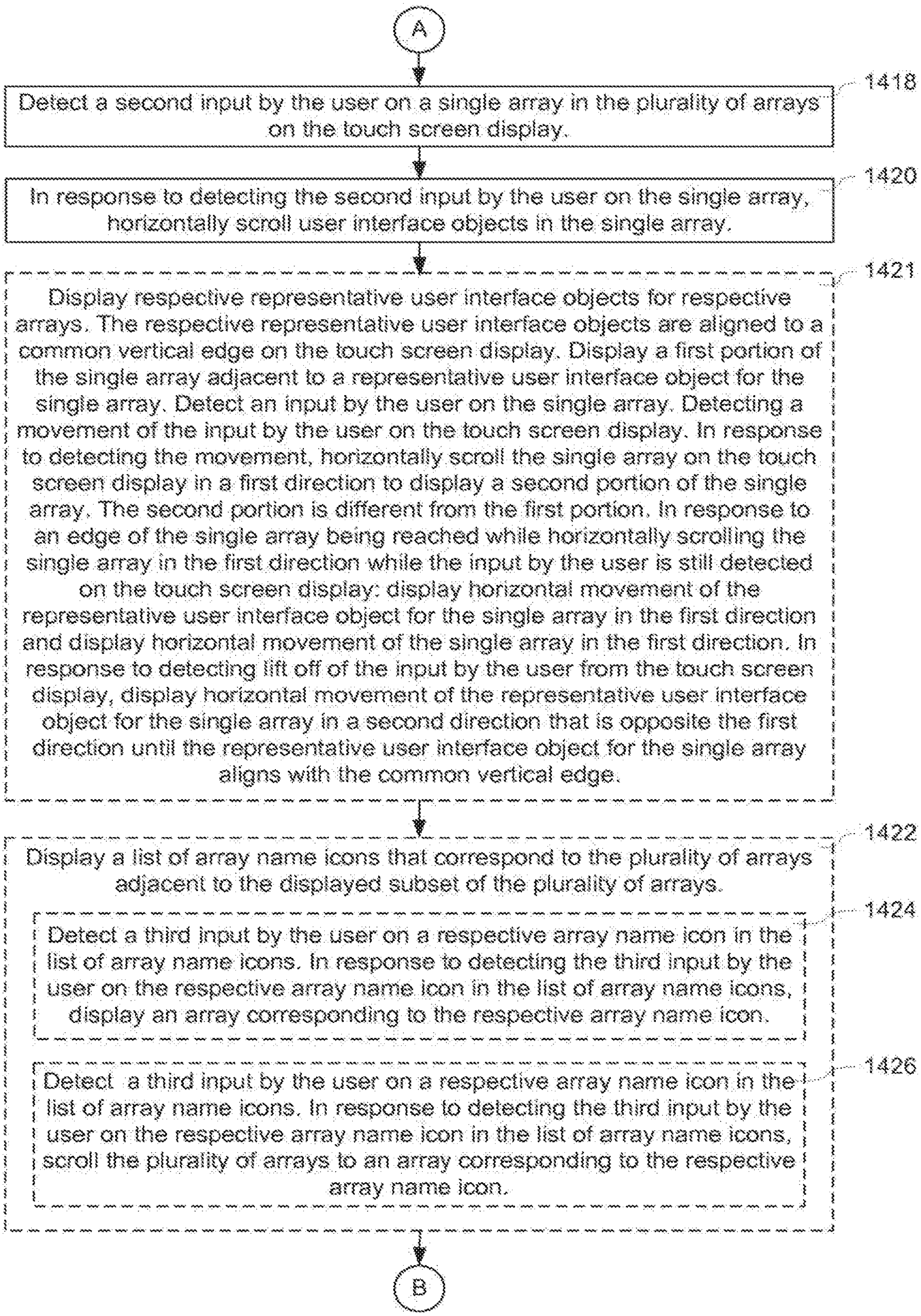
Figure 14C:
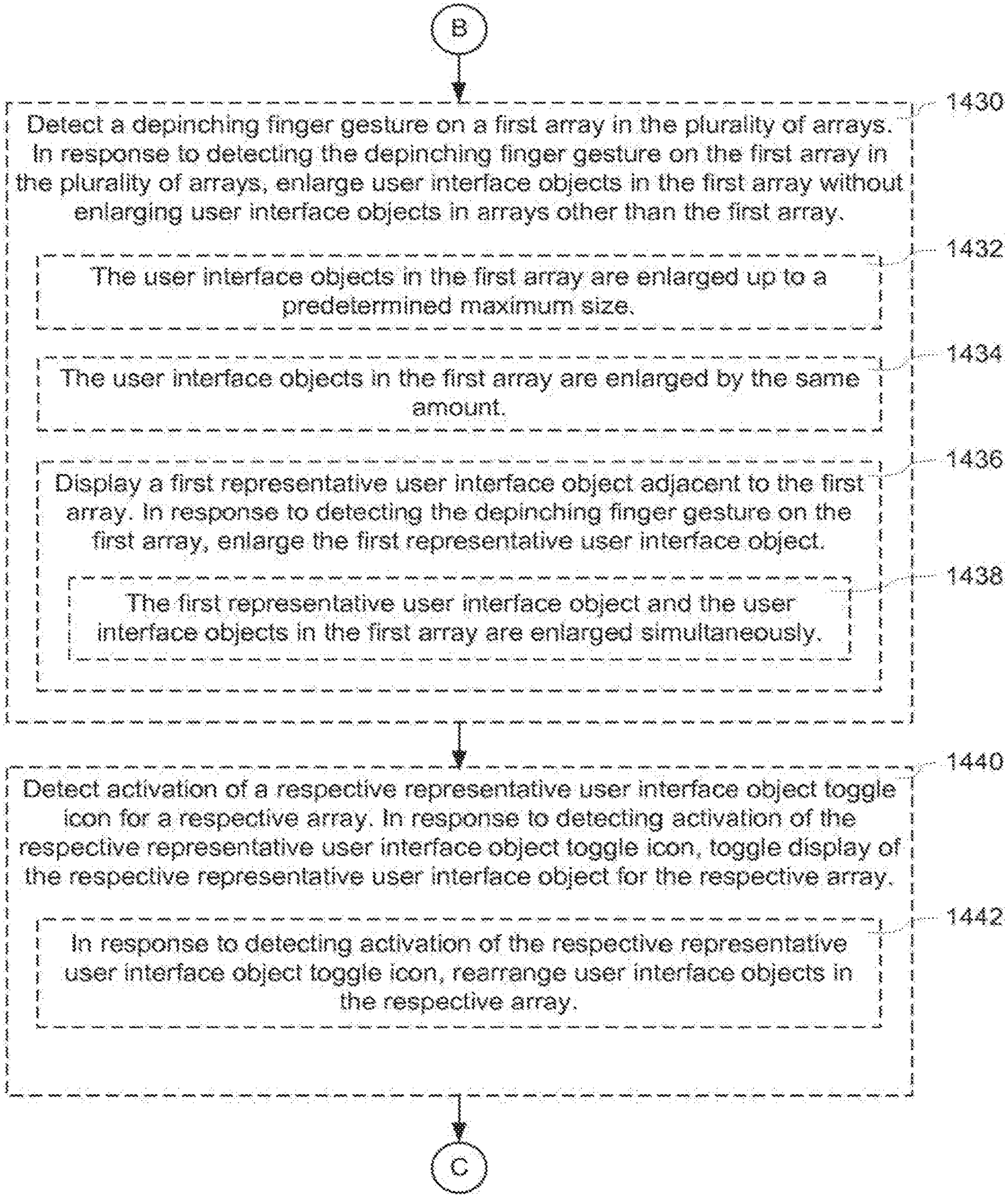
Figure 14D:
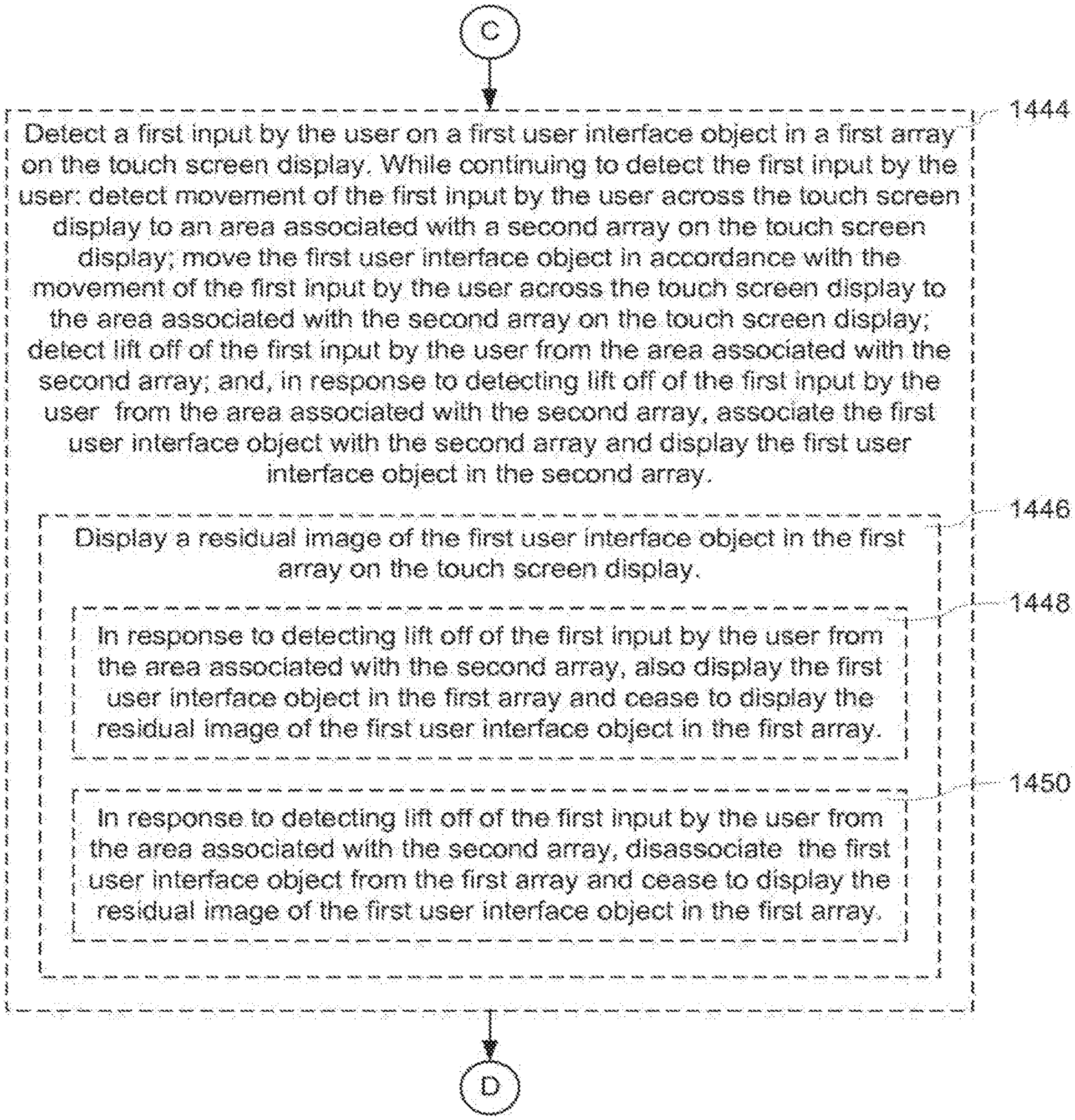

FIGS. 12A-12B are flow diagrams illustrating a method 1200 of forming a group of user interface objects, moving the group to a destination object or an area associated with a destination object, and performing an action associated with the destination object on the group of user interface objects in accordance with some embodiments. The method 1200 is performed at a computing device (e.g., device 300, FIG. 3, or portable multifunction device 100, FIG. 1) with a touch screen display (e.g., 112 in FIGS. 6M-6X). Some operations in method 1200 may be combined and/or the order of some operations may be changed.

As described below, the method 1200 provides an intuitive way to form a group of multiple user interface objects and manipulate the group of user interface objects at a computing device with a touch screen display. The method reduces the cognitive burden on a user when manipulating multiple user interface objects, thereby creating a more efficient human-machine interface. For battery-operated computing devices, enabling a user to manipulate multiple user interface objects faster and more efficiently conserves power and increases the time between battery charges.

The device simultaneously displays (1202 on the touch screen display (e.g., 112 in FIG. 6M) a plurality of user interface objects (e.g., digital images D1-D25, D28-D36, and/or S1-S39, D26, D27 in FIG. 6M) and at least one destination object (e.g., icons 6004, 6006, 6008, 6010, 6012, 6014, 6016, 6018, 6020, 6022, 6024, 6028, 6030, 6032, 6034, 6038, 6040, 6042, 6044, 6046, 6048, or 6050). In some embodiments, the user interface objects are 'selectable objects' (i.e., objects configured to be selectable by a user).

The device detects (1204) a first input by a user (e.g., a press and hold finger contact 6100, stylus contact, or mouse click) on a first user interface object (e.g., D31 in FIG. 6N) at a first location on the touch screen display.

Operations 1208-1226 are performed while the device continues (1206) to detect the first input (e.g., press and hold finger contact 6100 in FIGS. 6N-6T) by the user.

The device detects (1208) movement (e.g., 6102 in FIG. 6N) of the first input (e.g., 6100-1 in FIG. 6N) by the user across the touch screen display to a second location (e.g., 6100-2 in FIG. 6N) on the touch screen display.

The device moves (1210) the first user interface object in accordance with the movement (e.g., 6102 in FIG. 6N) of the first input by the user across the touch screen display to (or proximate to) the second location (e.g., 6100-2 in FIG. 6N) on the touch screen display. For example, in FIG. 6N the user interface object D31 moves to a location D31' that is proximate to the second location of the contact (e.g., 6100-2 in FIG. 6N).

The device detects (1212) a second input by the user or series of inputs by the user on two or more user interface objects in the plurality of user interface objects (e.g., a swipe gesture with a finger or stylus that contacts the two or more user interface objects), multiple simultaneous finger gestures (such as concurrent finger contacts on the two or more user interface objects), or a series of tap gestures with a finger or stylus or a series of mouse clicks on the two or more user interface objects). The two or more user interface objects are displayed at respective initial user interface object positions on the touch screen display. If both inputs are finger inputs, the finger that makes the first input by the user is different from the finger that makes the second input by the user or series of inputs by the user. For example, in FIG. 6O, the device detects a finger swipe gesture (e.g., contact 6104 followed by movement 6106 of the contact along the touch-sensitive surface in FIG. 6O), which passes through two or more of the user interface objects (e.g., D36, D33, D30, D25, D22, D19, D16, D13 and D10 in FIG. 6O).

In response to detecting the second input (e.g., swipe gesture including contact 6106-1 and movement 6106 of the contact along the touch-sensitive surface in FIG. 6O) by the user or series of inputs by the user on two or more user interface objects in the plurality of user interface objects, the device displays (1214) animations of each respective user interface object in the two or more user interface objects moving from a respective initial user interface object position to (or proximate to) the second location. The animations indicate to a user that these user interface objects are being added to the group of user interface objects. The animations may move the two or more user interface objects to, proximate to, or into the first user interface object. For example, as shown in FIG. 6P, as the contact moves 6106 to a second contact location 6104-2 as part of the swipe gesture, respective representations of the user interface objects (e.g., D36', D33', D30', D25', D22', D19', D16', D13', and D10' in FIG. 6P) move towards the second location (e.g., 6100-2 in FIG. 6P), which includes the first user interface object (e.g., D31' in FIG. 6P).

In some embodiments, the device displays (1216) a counter (e.g., 6108-*a* in FIG. 6Q) of the number of user interface objects that have moved to the second location (e.g., in response to detecting the second input by the user or series of inputs by the user on the two or more user interface objects). In the example above, as the device is animating the movement of the second user interface objects to the first user interface object, the device displays a counter showing "10" (e.g., 6108-*a* in FIG. 6Q) to indicate that ten user interface objects (e.g., D10, D13, D16, D19, D22, D25, D30, D31, D33 and D36) have moved to the second location.

In some embodiments, in response to detecting the second input by the user or series of inputs by the user on the two or more user interface objects, the device displays (1218) a residual image (e.g., the shaded user interface objects D10, D13, D16, D19, D22, D25, D30, D31, D33 and D36 in FIG. 6P-6Q) for each of the two or more user interface objects at a respective initial user interface object position on the touch screen display.

In some embodiments, the device detects (1220) a third input by the user (e.g., a finger gesture such as a tap gesture 6110 in FIG. 6Q, a stylus tap gesture, or a mouse input such as a mouse click when a cursor controlled by the mouse is over a respective residual image of a respective user interface object) on a respective residual image (e.g., shaded user interface object D25 in FIG. 6Q) of a respective user interface object at a respective initial user interface object position on the touch screen display while continuing to detect the first input (e.g., contact 6100-2 in FIG. 6Q) by the user. In response to detecting the third input (e.g., tap gesture 6110 in FIG. 6Q) by the user on the respective residual image of the respective user interface object at the respective initial user interface object position on the touch screen display, the device displays the respective user interface object at the respective initial user interface object position (e.g., unshaded user interface object D25 in FIG. 6S).

In some embodiment, the device displays (1222) an animation of the respective user interface object moving from the second location back to the respective initial user interface object position. The animation indicates to a user that the respective user interface object is being removed from the group of objects at the second location. The animation may move the respective user interface object from or out of the first user interface object. For example, in FIG. 6R, a representation of the second user interface object (e.g., D25') is shown moving from the first user interface object (e.g., D31' in FIG. 6R) towards the initial position of the second user interface object (e.g., D25 in FIG. 6R). In some embodiments, the device displays a counter (e.g., 6108-*b* in FIG. 6R) of the number of user interface objects that are still located at the second location. In the example above, as the device is animating the movement (e.g., 6112 in FIG. 6R) of the second user interface object to the initial second user interface object position on the touch screen, the device decrements a counter to "9" (e.g., 6108-*b* in FIG. 6R) to indicate that only nine of the user interface objects (e.g., D10, D13, D16, D19, D22, D30, D31, D33 and D36) remain in the second location. It should be understood that only nine user interface objects "remain" at a location because ten user interface objects (e.g., D10, D13, D16, D19, D22, D25, D30, D31, D33 and D36) have moved to the location and one (e.g., D25) has moved away from the location.

In some embodiments, the device detects (1224) movement of the first input (e.g., movement 6114 in FIG. 6S, which includes movement of contact 6100 from contact location 6100-2 to contact location 6100-3, to contact location 6100-4, to contact location 6100-5) by the user across the touch screen display from the second location (e.g., 6100-2) to a destination object (e.g., "School garden" event icon 6008 in FIG. 6S) or an area associated with a destination object. The device moves the first user interface object (and, in some embodiments, the two or more user interface objects) in accordance with the movement of the first input by the user across the touch screen display to the destination object or the area associated with a destination object (e.g., movement of the user interface object D31 from D31' to D31", to D31''' and finally to D31'''' which is proximate to the destination object "School garden" 6008 in the menu in FIG. 6S). In some embodiments, as the device moves the first user interface object, the device resizes the user interface object so as to match the size of the destination object. An illustrative example of the movement and resizing (e.g., from D31', to D31", D31''', and finally to D31'''' in FIG. 6S) of the destination object is shown in FIG. 5S. In this example, the destination object is larger along the horizontal dimension (i.e., longer) and smaller along the vertical dimension (i.e., shorter) than the first user interface object. Thus, as illustrated in FIG. 6S, the user interface object D31 is stretched horizontally and compressed vertically as it moves (e.g., from D31', to D31", to D31''' and finally to D31'''' in FIG. 6S) towards the destination object 6008 in FIG. 6J. It should be understood that, typically the various resized representations of the user interface object (e.g., D31', D31", D31''' and D31''' in FIG. 6S) are not simultaneously displayed, but are instead displayed in sequence as the user interface object moves along a path towards the destination object. In some embodiments, where the user interface object includes an image, the image is distorted as the object is resized.

In some embodiments, the device detects (1226) lift off of the first input by the user (e.g., lift off of the first finger contact by the user, lift off of the stylus contact, or a mouse up event) from the touch screen display at the destination object or at the area associated with the destination object. In response to detecting lift off of the first input (e.g., lift off of contact 6100-5 in FIG. 6S) by the user from the touch screen display at the destination object or at the area associated with the destination object, the device performs an action on the first user interface object and the two or more user interface objects (e.g., the device associates images D10, D13, D16, D19, D22, D30, D31, D33 and D36 with the "School garden" event that is associated with destination object 6008, as shown in FIG. 6X). The action is associated with the destination object (e.g., "School garden" event icon 6008 in FIG. 6S). Exemplary actions include, without limitation: associating a label with digital content or an electronic document; moving digital content or an electronic document from one event to another event; moving digital content or an electronic document to a folder, and printing/publishing a copy of the digital content or electronic document.

As an example of movement of the first input to an area associated with a destination object, in FIG. 6T, the destination object is the "School garden" icon 6008 and the area associated with the "School garden" icon 6008 is a rectangular area 6076 that includes an array 6072 of images labeled as being images of the "School garden" event. In this example, the first input by the user (e.g., contact 6100) is moved (e.g., movement 6116 in FIG. 6T) to a location 6100-6 within the area 6076 that is associated with the destination object "School garden" icon 6008. While the device is detecting the contact (e.g., 6100-6 in FIG. 6T) in the area 6076 that is associated with the destination object 6008, the device detects lift off of the first input 6100 by the user, as shown in FIG. 6U. In response to detecting the lift off of the user input (e.g., the release of contact 6100-6 in FIG. 6U), the device performs an action on the user interface objects (e.g., D10, D13, D16, D19, D22, D30, D31, D33 and D36) that were associated with the first input by the user (e.g., contact 6100). The action is associated with the destination object 6008. In this example, the device associates images D10, D13, D16, D19, D22, D30, D31, D33 and D36 with the "School garden" event 6008 and displays an animation of representations of the user interface objects (e.g., D10', D13', D16', D19', D22', D30', D31', D33' and D36' in FIGS. 6V and 6W) moving into the array 6072 of images labeled as being images of the "School garden" even. In some embodiments, the user interface objects are associated with the new array 6072 in addition to being associated with the old array 6078 of user interface objects to which the user interface objects previously belonged. In contrast, in other embodiments (e.g., as shown in FIG. 6X), the user interface objects (e.g., D10, D13, D16, D19, D22, D30, D31, D33 and 36) are associated with the new array (e.g., "School garden" array 6072) and disassociated with the old array to which they previously belonged (e.g., "Day at the zoo" array 6078). In FIG. 6X, the user interface objects D10, D13, D16, D19, D22, D30, D31, D33 and D36 are shown in the new array 6072 of user interface objects, while they are not shown in the old array 6078 of user interface objects, and the remaining user interface objects (e.g., D1-D9, D11-D12, D14-D15, D17-D18, D20-D21, D23-D25, D26, D29, D32 and D34-D35) in the old array 6078 of user interface objects are rearranged to fill in the gaps caused by the removal of the user interface objects D10, D13, D16, D19, D22, D30, D31, D33 and 36.

FIGS. 13A-13B are flow diagrams illustrating a method 1300 of zooming and rearranging user interface objects in an array with a multifinger gesture in accordance with some embodiments. The method 1300 is performed at a computing device (e.g., device 300, FIG. 3, or portable multifunction device 100, FIG. 1) with a touch screen display (e.g., 112 in FIGS. 7A-7O). Some operations in method 1300 may be combined and/or the order of some operations may be changed.

As described below, the method 1300 provides a way to keep track of a particular user interface object in an array when the array is rearranged after enlargement of the particular user interface object (and, typically, other user interface objects in the array) in response to a multitouch gesture. The method reduces the cognitive burden on a user of finding the particular user interface object after rearrangement of the array by keeping the particular user interface object at the same (or substantially the same) vertical position on the touch screen display just before and just after the rearrangement of the array, thereby creating a more efficient human-machine interface. For battery-operated computing devices, enabling a user to faster and more efficiently locate a user interface object in an array conserves power and increases the time between battery charges.

The device simultaneously displays (1302) on the touch screen display (e.g., 112 in FIG. 7A) a plurality of user interface objects (e.g., digital images S1-S41 in FIG. 7A) in an array 7002 (e.g., an array of digital images for an event labeled "School garden" FIG. 7A). The plurality of user interface objects in the array are displayed in a first arrangement 7002-1 (e.g., an array with three rows, with images in increasing number/time going from left to right across each row, from top to bottom in the array, as shown in FIG. 7A, where S1 has an earlier time than S2 and S2 has an earlier time than S3, and so on). A first user interface object (e.g., image S23) in the plurality of user interface objects is displayed at a first size (e.g., one half inch tall). The first arrangement comprises a first plurality of rows (e.g., three rows, S1-S18, S19-S34 and S35-S41).

The device detects (1304) simultaneous contacts (e.g., 7004 and 7006 in FIG. 7B) by a plurality of fingers (e.g., two fingers) on the array 7002. The simultaneous contacts have a corresponding centroid (e.g., 7008, FIG. 7B) position at the first user interface object. For example, when simultaneous contacts 7004-1 and 7006-1 are initially made on the touch screen display, the position of the centroid 7008-1 of the simultaneous contacts is located within the first user interface object S23, The device detects (1306) a gesture (e.g., a depinch gesture) made by the simultaneous contacts that corresponds to a command to zoom in by a user-specified amount. For example, in FIG. 7C, the simultaneous contacts include a first contact 7004-1 and a second contact 7006-1 and the device detects a depinch gesture (e.g., a gesture where the simultaneous contacts move apart from each other on the touch sensitive surface). In this example, the device detects movement 7010 of the first contact 7004-1 to a new position of the first contact (e.g., contact 7004-2 in FIG. 7D). The device also detects movement 7012 of the second contact 7006-1 to a new position of the second contact (e.g., contact 7006-2 in FIG. 7D).

In response to detecting the gesture (e.g., the depinching gesture) by the simultaneous contacts, the device enlarges (1308) the first user interface object (e.g., S23 in FIG. 7D) to a second size larger than the first size on the touch screen display (e.g., one inch tall). In some embodiments, in response to detecting the gesture by the simultaneous contacts, the device enlarges (1310) other user interface objects (e.g., S4-S11, S21-S22, S24-S28, S38-S41, etc. in FIG. 7D) in the array at the same time as the first user interface object and by the same amount as the first user interface object. In other words, if the first interface object S23 is one half inch tall before the gesture is detected and one inch tall after the gesture is detected, then if the other user interface objects in FIG. 7C are one half inch tall before the gesture is detected, they will also be one inch tall after the gesture has been detected, as illustrated in FIG. 7D. In some embodiments, respective user interface objects in the array maintain (1312) their respective positions in the array during the enlarging. For example, in FIG. 7D, respective images in the array 7002-1 with three rows maintain their respective positions in the array during the enlarging, even though not all of the images are displayed on the touch screen display after the enlarging.

After enlarging the first user interface object to the second size and while continuing to detect the simultaneous contacts on the touch screen display, the device determines (1314) an updated centroid position (e.g., 7008-2 in FIG. 7D) of the simultaneous contacts. The updated centroid position is located at a first vertical position on the touch screen display immediately prior to ceasing to detect the simultaneous contacts. As shown in FIG. 7D, the vertical position of the updated centroid 7008-2 is higher on the display than the initial vertical position of the centroid 7008-1. In this case, the vertical movement (e.g., 7014 in FIG. 7D) of the centroid from its initial position 7008-1 to its updated position 7008-2 is due to an uneven depinch gesture, where one of the contacts (e.g., contact 7004) moved further from the initial centroid position than the other contact (e.g., contact 7002) during the depinch gesture. However, it should be understood that both of the contacts (e.g., 7002 and 7004) could move simultaneously either up or down on the display (e.g., as illustrated in FIGS. 73-7K), which would also result in vertical movement of the updated centroid position.

The device ceases (1316) to detect the simultaneous contacts (e.g., detecting lift off of all of the simultaneous contacts 7004-2 and 7006-2 in FIG. 7D, as shown in FIG. 7E).

In response to ceasing to detect the simultaneous contacts, the device displays (1318) an animation of the plurality of user interface objects in the array rearranging to form a second arrangement. The second arrangement typically conforms the layout of the enlarged user interface objects to a predefined area of the display (such as the area where a plurality of arrays are being displayed). The second arrangement comprises a second plurality of rows different from the first plurality of rows. The first user interface object is displayed in a row in the second arrangement that includes (e.g., overlaps) the first vertical position on the touch screen display.

For example, in FIG. 7F the user interface objects are shown rearranging to form a second arrangement. In this example, the user interface objects have divided into groups of user interface objects (e.g., S2-S7, S8-S12, S19-S20, S21-S27, S28-S30 and S36-S41). In this example, there are fewer groups of user interface objects than there are user interface objects (e.g., in some embodiments, the user interface objects do not move independently, but rather move in groups). For this example, within each group of user interface objects, the user interface objects do not move relative to each other. For example, the horizontal neighbors to S23 (e.g., S22 and S24 in FIG. 7E) remain the horizontal neighbors of S23 in FIGS. 7F and 7G while the animation is being displayed, and continue to be the neighbors of S23 in the second arrangement, as shown in FIG. 7H. In contrast the vertical neighbors of S23 (e.g., S6, S40 and S41 in FIG. 7E) in this example cease to be neighbors of S23, because they are not part of the same group as S23. In this example, each of these groups of user interface objects moves independently to a location in the second arrangement. FIG. 7G illustrates a continuation of the exemplary animation as the groups of user interface objects rearrange to form the second arrangement of the array 7002-2 (FIG. 7H).

As noted above, the second arrangement comprises a second plurality of rows different from the first plurality of rows. For example, in array 7002-2 in FIG. 7H, there are six rows: S1-S7, S8-S13, S14-S20, S21-S27, S28-S34 and S35-S41, as opposed to the three rows in array 7002-1 that were displayed by the device before rearranging the user interface objects, as illustrated in FIG. 7A.

As noted above, the first user interface object S23 is displayed in a row in the second arrangement that includes (e.g., overlaps) the first vertical position (e.g., the vertical position of the updated centroid 7008-2 in FIGS. 7D-7H) on the touch screen display. In some embodiments, the user interface objects in the second arrangement are arranged according to the same criteria as the user interface objects in the first arrangement (e.g., in increasing number/time going from left to right across each row, from top to bottom in the array, as shown in FIG. 7H, where S1 has an earlier time than S2 and S2 has an earlier time than S3, and so on), while taking into account the change in size of the objects and the resulting change in the number of rows.

The first user interface object has a vertical position on the touch screen display. In some embodiments, the vertical position of the first user interface object moves (1320) in accordance with detected vertical movement of the centroid of the simultaneous contacts prior to ceasing to detect the simultaneous contacts. For example, in FIG. 7D the centroid position of the simultaneous contacts is shown as having moved a vertical distance 7014 from the initial centroid position. In this example, as shown in FIG. 7D, the vertical position of the first user interface object S23 moves by an amount that corresponds to the vertical movement 7014 of the centroid of the simultaneous contacts.

In some embodiments, the plurality of user interface objects are (1322) displayed at the second size in the second arrangement. For example, in FIG. 7H, the user interface objects (e.g., S1-S41) are shown as being one inch high in the second arrangement (e.g., the arrangement in FIG. 7H with six rows of user interface objects).

In some embodiments, an analogous rearrangement process occurs after the device detects a gesture made by the simultaneous contacts that corresponds to a command to zoom out by a user-specified amount (e.g., a two-finger pinch gesture) and then the device ceases to detect the simultaneous contacts.

An illustrative example of the analogous rearrangement process is described below with reference to FIGS. 7I-7O. The device detects simultaneous contacts (e.g., 7016 and 7018 in FIG. 7I) by a plurality of fingers (e.g., two fingers) on the array 7002-2. The simultaneous contacts have a corresponding centroid (e.g., 7020 in FIG. 7I) position at a first user interface object. For example, when the simultaneous contacts 7016-1 and 7018-1 are initially made on the touch screen display, the position of the centroid 7020-1 of the simultaneous contacts is located within the first user interface object S9.

Continuing this example, in FIG. 7I, the simultaneous contacts include a first contact 7016-1 and a second contact 7018-1 and the device detects a pinch gesture (e.g., a gesture where the simultaneous contacts move towards each other on the touch sensitive surface). In this example, the device detects movement 7022 of the first contact 7016-1 to a new position of the first contact (e.g., 7016-2 in FIG. 7J) and movement 7024 of the second contact 7018-1 to a new position of the second contact (e.g., 7018-2 in FIG. 7J). In response to detecting the pinching gesture, the device reduces the size of the first user interface object (e.g., S9 in FIG. 7J) to a new size (e.g., three quarters of an inch tall) smaller than the previous size (e.g., one inch tall) on the touch screen display. In some embodiments, in response to detecting the gesture by the simultaneous contacts, the device reduces the size of other user interface objects (e.g., S4-S11, S21-S22, S24-S28, S38-S41, etc. in FIG. 7J) in the array at the same time as the first user interface object (e.g., S9 in FIG. 7J) and by the same amount as the first user interface object. In other words, if the first interface object S9 is one inch tall before the gesture is detected and three quarters of an inch tall after the gesture is detected, then if the other user interface objects in FIG. 7I are one inch tall, they will be three quarters of an inch tall after the gesture has been detected, as illustrated in FIG. 7J. In some embodiments, respective user interface objects in the array maintain their respective positions in the array during the reducing. For example, in FIG. 7J, there are still six rows of images that are arranged in ascending order left to right, top to bottom, and each of the images is still next to the same images that it was next to before the images were reduced in size (e.g., in FIG. 7I).

In some embodiments, after detecting the pinching gesture, the device detects additional movement of the contacts. In the present example, this additional movement is a vertical translation of the contacts (e.g., 7016-2 and 7018-2 in FIG. 7J) down the touch screen, including movement (e.g., movements 7026 and 7028, respectively in FIG. 7J) of the contacts downwards to new positions (e.g., 7016-3 and 7018-3 in FIG. 7K) on the touch screen display. As the contacts move downwards, the current centroid (e.g., 7020-1 in FIG. 7J) position of the contacts also moves downwards (7030 in FIG. 7K) to a new position (e.g., 7020-2 in FIG. 7K), as does the entire array 7002.

In the present example, after reducing the size of the first user interface object to the second size and while continuing to detect the simultaneous contacts on the touch screen display, the device determines the updated centroid (e.g., 7020-2 in FIG. 7K) position of the simultaneous contacts. The updated centroid (e.g., 7020-2 in FIG. 7K) position is located at a first vertical position on the touch screen display immediately prior to ceasing to detect the simultaneous contacts. As shown in FIG. 7K, the vertical position of the updated centroid 7020-2 is lower on the display than the initial vertical position of the centroid 7020-1. In this case, the vertical movement (e.g., 7030 in FIG. 7K) of the centroid from its initial position 7020-1 to its updated position 7020-2 is due to a movement of the simultaneous contacts (e.g., 7016 and 7018) after the pinch gesture was detected. But it should be understood that the position of the centroid may change at any time due to the movement of one or more of the simultaneous contacts.

Continuing this example, the device ceases to detect the simultaneous contacts (e.g., detecting lift off of all of the simultaneous contacts, as shown in FIG. 7L). In response to ceasing to detect the simultaneous contacts, the device displays an animation of the plurality of user interface objects in the array rearranging to form a third arrangement. The third arrangement typically conforms the layout of the reduced user interface objects to a predefined area of the display (such as the area where a plurality of arrays are being displayed). For example, in FIGS. 7M-7O the user interface objects are shown rearranging to form a third arrangement of the array 7002-3. In this example, the user interface objects have divided into groups of user interface objects (e.g., S1-S7, S8-S12, S13, S14-S20, S21-S24, S25-S27, S28-S34, S35-S36 and S37-41). It should be noted that these groups of user interface objects are different from the groups of user interface objects formed in the previous example. In this example, within each group of user interface objects, the user interface objects do not move relative to each other. For example, the horizontal neighbors to S9 (e.g., S8 and S10 in FIG. 7L) remain neighbors of S9 in FIGS. 7M and 7N while the animation is being displayed, and continue to be the neighbors of S9 in the second arrangement as shown in FIG. 7O. In contrast the vertical neighbors of S9 (e.g., S3, S15 and S16 in FIG. 7L) in this example cease to be neighbors of S9 while the animation is displayed, because they are not part of the same group as S9. In this example, each of these groups of user interface objects moves independently to a location in the third arrangement. FIG. 7N illustrates a continuation of the exemplary animation as the groups of user interface objects rearrange to form the third arrangement. FIG. 7O illustrates the third arrangement of the array 7002-3.

It should be noted that in the third arrangement (e.g., the arrangement in FIG. 7O with four rows: S1-S12, S13-S24, S25-S36, S37-S41), the user interface object (e.g., S9) that was proximate to the updated centroid position 7020-2 when the simultaneous contacts were released (e.g., as shown in FIG. 7L) is at the same vertical position as the updated centroid position 7020-2, even though it is not at the same horizontal position. Typically, if the user is attempting to manipulate a particular user interface object, that object will be proximate to the centroid of any multitouch gesture performed by the user to resize the array. By positioning the user interface object that was proximate to the updated centroid position at the same vertical position as the updated centroid position immediately prior to lift off of the simultaneous contacts, the user interface object that the user was manipulating remains at the same (or nearly the same) vertical position on the touch screen display. Thus, the user is able to more easily locate this user interface object after rearrangement of the array.

FIGS. 14A-14I are flow diagrams illustrating a method 1400 of manipulating user interface objects in a plurality of arrays of user interface objects in accordance with some embodiments. The method 1400 is performed at a computing device (e.g., device 300, FIG. 3, or portable multifunction device 100. FIG. 1) with a touch screen display (e.g., 112 in FIGS. 8A-8UU). Some operations in method 1400 may be combined and/or the order of some operations may be changed.

As described below, the method 1400 provides an intuitive way to manipulate user interface objects in large data sets at a computing device with a touch screen display. The method reduces the cognitive burden on a user when performing actions on user interface objects in large data sets, thereby creating a more efficient human-machine interface. For battery-operated computing devices, enabling a user to manipulate user interface objects in a plurality of arrays faster and more efficiently conserves power and increases the time between battery charges.

The device simultaneously displays (1402) on the touch screen display (e.g., 112 in FIG. 8A) at least one destination object (e.g., an array name icon in a list or menu of such icons, such as one or more of array name icons 8004, 8006, 8008, 8010, 8012, 8014, 8016, 8018, 8020, 8022, 8024, 8028, 8030, 8032, 8034, 8038, 8040, 8042, 8044, 8046, 8048, and/or 8050) and at least a subset of a plurality of arrays of user interface objects. For example, as shown in FIG. 8A, there are two arrays of user interface objects, a "Day at the zoo" array 8052 that includes a plurality of user interface objects (e.g., digital images D1-D36) from an event labeled "Day at the zoo" and a "School garden" array 8054 that includes a plurality of user interface objects (e.g., S1-S41). Depending on the number of arrays, it may not be possible to simultaneously display every array in the plurality of arrays. In such cases, a subset of the plurality of arrays is displayed and different subsets may be viewed by scrolling the plurality of arrays (e.g., in response to detecting a first finger swipe gesture on the touch screen display, such as a vertical or substantially vertical finger swipe gesture, as described in greater detail below with reference to FIGS. 8B-8D).

In some embodiments, the device displays (1404) a respective representative user interface object (e.g., digital image S33-*r*, which is representative of the digital images in array 8054 in FIG. 5A) adjacent to a respective array (e.g., the "School garden" array 8054 in FIG. 5A) for at least some arrays in the plurality of arrays.

In some embodiments, the device displays (1406) a respective representative user interface object toggle icon (e.g., icon 8056 in FIG. 8A) for a respective array (e.g., 8054 in FIG. 8A) in the plurality of arrays. The representative user interface object toggle icon is operable to toggle display of the respective representative user interface object (e.g., image S33-*r* in FIG. 8A) on and off. In some embodiments, each array in the plurality of arrays has (1408) a corresponding representative user interface object toggle icon.

In some embodiments, the representative user interface object toggle icon (e.g., S33-*r* in FIG. 8A) is (1410) displayed adjacent to a respective representative user interface object when the respective representative user interface object is displayed and the representative user interface object toggle icon (e.g., 8056 in FIG. 5A) is displayed adjacent to a respective array (e.g., 8054 in FIG. 8Q) when the respective representative user interface object is not displayed, as illustrated in FIG. 8Q, which is described in more detail below. In some embodiments, the device displays (1412) a respective array name icon (e.g., "School garden" 8058 in FIG. 8A) adjacent to the respective representative user interface object toggle icon (e.g., 8056 in FIG. 8A).

The device detects (1414) a first input by a user (e.g., a vertical or substantially vertical finger swipe gesture or stylus swipe gesture) on the touch screen display. For example, in FIG. 8B, the device detects a vertical swipe gesture that includes a contact 8060-1 with the touch screen display and subsequent movement 8062 of the contact along the touch screen display to a new location (e.g., contact 8060-2 in FIG. 5C). In some embodiments, the first input by the user may be detected anywhere on the touch screen display. In some embodiments, the first input by the user must be detected in a predefined area on the touch screen display, such as the area that displays the plurality of arrays (as shown in FIG. 88).

In response to detecting the first input by the user on the touch screen display, the device vertically scrolls (1416) the plurality of arrays on the touch screen display. For example, in FIG. 8B, the currently displayed arrays are "Day at the zoo" 8052 and "School garden" 8054. After detecting the first input by the user (e.g., swipe gesture including contact 8060-1 and movement 8062 of the contact in FIG. 8B), the device scrolls through the arrays so that new arrays (e.g., the "Family reunion" array 8064 and the "Southern Europe" array 8066 in FIG. 8C) are displayed in the display region. In this example, the newly displayed arrays each include a plurality of user interface objects: the "Family reunion" array 8064 includes 17 user interface objects" (e.g., F1-F17), all of which are displayed; and the "Southern Europe" array 8066 includes 74 user interface objects, only some of which (e.g., E1-E54) can be displayed, while other user interface objects in the array (e.g., E55-E74) are not displayed, but can be revealed by the device in response to gestures from the user.

In some embodiments the device continues to scroll (e.g., as illustrated by arrow 8068 in FIG. 5C) the display of the device for a predetermined period of time after the device detects the end of the first user input (e.g., the end of the movement of the contact along the touch sensitive-surface during the swipe gesture). In some embodiments, this movement after detecting an end of the first user input gradually slows down, creating an inertia-like effect, as though the arrays were sliding along a physical surface and gradually slow down due to friction.

The device detects (1418) a second input by the user (e.g., a horizontal or substantially horizontal finger swipe gesture or stylus swipe gesture) on a single array in the plurality of arrays on the touch screen display. For example, in FIG. 8D, the second input is a horizontal swipe gesture that includes a contact 8070-1 with an array 8066 and subsequent movement 8072 of the contact to a new location (e.g., 8070-2 in FIG. 8E).

In response to detecting the second input by the user on the single array, the device horizontally scrolls (1420) user interface objects in the single array without horizontally scrolling other arrays in the plurality of arrays. In the example above, user interface objects in the array (e.g., 8066 in FIG. 8D) are scrolled horizontally (e.g., to the left) so that some of the previously displayed user interface objects are hidden (e.g., in FIG. 8D, before the scrolling of the user interface objects, user interface objects E1-E24 are displayed, while in FIG. 8E, after the scrolling of the user interface objects, user interface objects E1-E24 are no longer displayed.) Similarly, in the example above, some of the user interface objects that were previously hidden are displayed as a result of the horizontal scrolling (e.g., in FIG. 8D, before the scrolling of the user interface objects, user interface objects E55-E74 are not displayed, while in FIG. 8E, after the scrolling of the user interface objects, user interface objects E55-E74 are displayed.)

In some embodiments, the device displays a rubber-band-like effect to indicate that either the beginning or the end of an array is being displayed during detection of a horizontal scrolling gesture. To indicate the end of an array is being displayed, there is an invisible vertical edge 8074 at the right side of the display (FIG. 8E). The user interface objects in an array (e.g., array 8066, FIG. 8E) are horizontally scrolled (e.g., as shown by the leftward pointing arrow 8076 in FIG. 8E) beyond that edge during detection of a horizontal scrolling gesture (e.g., by contact 8070). After detecting lift off of the contact (e.g., lift off of 8070-2 in FIG. 8E), the device horizontally scrolls (e.g., as shown by the rightward pointing arrow 8078 in FIG. 8E) the user interface objects in the array 8066 back towards the edge 8074 so that the right edge of the rightmost user interface objects at the end of the array (e.g., images E73 and E74 in FIG. 8F) are proximate to the edge 8074. A rubber-band-like effect that is used to indicate that the beginning an array is being displayed during detection of a horizontal scrolling gesture is described in operation 1421 below.

As a further example of the device scrolling a single array of user interface objects horizontally, the device may also detect a horizontal swipe gesture including a contact (e.g., 8080-1 in FIG. 8G) with an array (e.g., 8066 in FIG. 8O) and subsequent movement (e.g., 8082 in FIG. 8G) of the contact to a new location (e.g., 8080-2 in FIG. 8H). In this example, after detecting the horizontal swipe gesture on the array (e.g., 8066 in FIG. 8G), the device horizontally scrolls user interface objects in the single array to the right without horizontally scrolling other arrays in the plurality of arrays. In this example, user interface objects in the array (e.g., 8066 in FIG. 8G) are scrolled horizontally (e.g., to the right) so that some of the previously displayed user interface objects are hidden (e.g., in FIG. 8G, before the scrolling of the user interface objects, user interface objects E55-E74 are displayed, while in FIG. 8H, after the scrolling of the user interface objects, user interface objects E55-E74 are no longer displayed.) Similarly, in this example, some of the user interface objects that were previously hidden are displayed as a result of the horizontal scrolling (e.g., in FIG. 8G, before the scrolling of the user interface objects, user interface objects E1-E24 are not displayed, while in FIG. 8H, after the scrolling of the user interface objects, user interface objects E1-E24 are displayed.)

In some embodiments, the device displays (1421) respective representative user interface objects for respective arrays (e.g., representative images F8-*r* and E45-*r* in FIG. 8G). The respective representative user interface objects are aligned to a common vertical edge on the touch screen display. For example, in FIG. 8G, the edges of the representative user interface objects (e.g., representative images F8-*r* and E45-*r* in FIG. 8O) are aligned with vertical edge 8084. The device displays a first portion of the single array adjacent to a representative user interface object for the single array (e.g., images E25-E74 in FIG. 8G). The device detects an input by the user (e.g., a finger contact 8080-1 or stylus contact) on the single array. The device detects a movement (e.g., movement 8082 in FIG. 8G) of the input by the user on the touch screen display. In response to detecting the movement, the device horizontally scrolls (e.g., as shown in FIGS. 8O-8H) the single array (e.g., 8066 in FIGS. 8O-8H) on the touch screen display in a first direction to display a second portion of the single array (e.g., images E1-E45 in array 8066, as shown in FIG. 8H). The second portion (e.g., images E1-E45 in FIG. 8H) is different from the first portion (e.g., images E25-E74 in FIG. 8G). In response to an edge of the single array being reached while horizontally scrolling the single array in the first direction while the input by the user is still detected on the touch screen display (e.g., contact 8070-2 in FIG. 8H), the device displays horizontal movement (e.g., movement 8086 in FIG. 8H) of the representative user interface object (e.g., image E45-*r* in FIG. 8H) for the single array (e.g., 8066 in FIG. 8H) in the first direction and the device displays horizontal movement of the single array in the first direction, (e.g., user interface objects E25-E74 move to the right from FIG. 8G to FIG. 8H). In some embodiments, the edge of the single array corresponds to an edge of a first user interface object (e.g., E1, E2 or E3 in FIG. 8H) in the single array (e.g., 8066 in FIG. 8H), such as a leftmost user interface object in the single array. In response to detecting lift off of the input (e.g., contact 8070-2 in FIG. 8H) by the user (e.g., lift off of the finger contact or stylus contact) from the touch screen display, the device displays horizontal movement (e.g., movement 8088 in FIG. 8H) of the representative user interface object for the single array (and the single array) in a second direction (e.g., to the left) that is opposite the first direction (e.g. the prior movement 8086 in FIG. 8H1 of the representative user interface object E45-*r* and the array to the right) until the representative user interface object for the single array aligns with the common vertical edge (e.g., the left edge of image E45-*r* aligns with vertical edge 8084).

In some embodiments, the device displays (1422) a list of array name icons (e.g., in FIGS. 8A and 8I, the event list 8002 with event icons 8004, 8006, 8008, 8010, 8012, 8014, 8016, 8018, 8020, 8022 and 8024) that correspond to the plurality of arrays. The list of array names is displayed adjacent to the displayed subset of the plurality of arrays. For example, array name icon “Day at the zoo” 8006 corresponds to the “Day at the zoo” array 8052 shown in FIG. 8A; array name icon “School garden” 8008 corresponds to the “School garden” array 8054 shown in FIG. 8A; array name icon “Family reunion” 8010 corresponds to the “Family reunion” array 8064 shown in FIG. 8I; and the array name icon “Southern Europe” 8066 corresponds to the “Southern Europe” array 8066 shown in FIG. 8I.

In some embodiments, the device detects (1424) a third input by the user (e.g., a finger tap gesture 8090 in FIG. 8I, a stylus tap gesture, or a mouse click when a cursor controlled by the mouse is over the respective array name icon in the list) on a respective array name icon (e.g., “Day at the zoo” 8006 in FIG. 8I) in the list of array name icons. In response to detecting the third input by the user (e.g., tap gesture 8090 in FIG. 8I) on the respective array name icon (e.g., 8006 in FIG. 8I) in the list of array name icons, the device displays an array corresponding to the respective array name icon (e.g., as shown in FIG. 8K, the “Day at the zoo” array 8052 is displayed).

In some embodiments, the device detects (1426) a third input by the user (e.g., a finger tap gesture 8090 in FIG. 8I, a stylus tap gesture, or a mouse click when a cursor controlled by the mouse is over the respective array name icon in the list) on a respective array name icon (e.g., “Day at the zoo” 8006 in FIG. 8I) in the list of array name icons. In response to detecting the third input by the user on the respective array name icon in the list of array name icons, the device scrolls (as shown in FIGS. 8I-8K) the plurality of arrays to an array corresponding to the respective array name icon (e.g., “Day at the zoo” array 8052 in FIG. 8K).

For example, in FIG. 8I the device detects a tap gesture 8090 on the “Day at the zoo” icon 8006. The event list 8002 indicates that the “Day at the zoo” array is above the “Family reunion” array 8064, and thus the device begins to scroll the plurality of arrays downwards (e.g., because the “Day at the zoo” array name icon in FIG. 8I is above the “Family reunion” array name icon in FIG. 8I). In response to detecting the tap gesture 8090, the device scrolls (8092, in FIG. 8I) the arrays (e.g., 8064, 8066) towards the bottom of the display. As shown in FIG. 8S, the device continues to scroll (8094 in FIG. 8J) the arrays towards the bottom of the display (e.g., the “Southern Europe” array 8066 begins to move off of the bottom of the screen) and scrolls newly displayed arrays from the top of the screen (e.g., the “School garden” array 8054 is displayed near the top of the screen in FIG. 8J). In this example, the device stops scrolling once the array (e.g., 8052 in FIG. 8K) that is associated with the “Day at the zoo” array name icon (e.g., 8006 in FIG. 8K) is displayed on the display.

In some embodiments, the device detects (1430) a depinching finger gesture (e.g., a two-finger depinching gesture) on a first array in the plurality of arrays. For example, in FIG. 8K, the device detects simultaneous contacts (e.g., 8096-1 and 8098-1 on the "School garden" array 8054 in FIG. 8K) and movement (e.g., 8100 and 8102 in FIG. 8K) of the contacts to a new location (e.g., 8096-2 and 8098-2 in FIG. 8L). In response to detecting the depinching finger gesture on the first array (e.g., 8054 in FIG. 8K) in the plurality of arrays, the device enlarges user interface objects (e.g., S13-S41 in FIG. 8K are enlarged and displayed as S13-S41 in FIG. 8L) in the first array (e.g., 8054 in FIG. 8L) without enlarging user interface objects in arrays other than the first array. For example, the user interface objects (e.g., images D1-D36) in the "Day at the zoo" array in FIG. 8K are the same size as the user interface objects (e.g., images D1-D36) in the "Day at the zoo" array 8052 in FIG. 8L after the zooming operation has been performed. In some embodiments, the user interface objects in the first array are (1432) enlarged up to a predetermined maximum size. In some embodiments, the user interface objects in the first array are (1434) enlarged by the same amount.

In some embodiments, the device displays (1436) a first representative user interface object adjacent to the first array (e.g., representative image S33-*r* for array 8054 in FIG. 8L). In response to detecting the depinching finger gesture on the first array, the device enlarges the first representative user interface object (e.g., the representative image S33-*r* is larger in FIG. 8L after the depinching gesture than the representative image S33-*r* in FIG. 8K before the depinching gesture). In some embodiments, the first representative user interface object and the user interface objects in the first array are (1438) enlarged simultaneously. For example, the device detects simultaneous contacts (e.g., 8096-1 and 8098-1 on the "School garden" array 8054 in FIG. 8K) and movement (e.g., 8100 and 8102 in FIG. 8K) of the contacts to a new location (e.g., 8096-2 and 8098-2 in FIG. 8L). In response to detecting this gesture, the device simultaneously enlarges the representative image S33-*r* and images S1-S39 in array 8054, as shown in FIGS. 8K-8L.

It should be noted that in the example shown in FIG. 8L, when the user interface objects in the expanded array are expanded, the device is no longer able to display all of the user interface objects in a single view (e.g., in FIG. 8L, user interface objects S1-S12 are not displayed in the first array 8054). In some embodiments, in order to allow the user to access these user interface objects, the device rearranges the user interface icons, as described in greater detail above with reference to FIGS. 7A-7O. In some embodiments, in order to allow the user to accesses these user interface objects the device changes the display of the user interface objects in the array in response to user inputs. For example, in response to a horizontal swipe gesture (e.g., contact 8104 and movement 8106 of the contact substantially horizontal to the direction of the array, as shown in FIG. 8M), the device scrolls the user interface objects in the array of user interface objects. In this example, user interface objects in the array (e.g., 8054 in FIG. 8M) are scrolled horizontally (e.g., to the right) so that some of the previously displayed user interface objects are hidden (e.g., in FIG. 5M, before the scrolling of the user interface objects, user interface objects S31-S41 are displayed, while in FIG. 8N, after the scrolling of the user interface objects, user interface objects S31-S41 are no longer displayed.) Similarly, in the example above, some of the user interface objects that were previously hidden are displayed as a result of the horizontal scrolling (e.g., in FIG. 8M, before scrolling the user interface objects, user interface objects S1-S12 are not displayed, while in FIG. 8N, after the scrolling of the user interface objects, user interface objects S1-S12 are displayed.)

Conversely, in some embodiments, the device reduces the size of an array after detecting a pinching finger gesture (e.g., a two-finger pinching gesture) on a first array in the plurality of arrays. For example, in FIG. 8N, the device detects simultaneous contacts (e.g., 8108-1 and 8110-1 on the "School garden" array 8054 in FIG. 8N) and movement (e.g., 8112 and 8114 in FIG. 8N) of the contacts to a new location (e.g., 8108-2 and 8110-2 in FIG. 8O). In response to detecting the pinching finger gesture on the first array (e.g., 8054 in FIG. 8N) in the plurality of arrays, the device reduces the size of user interface objects (e.g., images S1-S30 in FIG. 8N are reduced in size as displayed as S1-S30 in FIG. 8O) in the first array without reducing the size of the user interface objects in arrays other than the first array. For example, the user interface objects (e.g., images D1-D36) in the "Day at the zoo" array in FIG. 8M are the same size as the user interface objects (e.g., images D1-D36) in the "Day at the zoo" array 8052 in FIG. 8O after the zoom out operation has been performed. In some embodiments, the user interface objects in the first array are reduced in size down to a predetermined minimum size. In some embodiments, the user interface objects in the first array are reduced in size by the same amount. In some embodiments, when there is a representative user interface object for the array (e.g., image S33-*r* in FIG. 8M) the representative user interface object is also resized (e.g., reduced in size).

In some embodiments, the user interface objects are resized about a centroid of the simultaneous user interface contacts (e.g., 8108-2 and 8110-2 in FIG. 8O). For example, when the simultaneous contacts are proximate to a user interface object (e.g., S17 in FIG. 8O) when they are initially detected by the device, as the device resizes the user interface objects, the user interface object (e.g., image S17) which is proximate to the initial location of the simultaneous contacts (e.g., 8108-1 and 8110-1 in FIG. 8N) is moved so as to remain proximate to the user interface contacts. For example, in FIG. 8O, image S17 remains in between the two simultaneous contacts, even though this means that the user interface objects are "pulled" off center. In other words, the user interface objects "under" the pinching gesture behave as though they are on a sheet of rubber that is being contracted in accordance with the pinch, but is "stuck" under the contacts. In this embodiment, when the device detects a lift off of the contacts (e.g., 8108-2 and 8110-2 in FIG. 8O), the device moves (e.g., 8116 in FIG. 8O) array of user interface objects so as to align the array with a vertical edge that other arrays are aligned with (FIG. 8P).

In some embodiments, the device detects (1440) activation of a respective representative user interface object toggle icon (e.g., icon 8056 in FIG. 8P) for a respective array (e.g., detecting a finger tap gesture 8118 in FIG. 8P or a stylus tap gesture on the toggle icon). In response to detecting activation of the respective representative user interface object toggle icon, the device toggles display of the respective representative user interface object for the respective array. For example, in FIG. 8P a representative image S33-*r* is displayed with the "School garden" array 8054. As shown in FIG. 8Q, in response to activation of toggle icon 8056, the device ceases to display the representative image S33-*r*.

In some embodiments, in response to detecting activation of the respective representative user interface object toggle icon (e.g., 5086 in FIG. 8P), the device rearranges (1442) user interface objects in the respective array. For example, when the representative user interface object is displayed, the user interface objects in the respective array are displayed with the same height and the same width, and the objects are ordered sequentially by columns (e.g., successive user interface objects are ordered top-to-bottom, left-to-right in the array, as illustrated in FIG. 8P). But when the representative user interface object is not displayed, the user interface objects in the respective array are displayed with the same height and the objects are ordered sequentially by rows (e.g., successive user interface objects are ordered left-to-right, top-to-bottom in the array, as illustrated in FIG. 8Q).

In some embodiments, a single array in the plurality of arrays is rearranged in response to multifinger gestures as described above with respect to FIGS. 7A-7O and 13A-13B.

In some embodiments, while the single array is displayed without the representative user interface object (e.g., as in FIG. 8Q) the device detects a second activation of the respective representative user interface object toggle icon (e.g., 8056 in FIG. 8Q) for a respective array (e.g., by detecting a mouse click while a cursor 8120 in FIG. 8Q is positioned over the respective representative user interface object toggle icon, a finger tap gesture, or a stylus tap gesture on the toggle icon). For example, in FIG. 8Q, representative image S33-*r* is not displayed with the "School garden" array 8054, while in FIG. 8R, after the second activation of the toggle icon 8056, the device displays the representative image S33-*r*.

In some embodiments, the device detects (1444) a first input by the user (e.g., a press and hold finger contact 8122-1 in FIG. 8R or stylus contact) on a first user interface object (e.g., image D17 in FIG. 8R) in a first array (e.g., 8052 in FIG. 8R) on the touch screen display. While continuing to detect the first input by the user: the device detects movement (e.g., 8124 in FIG. 8S) of the first input by the user across the touch screen display to an area (e.g., 8126 in FIG. 8S) associated with a second array (e.g., 8054 in FIG. 8S) on the touch screen display (e.g., an area containing the user interface objects in the second array); the device moves the first user interface object (e.g., from D17 to D17' in FIG. 8S) in accordance with the movement of the first input by the user across the touch screen display to the area (e.g., 8126 in FIG. 8S) associated with the second array (e.g., 8054 in FIG. 8S) on the touch screen display; the device detects lift off of the first input by the user (e.g., lift off of the first finger contact 8122-2 in FIG. 8S or the stylus contact) from the area 8126 associated with the second array; and, in response to detecting lift off of the first input by the user from the area associated with the second array, the device associates the first user interface object with the second array (e.g., adds image D17 to the "School garden" event array 8054) and displays the first user interface object in the second array (e.g., as shown in FIGS. 8T-8U, where D17 moves 8128 into array 8054).

In some embodiments, the device displays (1446) a residual image of the first user interface object in the first array on the touch screen display (e.g., shaded user interface object D17 in FIGS. 8S-8T). In some embodiments, the residual image is displayed in the first array while the first input (e.g., contact 8122-1 in FIG. 8S) by the user is still detected on the touch screen display, but the residual image ceases to be displayed in response to detecting lift off of the first input (e.g., lift off of contact 8122-2 in FIG. 8S).

In some embodiments, in response to detecting lift off of the first input (e.g., lift off of contact 8122-2 in FIG. 8S) by the user (e.g., lift off of a first finger contact or stylus contact) from the area (e.g., 8126 in FIG. 8S) associated with the second array (e.g., 8054 in FIG. 8S), the device also displays (1448) the first user interface object in the first array and ceases to display the residual image of the first user interface object in the first array (i.e., the first user interface object is displayed in both the first array 8052 and the second array 8054). For example, in FIG. 8U, the user interface object D17 is displayed in both the first array 8052 and the second array 8054.

In some embodiments, in response to detecting lift off of the first input (e.g., lift off of contact 8122-2 in FIG. 8S) by the user (e.g., lift off of the first finger contact or stylus contact by the user) from the area (e.g., 8126 in FIG. 8S) associated with the second array (e.g., 8054 in FIG. 8S), the device disassociates (1450) the first user interface object from the first array and ceases to display the residual image of the first user interface object in the first array. For example in FIG. 8V, the user interface object D17 is displayed only in the second array 8054, and the user interface object D17 has been removed from the first array 8052. In some embodiments, the remaining user interface objects (e.g., images D1-D16. D18-D36) in the first array are rearranged to fill in the space left by the removed user interface object, as shown in FIG. 8V, while remaining in time/number order.

In some embodiments, a group of selected objects is formed and then the group is moved/acted upon, as described above with respect to FIGS. 6A-6X, 11A-11B, and 12A-12B.

Figure 8W:
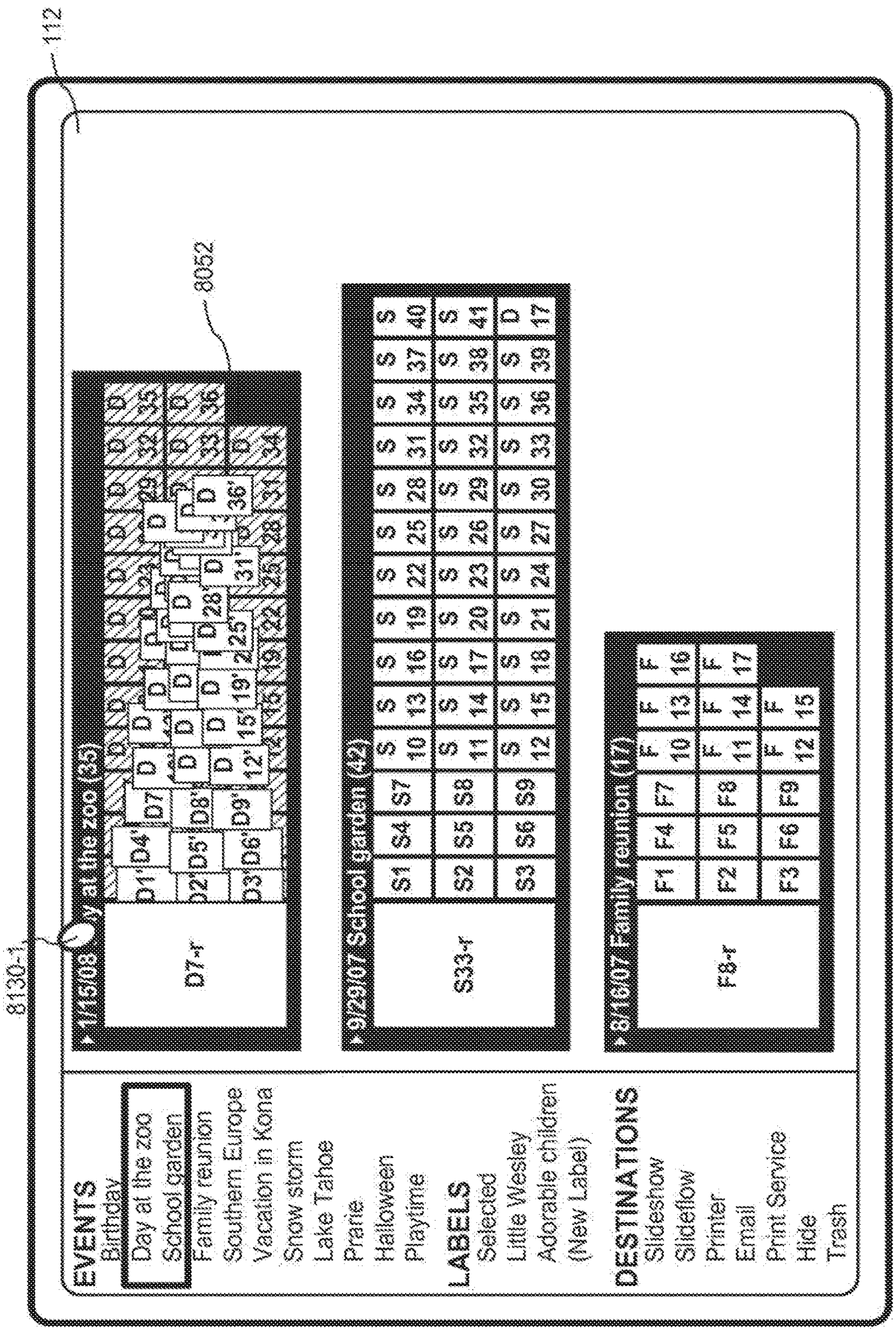

In some embodiments, the device detects (1452) activation of a respective array name icon that corresponds to a respective array (e.g., array 8052 in FIG. 8V) in the plurality of arrays (e.g., detecting a press and hold finger contact input 8130-1 or stylus contact by the user on the "Day at the zoo" array name icon 8132 in FIG. 8V, which is displayed adjacent to a respective representative user interface object toggle icon). In response to detecting activation of the respective array name icon (e.g., "Day at the zoo" 8132 in FIG. 8V) that corresponds to the respective array (e.g., 8052 in FIG. 8V), the device displays an animation of user interface objects in the respective array moving into a respective representative user interface object for the respective array. The animation indicates to a user that all of the user interface objects in the array are being grouped together. For example, FIG. 8W, illustrates an animation of images D1', D2', D3', D4', D5', D6', D7', D8', D9', D12', D15', D19', D19', D25', D28', D31', D36', etc. moving towards representative image D7-*r*, while residual user interface objects are displayed in the original locations of the user interface objects (e.g., shaded user interface objects D32, D33, D34, D35, D36, etc. in FIG. 8W). It should be understood that, in this example, all of the user interface objects in array 8052 are moving into representative user interface object D7-*r*, however, some of the user interface objects are shown as covering other user interface objects, and thus, not all of the user interface objects are visible in FIG. 8W.

Figure 8X:
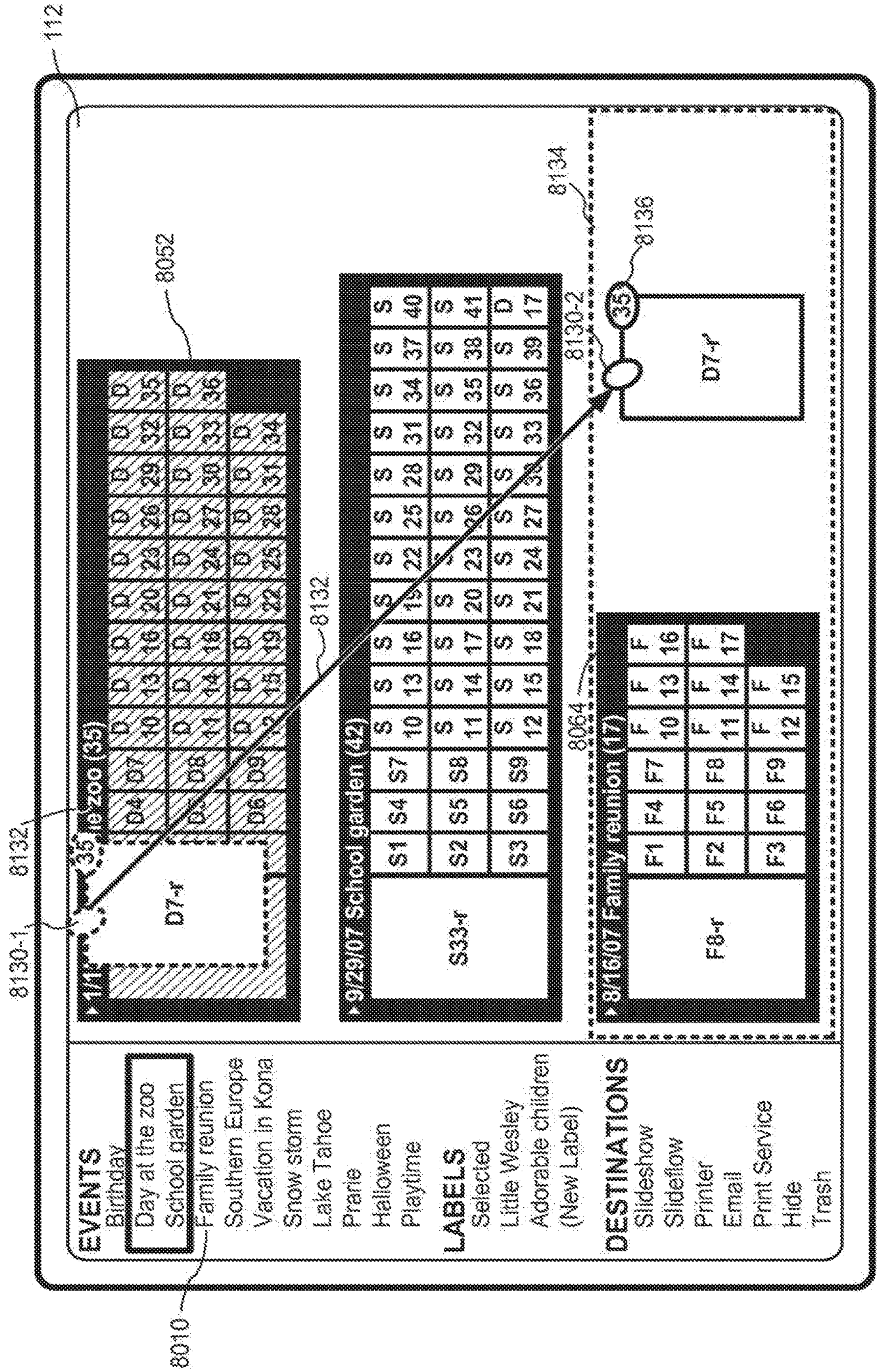

The device detects movement (e.g., 8132 in FIG. 8X) of an input by the user (e.g., a finger contact 8130-1 or stylus contact) from the array name icon (e.g., 8132 in FIG. 8X) to a destination object or an area associated with a destination object (e.g., area 8134 in FIG. 8X). The device moves the respective representative user interface object (e.g., from D7-*r* to D7-*r'* in FIG. 8X) in accordance with the movement (e.g., 8132 in FIG. 8X) of the input (e.g., contact 8130-1 moves to a new contact location 8130-2 in FIG. 8X) by the user across the touch screen display to the destination object or the area associated with a destination object (e.g., the area associated with the "Family reunion" event icon 8010 in FIG. 8X). In some embodiments, a counter (e.g., 8136 in FIG. 8X) with the number (e.g., "35") of user interface objects in the respective array is also displayed.

The device detects lift off of the input (e.g., contact 8130-2 is present in FIG. 8X and has lifted off in FIG. 8Y) by the user (e.g., lift off of the finger contact or stylus contact) from the touch screen display at the destination object or at the area (e.g., 8134 in FIG. 8Y) associated with a destination object. In response to detecting lift off of the input by the user from the touch screen display at the destination object or at the area (e.g., 8134 in FIG. 8Y) associated with the destination object, the device performs an action on the user interface objects in the respective array. The action is associated with the destination object. Exemplary actions include, without limitation: associating a label with digital content or an electronic document; moving digital content or an electronic document from one event to another event; moving digital content or an electronic document to a folder; and printing/publishing a copy of the digital content or electronic document.

In some embodiments, the action is (1454) performed on all of the user interface objects in the respective array (e.g., all of the user interface objects from the "Day at the zoo" array 8052 are made part of the "Family reunion" array 8064, as illustrated in FIG. 8AA).

In some embodiments, in response to detecting activation of the respective array name icon that corresponds to the respective array, the device displays (1456) a counter (e.g., 8136 in FIG. 8X) with the number of user interface objects (e.g., "35") in the respective array.

In some embodiments, in response to detecting activation of the respective array name icon (e.g., contact 8130-1 with array name icon "Day at the zoo" 8132 in FIG. 8X) that corresponds to the respective array, the device displays (1458) residual images (e.g., shaded images D1, D2, D3, D14, D5, D6, D7, D8, D9, D10, D11, D12, D13, D14, D15, 1D6, D18, D19, D20, D21, D22, D23, D24, D25, D26, D27, D28, D29, D30, D31, D32, D33, D34, D35, D36 in FIGS. 8W-8Z) of user interface objects in the respective array.

In some embodiments, in response to detecting lift off of the input by the user (e.g., lift off of the finger contact or stylus contact) from the touch screen display at the destination object or at the area associated with the destination object, the device displays (1460) the user interface objects in the respective array and ceases to display the residual images of user interface objects in the respective array (i.e., the user interface objects replace their residual images in the respective array). For example, in FIGS. 8Y-8AA, after the device detects lift off of the contact 8130-2 (FIG. 8Y), the images D1-D36 replace their residual images in array 8052. In addition, the device replaces display of the representative user interface object (e.g., D7-*r*' in FIG. 8Y) and the counter (e.g., 8136 in FIG. 8Y) with representations of the user interface objects (e.g., D1', D2', D3', D4', D5', D6', D7', D8', D9', D10', D11', D12', D13', D14', D15', D16', D18', D19', D20', D21', D22', D23', D24', D25', D26', D27', D28', D29', D30', D31', D32', D33', D34', D35', D36' in FIG. 8Z). In some embodiments, the device displays an animation of these user interface objects moving into the array associated with the destination object (e.g., "Family reunion" array 8064). In Figure AA, after the animation has completed, user interface objects D1', D2', D3', D4', D5', D6', D7', D8', D9', D10', D11', D12', D13', D14', D15', D16', D18', D19', D20', D21', D22', D23', D24', D25', D26', D27', D28', D29', D30', D31', D32', D33', D34', D35', D36' are shown as part of the "Family reunion" array 8064, and corresponding user interface objects D1, D2, D3, D4, D5, D6, D7, D8, D9, D10, D11, D12, D13, D4, D15, D16, D18, D19, D20, D21, D22, D23, D24, D25, D26, D27, D28, D29, D30, D31, D32, D33, D34, D35, D36 are simultaneously shown in the "Day at the zoo array" 8052.

In some embodiments, in response to detecting lift off of the input by the user (e.g., lift off of the finger contact or stylus contact) from the touch screen display at the destination object or at the area associated with the destination object, the device disassociates (1462) the user interface objects from the respective array and ceases to display the residual images of the user interface objects in the respective array (not shown).

Figure 8Y:
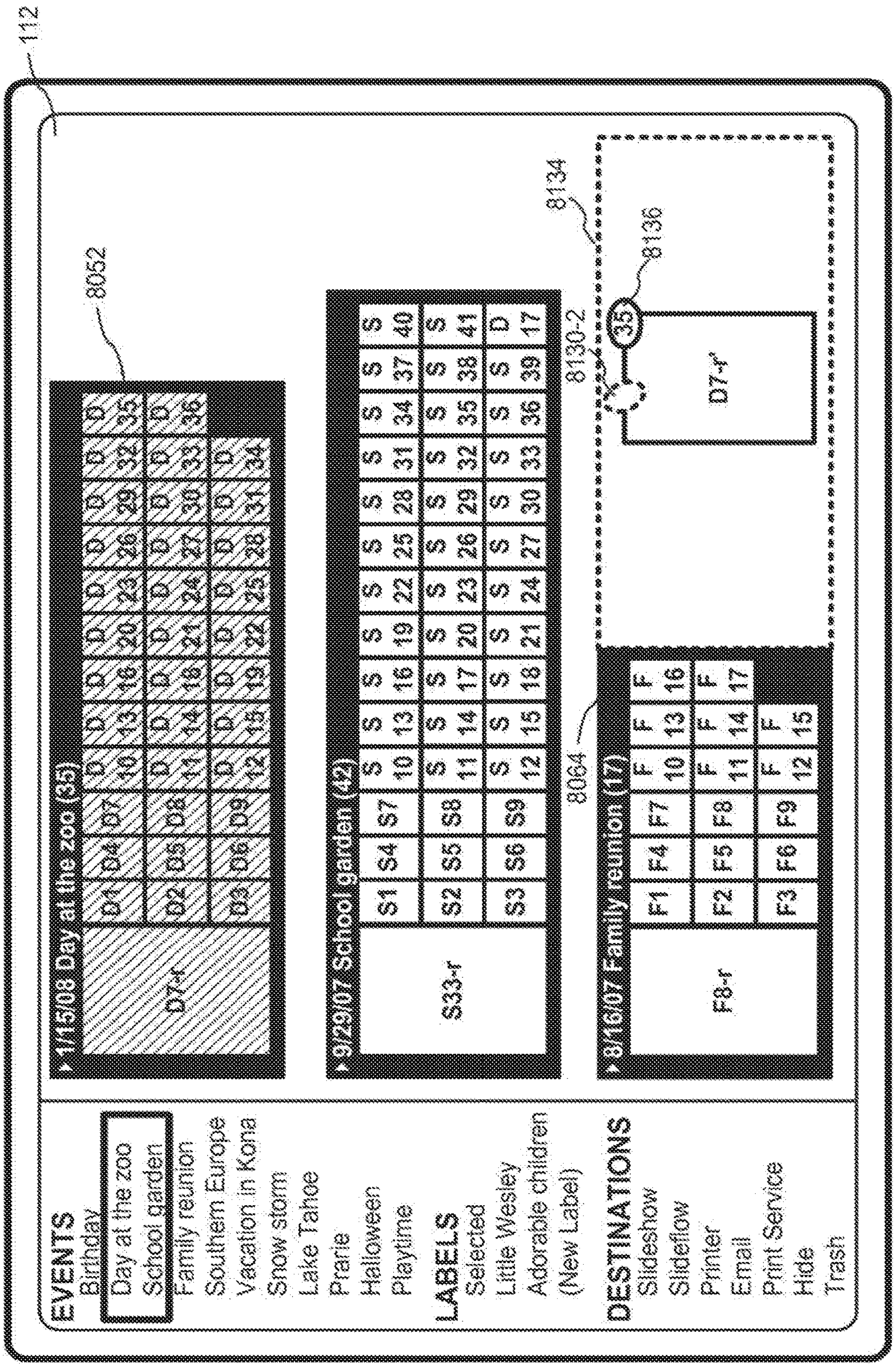
Figure 8Z:
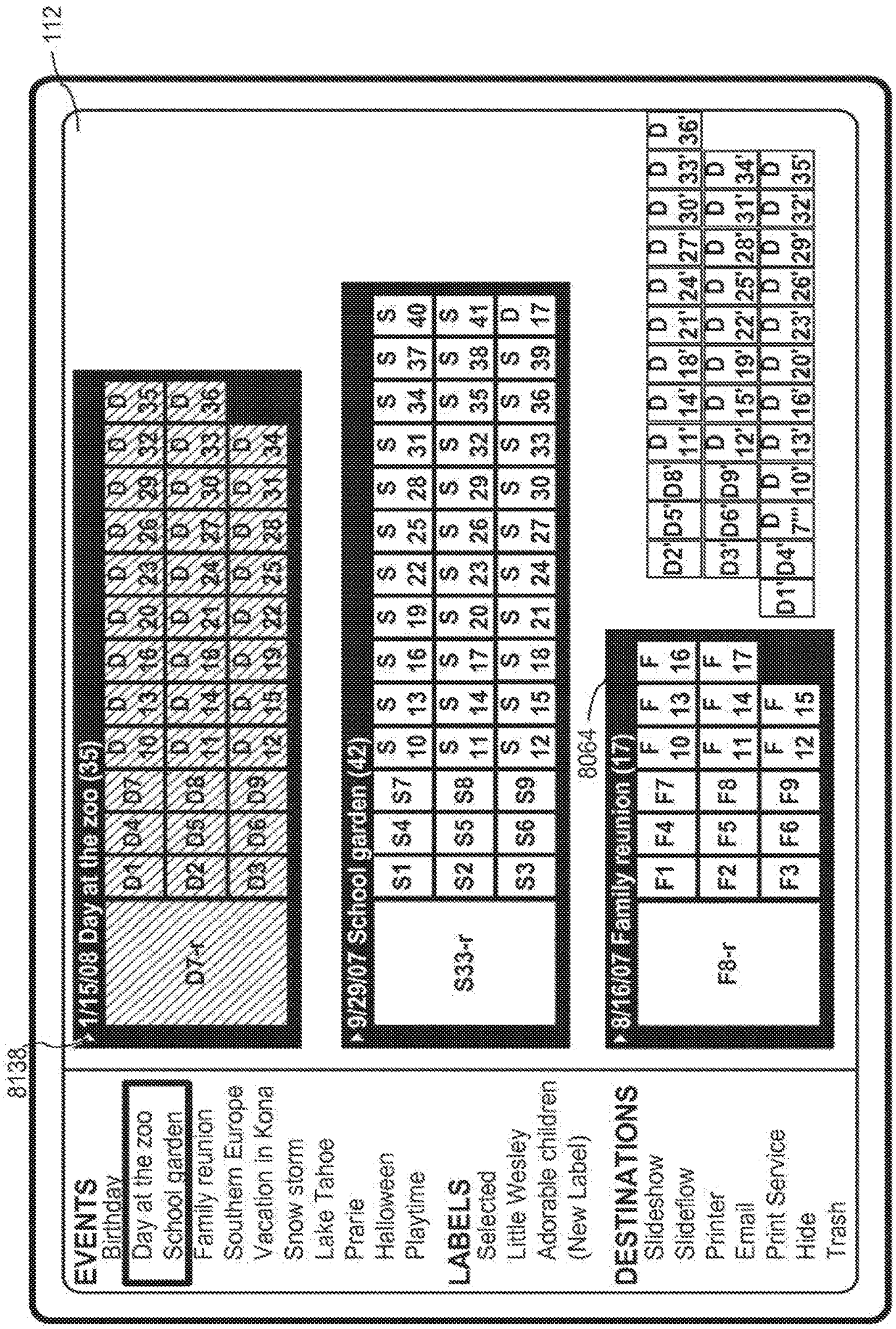
Figure 8A:
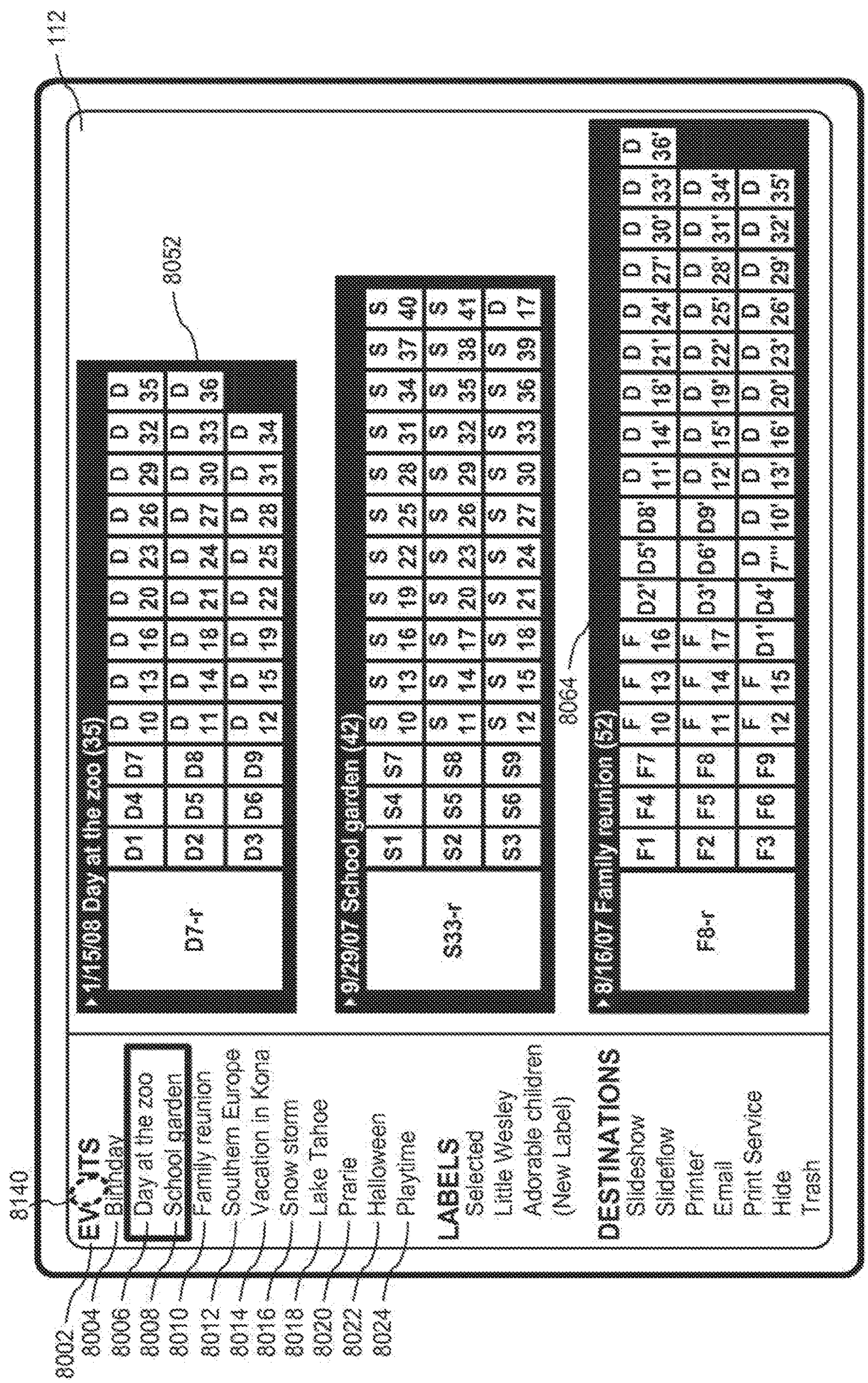
Figure 8B:
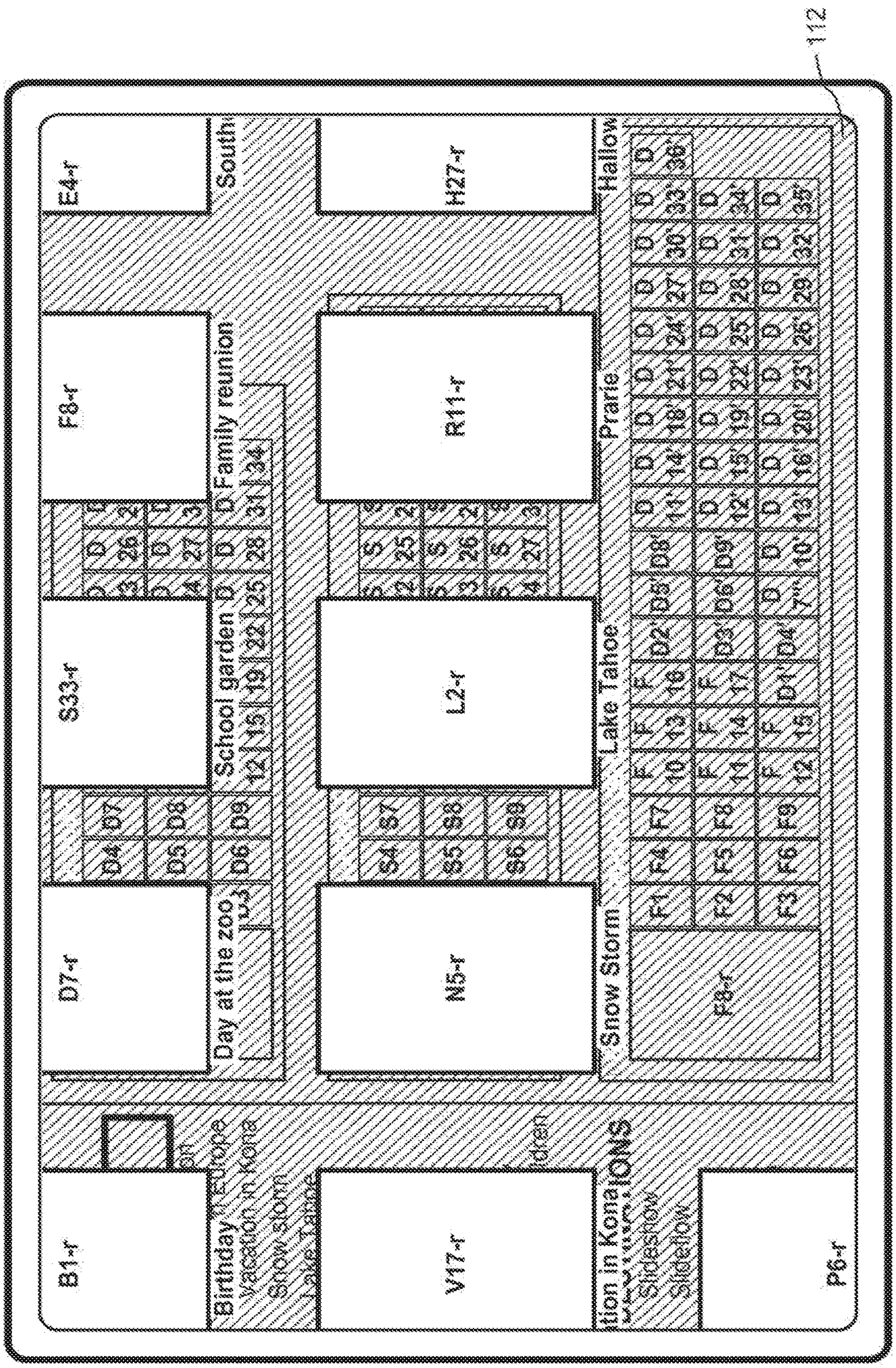
Figure 8C:
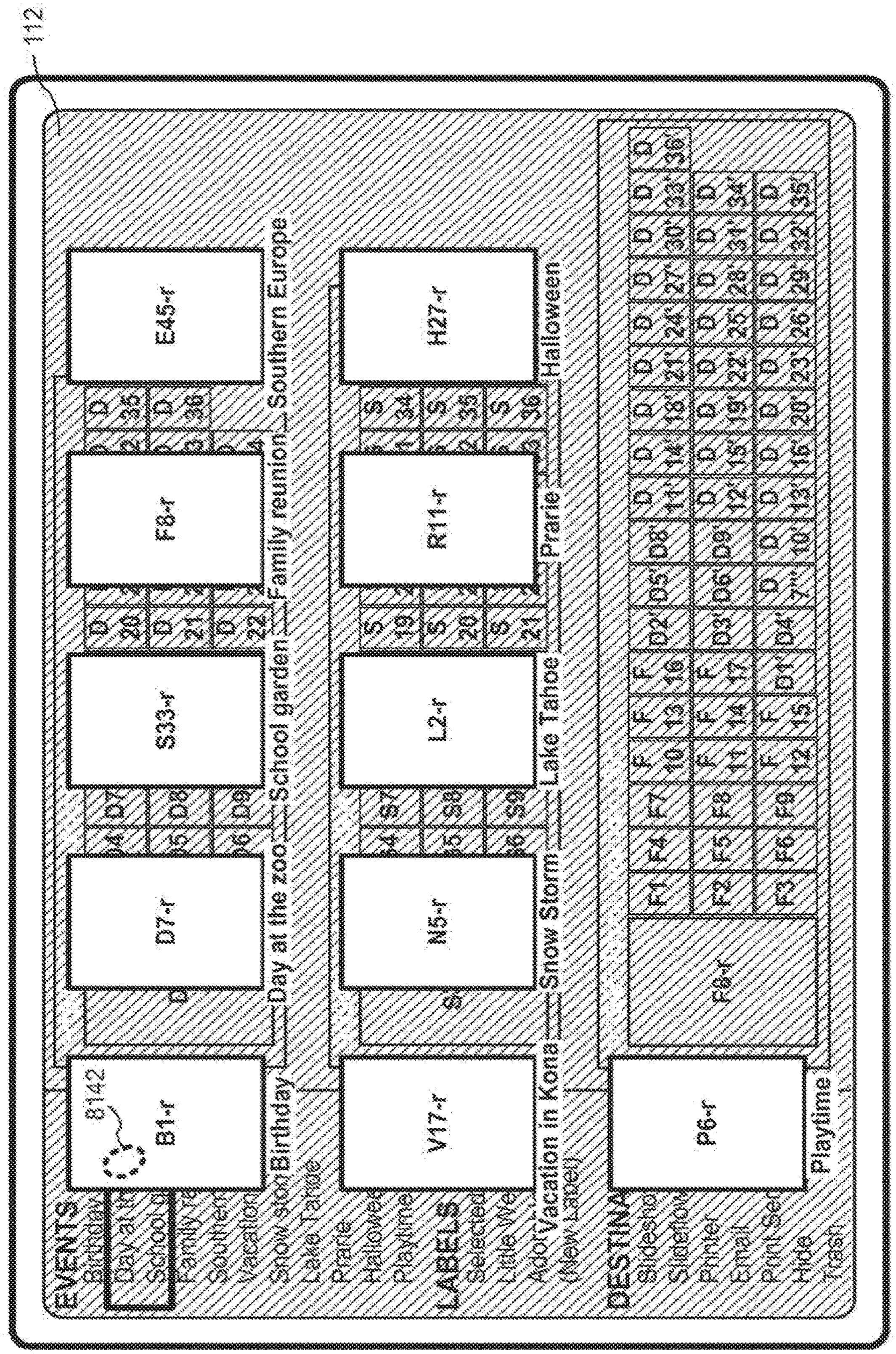
Figure 8D:
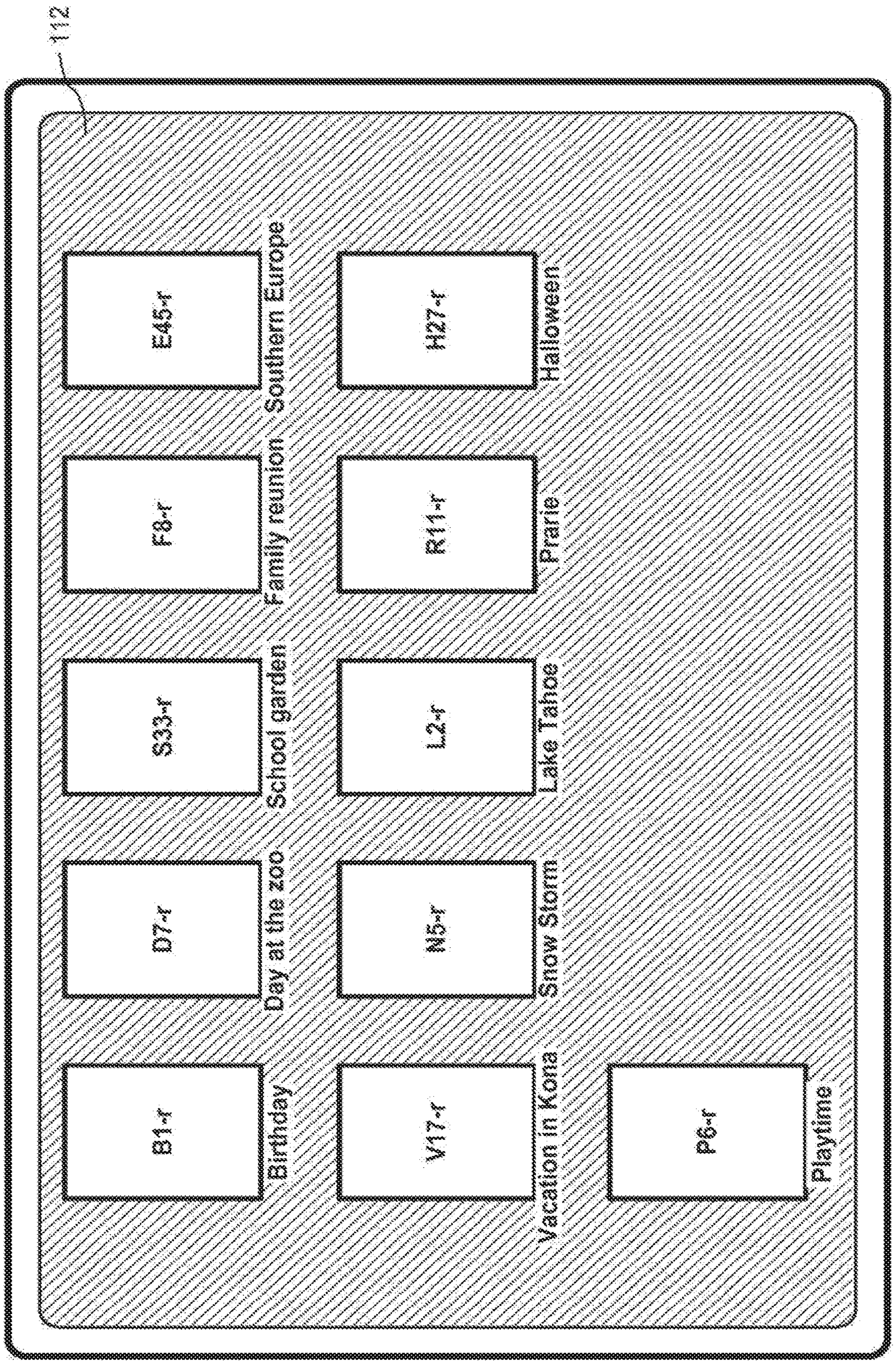
Figure 8E:
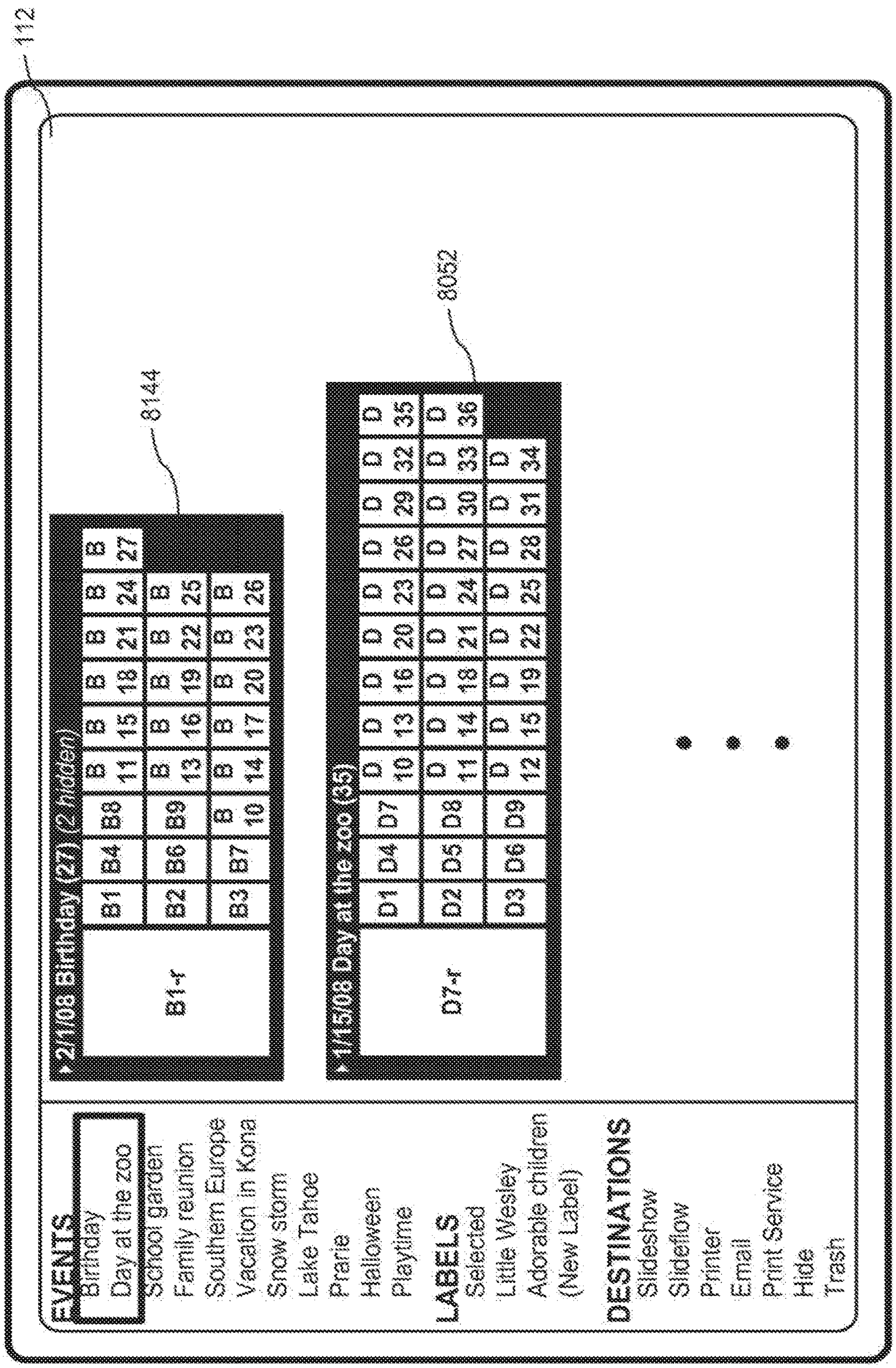
Figure 8F:
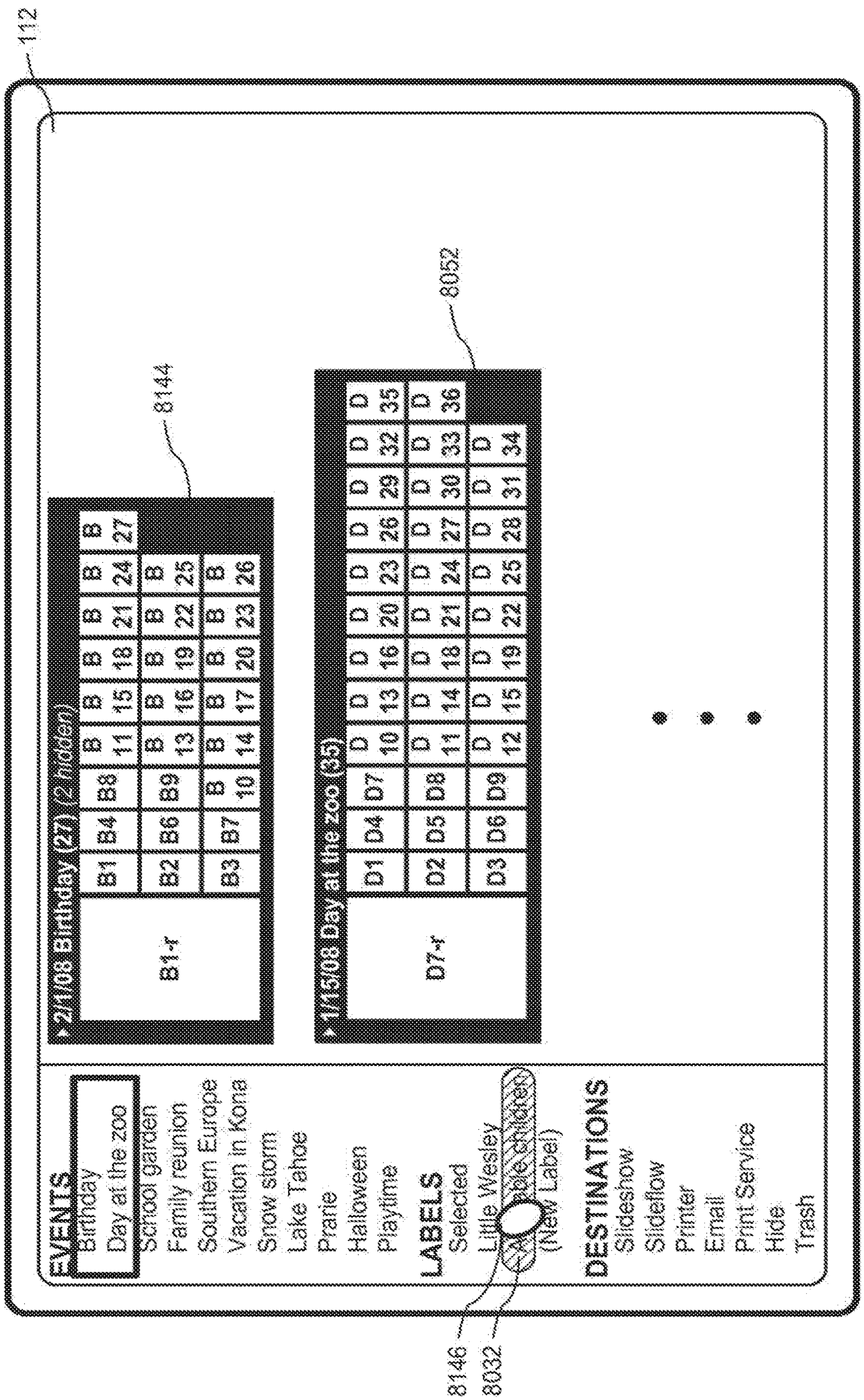
Figure 8G:
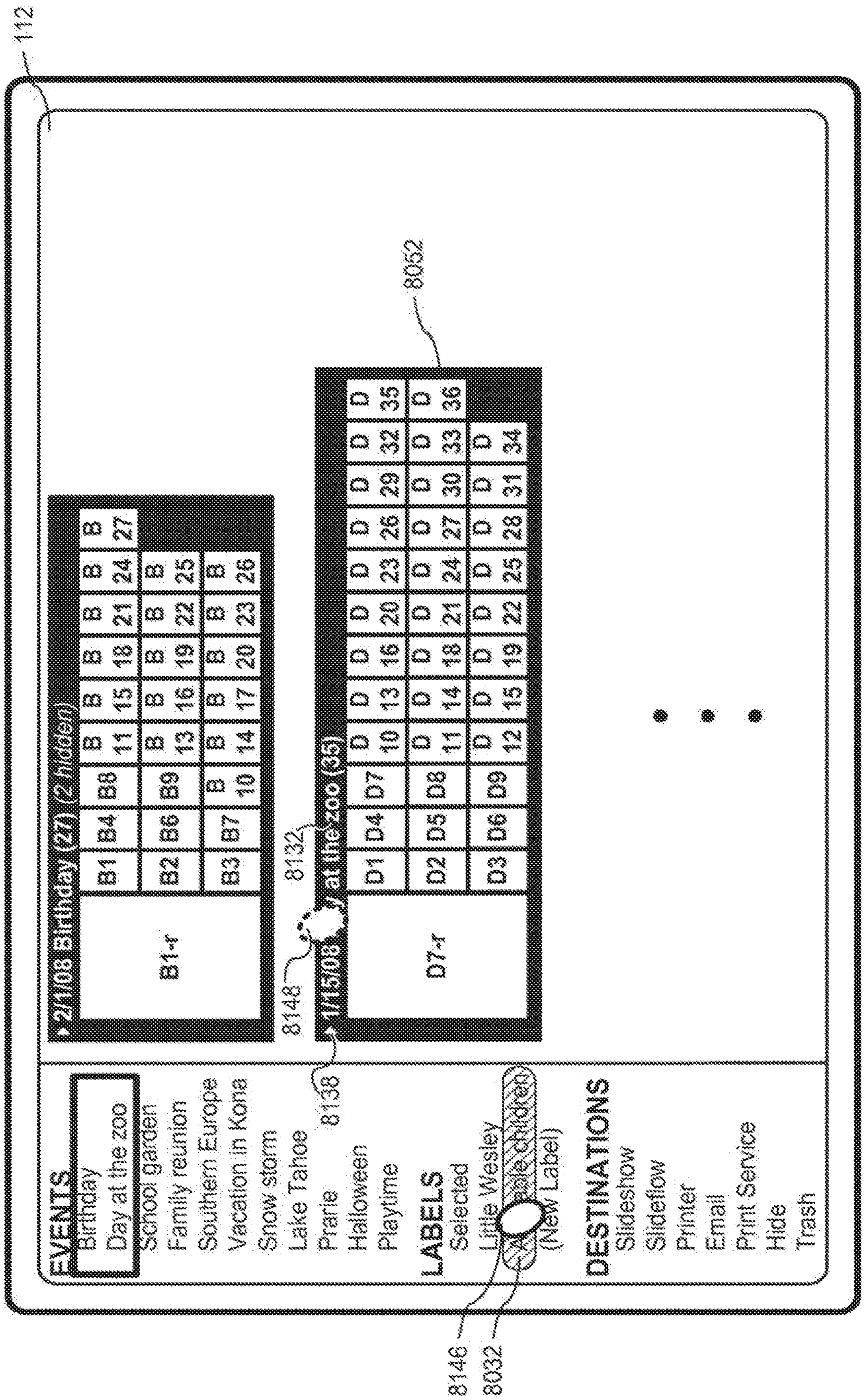
Figure 8H:
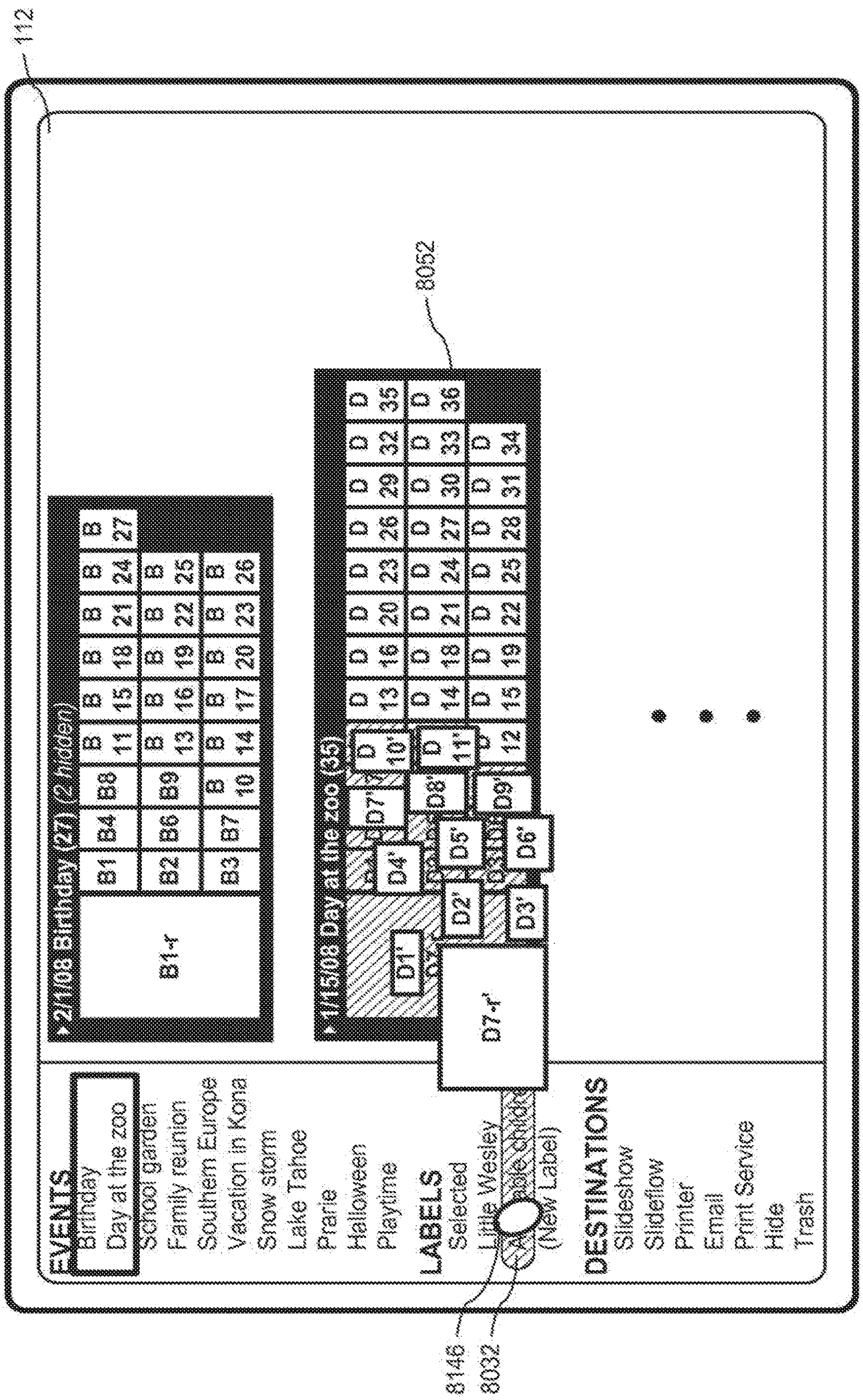
Figure 8I:
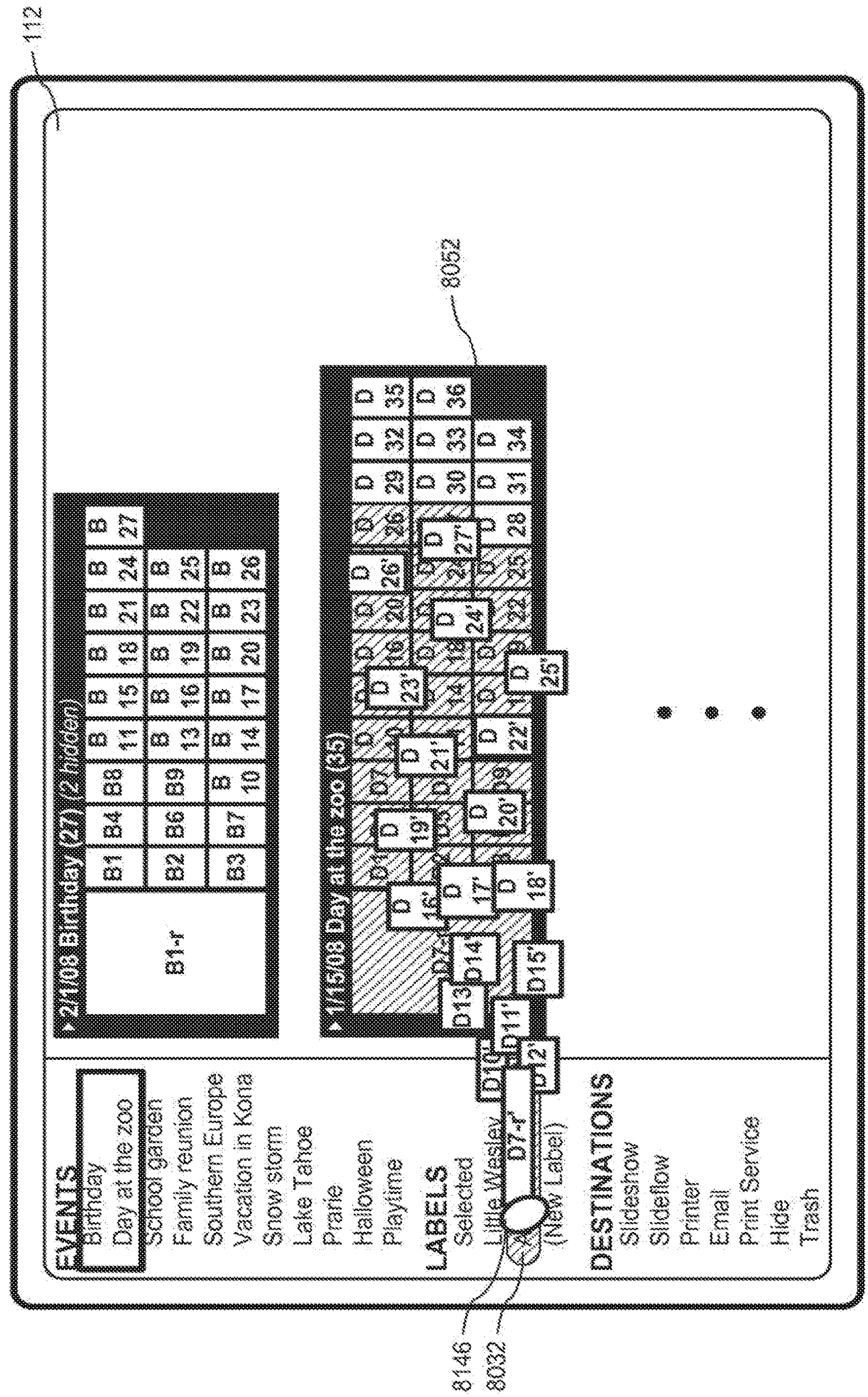
Figure 8J:
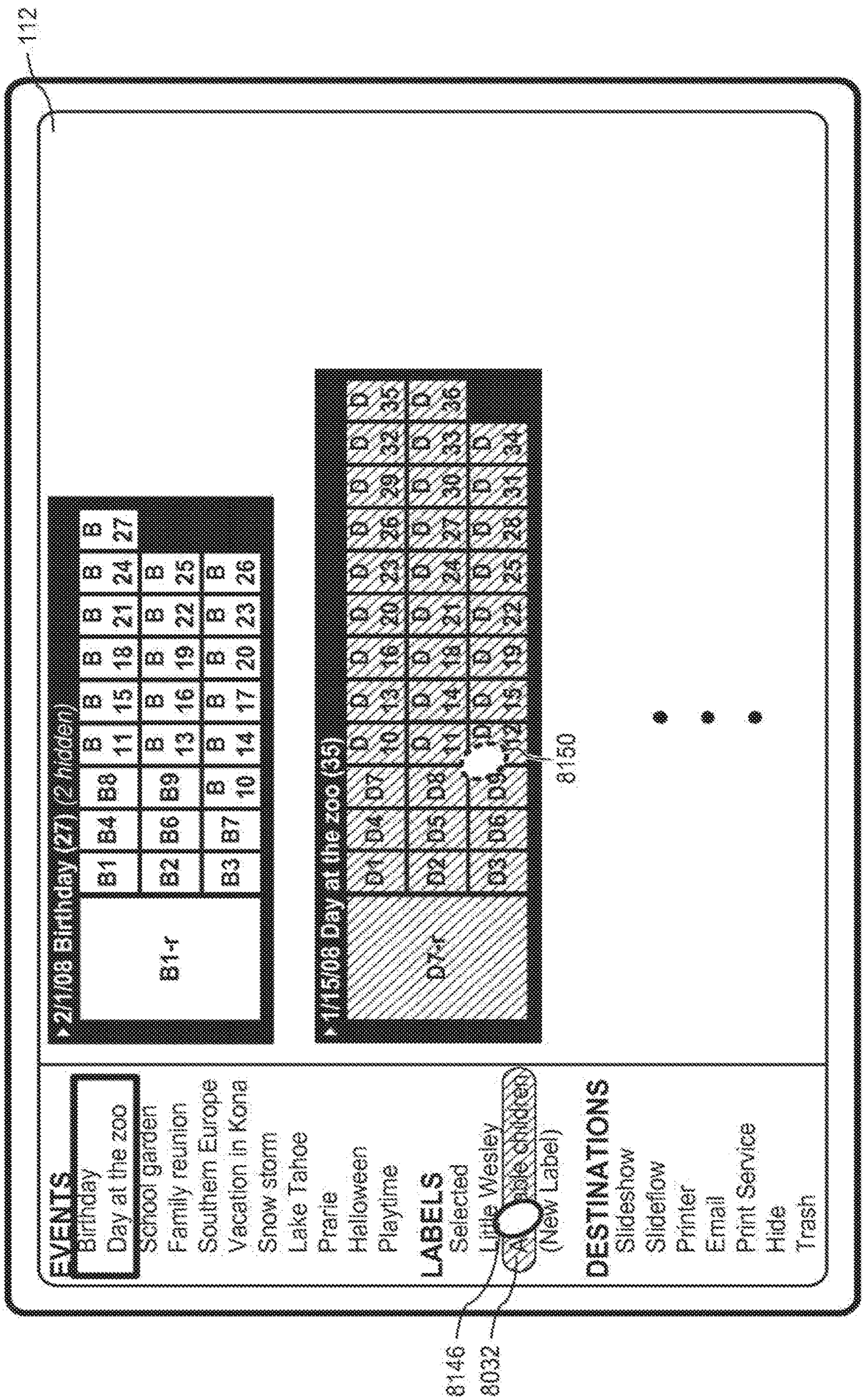
Figure 8K:
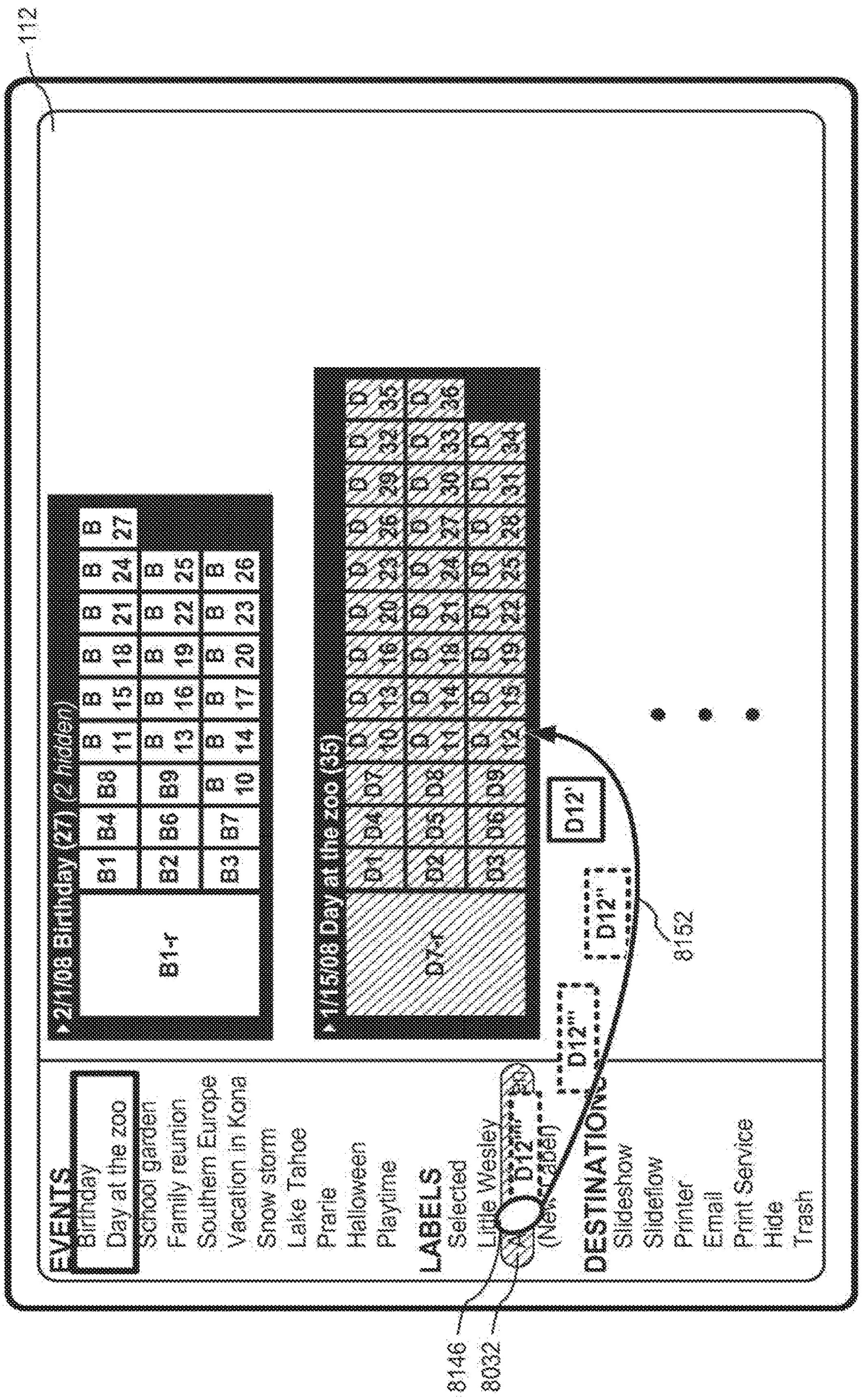
Figure 8L:
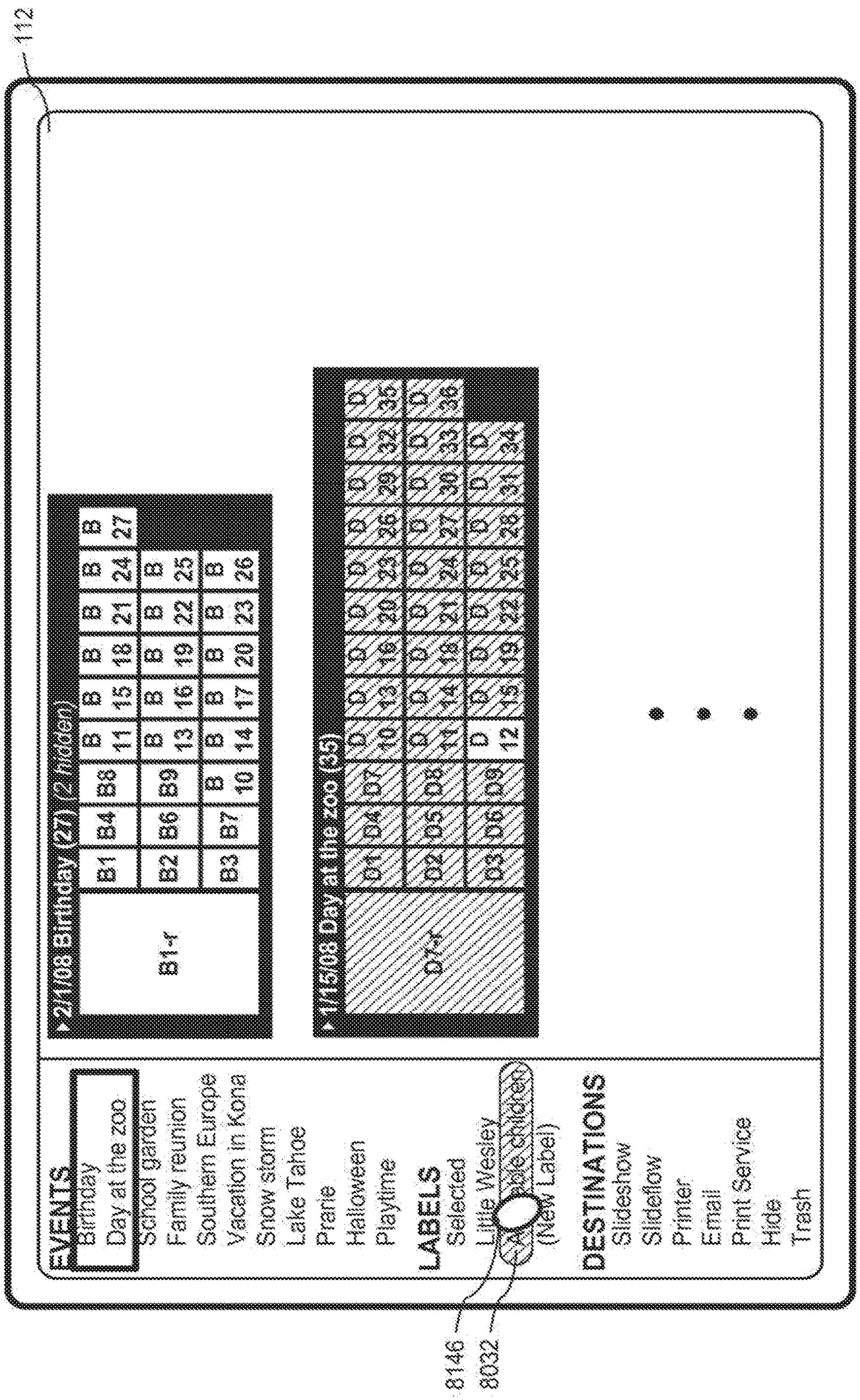
Figure 8M:
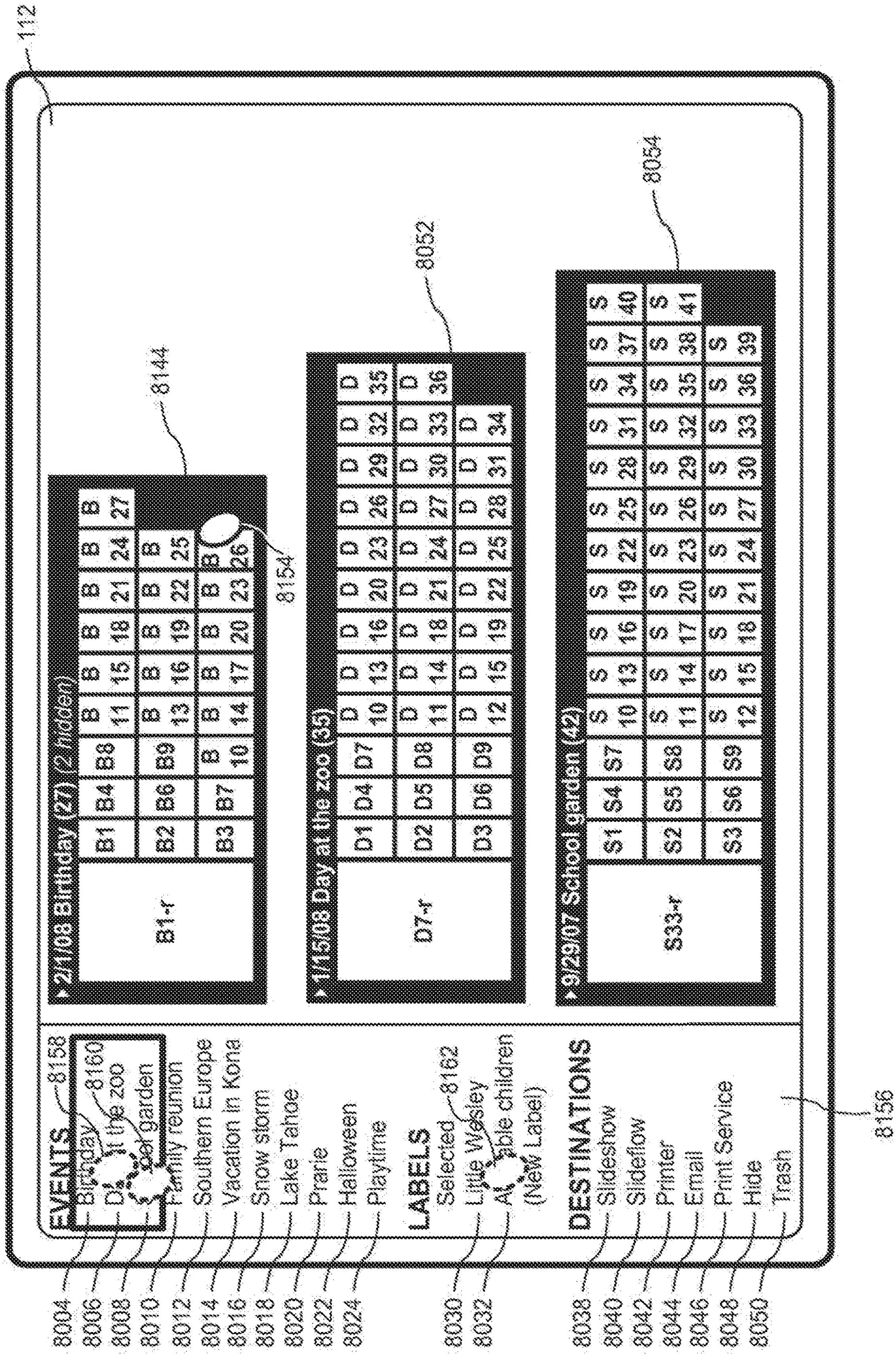
Figure 8N:
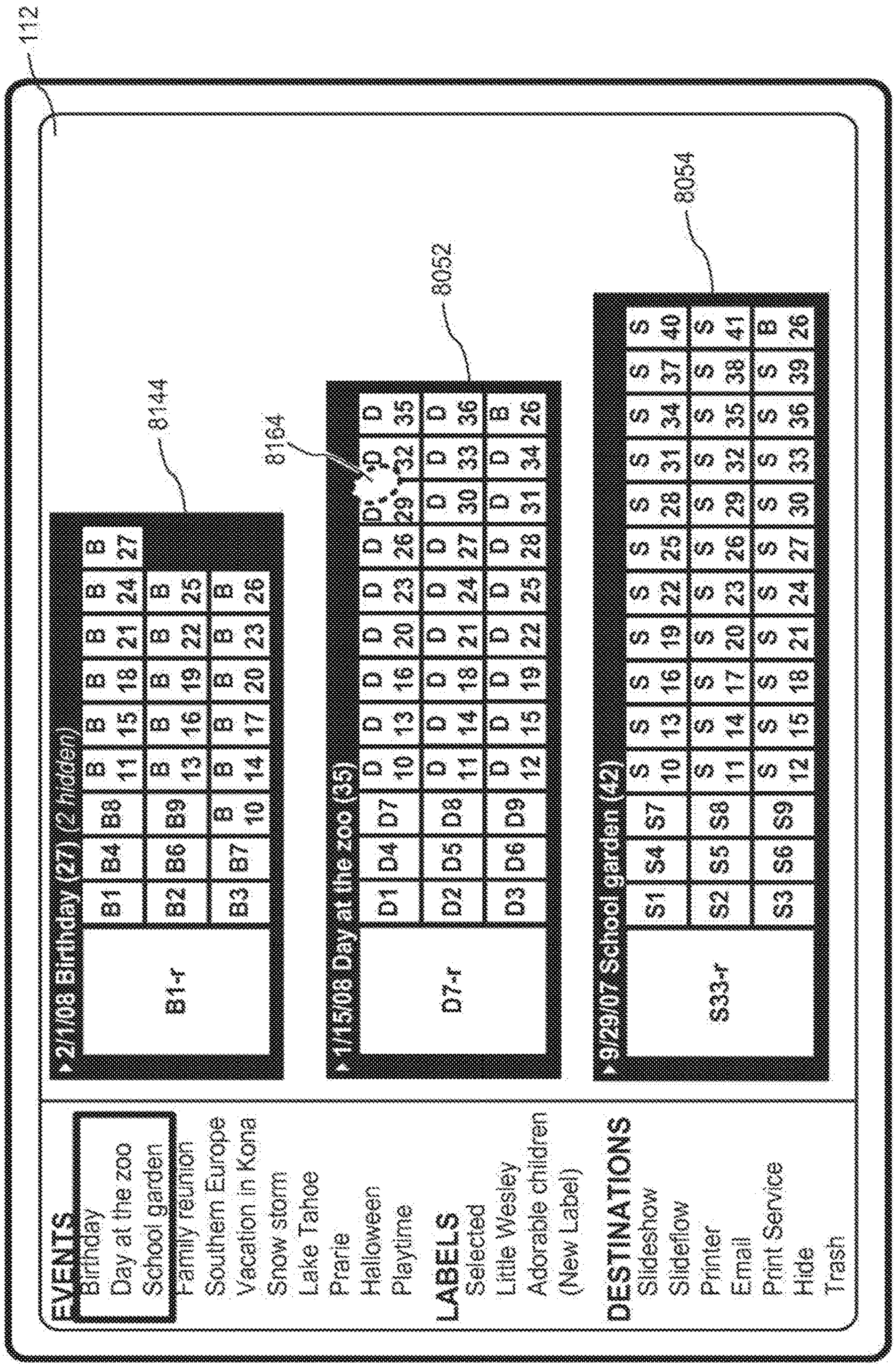
Figure 8O:
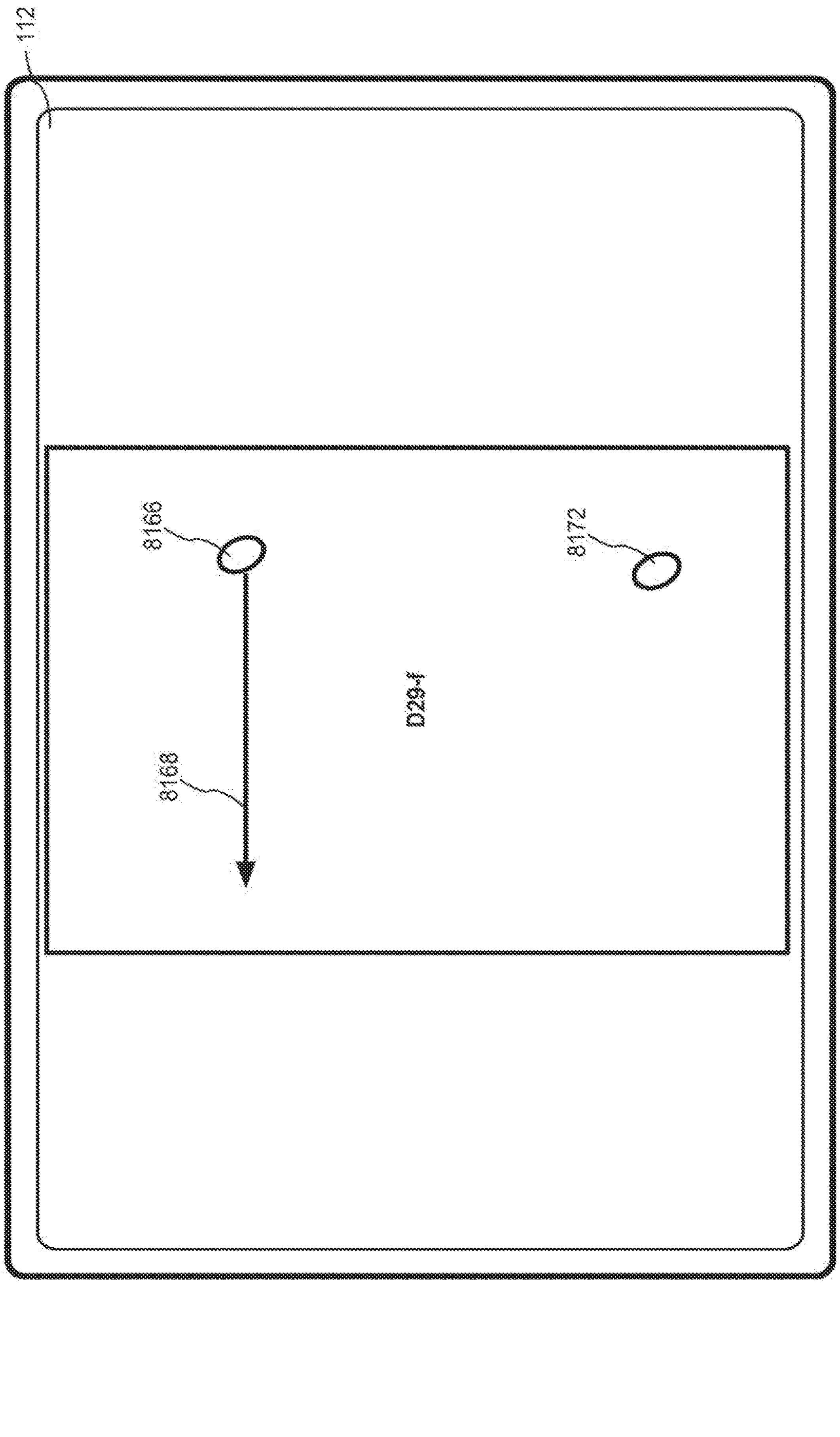
Figure 8P:
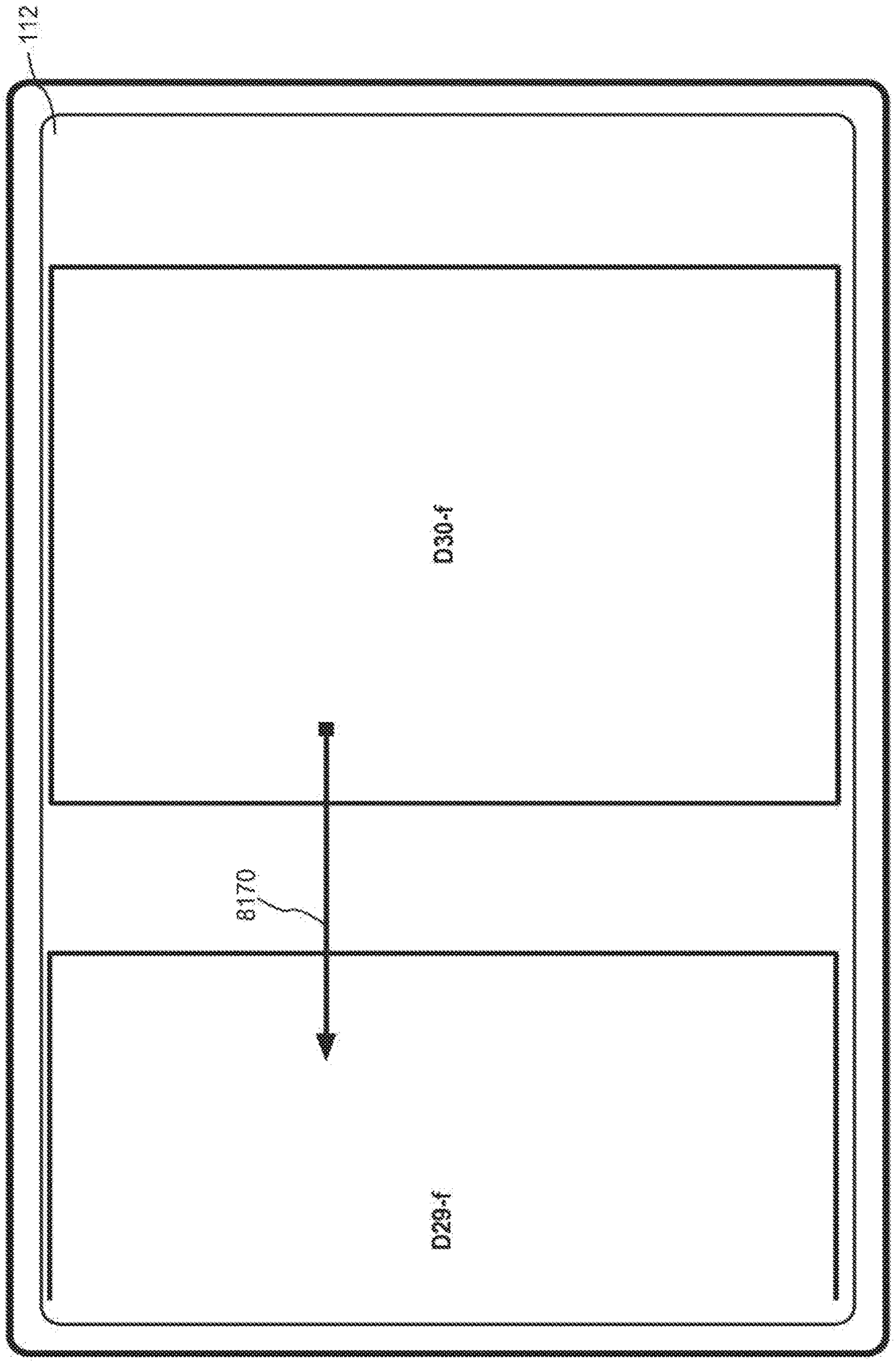
Figure 8Q:
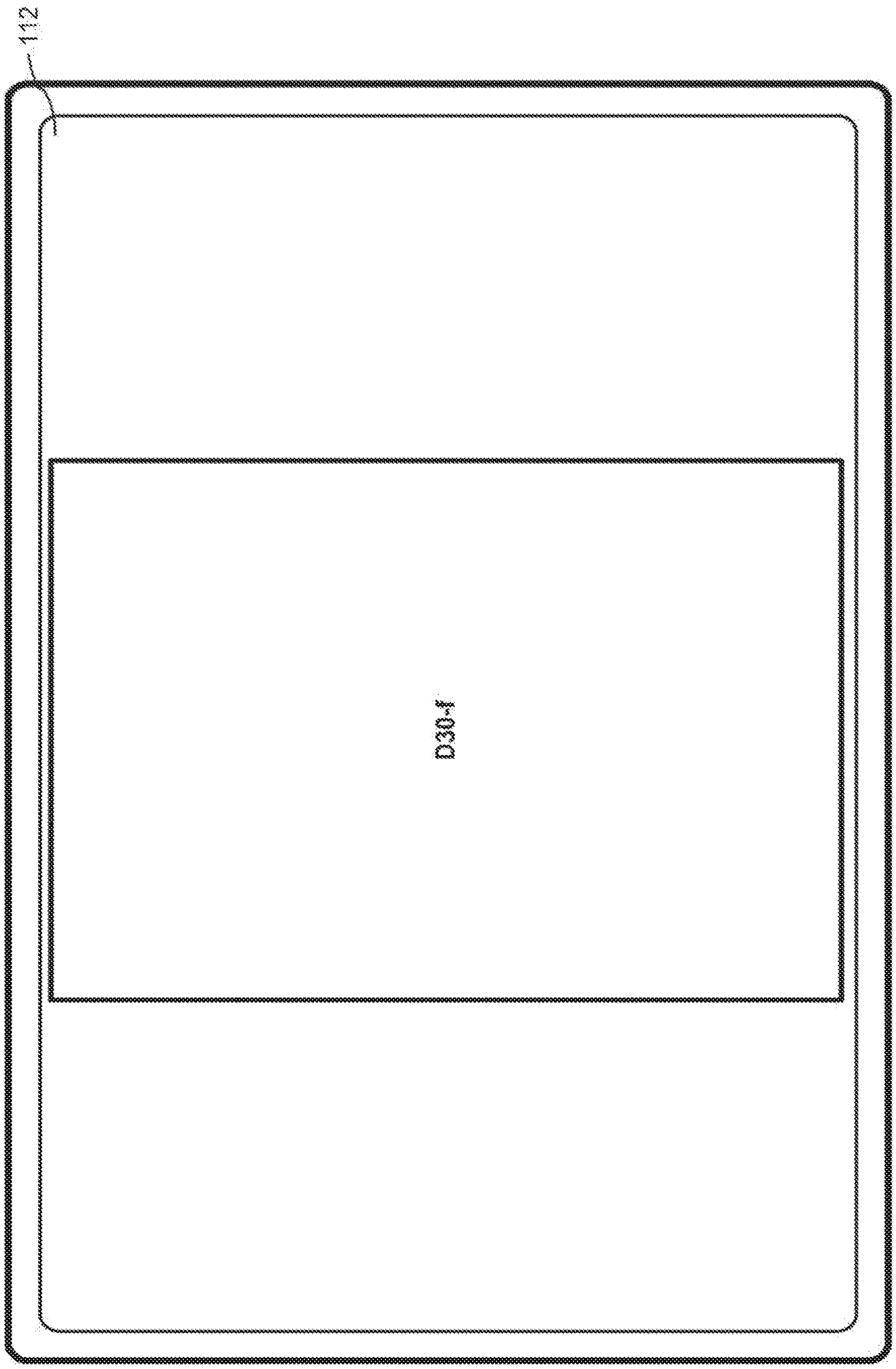
Figure 8R:
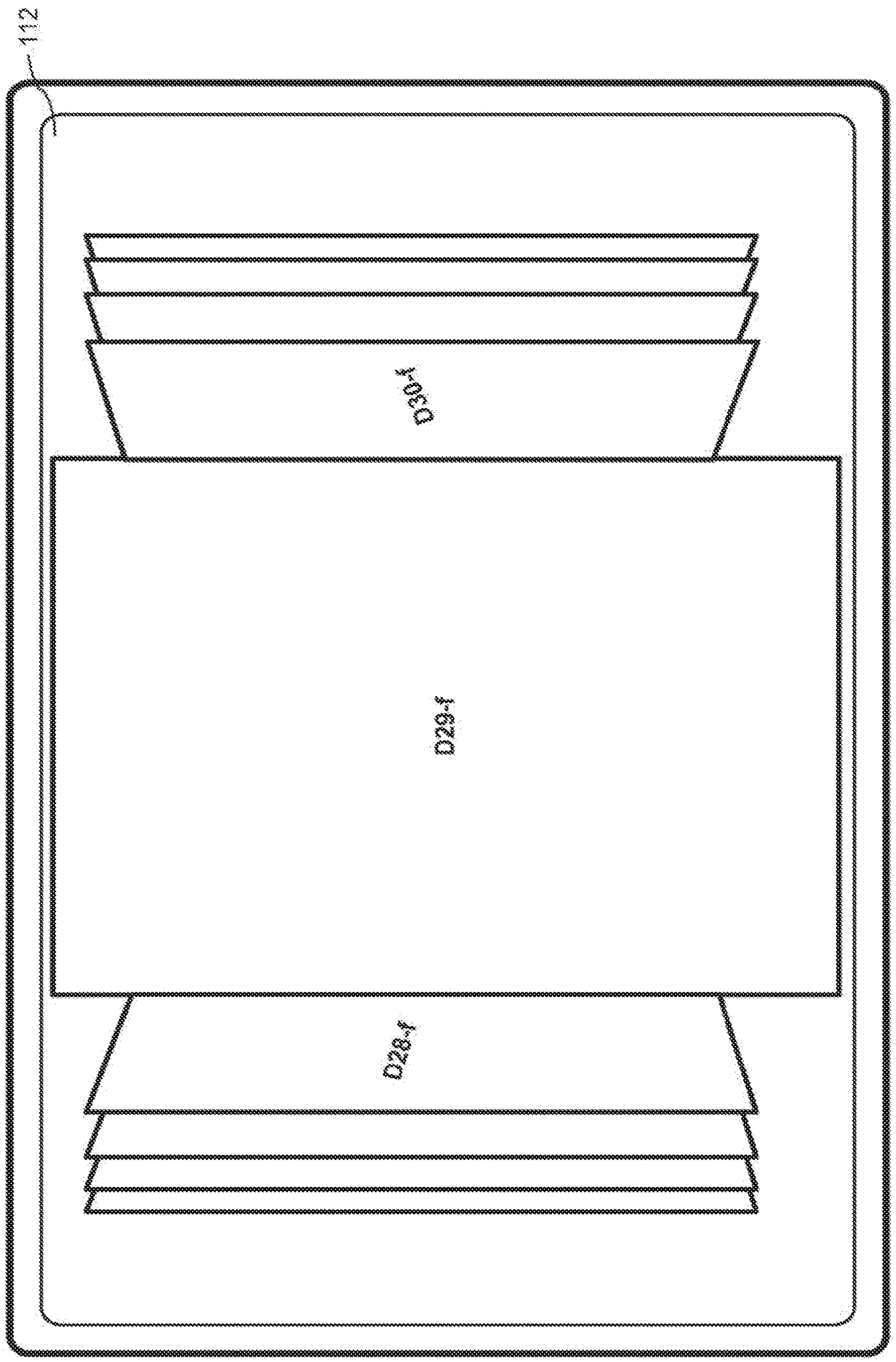
Figure 8S:
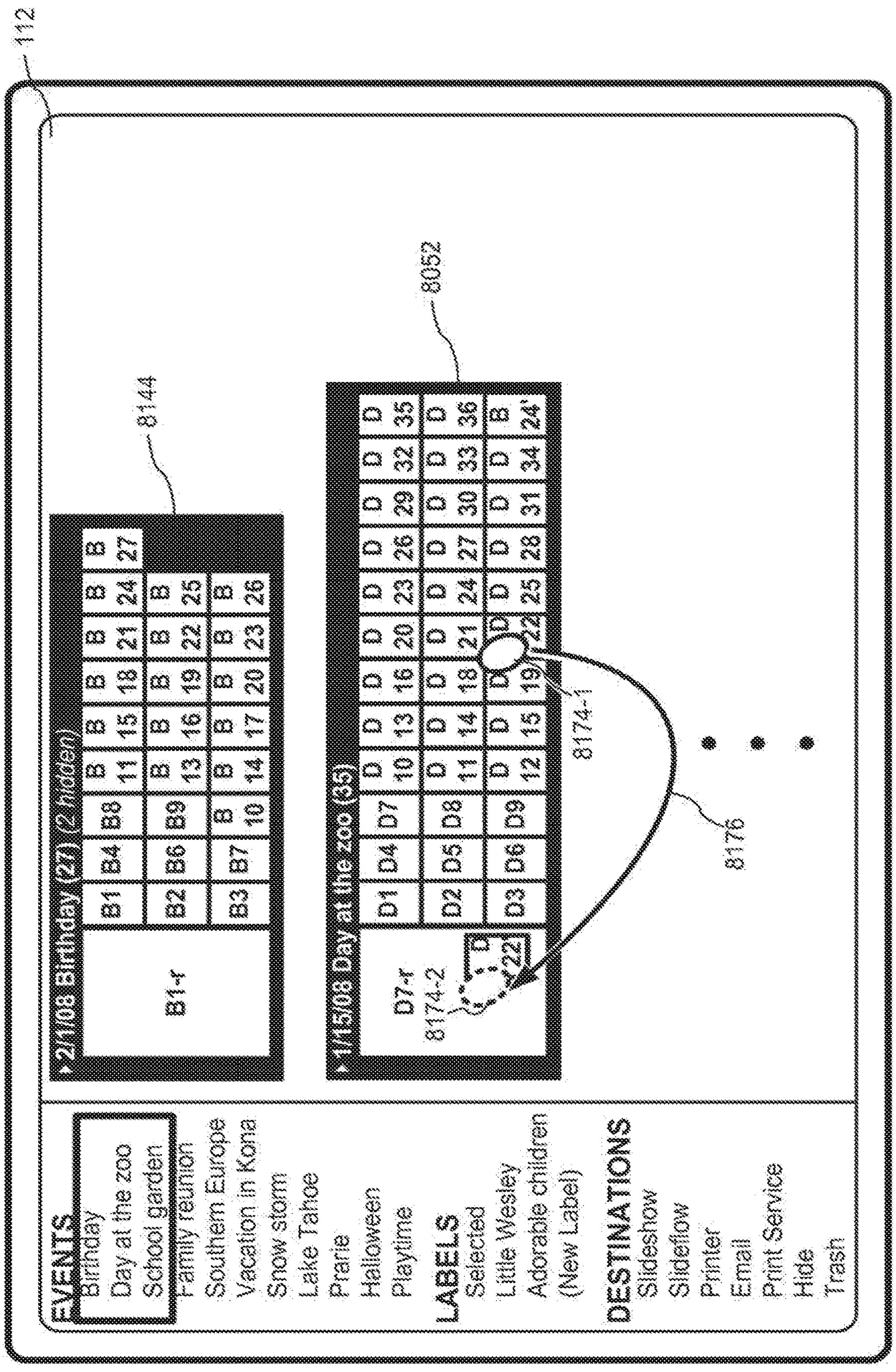
Figure 8T:
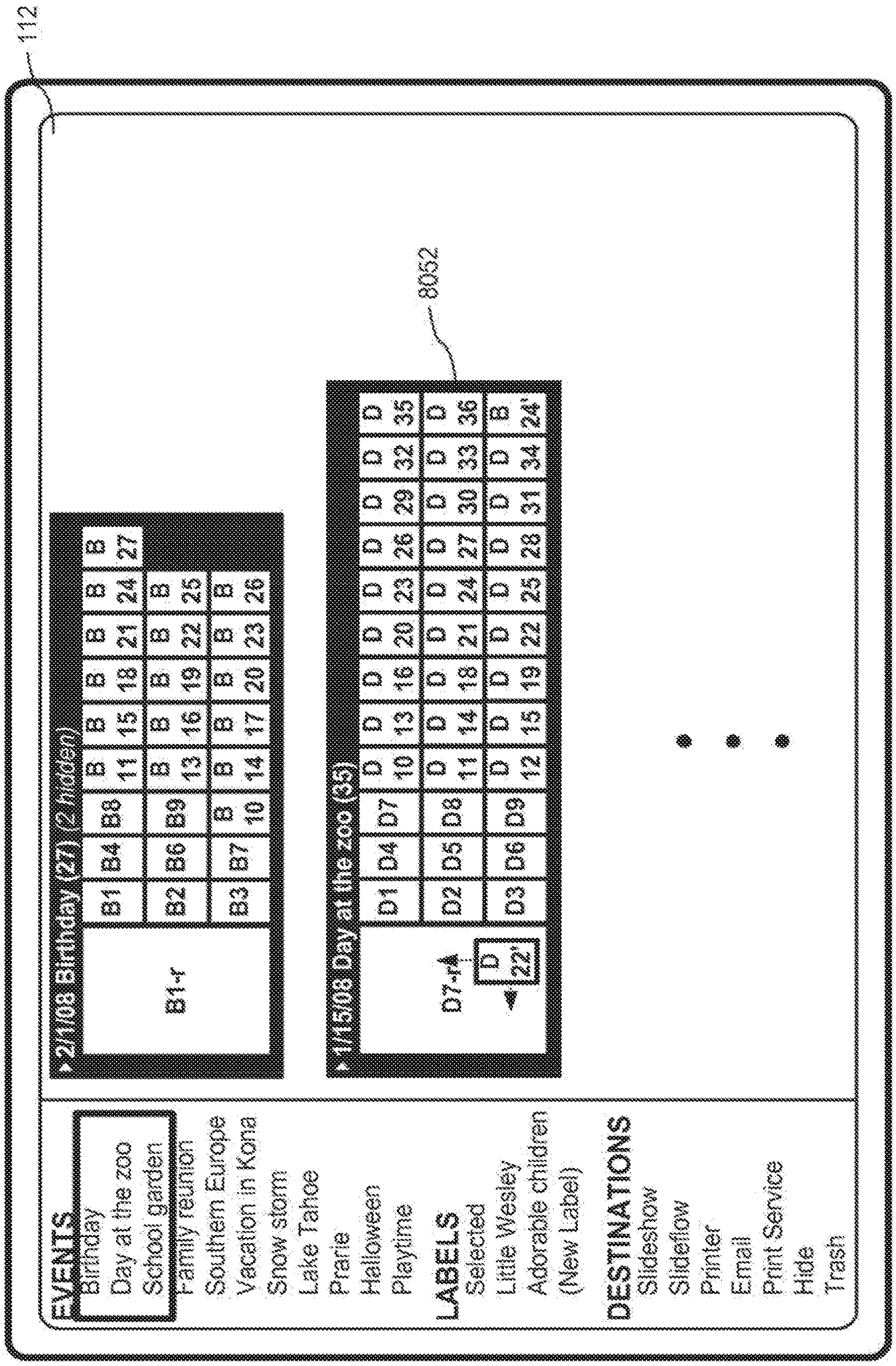
Figure 8U:
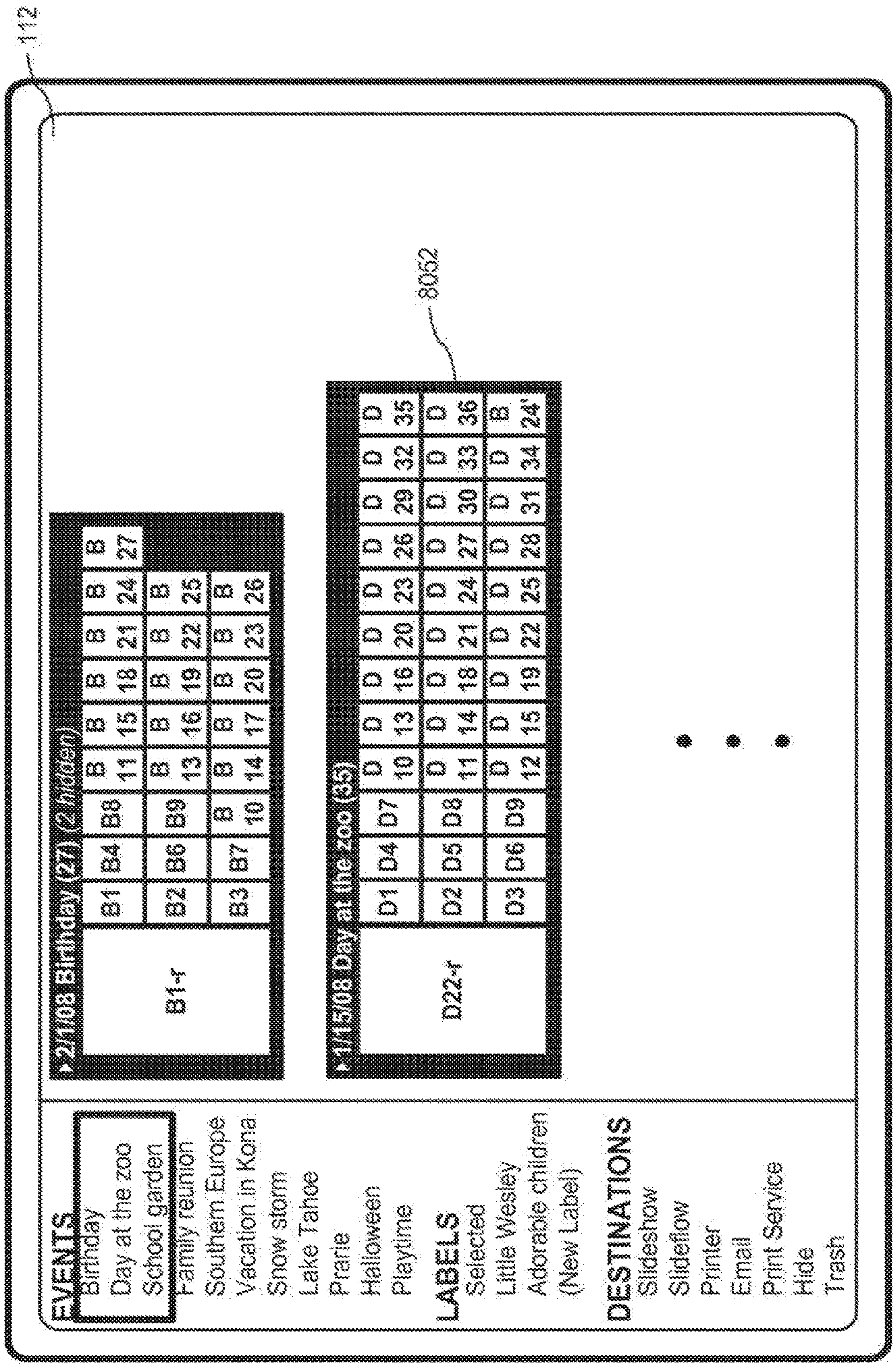
Figure 9A:
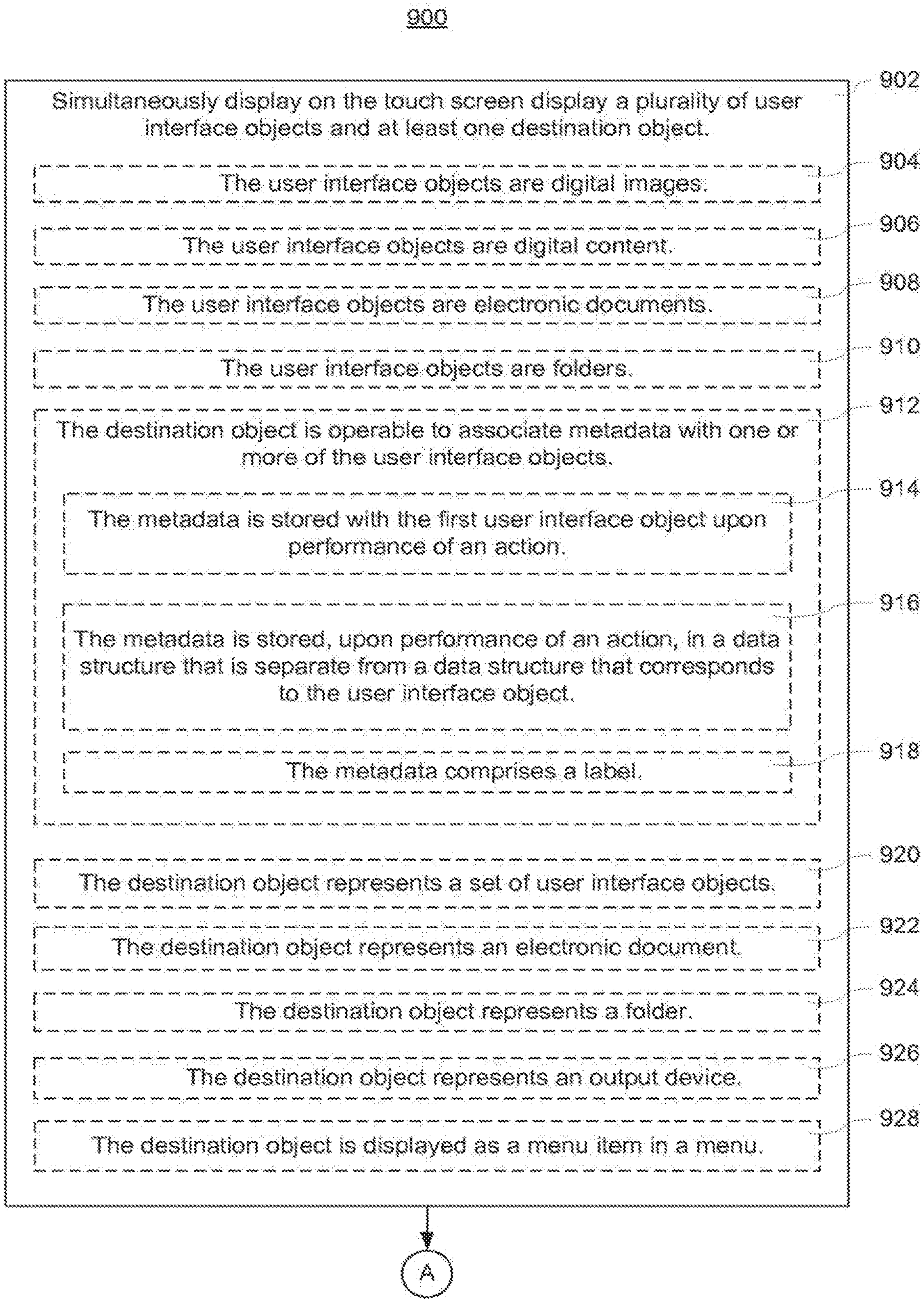
Figure 9B:
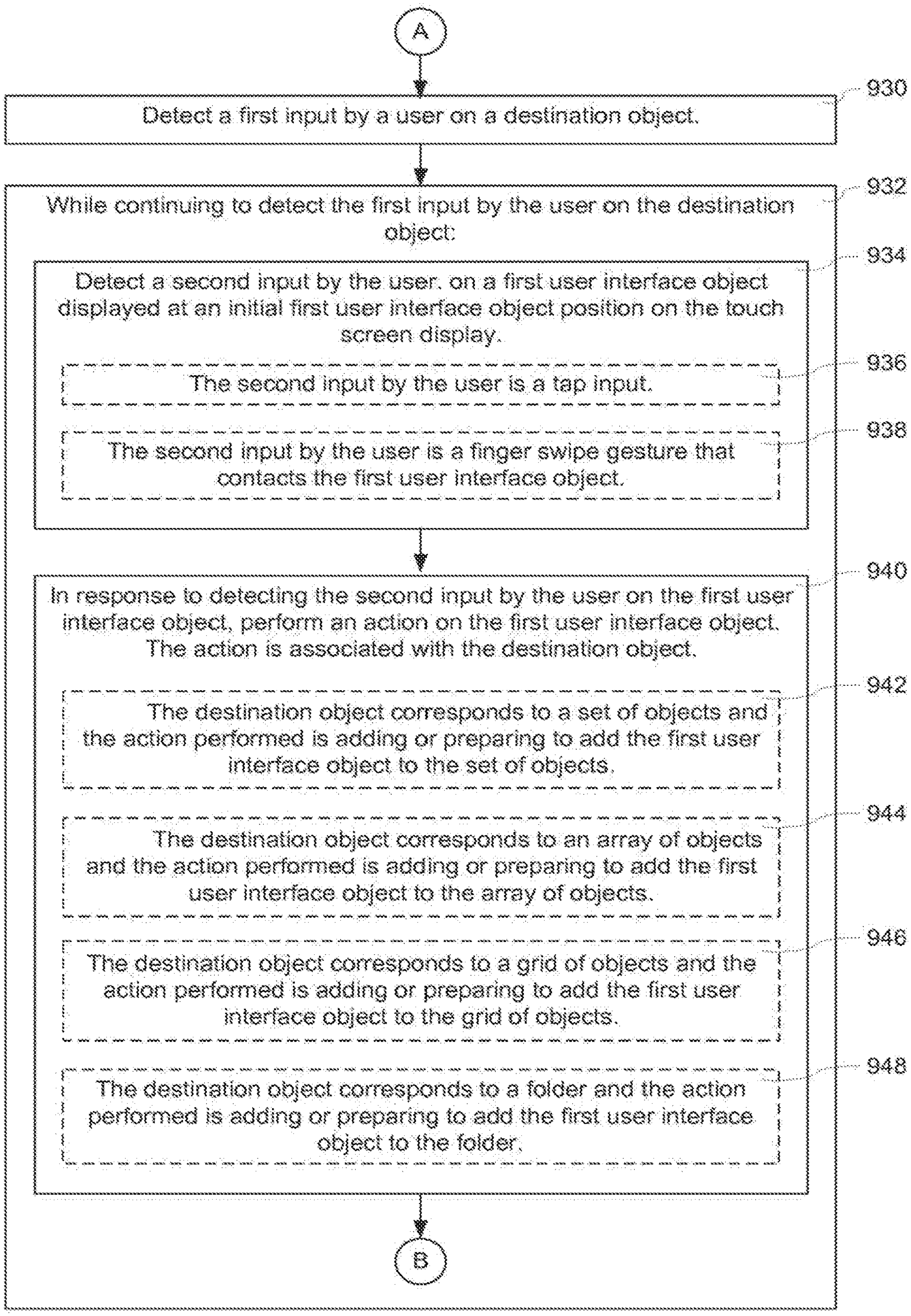
Figure 9C:
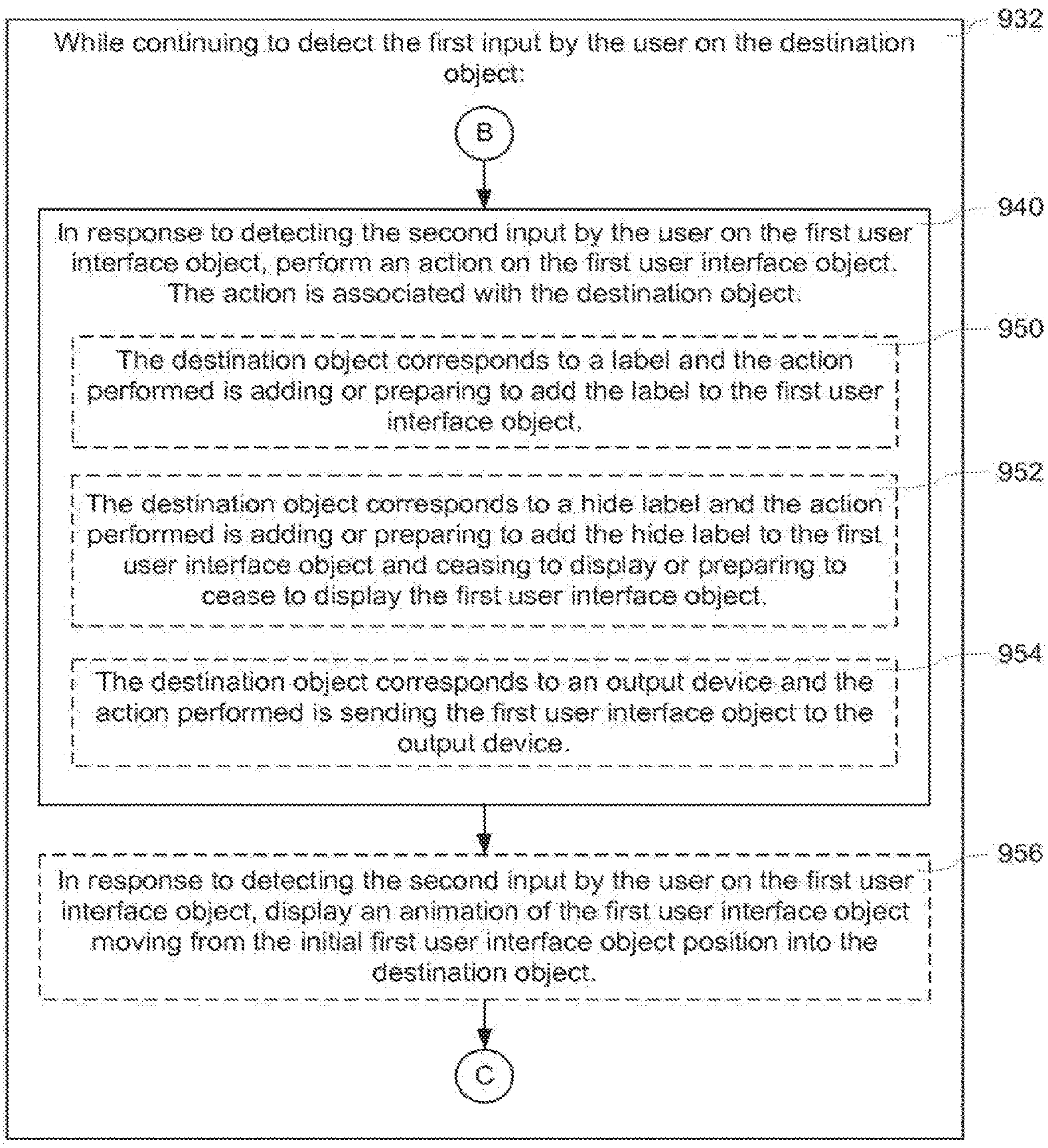

In some embodiments, in response to detecting movement of the input by the user from the array name icon, the device displays (1464) a residual image of the respective representative user interface object (e.g., shaded representative user interface object D7-*r* in FIGS. 8X-8Z). In some embodiments, the residual image of the respective representative user interface object is (1466) displayed adjacent to a respective representative user interface object toggle icon (e.g., 8138 in FIG. 8Z).

In some embodiments, the device detects (1468) activation of a menu category icon (e.g., activation of menu category icon "Events" 8002 for a plurality of array name icons for events 8004, 8006, 8008, 8010, 8012, 8014, 8016, 8018, 8020, 8022, 8024 in FIG. 8AA by a finger tap gesture 8140, stylus gesture, or mouse click on the menu category icon). In response to detecting activation of the menu category icon (e.g., "Events" 8002), the device displays a plurality of representative user interface objects for respective arrays in a menu category that corresponds to the menu category icon, as shown in FIG. 8CC.

In some embodiments, displaying the plurality of representative user interface objects includes overlaying (1470) the plurality of representative user interface objects on user interface objects displayed on the touch screen display immediately prior to detecting activation of the menu category icon. For example, in FIG. 8CC, a plurality of representative user interface objects (e.g., representative images B1-*r*, D7-*r*, S33-*r*, F8-*r*, E45-*r*, V17-*r*, N5-*r*, L2-*r*, R11-*r*, H27-*r* and P6-*r*) are displayed overlaid on shaded images F1-F17, D1'-D16', and D8'-D36'. In some cases, the representative objects appear as though they are layered on top of the previously displayed user interface. In some embodiments, the device displays an animation where the representative user interface objects (e.g., B1-*r*, D7-*r*, S33-*r*, F8-*r*, E45-*r*, V17-*r*, N5-*r*, L2-*r*, R11-*r*, H27-*r* and P6-*r*) are shown coming in from the edges (e.g., top, bottom, right and left sides) of the display and shrinking to fit onto the display. Thus, in FIG. 8BB, the representative user interface objects (e.g., B1-*r*, D7-*r*, S33-*r*, F8-*r*, E45-*r*, V17-*r*, N5-*r*, L2-*r*, R11-*r*, H27-*r* and P6-*r*) are larger than the corresponding representative user interface objects in FIG. 8CC, and the user interface objects that are adjacent to the edges of the touch screen display (e.g., B1-*r*, D7-*r*, S33-*r*, F8-*r*, E45-*r*, V17-*r*, H27-*r* and P6-*r*) are only partially displayed. Additionally, in some embodiments, the representative user interface objects are initially displayed at a low opacity (e.g., 0% opacity or 10% opacity) and the opacity of the representative user interface objects is gradually increased as the representative user interface objects are reduced in size and moved onto the touch screen display.

In some embodiments, displaying the plurality of representative user interface objects (e.g., B1-*r*, D7-*r*, S33-*r*, F8-*r*, E45-*r*, V17-*r*, N5-*r*, L2-*r*, R11-*r*, H27-*r* and P6-*r* in FIG. 8DD) includes ceasing (1472) to display user interface objects displayed on the touch screen display immediately prior to detecting activation of the menu category icon, as shown in FIG. 8DD. In other words, the user interface objects displayed on the touch screen display immediately prior to detecting activation of the menu category icon are replaced by display of the plurality of representative user interface objects for respective arrays in the menu category that corresponds to the activated menu category icon (e.g., as shown in FIG. 8DD).

In some embodiments, only the plurality of representative user interface objects (e.g., B1-*r*, D7-*r*, S33-*r*, F8-*r*, E45-*r*, V17-*r*, N5-*r*, L2-*r*, R11-*r*, H27-*r* and P6-*r* in FIG. 8DD) for respective arrays in the menu category that corresponds to the activated menu category icon are (1474) displayed on the touch screen display (e.g., as shown in FIG. 8DD).

In some embodiments, the device detects (1476) an input by the user (e.g., a finger tap gesture 8142 in FIG. 8CC, stylus gesture, or mouse click) on a first representative user interface object (e.g., representative image B1-*r* in FIG. 8CC) in the plurality of representative user interface objects (e.g., representative images B1-*r*, D7-*r*, S33-*r*, F8-*r*, E45-*r*, V17-*r*, N5-*r*, L2-*r*, R11-*r*, H27-*r* and P6-*r* in FIG. 8CC) for respective arrays in the menu category that corresponds to the activated menu category icon (e.g., 8002 in FIG. 8AA). In response to detecting the input by the user on the first representative user interface object, the device ceases to display the plurality of representative user interface objects and displays an array (e.g., the "Birthday" array 8144 in FIG. 8EE) of user interface objects (e.g., images B1, B2, B3, B4, B6, B7, B8, B9, B10, B11, B13, B14, B15, B16, B17, B18, B19, B20, B21, B22, B23, B24, B25, B26, B27) that correspond to the first representative user interface object (e.g., B1-*r* in FIG. 8CC).

In some embodiments, in response to detecting the input by the user on the first representative user interface object (e.g., representative image B1-*r* in FIG. 8CC), the device displays (1478) the first representative user interface object adjacent to the array (e.g., "Birthday" array 8144 in FIG. 8EE) of user interface objects that corresponds to the first representative user interface object (e.g., representative image B1-*r* in FIG. 8EE).

In some embodiments, in response to detecting the input by the user on the first representative user interface object, the device displays (1480) arrays (e.g., "Day at the zoo" array 8052 in FIG. 8EE) of user interface objects (e.g., images D1, D2, D3, D4, D5, 136, D7, D8, D9, D10, D11, D12, D13, D14, D15, D16, D18, D19, D20, D21, D22, D23, D24, D25, D26, D27, D28, D29, D30, D31, D32, D33, D34, D35, D36 in FIG. 8EE) that do not correspond to the first representative user interface object (e.g., arrays in the plurality of arrays that are adjacent to the array of user interface objects that corresponds to the first representative user interface object).

In some embodiments, selected object(s) are moved to a destination object (e.g., an item in sidebar menu) while input by the user (e.g., a finger contact or stylus contact) is on the destination object, as described above with respect to FIGS. 5A-5Y and 9A-90, 10A-10B.

In some embodiments, the device detects (1482) a third input by the user (e.g., a linger contact 8146 in FIG. 8FF or stylus contact) on a destination object (e.g., "Adorable children" label icon 8032 in FIG. 8FF). While continuing to detect the third input (e.g., contact 8146 in FIGS. 8FF-8LL) by the user on the destination object (e.g., "Adorable children" label icon 8032 in FIG. 8FF-8LL), the device detects a fourth input by the user on an array name icon (e.g., a finger tap gesture 8148, stylus gesture, or mouse click by the user on an array name icon 8132 in FIG. 8GG displayed adjacent to a respective representative user interface object toggle icon e.g., 8138 in FIG. 8GG). In response to detecting the fourth input (e.g., tap gesture 8148 in FIG. 8GG) by the user on the array name icon (e.g., 8132 in FIG. 8GG), the device performs an action on all user interface objects (e.g., images D1-D16, D18-D36 in FIG. 8G0) in an array (e.g., "Day at the zoo" array 8052 in FIG. 8GG) that corresponds to the array name icon (e.g., 8132 in FIG. 8GG). The action is associated with the destination object (e.g., "Adorable children" label icon 8032 in FIG. 8GG). In some embodiments, the action is a preparatory action, such as preparing to perform an action that will occur upon detecting lift off of the third input (e.g., lift off of the third finger contact 8416 in FIG. 8GG by the user) from the destination object. Exemplary actions include, without limitation: associating a label with digital content or an electronic document; moving digital content or an electronic document from one event to another event; moving digital content or an electronic document to a folder, and printing/publishing a copy of the digital content or electronic document.

In some embodiments, in response to detecting the fourth input (e.g., tap gesture 8148 in FIG. 8GG) by the user on the array name icon (e.g., 8132 in FIG. 8GG), the device displays (1484) an animation of user interface objects in the array (e.g., 8052 in FIGS. 8GG-8II) that corresponds to the array name icon moving from respective initial object positions into the destination object. For example, in FIGS. 8HH and 8II, the device displays representations of the images D1-D16 and D18-D36 moving into the destination object (e.g., 8032 in FIGS. 8HH and 8II). In this example, as each user interface object (e.g., D11' in FIG. 8HH) begins to move towards the destination object (e.g., 8032 in FIG. 8HH), the device resizes the user interface object so as to match the dimensions of the destination object (e.g., 8032 in FIG. 8HH). In the case of image D11', the object is taller and narrower than the destination object, so in a subsequent frame of the animation (shown in FIG. 8II) the user interface object D11' is has been resized so that it is shorter and wider than the original user interface object D11 (in FIG. 8GG, before the animation was displayed). This process is performed for some or all of the user interface objects in the array (e.g., 8052 in FIGS. 8HH and 8II). In some embodiments this process is also performed for the representative user interface object (e.g., D7-*r*' in FIGS. 8HH and 8II). The animation indicates to a user that an action associated with the destination object will be applied to the user interface objects in this array.

In some embodiments, in response to detecting the fourth input (e.g., tap gesture 8148 in FIG. 8GG) by the user on the array name icon (e.g., 8132 in FIG. 8GG), the device displays (1486) respective residual images (e.g., shaded images D1, D7, D16, D18, D20, D25, etc. in FIGS. 8II and 8JJ) of respective user interface objects at respective initial user interface object positions on the touch screen display (e.g., respective positions of D1, D7, D16, D18, D20, D25, etc. in FIG. 8GG).

In some embodiments, the device detects (1488) a fifth input (e.g., a finger tap gesture 8150 (FIG. 8JJ), stylus gesture, or mouse click) on a respective residual image (e.g., shaded image D12 in FIG. 8JJ) of a respective user interface object at a respective initial user interface object position on the touch screen display while continuing to detect the third input (e.g., contact 8146 in FIG. 8JJ) by the user on the destination object (e.g., "Adorable children" icon 8032 in FIG. 8JJ). In response to detecting the fifth input (e.g., tap gesture 8150 in FIG. 8JJ) by the user on the respective residual image (e.g., shaded image D12 in FIG. 8JJ) of the respective user interface object at the respective initial user interface object position on the touch screen display, the device undoes the action performed on the respective user interface object and displays the respective user interface object at the respective initial user interface object position. For example, image D12 will not be labeled "Adorable children" and the residual shaded image of D12 (FIG. 8J) is replaced by the original unshaded image of D12 (FIG. 8LL).

In some embodiments, in response to detecting the fifth input by the user on the respective residual image of the respective user interface object at the respective initial user interface object position on the touch screen display, the device displays (1490) an animation of the respective user interface object moving from the destination object back to the respective initial user interface object position. The animation indicates to a user that an action associated with the destination object will not be applied to the respective user interface object. For example FIG. 8KK illustrates an exemplary an animation of undoing the prior movement of user interface object D12 from its initial position to the destination object "Adorable children" 5030 (as shown in FIGS. 8HH-8II). In this animation, the device moves user interface object D12 along a path (e.g., 8152 in FIG. 8KK) from the location at the destination object 5032 back to its original position (e.g., image D12 in FIG. 8KK). In one embodiment, as the user interface object moves along the path, the user interface object is initially displayed as a resized representation so as to match the size of the destination object. An illustrative example of the movement and resizing (e.g., from D12'''' to D12''' to D12'' to D12' in FIG. 8KK and finally to D12 in FIG. 8LL) of the user interface object is shown in FIGS. 8KK-8LL. In this example, destination object (e.g., 8032 in FIG. 8KK) is larger along the horizontal dimension (i.e., longer) and smaller along the vertical dimension (i.e., shorter) than the image D12. Thus, as illustrated in FIG. 8KK, the user interface object is initially displayed as a representation of the user interface object (e.g., D12'''') that is stretched horizontally and compressed vertically compared to the original user interface object (e.g., image D12). As the user interface object moves (e.g., from D12'''' to D12''' to D12'' to D12' and finally to D12) towards the original position of the image D12, the user interface object is compressed horizontally and stretched vertically so that it returns to the dimensions of the original image D12. It should be understood that, typically the various resized representations of the user interface object (e.g., D12, D12', D12'', D12''' and D12'''' shown in FIGS. 8KK-8LL) are not simultaneously displayed, but are instead displayed in sequence as the user interface object moves along the path 8152 towards the destination object. In some embodiments, where the user interface object includes an image, the image is distorted as the object is resized.

After the device undoes the action performed on the respective user interface object, the respective user interface object is displayed at the initial respective user interface object position (e.g., unshaded image D12, as illustrated in FIG. 8LL).

In some embodiments, the device detects (1491) an input by the user (e.g., a finger contact 8154 in FIG. 8MM or stylus contact) on a user interface object (e.g., image B26 in FIG. 8MM) in an array (e.g., the "Birthday" array 8144 in FIG. 8MM) in the plurality of arrays (e.g., including arrays 8144, 8052 and 8054 in FIG. 8MM). While continuing to detect the input (e.g., contact 8154) by the user on the user interface object in the array in the plurality of arrays, for a plurality of destination objects (e.g., array name icons 8006 and 8008, and label 8032 in sidebar menu 8156, FIG. 8MM), the device detects a respective input by the user (e.g., a finger or stylus gesture such as a tap gestures 8158, 8160, and 8162 in FIG. 8MM) on a respective destination object. In response to each respective input by the user on each respective destination object, the device performs a respective action on the user interface object in the array in the plurality of arrays. The respective action is associated with the respective destination object. In some embodiments, the respective action is a preparatory action, such as preparing to perform an action that will occur upon detecting lift off of the input by the user (e.g., lift off of the finger contact 8154 in FIG. 8MM) from the user interface object in the array. Exemplary actions include, without limitation: associating a label with digital content or an electronic document; moving digital content or an electronic document from one event to another event; moving digital content or an electronic document to a folder; and printing/publishing a copy of the digital content or electronic document.

For example, in FIG. 8MM, while continuing to detect finger contact 8154 on image B26, the device detects three respective user inputs (e.g., tap gesture 8158, tap gesture 8160, and tap gesture 8162) associated with respective destination objects (e.g., "Day at the zoo" array name destination object 8006, "School garden" array name destination object 8008, and "Adorable children" label destination object 8032.) In response to the each of the respective inputs, the device performs an action associated with the input. For example, in response to the tap gesture 8158 on the "Day at the zoo" array name 8006, the device makes image B26 part of the "Day at the zoo" array 8052 (FIG. 8NN). In response to the tap gesture 8160 on the "School garden" array name 8008, the device makes image B26 part of the "School garden" array 8054 (FIG. 8NN). In response to the tap gesture 8162 on the "Adorable children" label 8032, the device adds the label "Adorable children" to image B26. Thus, the user is able to perform multiple actions on a single user interface object by maintaining one input (e.g., contact 8154 in FIG. 8MM) on the single user interface object and simultaneously providing other inputs (e.g., tap gestures 8158, 8160, and 8162 in FIG. 8MM) on destination objects (e.g., 8006, 8008 and 8032 in FIG. 8MM) in a menu (e.g., 8156 in FIG. 8MM).

In some embodiments, in response to each respective input by the user on each respective destination object, the device displays (1492) a respective animation of the user interface object in the array moving from a respective initial object position into the respective destination object, as described previously with reference to FIGS. 5E, 5K-5L, 5O, 5P and/or 5Q depending on the type of action performed and the number of objects on which the action is being performed.

In some embodiments, the device detects (1493) an input (e.g., a finger or stylus gesture such as a double tap gesture 8164 in FIG. 8NN) by the user on a first user interface object (e.g., image D29 in FIG. 8NN) in a first array (e.g., "Day at the zoo" array 8052 in FIG. 8NN) in the plurality of arrays (e.g., including arrays 8144, 8052, and 8054 in FIG. 8NN). In response to detecting the input by the user on the first user interface object in the first array in the plurality of arrays, the device displays a first enlarged image (e.g., image D29-*f* in FIG. 8OO) that corresponds to the first user interface object (e.g., a full-screen image of a photograph or a preview image of an electronic document file that corresponds to user interface object D29 in FIG. 8NN).

The device detects a horizontal (or substantially horizontal) swipe gesture (e.g., contact 8166 followed by movement 8168 of the contact in a direction that is substantially horizontal in FIG. 8OO) by the user on the first enlarged image (e.g., image D29-*f* in FIG. 8OO) that corresponds to the first user interface object (e.g., image D29 in FIG. 8NN). In response to detecting the horizontal (or substantially horizontal) swipe gesture by the user on the first enlarged image that corresponds to the user interface object, the device displays a second enlarged image (e.g., image D30-*f* in FIGS. 8PP and 8QQ) of a second user interface object (e.g., image D30 in FIG. 8NN) in the first array that is adjacent to the first user interface object (e.g., image D29 in FIG. 8NN) in the first array (e.g., "Day at the zoo" array 5052 in FIG. 8NN). In some embodiments, the device displays an animation of the first enlarged image (e.g., image D29-*f* in FIG. 8OO) sliding off of the display and being replaced with the second enlarged image (e.g., image D30-*f* in FIG. 8PP), as shown by the progression of Figures from 8OO to 8PP to 8QQ. In FIG. 8QQ, the first enlarged image D29-*f* in FIGS. 8OO-8PP has been completely replaced with the second enlarged image D30-*f*.

In some embodiments, the device detects (1494) a vertical (or substantially vertical) swipe gesture by the user on the first enlarged image (e.g., D29-*f* in FIG. 8OO). In response to detecting the vertical (or substantially vertical) swipe gesture by the user on the first enlarged image, the device scrolls the first enlarged image (not shown).

In some embodiments, the device detects (1495) an input by the user (e.g., a press and hold gesture 8172 in FIG. 8OO) on the first enlarged image (e.g., image D29-*f* in FIG. 8OO). In response to detecting the input by the user on the first enlarged image, the device displays the user interface objects in the first array in a cover flow mode of display. For example, in FIG. 8RR, the enlarged images of the user interface objects in the "Day at the zoo" array 8052 (FIG. 8NN) are displayed in cover flow mode. In some embodiments, cover flow mode is a mode where the currently displayed user interface item (e.g., image D29-*f* in FIG. 8RR) is displayed to the user, while skewed representations of adjacent user interface items (e.g., images D28-*f* and D30-*f* in FIG. 8RR) are displayed on each side of the currently displayed user interface item. Cover flow mode is described in U.S. patent application Ser. No. 11/519,460, "Media Manager With Integrated Browsers," filed Sep. 11, 2006, which is hereby incorporated by reference herein in its entirety. In response to a swipe gesture (not shown) the device scrolls through the enlarged representations of user interface items in the cover flow view, displaying a current enlarged representation of a user interface item in the center of the display (e.g., image D29-*f* in FIG. 8RR). In some embodiments, the speed of the scrolling is determined based on the speed of the swipe gesture.

In some embodiments, the device detects (1496) an input by the user (e.g., a finger or stylus contact 8174-1 in FIG. 8SS) on a first user interface object in a first array (e.g., image D22 in the "Day at the zoo" array 8052 in FIGS. 8SS-8UU) of user interface objects (e.g., images D1-D16, D18-D36) in the plurality of arrays (e.g., including arrays 8144 and 8052 in FIGS. 8SS-8UU). The device detects movement (e.g., movement 8176 in FIG. 8SS) of the input (e.g., contact 8174) by the user to a representative user interface object (e.g., representative image D7-*r* in FIG. 8SS) for the first array (e.g., 8052 in FIG. 8SS) of user interface objects. The device detects lift off of the input by the user (e.g., lift off of the finger contact or stylus contact 8174-2) from the representative user interface object for the first array of user interface objects. In response to detecting lift off of the input by the user from the representative user interface object (e.g., representative image D7-*r* in FIG. 8TT) for the first array of user interface objects, the device makes the first user interface object the representative user interface object (e.g., representative image D22-*r* in FIG. 8UU) for the first array of user interface objects (e.g., 8052 in FIG. 8UU).

For example, the device detects a contact 8174-1 with image D22 in FIG. 8SS, and movement 8176 of the contact (e.g., from 8174-1 to 8174-2 in FIG. 8SS) to the current representative image D7-*r*, which is a representation of user interface object D7 (e.g., an enlarged version of D7). In the present example, in FIG. 8'IT, the device ceases to detect the contact 8174-2 with image D22' while the contact is located over the current representative image D7-*r*. In some embodiments, when the device detects a release of the contact while it is over the current representative user interface object, the device displays an animation (e.g., image D22' expanding upwards and to the left, as shown in FIG. 8TT) of replacing the current representative user interface object (e.g., representative image D7-*r* in FIG. 8TT) with a new representative user interface object (e.g., representative image D22-*r* in FIG. 8UU, which is a representation of image D22, such as an enlarged version of image D22). In FIG. 8UU, the "Day at the zoo" array 8052 is shown with a new representative user interface object, namely representative image D22-*r*.

Figure 15A:
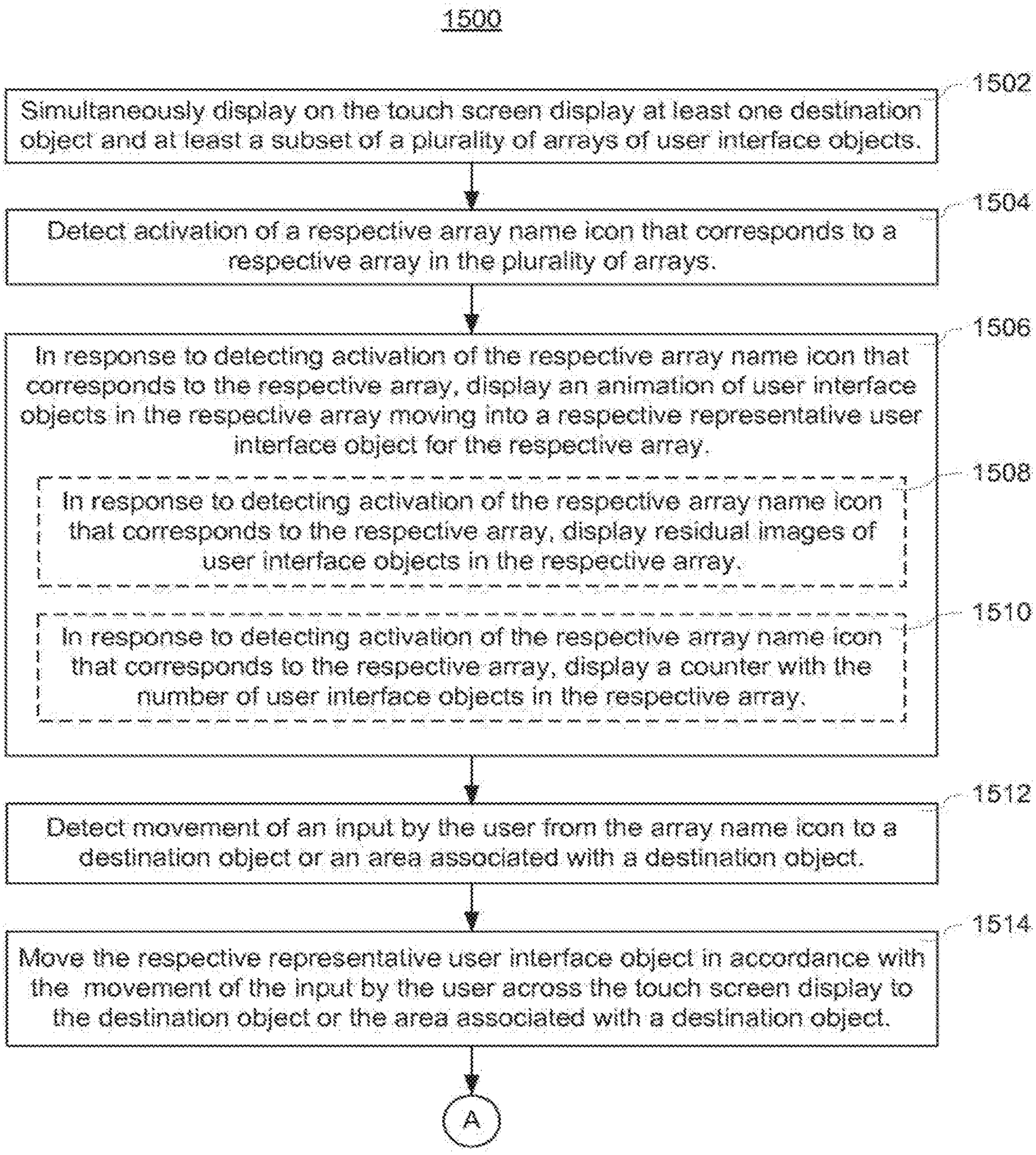
FIGS. 15A-15B are flow diagrams illustrating a method of performing an action on user interface objects in an array in accordance with some embodiments.
Figure 15B:
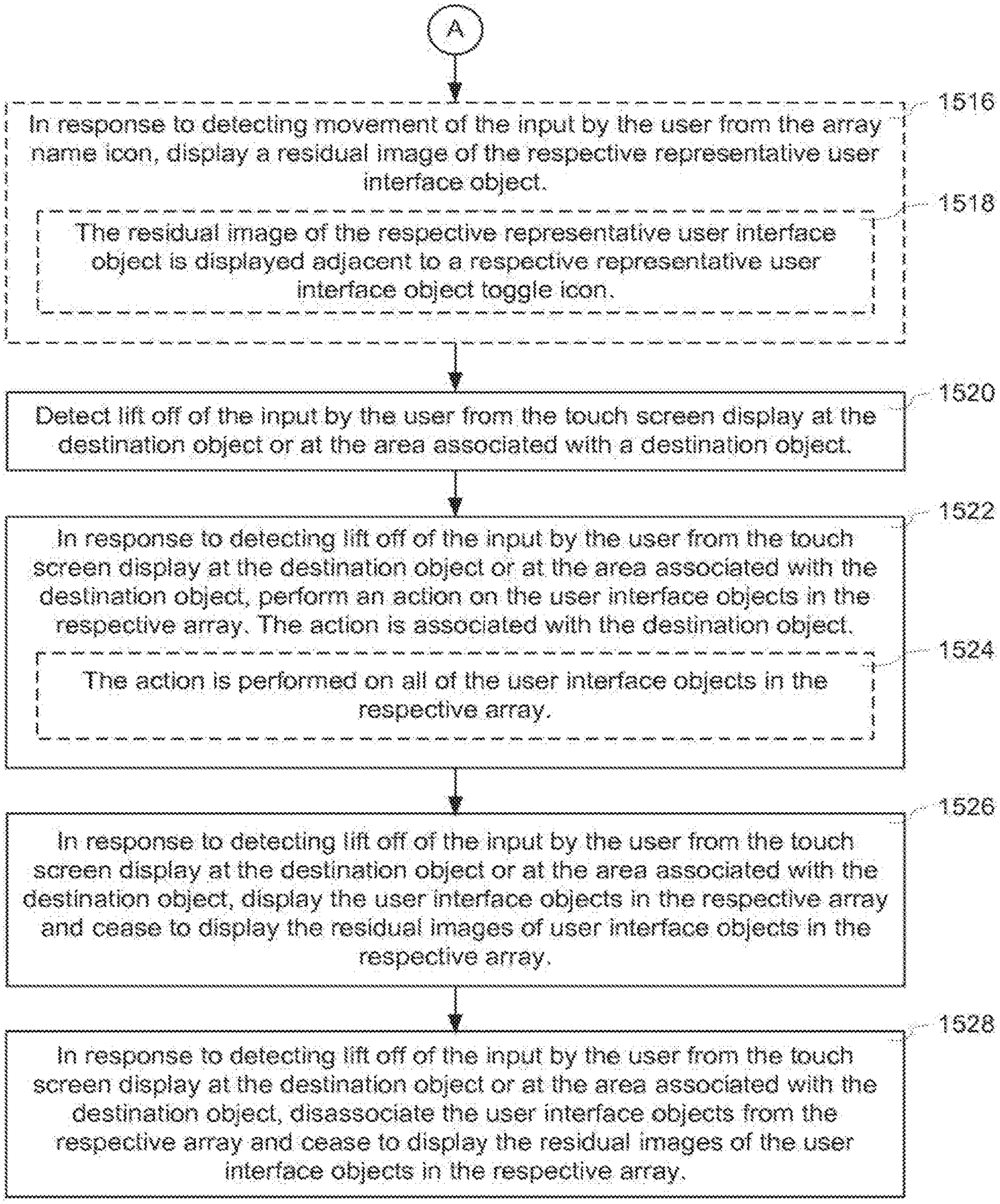

FIGS. 15A-15B are flow diagrams illustrating a method 1500 of performing an action on user interface objects in an array in accordance with some embodiments. The method 1500 is performed at a computing device (e.g., device 300, FIG. 3, or portable multifunction device 100, FIG. 1) with a touch screen display (e.g., 112 in FIGS. 8V-8AA). Some operations in method 1500 may be combined and/or the order of some operations may be changed.

As described below, the method 1500 provides an intuitive way to manipulate all user interface objects in an array of user interface objects at a computing device with a touch screen display. The method reduces the cognitive burden on a user when performing the same action on all user interface objects in an array of user interface objects, thereby creating a more efficient human-machine interface. For battery-operated computing devices, enabling a user to manipulate all user interface objects in an array of user interface objects faster and more efficiently conserves power and increases the time between battery charges.

The device simultaneously displays (1502) on the touch screen display at least one destination object (e.g., an array name icon in a list or menu of such icons) and at least a subset of a plurality of arrays (e.g., arrays 8052 and 8054 in FIG. 8V) of user interface objects. Depending on the number of arrays, it may not be possible to simultaneously display every array in the plurality of arrays. In such cases, a subset of the plurality of arrays is displayed and different subsets may be viewed by scrolling the plurality of arrays (e.g., in response to detecting a first finger swipe gesture on the touch screen display, such as a vertical or substantially vertical finger swipe gesture), as described in greater detail above with reference to FIGS. 8A-8F.

The device detects (1504) activation of a respective array name icon that corresponds to a respective array (e.g., array 8052 in FIG. 8V) in the plurality of arrays (e.g., detecting a press and hold finger contact input 8130-1 or stylus contact by the user on the "Day at the zoo" array name icon 8132 in FIG. 8V, which is displayed adjacent to a respective representative user interface object toggle icon).

In response to detecting activation of the respective array name icon that corresponds to the respective array, the device displays (1506) an animation of user interface objects in the respective array moving into a respective representative user interface object (e.g., D7-*r* in FIG. 8W) for the respective array (e.g., the "Day at the zoo" array 8052 in FIG. 8W), as described in greater detail above with reference to FIG. 8W.

In some embodiments, in response to detecting activation of the respective array name icon (e.g., 8132 in FIG. 8V) that corresponds to the respective array, the device displays (1508) residual images (e.g., shaded images D1-D34 in FIG. 8Y, as described in greater detail above with reference to FIGS. 8W-8Y) of user interface objects in the respective array (e.g., 8052 in FIG. 8V).

In some embodiments, in response to detecting activation of the respective array name icon that corresponds to the respective array, the device displays (1510) a counter (e.g., 8136 in FIG. 8X) with the number of user interface objects (e.g., "35") in the respective array.

The device detects (1512) movement (e.g., 8132 in FIG. 8X) of an input by the user (e.g., a finger contact or stylus contact) from the array name icon (e.g., 8132 in FIG. 8X) to a destination object or an area (e.g., 8134 in FIGS. 8X-8Y) associated with a destination object, as described in greater detail above with reference to FIG. 8X.

The device moves (1514) the respective representative user interface object (e.g., representative image D7-*r* in FIG. 8X) (and, in some embodiments, a counter 8134 with the number of user interface objects in the respective array) in accordance with the movement of the input by the user across the touch screen display to the destination object or the area associated with a destination object, as described in greater detail above with reference to FIG. 8X.

In some embodiments, in response to detecting movement of the input by the user from the array name icon, the device displays (1516) a residual image of the respective representative user interface object (e.g., shaded representative image D7-*r* in FIG. 8Z). In some embodiments, the residual image of the respective representative user interface object is (1518) displayed adjacent to a respective representative user interface object toggle icon. (e.g., icon 8138 in FIG. 8Z).

The device detects (1520) lift off of the input by the user (e.g., lift off of the finger contact or stylus contact) from the touch screen display at the destination object or at the area (e.g., 8134 in FIG. 8Y) associated with a destination object.

In response to detecting lift off of the input by the user from the touch screen display at the destination object or at the area associated with the destination object, the device performs (1522) an action on the user interface objects in the respective array. The action is associated with the destination object. Exemplary actions include, without limitation: associating a label with digital content or an electronic document: moving digital content or an electronic document from one event to another event; moving digital content or an electronic document to a folder, and printing/publishing a copy of the digital content or electronic document, as described in greater detail above with reference to FIGS. 8Y-8AA.

In some embodiments, the action is (1524) performed on all of the user interface objects in the respective array (e.g., on all of the images D1-D16, D81-D36 in array 8052 in FIG. 8V).

In some embodiments, in response to detecting lift off of the input by the user (e.g., lift off of the finger contact 8130-2 in FIG. 8Y or stylus contact) from the touch screen display at the destination object or at the area (e.g., 8134 in FIG. 8Y) associated with the destination object, the device displays (1526) the user interface objects in the respective array (e.g., 8064 in FIG. 8AA) and ceases to display the residual images of user interface objects in the respective array (i.e., the user interface objects replace their residual images in the respective array as shown in FIG. 8AA), as described in greater detail above with reference to FIGS. 8Y-8AA.

In some embodiments, in response to detecting lift off of the input by the user (e.g., lift off of the finger contact 8130-2 in FIG. 8Y or stylus contact) from the touch screen display at the destination object or at the area (e.g., 8134 in FIG. 8Y) associated with the destination object, the device disassociates (1528) the user interface objects from the respective array and ceases to display the residual images of the user interface objects in the respective array (not shown).

Figure 16A:
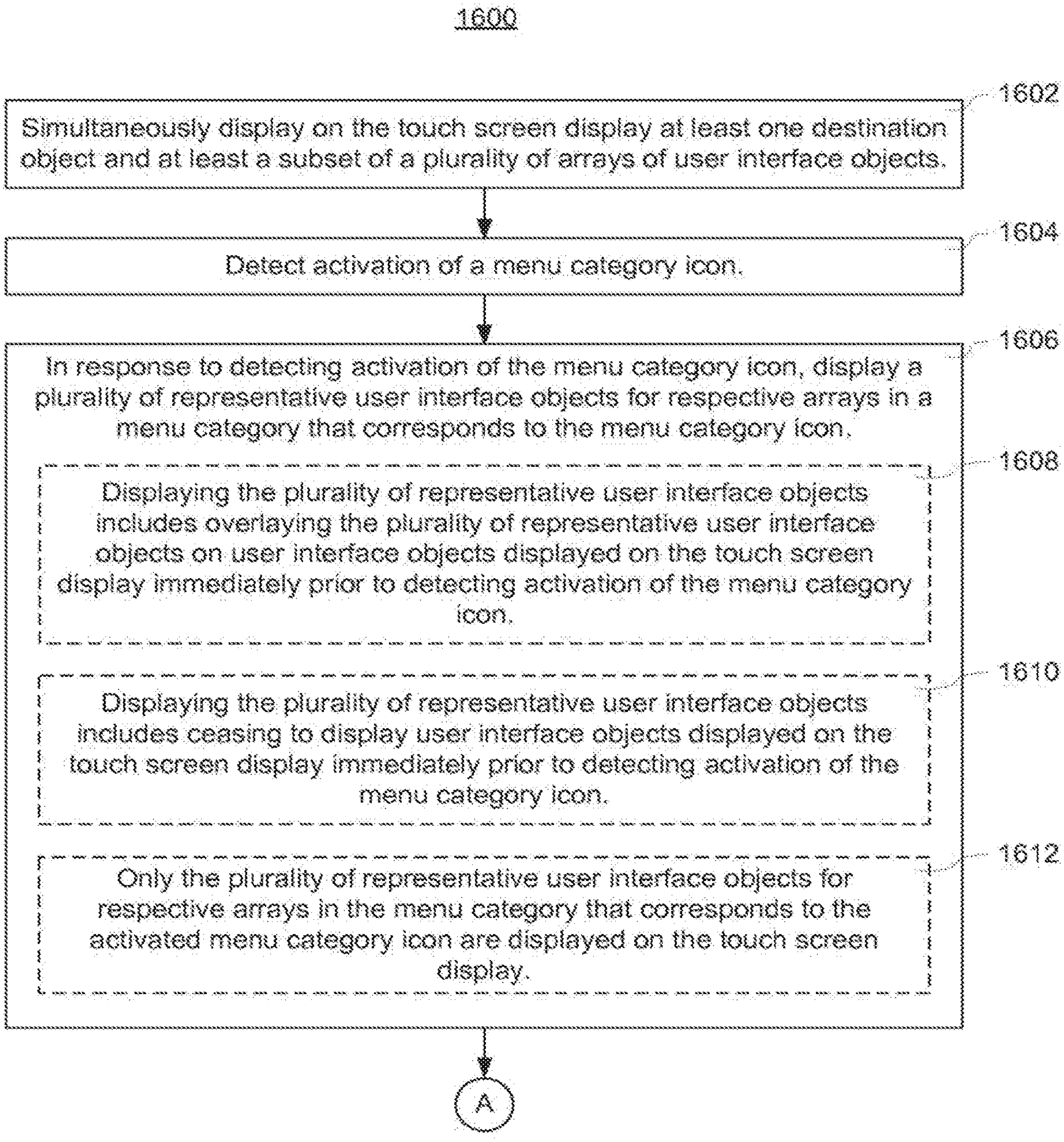

FIGS. 16A-16B are flow diagrams illustrating a method 1600 of using representative user interface objects for respective arrays in a menu category to select an array in accordance with some embodiments. The method 1600 is performed at a computing device (e.g., device 300, FIG. 3, or portable multifunction device 100, FIG. 1) with a touch screen display (e.g., 112 in FIGS. 8AA-8EE). Some operations in method 1600 may be combined and/or the order of some operations may be changed.

As described below, the method 1600 provides an intuitive way to quickly find and select an array in a plurality of arrays at a computing device with a touch screen display. The method reduces the cognitive burden on a user when trying to find a particular array in a plurality of arrays, thereby creating a more efficient human-machine interface. For battery-operated computing devices, enabling a user to find a particular array faster and more efficiently conserves power and increases the time between battery charges.

The device simultaneously displays (1602) on the touch screen display at least one destination object (e.g., an array name icon in a list or menu of such icons) and at least a subset of a plurality of arrays of user interface objects. Depending on the number of arrays, it may not be possible to simultaneously display every array in the plurality of arrays. In such cases, a subset of the plurality of arrays is displayed and different subsets may be viewed by scrolling the plurality of arrays (e.g., in response to detecting a first finger swipe gesture on the touch screen display, such as a vertical or substantially vertical finger swipe gesture).

The device detects (1604) activation of a menu category icon (e.g., activation of menu category icon "Events" 8002 for a plurality of array name icons for events 8004, 8006, 8008, 8010, 8012, 8014, 8016, 8018, 8020, 8022, 8024 in FIG. 8AA by a finger tap gesture 8140, stylus gesture, or mouse click on the menu category icon).

In response to detecting activation of the menu category icon (e.g., "Events" 8002), the device displays (1606) a plurality of representative user interface objects for respective arrays in a menu category that corresponds to the menu category icon, (e.g., representative images B1-*r*, D7-*r*, S33-*r*, F8-*r*, E45-*r*, V17-*r*, N5-*r*, L2-*r*, R11-*r*, H27-*r* and P6-*r* in FIGS. 8BB-8DD).

In some embodiments, displaying (1608) the plurality of representative user interface objects includes overlaying the plurality of representative user interface objects (e.g., representative images B1-*r*, D7-*r*, S33-*r*, F8-*r*, E45-*r*, V17-*r*, N5-*r*, L2-*r*, R11-*r*, H27-*r* and P6-*r* in FIGS. 8BB-8CC) on user interface objects displayed on the touch screen display immediately prior to detecting activation of the menu category icon, as described in greater detail above with reference to FIGS. 8BB-8CC. In some embodiments, displaying the plurality of representative user interface objects includes ceasing (1610) to display user interface objects displayed on the touch screen display immediately prior to detecting activation of the menu category icon. In other words, the user interface objects displayed on the touch screen display immediately prior to detecting activation of the menu category icon are replaced by display of the plurality of representative user interface objects (e.g., representative images B1-*r*, D7-*r*, S33-*r*, F8-*r*, E45-*r*, V17-*r*, N5-*r*, L2-*r*, R11-*r*, H27-*r* and P6-*r* in FIG. 8DD) for respective arrays in the menu category that corresponds to the activated menu category icon, as described in greater detail above with reference to FIG. 8DD.

In some embodiments, only the plurality of representative user interface objects for respective arrays in the menu category that corresponds to the activated menu category icon are (1612) displayed on the touch screen display. For example in FIGS. 8BB-8CC the device displays representative user interface objects for a plurality of the "Events" which include arrays of user interface objects. Similarly, if the "Labels" category icon 8026 (FIG. 8A) were selected, the device would display a representative user interface object for each of a plurality of the labels (e.g., a representative user interface object for the label "Little Wesley" and a representative user interface object for the label "Adorable children"), where selecting the representative user interface object for a respective label would display an array of user interface objects associated with the respective label.

In some embodiments, the device detects (1614) an input by the user (e.g., a finger tap gesture e.g., 8142 in FIG. 8CC, stylus gesture, or mouse click) on a first representative user interface object (e.g., representative image B1-*r* in FIG. 8CC) in the plurality of representative user interface objects for respective arrays in the menu category that corresponds to the activated menu category icon. In response to detecting the input (e.g., tap gesture 8142 in FIG. 8CC) by the user on the first representative user interface object, the device ceases to display the plurality of representative user interface objects (e.g., representative image B1-*r*, D7-*r*, S33-*r*, F8-*r*, E45-*r*, V17-*r*, N5-*r*, L2-*r*, R11-*r*, H27-*r* and P6-*r* in FIG. 8CC) and displays an array of user interface objects that corresponds to the first representative user interface object (e.g., images in the "Birthday" array 8144, as shown in FIG. 8EE).

In some embodiments, in response to detecting the input by the user on the first representative user interface object, the device displays (1616) the first representative user interface object (e.g., representative image B1-*r* in FIG. 8EE) adjacent to the array (e.g., "Birthday" array 8144 in FIG. 8EE) of user interface objects that corresponds to the first representative user interface object.

In some embodiments, in response to detecting the input by the user on the first representative user interface object, the device displays (1618) arrays (e.g., 8052 in FIG. 8EE) of user interface objects that do not correspond to the first representative user interface object (e.g., B1-*r* in FIG. 8EE), In other words, the device displays arrays in the plurality of arrays that are adjacent to the array of user interface objects that corresponds to the first representative user interface object.

In some embodiments, selected object(s) are moved to a destination object (e.g., an item in sidebar menu) while input by the user (e.g., a finger contact or stylus contact) is on the destination object, as described above with respect to FIGS. 5A-5Y and 9A-9D, 10A-10B.

Figure 17A:
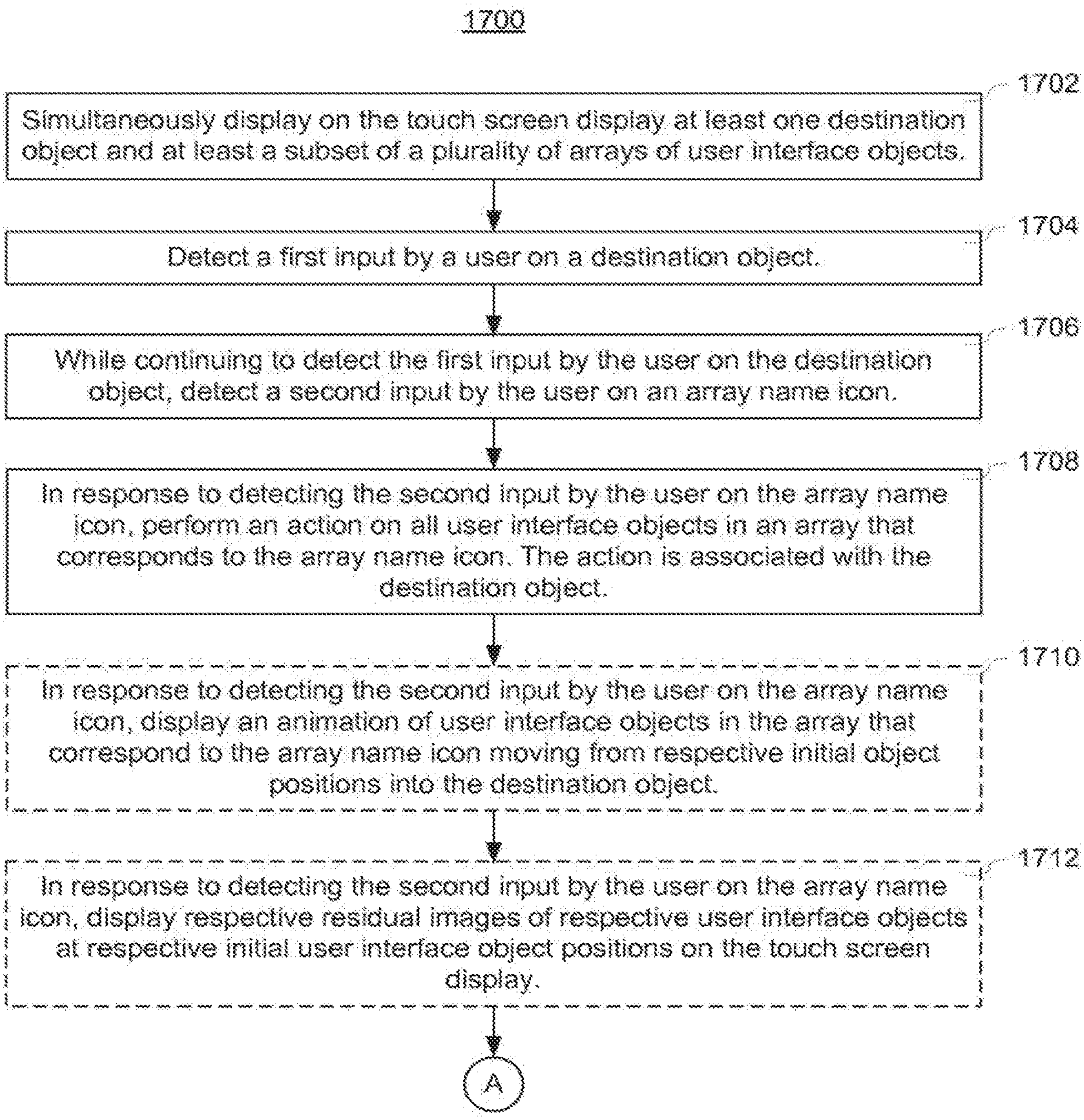

FIGS. 17A-17B are flow diagrams illustrating a method 1700 of performing an action on user interface objects in an array in accordance with some embodiments. The method 1700 is performed at a computing device (e.g., device 300, FIG. 3, or portable multifunction device 100, FIG. 1) with a touch screen display (e.g., 112 in FIGS. 8EE-8MM). Some operations in method 1700 may be combined and/or the order of some operations may be changed.

As described below, the method 1700 provides an intuitive way to perform an action on all or most user interface objects in one array of a plurality of arrays at a computing device with a touch screen display. The method reduces the cognitive burden on a user when performing the same action on all or most user interface objects in an array of user interface objects, thereby creating a more efficient human-machine interface. For battery-operated computing devices, enabling a user to perform the same action on all or most interface object in an array faster and more efficiently conserves power and increases the time between battery charges.

The device simultaneously displays (1702) on the touch screen display at least one destination object (e.g., an array name icon in a list or menu of such icons) and at least a subset of a plurality of arrays (e.g., 8144 and 8052 in FIG. 8FF) of user interface objects. Depending on the number of arrays, it may not be possible to simultaneously display every array in the plurality of arrays. In such cases, a subset of the plurality of arrays is displayed and different subsets may be viewed by scrolling the plurality of arrays (e.g., in response to detecting a first finger swipe gesture on the touch screen display, such as a vertical or substantially vertical finger swipe gesture), as described in greater detail above with reference to FIGS. 8A-8F.

The device detects (1704) a first input by a user (e.g., a finger contact 8146 in FIG. 8FF or stylus contact) on a destination object (e.g., "Adorable children" label icon 8032 in FIG. 8FF).

While continuing to detect the first input (e.g., contact 8146 in FIGS. 8FF-8LL) by the user on the destination object (e.g., "Adorable children" label icon 8032 in FIGS. 8FF-8LL), the device detects (1706) a second input by the user on an array name icon (e.g., a finger tap gesture 8148 in FIG. 8GG, stylus gesture, or mouse click by the user on an array name icon 8132 in FIG. 8GG displayed adjacent to a respective representative user interface object toggle icon 8138 in FIG. 8GG).

In response to detecting the second input (e.g., tap gesture 8148 in FIG. 8GG) by the user on the array name icon, the device performs (1708) an action on all user interface objects (e.g., images D1-D16, D18-D36 in FIG. 8GG) in an array (e.g., "Day at the zoo" array 8052 in FIG. 8GG) that corresponds to the array name icon (e.g., 8132 in FIG. 8GG). The action is associated with the destination object (e.g., "Adorable children" label icon 8032 in FIG. 8HH). In some embodiments, the action is a preparatory action, such as preparing to perform an action that will occur upon detecting lift off of the first input (e.g., lift off of the first finger contact 8416 in FIG. 8GG by the user) from the destination object. Exemplary actions include, without limitation: associating a label with digital content or an electronic document; moving digital content or an electronic document from one event to another event; moving digital content or an electronic document to a folder; and printing/publishing a copy of the digital content or electronic document.

In some embodiments, in response to detecting the second input (e.g., tap gesture 8148 in FIG. 8GG) by the user on the array name icon (e.g., 8132 in FIG. 8GG), the device displays (1710) an animation of user interface objects in the array (e.g., 8052 in FIGS. 8GG-8II) that correspond to the array name icon moving from respective initial object positions into the destination object (e.g., 8032 in FIGS. 8GG-8II), as described in greater detail above with reference to FIGS. 8GG-8JJ. The animation indicates to a user that an action associated with the destination object will be applied to the user interface objects in this array.

In some embodiments, in response to detecting the second input (e.g., tap gesture 8148 in FIG. 8GG) by the user on the array name icon (e.g., 8132 in FIG. 8GG) the device displays (1712) respective residual images (e.g., shaded images D0-D16 and D18-D36 in FIG. 8JJ) of respective user interface objects at respective initial user interface object positions on the touch screen display.

In some embodiments, the device detects (1714) a third input by the user (e.g., a finger tap gesture 8150 (FIG. 8JJ), stylus gesture, or mouse click) on a respective residual image (e.g., shaded image D12 in FIG. 8JJ) of a respective user interface object at a respective initial user interface object position on the touch screen display while continuing to detect the first input by the user on the destination object (e.g., contact 8146 on "Adorable children" icon 8032 in FIG. 8JJ). In response to detecting the third input (e.g., tap gesture 8150 in FIG. 8JJ) by the user on the respective residual image of the respective user interface object (e.g., shaded image D12 in FIG. 8JJ) at the respective initial user interface object position on the touch screen display, the device undoes the action performed on the respective user interface object and displays the respective user interface object at the respective initial user interface object position, as described in greater detail above with reference to FIGS. 8JJ-8LL. For example, image D12 will not be labeled "Adorable children" and the residual shaded image of D12 (FIG. 8JJ) is replaced by the original unshaded image of D12 (FIG. 8LL).

In some embodiments, in response to detecting the third input (e.g., tap gesture 8150 in FIG. 8JJ) by the user on the respective residual image (e.g., shaded image D12 in FIG. 8JJ) of the respective user interface object at the respective initial user interface object position on the touch screen display, the device displays (1716) an animation of the respective user interface object moving from the destination object back to the respective initial user interface object position, as described in greater detail above with reference to FIG. 8KK. The animation indicates to a user that an action associated with the destination object will not be applied to the respective user interface object.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:

a display;

one or more processors; and memory storing one or more programs configured to be executed by the one or more processors, the one or more programs including instructions for:

displaying, on the display, a first plurality of representations of a plurality of content items, the first plurality of representations of the plurality of content items including a first representation of a first content item displayed with a first aspect ratio and a first representation of a second content item displayed with a second aspect ratio different from the first aspect ratio;

displaying, concurrently with the first plurality of representations of the plurality of content items, a selectable user interface object;

while displaying the first plurality of representations of the plurality of content items and the selectable user interface object, detecting an activation of the selectable user interface object; and in response to detecting the activation of the selectable user interface object, displaying a second plurality of representations of the plurality of content items, the second plurality of representations of the plurality of content items including a second representation of the first content item and a second representation of the second content item, wherein the second representation of the first content item and the second representation of the second content item are displayed with a same aspect ratio.

2. The electronic device of claim 1, wherein displaying the second plurality of representations of the plurality of content items includes rearranging the display of the first plurality of representations of the plurality of content items.

3. The electronic device of claim 1, wherein the one or more programs further include instructions for:

while displaying the second plurality of representations of the plurality of content items, displaying a second selectable user interface object;

while displaying the second plurality of representations of the plurality of content items and the second selectable user interface object, detecting an activation of the second selectable user interface object; and in response to detecting the activation of the second selectable user interface object, displaying the first plurality of representations of the plurality of content items including the first representation of the first content item displayed with the first aspect ratio and the first representation of the second content item displayed with the second aspect ratio.

4. The electronic device of claim 1, wherein the one or more programs further include instructions for:

before displaying the first plurality of representations of the plurality of content items and the selectable user interface object, displaying a plurality of event icons including an event icon that corresponds to the plurality of content items, wherein displaying the first plurality of representations of the plurality of content items is performed in response to detecting activation of the event icon that corresponds to the plurality of content items.

5. The electronic device of claim 1, wherein the one or more programs further include instructions for:

displaying, concurrently with the second plurality of representations of the plurality of content items, a representative content item that corresponds to the plurality of content items.

6. The electronic device of claim 1, wherein the one or more programs further include instructions for:

while displaying the first plurality of representations of the plurality of content items, detecting a gesture in a direction on the display; and in response to detecting the gesture in the direction on the display, scrolling the first plurality of representations of the plurality of content items.

7. The electronic device of claim 1, wherein the one or more programs further include instructions for:

while displaying the second plurality of representations of the plurality of content items, detecting a gesture in a direction on the display; and in response to detecting the gesture in the direction on the display, scrolling the second plurality of representations of the plurality of content items.

8. The electronic device of claim 1, wherein the second representation of the first content item and the second representation of the second content item are displayed with a third aspect ratio that is different from the first aspect ratio and the second aspect ratio.

9. A non-transitory computer-readable storage medium storing one or more programs configured to be executed by one or more processors of an electronic device with a display, the one or more programs including instructions for:

displaying, on the display, a first plurality of representations of a plurality of content items, the first plurality of representations of the plurality of content items including a first representation of a first content item displayed with a first aspect ratio and a first representation of a second content item displayed with a second aspect ratio different from the first aspect ratio;

displaying, concurrently with the first plurality of representations of the plurality of content items, a selectable user interface object;

while displaying the first plurality of representations of the plurality of content items and the selectable user interface object, detecting an activation of the selectable user interface object; and in response to detecting the activation of the selectable user interface object, displaying a second plurality of representations of the plurality of content items, the second plurality of representations of the plurality of content items including a second representation of the first content item and a second representation of the second content item, wherein the second representation of the first content item and the second representation of the second content item are displayed with a same aspect ratio.

10. The non-transitory computer readable storage medium of claim 9, wherein displaying the second plurality of representations of the plurality of content items includes rearranging the display of the first plurality of representations of the plurality of content items.

11. The non-transitory computer readable storage medium of claim 9, wherein the one or more programs further include instructions for:

while displaying the second plurality of representations of the plurality of content items, displaying a second selectable user interface object;

while displaying the second plurality of representations of the plurality of content items and the second selectable user interface object, detecting an activation of the second selectable user interface object; and in response to detecting the activation of the second selectable user interface object, displaying the first plurality of representations of the plurality of content items including the first representation of the first content item displayed with the first aspect ratio and the first representation of the second content item displayed with the second aspect ratio.

12. The non-transitory computer readable storage medium of claim 9, wherein the one or more programs further include instructions for:

before displaying the first plurality of representations of the plurality of content items and the selectable user interface object, displaying a plurality of event icons including an event icon that corresponds to the plurality of content items, wherein displaying the first plurality of representations of the plurality of content items is performed in response to detecting activation of the event icon that corresponds to the plurality of content items.

13. The non-transitory computer readable storage medium of claim 9, wherein the one or more programs further include instructions for:

displaying, concurrently with the second plurality of representations of the plurality of content items, a representative content item that corresponds to the plurality of content items.

14. The non-transitory computer readable storage medium of claim 9, wherein the one or more programs further include instructions for:

while displaying the first plurality of representations of the plurality of content items, detecting a gesture in a direction on the display; and in response to detecting the gesture in the direction on the display, scrolling the first plurality of representations of the plurality of content items.

15. The non-transitory computer readable storage medium of claim 9, wherein the one or more programs further include instructions for:

while displaying the second plurality of representations of the plurality of content items, detecting a gesture in a direction on the display; and in response to detecting the gesture in the direction on the display, scrolling the second plurality of representations of the plurality of content items.

16. The non-transitory computer readable storage medium of claim 9, wherein the second representation of the first content item and the second representation of the second content item are displayed with a third aspect ratio that is different from the first aspect ratio and the second aspect ratio.

17. A method, comprising:

at an electronic device with a display:

displaying, on the display, a first plurality of representations of a plurality of content items, the first plurality of representations of the plurality of content items including a first representation of a first content item displayed with a first aspect ratio and a first representation of a second content item displayed with a second aspect ratio different from the first aspect ratio;

displaying, concurrently with the first plurality of representations of the plurality of content items, a selectable user interface object;

while displaying the first plurality of representations of the plurality of content items and the selectable user interface object, detecting an activation of the selectable user interface object; and in response to detecting the activation of the selectable user interface object, displaying a second plurality of representations of the plurality of content items, the second plurality of representations of the plurality of content items including a second representation of the first content item and a second representation of the second content item, wherein the second representation of the first content item and the second representation of the second content item are displayed with a same aspect ratio.

18. The method of claim 17, wherein displaying the second plurality of representations of the plurality of content items includes rearranging the display of the first plurality of representations of the plurality of content items.

19. The method of claim 17, further comprising:

while displaying the second plurality of representations of the plurality of content items, displaying a second selectable user interface object;

while displaying the second plurality of representations of the plurality of content items and the second selectable user interface object, detecting an activation of the second selectable user interface object; and in response to detecting the activation of the second selectable user interface object, displaying the first plurality of representations of the plurality of content items including the first representation of the first content item displayed with the first aspect ratio and the first representation of the second content item displayed with the second aspect ratio.

20. The method of claim 17, further comprising:

before displaying the first plurality of representations of the plurality of content items and the selectable user interface object, displaying a plurality of event icons including an event icon that corresponds to the plurality of content items, wherein displaying the first plurality of representations of the plurality of content items is performed in response to detecting activation of the event icon that corresponds to the plurality of content items.

21. The method of claim 17, further comprising:

displaying, concurrently with the second plurality of representations of the plurality of content items, a representative content item that corresponds to the plurality of content items.

22. The method of claim 17, further comprising:

while displaying the first plurality of representations of the plurality of content items, detecting a gesture in a direction on the display; and in response to detecting the gesture in the direction on the display, scrolling the first plurality of representations of the plurality of content items.

23. The method of claim 17, further comprising:

while displaying the second plurality of representations of the plurality of content items, detecting a gesture in a direction on the display; and in response to detecting the gesture in the direction on the display, scrolling the second plurality of representations of the plurality of content items.

24. The method of claim 17, wherein the second representation of the first content item and the second representation of the second content item are displayed with a third aspect ratio that is different from the first aspect ratio and the second aspect ratio.

* * * * *